US010963657B2

(12) United States Patent
Rodriguez et al.

(10) Patent No.: US 10,963,657 B2
(45) Date of Patent: Mar. 30, 2021

(54) METHODS AND ARRANGEMENTS FOR IDENTIFYING OBJECTS

(71) Applicant: Digimarc Corporation, Beaverton, OR (US)

(72) Inventors: Tony F. Rodriguez, Portland, OR (US); Bruce L. Davis, Lake Oswego, OR (US); Geoffrey B. Rhoads, West Linn, OR (US); Eric D. Evans, Portland, OR (US); Rebecca L. Gerlach, Beaverton, OR (US); Tomas Filler, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/893,856

(22) Filed: Jun. 5, 2020

(65) Prior Publication Data

US 2020/0380226 A1    Dec. 3, 2020

Related U.S. Application Data

(60) Division of application No. 15/462,597, filed on Mar. 17, 2017, which is a continuation-in-part of (Continued)

(51) Int. Cl.
*G06K 9/00* (2006.01)
*G06K 7/10* (2006.01)
(Continued)

(52) U.S. Cl.
CPC ....... *G06K 7/10861* (2013.01); *G06K 7/1456* (2013.01); *G06K 9/00671* (2013.01);
(Continued)

(58) Field of Classification Search
CPC .... G06K 7/10861; G06K 9/18; G06K 7/1456; G06K 9/209; G06K 9/00671; G06K 9/46;
(Continued)

(56) References Cited

U.S. PATENT DOCUMENTS

| 4,656,463 | A |   | 4/1987 | Anders |
| 5,537,118 | A | * | 7/1996 | Appriou ................ G01S 13/726 342/95 |

(Continued)

FOREIGN PATENT DOCUMENTS

| EP | 0965393 | A2 | * | 12/1999 | ......... G01N 21/8901 |
| EP | 1041378 | A1 | * | 10/2000 | ................ G01J 3/46 |

(Continued)

OTHER PUBLICATIONS

Ren, et al, Learning probabilistic models for contour completion in natural images, International Journal of Computer Vision, May 1, 2008, pp. 47-63.

(Continued)

*Primary Examiner* — Mahendra R Patel
(74) *Attorney, Agent, or Firm* — Digimarc Corporation

(57) ABSTRACT

In some arrangements, product packaging is digitally watermarked over most of its extent to facilitate high-throughput item identification at retail checkouts. Imagery captured by conventional or plenoptic cameras can be processed (e.g., by GPUs) to derive several different perspective-transformed views—further minimizing the need to manually reposition items for identification. Crinkles and other deformations in product packaging can be optically sensed, allowing such surfaces to be virtually flattened to aid identification. Piles of items can be 3D-modelled and virtually segmented into geometric primitives to aid identification, and to discover locations of obscured items. Other data (e.g., including data from sensors in aisles, shelves and carts, and gaze tracking (Continued)

for clues about visual saliency) can be used in assessing identification hypotheses about an item. Logos may be identified and used—or ignored—in product identification. A great variety of other features and arrangements are also detailed.

57 Claims, 52 Drawing Sheets

Related U.S. Application Data application No. 15/175,997, filed on Jun. 7, 2016, now Pat. No. 10,192,087, and a continuation-in-part of application No. 14/839,561, filed on Aug. 28, 2015, now Pat. No. 9,600,982, which is a division of application No. 13/946,968, filed on Jul. 19, 2013, now Pat. No. 9,129,277, which is a continuation-in-part of application No. 13/750,752, filed on Jan. 25, 2013, now Pat. No. 9,367,770, and a division of application No. 13/750,752, filed on Jan. 25, 2013, now Pat. No. 9,367,770, and a continuation-in-part of application No. PCT/US2012/005321, filed on Aug. 30, 2012, and a continuation-in-part of application No. 13/231,893, filed on Sep. 13, 2011, now Pat. No. 9,033,238.

(60) Provisional application No. 61/724,854, filed on Nov. 9, 2012, provisional application No. 61/716,223, filed on Oct. 19, 2012, provisional application No. 61/693,225, filed on Aug. 24, 2012, provisional application No. 61/544,996, filed on Oct. 7, 2011, provisional application No. 61/540,455, filed on Sep. 28, 2011, provisional application No. 61/537,523, filed on Sep. 21, 2011, provisional application No. 61/533,079, filed on Sep. 9, 2011, provisional application No. 61/531,525, filed on Sep. 6, 2011, provisional application No. 61/529,214, filed on Aug. 30, 2011.

(51) Int. Cl.

| | | |
|---|---|---|
| *G06K 7/14* | (2006.01) | |
| *G06K 9/18* | (2006.01) | |
| *G06K 9/20* | (2006.01) | |
| *G06K 9/78* | (2006.01) | |
| *G06Q 30/00* | (2012.01) | |
| *G07G 1/00* | (2006.01) | |
| *G06Q 20/20* | (2012.01) | |
| *G06Q 10/08* | (2012.01) | |
| *G06Q 30/06* | (2012.01) | |
| *G06K 9/46* | (2006.01) | |
| *G06F 3/147* | (2006.01) | |

(52) U.S. Cl.
CPC .............. *G06K 9/18* (2013.01); *G06K 9/209* (2013.01); *G06K 9/78* (2013.01); *G06Q 10/087* (2013.01); *G06Q 20/201* (2013.01); *G06Q 20/208* (2013.01); *G06Q 30/00* (2013.01); *G07G 1/0045* (2013.01); *G06F 3/147* (2013.01); *G06K 9/46* (2013.01); *G06Q 10/08* (2013.01); *G06Q 30/0601* (2013.01); *G06T 2201/0065* (2013.01)

(58) Field of Classification Search
CPC .... G06K 9/78; G06K 2209/17; G06Q 20/201; G06Q 30/00; G06Q 10/087; G06Q 30/0601; G06Q 10/08; G06Q 20/208; G06F 3/147; G06T 2201/0065; G07G 1/0045; G07G 10/0054; G01C 19/4144; G01J 3/052
USPC ........................................................ 382/100
See application file for complete search history.

(56) References Cited

U.S. PATENT DOCUMENTS

| | | | |
|---|---|---|---|
| 5,546,475 | A | 8/1996 | Bolle |
| 5,930,771 | A | 7/1999 | Stapp |
| 5,947,314 | A | 9/1999 | Chilewich |
| 6,041,274 | A | 3/2000 | Onishi |
| 6,069,696 | A | 5/2000 | McQueen |
| 6,155,489 | A | 12/2000 | Collins, Jr. |
| 6,236,736 | B1 | 5/2001 | Crabtree |
| 6,332,573 | B1 | 12/2001 | Gu |
| 6,409,085 | B1* | 6/2002 | Gu ................. G07G 1/0054 235/383 |
| 6,462,663 | B1 | 10/2002 | Wilson |
| 6,606,579 | B1 | 8/2003 | Gu |
| 6,658,138 | B1 | 12/2003 | Gu |
| 6,659,344 | B2 | 12/2003 | Otto |
| 6,725,206 | B1 | 4/2004 | Coveley |
| 6,796,799 | B1 | 9/2004 | Yoshiike |
| 7,085,677 | B1 | 8/2006 | Champlin |
| 7,092,789 | B2 | 8/2006 | Chavez |
| 7,225,980 | B2 | 6/2007 | Ku |
| 7,290,707 | B2 | 11/2007 | Sawasaki |
| 7,416,117 | B1 | 8/2008 | Morrison |
| 7,422,147 | B2* | 9/2008 | Rosenbaum ........... G06Q 20/20 235/383 |
| 7,522,057 | B2 | 4/2009 | Stern |
| 7,576,681 | B2* | 8/2009 | Chen .................... G06K 9/3241 342/175 |
| 7,606,728 | B2 | 10/2009 | Sorensen |
| 7,693,758 | B1 | 4/2010 | Bacco |
| 7,774,243 | B1 | 8/2010 | Antony |
| 7,780,081 | B1 | 8/2010 | Liang |
| 7,909,248 | B1 | 3/2011 | Goncalves |
| 7,949,568 | B2 | 5/2011 | Fano |
| 7,983,448 | B1 | 7/2011 | Da Vitoria Lobo |
| 7,986,809 | B1 | 7/2011 | Funk |
| 8,009,864 | B2 | 8/2011 | Linaker |
| 8,036,956 | B1* | 10/2011 | Felske ................ G06Q 30/0601 705/28 |
| 8,050,984 | B2 | 11/2011 | Bonner |
| 8,094,026 | B1 | 1/2012 | Green |
| 8,098,888 | B1 | 1/2012 | Mummareddy |
| 8,117,071 | B1* | 2/2012 | Fitch .................... G06Q 20/201 705/23 |
| 8,140,185 | B2 | 3/2012 | Simmons |
| 8,175,925 | B1 | 5/2012 | Rouaix |
| 8,189,855 | B2 | 5/2012 | Opalach |
| 8,264,422 | B1 | 9/2012 | Persson |
| 8,325,036 | B1 | 12/2012 | Fuhr |
| 8,380,347 | B2 | 2/2013 | Garson |
| 8,423,431 | B1 | 4/2013 | Rouaix |
| 8,462,212 | B1 | 6/2013 | Kundu |
| 8,538,829 | B1* | 9/2013 | Hu ..................... G06Q 30/0281 705/26.1 |
| 8,571,702 | B1 | 10/2013 | Haake |
| 8,577,136 | B1 | 11/2013 | Ascher |
| 8,577,705 | B1 | 11/2013 | Baboo |
| 8,600,830 | B2* | 12/2013 | Hoffberg ............... G07F 17/323 705/26.3 |
| 8,630,924 | B2 | 1/2014 | Groenevelt et al. |
| 8,680,991 | B2 | 3/2014 | Tran |
| 8,688,598 | B1 | 4/2014 | Shakes |
| 8,695,872 | B2* | 4/2014 | Braunstein ........... G06Q 10/087 235/379 |
| 8,891,820 | B2* | 11/2014 | Owechko ........... G06K 9/00771 382/103 |
| 8,897,485 | B2 | 11/2014 | Fedorovskaya |
| 9,064,161 | B1* | 6/2015 | Boman .................... G06K 7/01 |

(56) References Cited

U.S. PATENT DOCUMENTS

| | | | |
|---|---|---|---|
| 9,135,789 B2* | 9/2015 | Herwig | G07G 1/0054 |
| 9,165,318 B1 | 10/2015 | Pauley | |
| 9,235,928 B2 | 1/2016 | Medioni | |
| 9,311,789 B1 | 4/2016 | Gwin | |
| 9,412,099 B1 | 8/2016 | Tyree | |
| 10,083,453 B2 | 9/2018 | Campbell | |
| 10,192,087 B2 | 1/2019 | Davis | |
| 2002/0104887 A1 | 8/2002 | Schlieffers | |
| 2002/0139848 A1* | 10/2002 | Catan | G06Q 99/00 235/385 |
| 2003/0002712 A1 | 1/2003 | Steenburgh | |
| 2003/0102373 A1 | 6/2003 | Swartz | |
| 2003/0154141 A1 | 8/2003 | Capazario | |
| 2003/0184468 A1* | 10/2003 | Chen | G06T 5/40 342/52 |
| 2003/0186663 A1* | 10/2003 | Chen | G06T 5/40 455/226.3 |
| 2004/0181467 A1 | 9/2004 | Raiyani | |
| 2005/0006569 A1 | 1/2005 | Yoshiyuki | |
| 2005/0027603 A1 | 2/2005 | Green | |
| 2005/0067816 A1 | 3/2005 | Buckman | |
| 2005/0077352 A1 | 4/2005 | Gudbjartsson | |
| 2005/0171854 A1 | 8/2005 | Lyon | |
| 2005/0189411 A1 | 9/2005 | Ostrowski | |
| 2005/0189412 A1 | 9/2005 | Hudnut | |
| 2006/0001545 A1 | 1/2006 | Wolf | |
| 2006/0139166 A1 | 6/2006 | Choutier | |
| 2006/0195050 A1 | 8/2006 | Alwan | |
| 2006/0243798 A1 | 11/2006 | Kundu | |
| 2006/0256082 A1 | 11/2006 | Cho | |
| 2006/0259195 A1 | 11/2006 | Eliuk | |
| 2007/0084918 A1 | 4/2007 | Tabet | |
| 2007/0086679 A1 | 4/2007 | Kudo | |
| 2007/0136224 A1* | 6/2007 | Aboutalib | G06K 9/6288 706/52 |
| 2007/0158417 A1 | 7/2007 | Brewington | |
| 2007/0222674 A1* | 9/2007 | Tan | G06Q 10/08 342/357.32 |
| 2007/0239569 A1 | 10/2007 | Lucas | |
| 2007/0276270 A1 | 11/2007 | Tran | |
| 2008/0018738 A1 | 1/2008 | Lipton | |
| 2008/0019589 A1 | 1/2008 | Yoon | |
| 2008/0055087 A1 | 3/2008 | Horii | |
| 2008/0055194 A1 | 3/2008 | Baudino | |
| 2008/0059570 A1 | 3/2008 | Bill | |
| 2008/0068170 A1 | 3/2008 | Ehrman | |
| 2008/0077511 A1 | 3/2008 | Zimmerman | |
| 2008/0103939 A1 | 5/2008 | Gibb | |
| 2008/0106870 A1 | 5/2008 | Dully | |
| 2008/0109114 A1 | 5/2008 | Orita | |
| 2008/0129518 A1 | 6/2008 | Carlton-Foss | |
| 2008/0183326 A1 | 7/2008 | Danelski | |
| 2008/0186189 A1 | 8/2008 | Azzaro | |
| 2008/0215462 A1 | 9/2008 | Sorensen | |
| 2008/0249859 A1 | 10/2008 | Angell | |
| 2008/0260212 A1 | 10/2008 | Moskal | |
| 2008/0296392 A1 | 12/2008 | Connell | |
| 2008/0306787 A1 | 12/2008 | Hamilton | |
| 2009/0003653 A1 | 1/2009 | Takahata | |
| 2009/0057395 A1* | 3/2009 | He | G06K 9/6278 235/379 |
| 2009/0066513 A1 | 3/2009 | Kondo | |
| 2009/0071854 A1* | 3/2009 | Martin | B25H 3/02 206/373 |
| 2009/0072029 A1 | 3/2009 | Martin | |
| 2009/0121017 A1 | 5/2009 | Cato | |
| 2009/0152348 A1 | 6/2009 | Ostrowski | |
| 2009/0179734 A1 | 7/2009 | Do | |
| 2009/0192882 A1 | 7/2009 | Narahashi | |
| 2009/0195388 A1 | 8/2009 | Ikumi | |
| 2009/0212102 A1 | 8/2009 | Connell, II | |
| 2009/0224925 A1 | 9/2009 | Gannot | |
| 2009/0245573 A1 | 10/2009 | Saptharishi | |
| 2009/0254003 A1 | 10/2009 | Buckman | |
| 2009/0257624 A1 | 10/2009 | Ikumi | |
| 2009/0259571 A1 | 10/2009 | Ebling | |
| 2009/0268028 A1 | 10/2009 | Ikumi | |
| 2009/0268939 A1 | 10/2009 | Connell, II | |
| 2009/0272801 A1 | 11/2009 | Connell, II | |
| 2009/0287449 A1 | 11/2009 | Nagashima | |
| 2009/0306819 A1 | 12/2009 | Insolia | |
| 2009/0319340 A1 | 12/2009 | Sekine | |
| 2009/0322540 A1 | 12/2009 | Richardson | |
| 2009/0322548 A1 | 12/2009 | Gottlieb | |
| 2010/0026470 A1* | 2/2010 | Wilson | G06K 9/6288 340/10.52 |
| 2010/0030578 A1* | 2/2010 | Siddique | G06Q 40/12 705/3 |
| 2010/0059589 A1 | 3/2010 | Goncalves | |
| 2010/0069013 A1* | 3/2010 | Chaudhri | H04W 16/14 455/67.11 |
| 2010/0070338 A1* | 3/2010 | Siotia | G06Q 30/0223 705/7.31 |
| 2010/0114623 A1 | 5/2010 | Bobbitt | |
| 2010/0117959 A1 | 5/2010 | Hong | |
| 2010/0134611 A1 | 6/2010 | Naruoka | |
| 2010/0138037 A1 | 6/2010 | Adelberg | |
| 2010/0158310 A1 | 6/2010 | McQueen | |
| 2010/0172052 A1 | 7/2010 | Shibata | |
| 2010/0177968 A1 | 7/2010 | Fry | |
| 2010/0217678 A1 | 8/2010 | Goncalves | |
| 2010/0219244 A1 | 9/2010 | Silverbrook | |
| 2010/0235250 A1* | 9/2010 | Bar-Levav | G06Q 20/20 705/23 |
| 2010/0277277 A1 | 11/2010 | Green | |
| 2010/0287057 A1 | 11/2010 | Aihara | |
| 2010/0318440 A1 | 12/2010 | Coveley | |
| 2011/0007152 A1 | 1/2011 | Sekine | |
| 2011/0010275 A1 | 1/2011 | Hull | |
| 2011/0011936 A1 | 1/2011 | Morandi | |
| 2011/0098029 A1* | 4/2011 | Rhoads | H04N 5/225 455/418 |
| 2011/0102155 A1 | 5/2011 | Choi | |
| 2011/0125327 A1 | 5/2011 | Sankai | |
| 2011/0161076 A1* | 6/2011 | Davis | G06K 9/6202 704/231 |
| 2011/0178863 A1 | 7/2011 | Daigle | |
| 2011/0230791 A1 | 9/2011 | Ten Kate | |
| 2011/0242025 A1 | 10/2011 | Wen | |
| 2011/0244919 A1* | 10/2011 | Aller | G06Q 30/0281 455/556.1 |
| 2011/0274094 A1 | 11/2011 | Jovicic | |
| 2011/0295412 A1 | 12/2011 | Hara | |
| 2011/0295644 A1 | 12/2011 | Hara | |
| 2011/0295704 A1 | 12/2011 | Edwards | |
| 2011/0316697 A1 | 12/2011 | Krahnstoever | |
| 2011/0320322 A1 | 12/2011 | Roslak | |
| 2012/0019643 A1 | 1/2012 | Gideon | |
| 2012/0041845 A1 | 2/2012 | Rothschild | |
| 2012/0046044 A1* | 2/2012 | Jamtgaard | H04N 7/181 455/456.1 |
| 2012/0055982 A1 | 3/2012 | Edwards | |
| 2012/0087547 A1 | 4/2012 | He | |
| 2012/0095853 A1 | 4/2012 | Von Bose | |
| 2012/0101770 A1 | 4/2012 | Grabiner | |
| 2012/0123277 A1 | 5/2012 | Blaha | |
| 2012/0127314 A1 | 5/2012 | Clements | |
| 2012/0143808 A1* | 6/2012 | Karins | G06N 7/005 706/46 |
| 2012/0169879 A1 | 7/2012 | Libal | |
| 2012/0190386 A1* | 7/2012 | Anderson | G01S 19/14 455/456.3 |
| 2012/0200385 A1 | 8/2012 | Savage | |
| 2012/0205433 A1 | 8/2012 | Dudek | |
| 2012/0208592 A1 | 8/2012 | Davis | |
| 2012/0214515 A1 | 8/2012 | Davis | |
| 2012/0235860 A1 | 9/2012 | Ghazarian | |
| 2012/0245969 A1 | 9/2012 | Campbell | |
| 2012/0262294 A1 | 10/2012 | Nikolovski | |
| 2012/0284132 A1 | 11/2012 | Kim | |
| 2012/0314901 A1 | 12/2012 | Hanson | |
| 2013/0000228 A1 | 1/2013 | Ovaert | |

(56) References Cited

U.S. PATENT DOCUMENTS

| | | |
|---|---|---|
| 2013/0021262 A1 | 1/2013 | Chen |
| 2013/0035950 A1 | 2/2013 | MacDonald |
| 2013/0044942 A1 | 2/2013 | Fan |
| 2013/0048722 A1* | 2/2013 | Davis .................. G06K 7/1456 235/383 |
| 2013/0054333 A1 | 2/2013 | Ross |
| 2013/0073703 A1 | 3/2013 | Das |
| 2013/0076898 A1 | 3/2013 | Philippe |
| 2013/0083064 A1* | 4/2013 | Geisner ................ G06F 16/434 345/633 |
| 2013/0100284 A1 | 4/2013 | Fujii |
| 2013/0103608 A1 | 4/2013 | Scipioni |
| 2013/0110565 A1 | 5/2013 | Means, Jr. |
| 2013/0117153 A1 | 5/2013 | Shen |
| 2013/0126611 A1 | 5/2013 | Kangas |
| 2013/0138395 A1 | 5/2013 | Baggen |
| 2013/0217352 A1 | 8/2013 | Pan |
| 2013/0253700 A1 | 9/2013 | Carson |
| 2013/0265232 A1 | 10/2013 | Yun |
| 2013/0268357 A1 | 10/2013 | Heath |
| 2013/0284806 A1 | 10/2013 | Margalit |
| 2013/0285813 A1 | 10/2013 | Kasama |
| 2013/0290106 A1 | 10/2013 | Bradley |
| 2013/0294646 A1 | 11/2013 | Shaw |
| 2013/0317916 A1 | 11/2013 | Gopalakrishnan |
| 2013/0339115 A1 | 12/2013 | Soldate |
| 2014/0006206 A1* | 1/2014 | Scrivner ............. G06Q 10/083 705/26.8 |
| 2014/0031972 A1 | 1/2014 | Dewitt |
| 2014/0036630 A1 | 2/2014 | Herwig |
| 2014/0043162 A1 | 2/2014 | Siciliano |
| 2014/0074762 A1 | 3/2014 | Campbell |
| 2014/0111380 A1 | 4/2014 | Gibbs |
| 2014/0164176 A1 | 6/2014 | Kitlyar |
| 2014/0185897 A1* | 7/2014 | Neuser .................. G06T 11/008 382/131 |
| 2014/0191863 A1 | 7/2014 | Ten Kate |
| 2014/0220883 A1 | 8/2014 | Emigh |
| 2014/0244429 A1 | 8/2014 | Clayton |
| 2014/0244447 A1 | 8/2014 | Kim |
| 2014/0244488 A1 | 8/2014 | Kim |
| 2014/0253429 A1 | 9/2014 | Dai |
| 2014/0263631 A1 | 9/2014 | Muniz |
| 2014/0266684 A1 | 9/2014 | Poder |
| 2014/0276242 A1 | 9/2014 | Chen |
| 2014/0279294 A1 | 9/2014 | Field-Darragh |
| 2014/0279713 A1 | 9/2014 | Calman |
| 2014/0288714 A1 | 9/2014 | Poivet |
| 2014/0304072 A1 | 10/2014 | Rider |
| 2014/0304107 A1 | 10/2014 | McAllister |
| 2014/0313036 A1 | 10/2014 | Sweeney |
| 2014/0316916 A1* | 10/2014 | Hay ........................ A47F 9/048 705/17 |
| 2014/0338987 A1 | 11/2014 | Kobres |
| 2014/0343846 A1* | 11/2014 | Goldman ............. G01C 21/165 701/525 |
| 2014/0347511 A1 | 11/2014 | Rodriguez-Serrano |
| 2014/0350715 A1 | 11/2014 | Gopalakrishnan |
| 2014/0365334 A1 | 12/2014 | Hurewitz |
| 2014/0379296 A1 | 12/2014 | Nathan |
| 2015/0002292 A1 | 1/2015 | Cavalcanti |
| 2015/0006319 A1 | 1/2015 | Thomas |
| 2015/0006320 A1 | 1/2015 | Goulart |
| 2015/0012396 A1 | 1/2015 | Puerini |
| 2015/0012426 A1* | 1/2015 | Purves ................ G06Q 20/321 705/41 |
| 2015/0019391 A1 | 1/2015 | Kumar |
| 2015/0025969 A1 | 1/2015 | Schroll |
| 2015/0073907 A1 | 3/2015 | Purves |
| 2015/0086107 A1 | 3/2015 | Dedeoglu |
| 2015/0127478 A1 | 5/2015 | Westby |
| 2015/0206096 A1 | 7/2015 | Fernandez |
| 2015/0254704 A1* | 9/2015 | Kothe ................ G06Q 30/0276 705/14.26 |
| 2015/0302720 A1 | 10/2015 | Zhang |
| 2015/0310601 A1* | 10/2015 | Rodriguez ........... G07G 1/0072 348/150 |
| 2015/0317890 A1 | 11/2015 | Ten Kate |
| 2016/0028825 A1 | 1/2016 | Corbin |
| 2016/0038061 A1 | 2/2016 | Kechichian |
| 2016/0113551 A1 | 4/2016 | Annegarn |
| 2017/0249491 A1* | 8/2017 | MacIntosh ......... G06K 9/00671 |
| 2017/0270589 A1* | 9/2017 | Grueneberg ....... G06Q 30/0217 |
| 2018/0075403 A1* | 3/2018 | Mascorro Medina ...................... G06Q 10/087 |

FOREIGN PATENT DOCUMENTS

| | | | |
|---|---|---|---|
| JP | 2001128814 | 5/2001 | |
| WO | WO-9746856 A1 * | 12/1997 | ............... G06K 9/20 |
| WO | 2006085745 | 8/2006 | |
| WO | 2013016803 | 2/2013 | |

OTHER PUBLICATIONS

The ShelfX System, Shelfx web page our-shelfx-system, retrieved from web archive dated Sep. 28, 2012.

Shelfx flyer, Jan., 2012.

Schmidt et al, Context acquisition based on load sensing, International Conference on Ubiquitous Computing, Sept 29, 2002, pp. 333-350.

Kamoda, et al, Grocery re-identification using load balance feature on the shelf for monitoring grocery inventory, Cooking with Computers Workshop (CwC), Aug. 28, 2012, pp. 13-18.

U.S. Appl. No. 12/313,635 of Moon et al, filed Nov. 21, 2008, which is a priority parent to U.S. Pat. No. 10,713,670.

U.S. Appl. No. 61/563,417 of Sorensen, filed Nov. 23, 2011, which is a priority application for U.S. Pat. No. 9,633,328.

U.S. Appl. No. 61/624,062 of Margalit, filed Apr. 13, 2012, which is a priority application for U.S. Pat. No. 2013/0284806.

Bayesian Inference article, Wikipedia, Sep. 8, 2011.

* cited by examiner

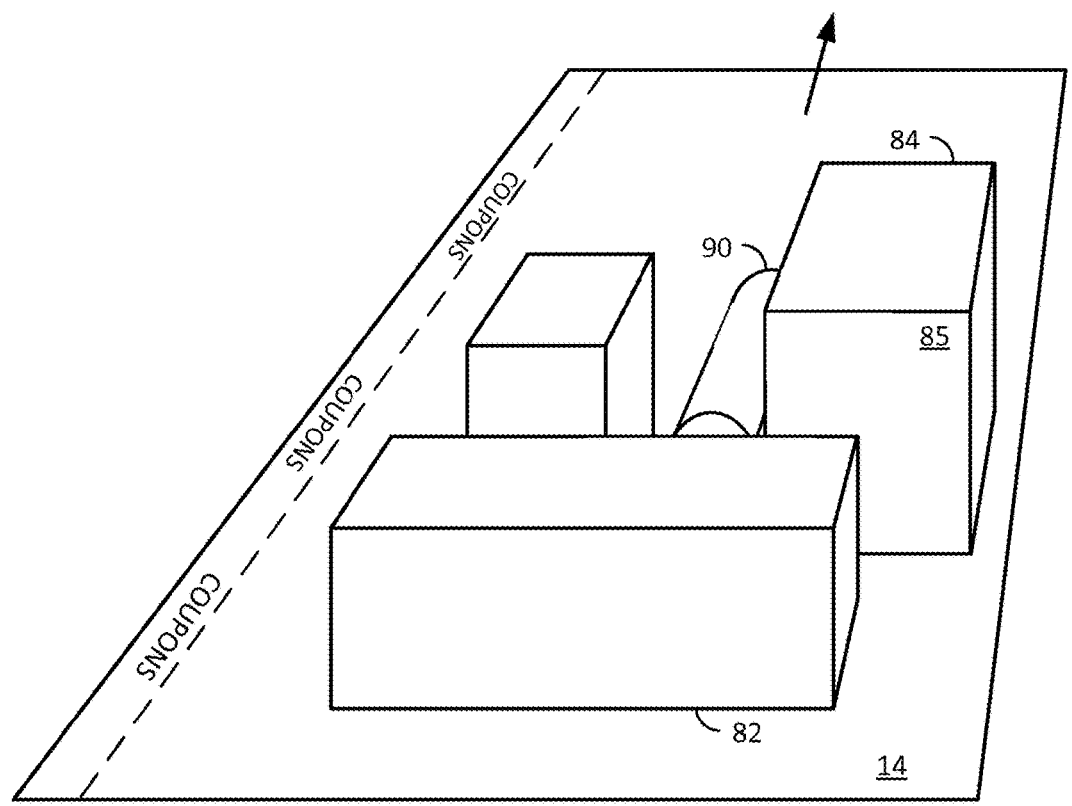
FIG. 9
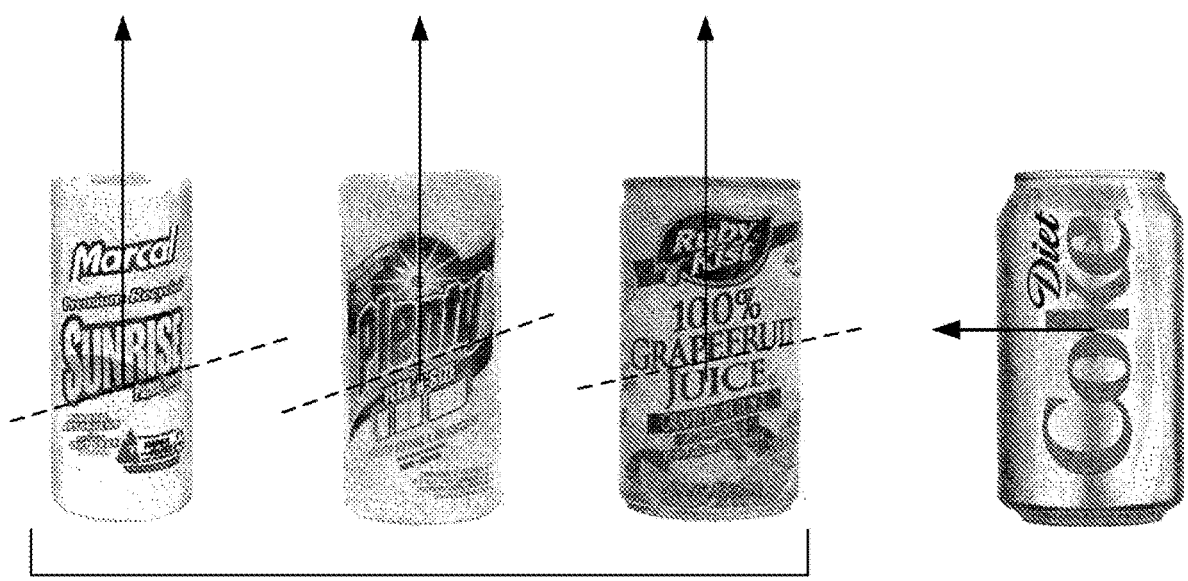
FIG. 10A  FIG. 10B

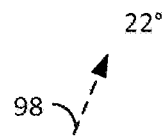 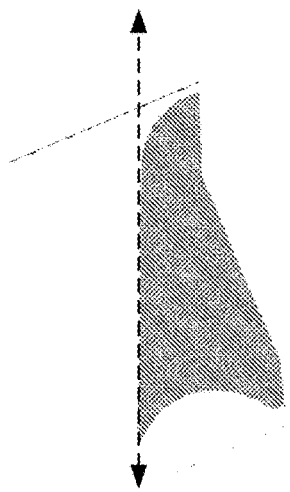 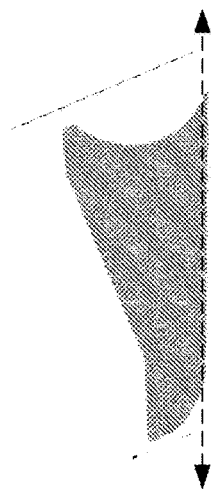
FIG. 16    FIG. 17A    FIG. 17B
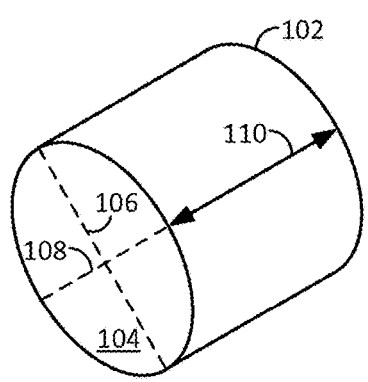 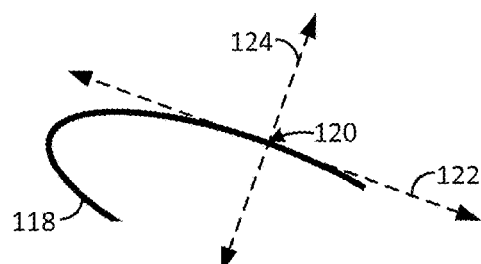
FIG. 19
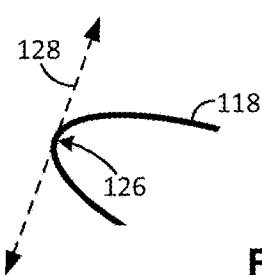
FIG. 18
FIG. 20

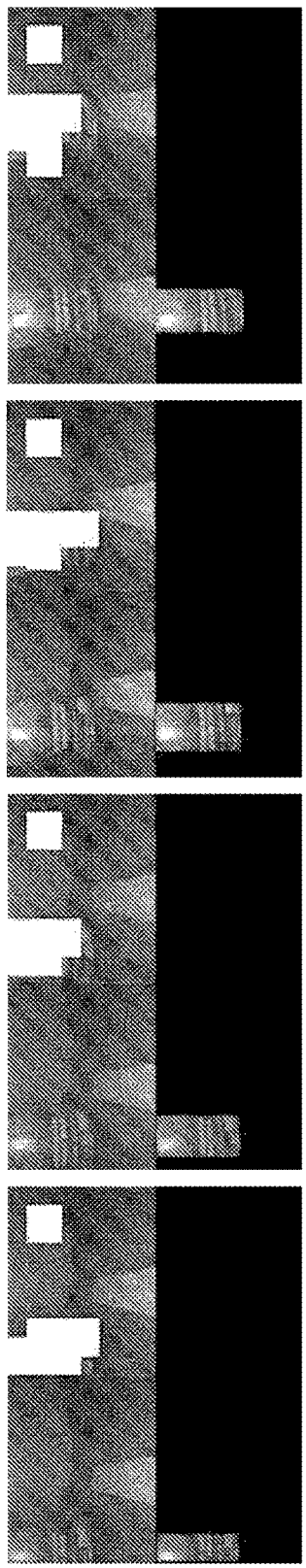
FIG. 42A FIG. 42B FIG. 42C FIG. 42D
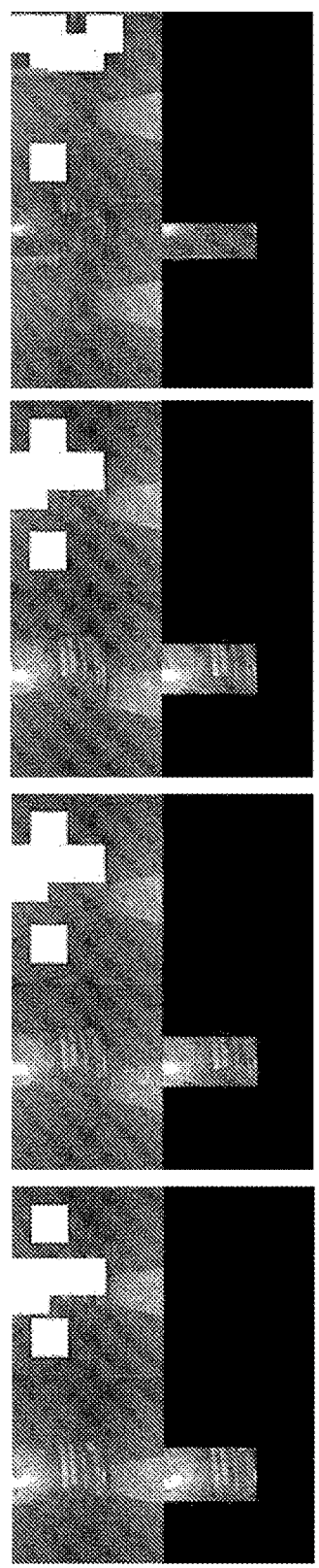
FIG. 42E FIG. 42F FIG. 42G FIG. 42H
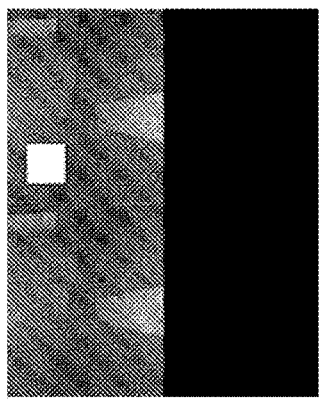
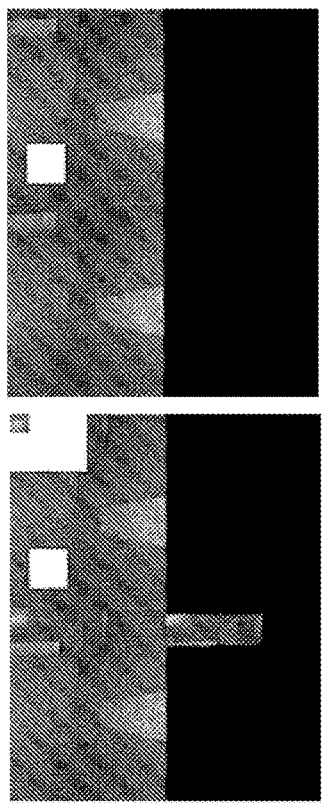
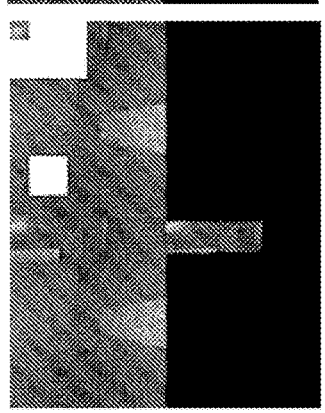
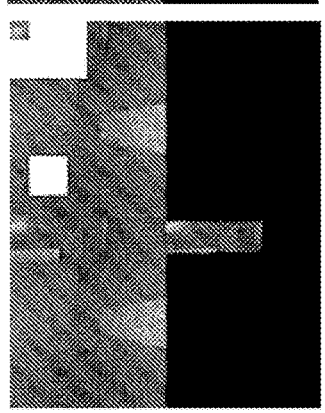
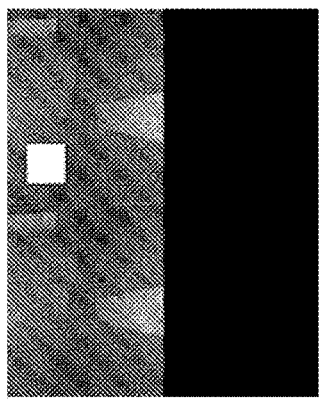
FIG. 42I FIG. 42J

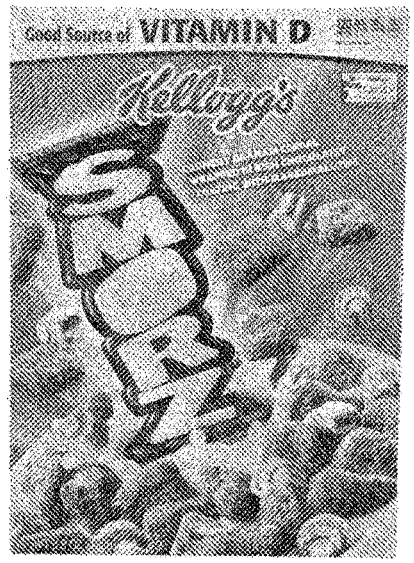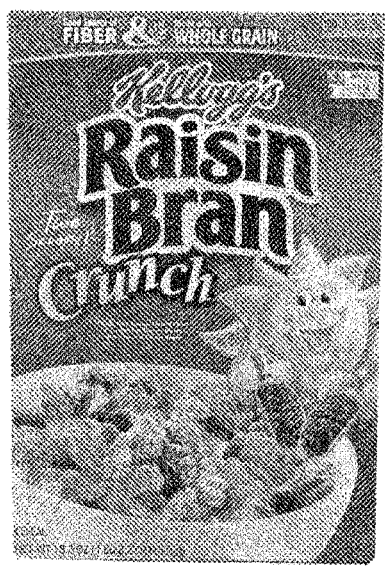
FIG. 44

| KEYPOINT DESCRIPTOR | UPC | NAME |
|---|---|---|
| 26DE4...1BD1A | 038000391095 | Kellogg's Raisin Bran Cereal |
| F4233...5FA0A | 038000391095 | Kellogg's Raisin Bran Cereal |
| 3DF6E...3775D | 038000391095 | Kellogg's Raisin Bran Cereal |

· · ·
· · ·
· · ·

| | | |
|---|---|---|
| CF146...ABFD7 | 038000391095 | Kellogg's Raisin Bran Cereal |
| BC060...173C0 | 038000391095 | Kellogg's Raisin Bran Cereal |
| 8841B...46E16 | 038000391095 | Kellogg's Raisin Bran Cereal |
| 0E6B1...A9483 | 038000391095 | Kellogg's Raisin Bran Cereal |
| 0F9C9...A3DEE | 038000391095 | Kellogg's Raisin Bran Cereal |

· · ·
· · ·
· · ·

| | | |
|---|---|---|
| 8B309...785CA | 038000391095 | Kellogg's Raisin Bran Cereal |
| 7C726...B28F7 | 038000291210 | Kellogg's Rice Crispies Cereal |
| 4EDD0...A6367 | 038000291210 | Kellogg's Rice Crispies Cereal |
| 401D8...31200 | 038000291210 | Kellogg's Rice Crispies Cereal |
| 3E8F9...48337 | 038000291210 | Kellogg's Rice Crispies Cereal |

· · ·
· · ·
· · ·

| | | |
|---|---|---|
| E6578...524E1 | 038000291210 | Kellogg's Rice Crispies Cereal |
| DA861...22B92 | 038000291210 | Kellogg's Rice Crispies Cereal |
| DE674...04220 | 038000291210 | Kellogg's Rice Crispies Cereal |
| AA701...2C165 | 038000291210 | Kellogg's Rice Crispies Cereal |

| KEYPOINT DESCRIPTOR | UPC | COMPANY | PRODUCT NAME | AUXILIARY INFO |
|---|---|---|---|---|
| 26DE4...1BD1A | 038000391095 | Kellogg Co. | Kellogg's Raisin Bran Cereal | LOGO POINT |
| F4233...5FA0A | 038000391095 | Kellogg Co. | Kellogg's Raisin Bran Cereal | LOGO POINT |
| 3DF6E...3775D | 038000391095 | Kellogg Co. | Kellogg's Raisin Bran Cereal | LOGO POINT |
| ... | ... | | | |
| CF146...ABFD7 | 038000391095 | Kellogg Co. | Kellogg's Raisin Bran Cereal | LOGO POINT |
| BC060...173C0 | 038000391095 | Kellogg Co. | Kellogg's Raisin Bran Cereal | |
| 8841B...46E16 | 038000391095 | Kellogg Co. | Kellogg's Raisin Bran Cereal | |
| 0E6B1...A9483 | 038000391095 | Kellogg Co. | Kellogg's Raisin Bran Cereal | |
| 0F9C9...A3DEE | 038000391095 | Kellogg Co. | Kellogg's Raisin Bran Cereal | |
| ... | ... | | | |
| 8B309...785CA | 038000391095 | Kellogg Co. | Kellogg's Raisin Bran Cereal | |
| 7C726...B28F7 | 038000291210 | Kellogg Co. | Kellogg's Rice Crispies Cereal | LOGO POINT |
| 4EDD0...A6367 | 038000291210 | Kellogg Co. | Kellogg's Rice Crispies Cereal | LOGO POINT |
| 401D8...31200 | 038000291210 | Kellogg Co. | Kellogg's Rice Crispies Cereal | LOGO POINT |
| 3E8F9...48337 | 038000291210 | Kellogg Co. | Kellogg's Rice Crispies Cereal | LOGO POINT |
| ... | ... | | | |
| E6578...524E1 | 038000291210 | Kellogg Co. | Kellogg's Rice Crispies Cereal | LOGO POINT |
| DA861...22B92 | 038000291210 | Kellogg Co. | Kellogg's Rice Crispies Cereal | |
| DE674...04220 | 038000291210 | Kellogg Co. | Kellogg's Rice Crispies Cereal | |
| AA701...2C165 | 038000291210 | Kellogg Co. | Kellogg's Rice Crispies Cereal | |
| ... | | | | |

FIG. 47

| KEYPOINT DESCRIPTOR | UPC | COMPANY | PRODUCT NAME | AUXILIARY INFO |
|---|---|---|---|---|
| 26DE4...1BD1A | 038000391095 | Kellogg Co. | Kellogg's Raisin Bran Cereal | 0.2 |
| F4233...5FA0A | 038000391095 | Kellogg Co. | Kellogg's Raisin Bran Cereal | 0.2 |
| 3DF6E...3775D | 038000391095 | Kellogg Co. | Kellogg's Raisin Bran Cereal | 0.2 |
| ... | ... | ... | ... | ... |
| CF146...ABFD7 | 038000391095 | Kellogg Co. | Kellogg's Raisin Bran Cereal | 0.2 |
| BC060...173C0 | 038000391095 | Kellogg Co. | Kellogg's Raisin Bran Cereal | 1.0 |
| 8841B...46E16 | 038000391095 | Kellogg Co. | Kellogg's Raisin Bran Cereal | 1.0 |
| 0E6B1...A9483 | 038000391095 | Kellogg Co. | Kellogg's Raisin Bran Cereal | 1.0 |
| 0F9C9...A3DEE | 038000391095 | Kellogg Co. | Kellogg's Raisin Bran Cereal | 1.0 |
| ... | ... | ... | ... | ... |
| 8B309...785CA | 038000391095 | Kellogg Co. | Kellogg's Raisin Bran Cereal | 1.0 |
| 7C726...B28F7 | 038000291210 | Kellogg Co. | Kellogg's Rice Crispies Cereal | 0.2 |
| 4EDD0...A6367 | 038000291210 | Kellogg Co. | Kellogg's Rice Crispies Cereal | 0.2 |
| 401D8...31200 | 038000291210 | Kellogg Co. | Kellogg's Rice Crispies Cereal | 0.2 |
| 3E8F9...48337 | 038000291210 | Kellogg Co. | Kellogg's Rice Crispies Cereal | 0.2 |
| ... | ... | ... | ... | ... |
| E6578...524E1 | 038000291210 | Kellogg Co. | Kellogg's Rice Crispies Cereal | 0.2 |
| DA861...22B92 | 038000291210 | Kellogg Co. | Kellogg's Rice Crispies Cereal | 1.0 |
| DE674...04220 | 038000291210 | Kellogg Co. | Kellogg's Rice Crispies Cereal | 1.0 |
| AA701...2C165 | 038000291210 | Kellogg Co. | Kellogg's Rice Crispies Cereal | 1.0 |

FIG. 51

MAGNITUDE OF WATERMARK ORIENTATION SIGNAL
IN FREQUENCY DOMAIN

REAL VALUE OF WATERMARK ORIENTATION SIGNAL
IN SPATIAL DOMAIN

METHODS AND ARRANGEMENTS FOR IDENTIFYING OBJECTS

RELATED APPLICATION DATA

This application is a division of application Ser. No. 15/462,597, filed Mar. 17, 2017 (published as 20170249491), which is a continuation-in-part of application Ser. No. 15/175,997, filed Jun. 7, 2016 (now U.S. Pat. No. 10,192,087), which is a division of application Ser. No. 13/750,752, filed Jan. 25, 2013 (now U.S. Pat. No. 9,367,770), which claims priority to provisional applications 61/724,854, filed Nov. 9, 2012; and 61/716,223, filed Oct. 19, 2012. Application Ser. No. 15/462,597 is also a continuation-in-part of application Ser. No. 14/839,561, filed Aug. 28, 2015 (now U.S. Pat. No. 9,600,982), which is a division of application Ser. No. 13/946,968, filed Jul. 19, 2013 (now U.S. Pat. No. 9,129,277), which is a continuation-in-part of said application Ser. No. 13/750,752, filed Jan. 25, 2013. Application Ser. No. 13/946,968 is also a continuation-in-part of application Ser. No. 13/231,893, filed Sep. 13, 2011 (now U.S. Pat. No. 9,033,238), which claims priority to the following provisional applications: 61/533,079, filed Sep. 9, 2011; 61/531,525, filed Sep. 6, 2011; and 61/529,214, filed Aug. 30, 2011. Application Ser. No. 13/946,968 is also a continuation-in-part of PCT application PCT/US12/53201, filed Aug. 30, 2012 (published as WO13033442), which claims priority to the following applications: 61/693,225, filed Aug. 24, 2012; 61/544,996, filed Oct. 7, 2011; 61/540,455, filed Sep. 28, 2011; 61/537,523, filed Sep. 21, 2011; 61/533,079, filed Sep. 9, 2011; 61/531,525, filed Sep. 6, 2011; and 61/529,214, filed Aug. 30, 2011.

The subject matter of this application is also related to that of application Ser. No. 13/804,413, filed Mar. 14, 2013 (now U.S. Pat. No. 9,224,184).

TECHNICAL FIELD

The present technology concerns technologies useful in retail stores, such as for speeding customer checkout.

BACKGROUND AND SUMMARY

The widespread use of barcodes has greatly simplified supermarket checkout. However, many problems persist, causing both inconvenience for shoppers, and added costs for retailers.

One of the difficulties is finding a barcode on a package. While experienced supermarket clerks eventually learn barcode locations for popular products, even the best clerks sometimes have difficulty with less common products. For shoppers who use self-service checkout stations, any product can be confounding.

Another issue concerns re-orienting a package so that its barcode is in position for reading. Many items are straightforward. However, particularly with large items (e.g., a carton of diapers, or a heavy bag of dog food), it can be a physical challenge to manipulate the product so that the barcode is exposed to the reading device. Often in self-service checkout stations, the physical constraints of the checkout station compound the difficulty, as these stations commonly don't have the handheld scanning capability with which conventional checkouts are equipped—forcing the shopper to manipulate the product so that barcode faces a glass scanning platen on the counter. (When properly positioned, the shopper may be unable to view either the platen or the barcode—exacerbating the difficulty.) Moreover, it is not enough for the barcode to be visible to the scanner; it must also be presented so as to roughly face the scanner (i.e., its surface normal must generally be within about 40-50 degrees of facing the scanning device in order to be read).

Sometimes a product is flipped and turned in search of a barcode, only to find there is none. Bottles of wine, for example, commonly lack barcodes.

Yet another issue is occasional difficulty in getting the scanning equipment to successfully read the barcode, after the barcode has been found and correctly positioned. This is a particular problem with malleable items (e.g., a package of frozen peas), in which the barcoded surface is crinkled or otherwise physically irregular.

To redress such issues, some have proposed identifying products with passive tags that can be sensed by radio (e.g., RFID and NFC chips). However, the costs of these tags are an obstacle in the low-margin grocery business. And it can be difficult to distinguish the responses from several different items on a checkout counter. Moreover, certain materials in the check-out queue may be radio-opaque—preventing some identifiers from being read. Privacy issues raise yet further concerns.

Other checkout technologies have also been tried. For example, in patent publication 20040081799, Kodak describes how a marking can be applied to supermarket packaging by adding a polymer layer that defines scannable information in the form of matte and glossy areas. The matte/glossy areas can form indicia such as barcodes, or digital watermarks. However, this technology requires applying a polymer layer to the packaging—a further expense, and an additional processing step that packagers are not equipped to provide.

Other identification technologies have been proposed for use in conjunction with barcode-based product identification. For example, patent application 20040199427 proposes capturing 2D imagery of products, and checking their color histograms against histograms associated with products identified by sensed barcode data, to ensure correct product identification. The same publication similarly proposes weighing articles on the conveyor—again checking for consistency with the barcode-indicated product. Publications 20040223663 and 20090060259 teach related arrangements, in which imagery of products is used to check for possibly switched barcodes.

Applicant's U.S. Pat. No. 7,044,395 teaches that a watermark can replace a barcode, such as a UPC symbol or other standard product code, in a retail point of sale application. A reader unit at a checkout counter extracts a product identifier from the watermark, and uses it to look up the product and its price.

U.S. Pat. No. 4,654,872 describes a system employing two video cameras, which captures images of a 3D article, and uses the imagery to recognize the article. U.S. Pat. No. 7,398,927 teaches another two-camera system, this one to read product codes from articles despite specular reflections. U.S. Pat. No. 7,909,248 details a self-service checkout terminal in which captured imagery is compared against a database of reference imagery to try to identify a matching product.

In accordance with various embodiments of the present technology, certain drawbacks of the prior art are overcome, and new capabilities are provided.

For example, in one aspect, the present technology involves marking product packaging with a digital watermark that encodes related information (e.g., Universal Product Codes, such as UPC-A or UPC-E; Electronic Product Codes—EPC, European Article Number Codes—EAN, a URI or web address, etc.). The marking spans a substantial part of the packaging surface area, so that it can be sensed from one or more fixed cameras at a checkout station without repositioning of the item. The watermark indicia is applied to the packaging along with other printing—integrated in the other packaging artwork.

In one such embodiment, a variety of recognition technologies are used at a checkout station—looking for different indicia of product identification (watermark, barcode, color histogram, weight, temperature, etc.). The system applies a set of rules to the collected evidence, and outputs a product identification based on the available information.

In another aspect, crinkles and other deformations in malleable product packaging are optically sensed, and are used in decoding an identifier from the distorted surface (e.g., the crinkled surface can be virtually flattened prior to decoding the identifier). In one particular arrangement, the crinkled configuration is sensed by structure-from-motion techniques. In another, the product configuration is sensed by a structured light scanner (e.g., of the sort popularized by the Microsoft Kinect sensor).

In yet another aspect, a checkout station comprises a conveyor belt that includes markings that are optically sensed, and which are used to increase check-out speed and accuracy.

In still another aspect, imagery captured from an item that is being conveyor-transported at a checkout station is processed to compensate for motion blur, prior to applying a product recognition technology.

In yet another aspect, a plenoptic camera system senses information at a checkout station. The collected light field data is then processed to yield multiple different planes of focused imagery, to which product recognition technologies are applied. In some embodiments, these planes include a variety of non-parallel planes.

In still another aspect, 2D imagery that is acquired at a checkout station is applied to a GPU, which computes multiple perspective-transformed versions of the imagery. These different versions of the imagery are then analyzed for product recognition purposes. The GPU can process input imagery of several different focal lengths, e.g., captured by plural fixed-focus cameras, or by a camera that cyclically changes its focal plane, or by plenoptic sensing.

In yet another aspect, piled items presented for checkout are volumetrically modeled and segmented to identify component items in the pile.

In still another aspect, the location of an item that is too obscured to be identified within a pile, is determined, so that a clerk or a mechanical system can expose it for identification.

In yet a further aspect, a confidence score is computed that indicates the certainty of an identification hypothesis about an item. This hypothesis is tested against collected evidence, until the confidence score exceeds a threshold (or until the process concludes with an ambiguous determination).

In still another aspect, data acquired away from the checkout station (e.g., in a store aisle) is used in identifying items at checkout. This data can include, e.g., sensor data evidencing removal of a product from a shelf, location data indicating that the shopper paused near certain merchandise, etc. Such data may be accorded a weight that varies with a time elapsed between its sensing and item checkout.

In yet another aspect, a clerk's or shopper's interaction with an item is sensed to aid in identification of the item. For example, a clerk's gaze may be tracked to identify the location of a salient feature on the item, or a shopper's particular hand pose in grasping the item when putting it into a cart or onto a checkout conveyor may provide some clue about the item's identity.

In still another aspect, a system provides guidance to a clerk or shopper concerning a manner of packing items into bags, e.g., based on the shapes, weights and temperatures of the purchased items.

In yet a further aspect, different items at a checkout station are illuminated with light of different colors, e.g., to indicate items that have been successfully identified (or not), to indicate which items should be placed in which bags, etc.

The foregoing and a great number of other features and advantages of the present technology will be more readily apparent from the following detailed description, which proceeds with reference to the accompanying drawings.

BRIEF DESCRIPTION OF THE DRAWINGS

FIG. 9 is another perspective view of items on a checkout conveyor, including a cylindrical item.

FIG. 10A shows that the most prominent text on most cylindrical items is oriented parallel to the cylinder axis.

FIG. 10B shows that certain cylindrical items include the most prominent text 270 degrees (clockwise) from the cylinder axis.

FIG. 16 shows how a long edge of a segmented image region can be used as a clue to watermark orientation.

FIGS. 17A and 17B show the long edge of FIG. 16 rotated in two vertical orientations.

FIG. 18 shows how the minor axis of a ellipse can be used as a clue to watermark orientation.

FIGS. 19 and 20 show how even parts of ellipses can be used as clues to watermark orientation.

FIGS. 42A-J are illustrations based on a sequence of image captures while a coffee can was passed in front of a camera.

FIG. 44 shows artwork from four Kellogg's cereals.

FIG. 45 conceptually shows a reference database that can be used in image fingerprint matching.

FIG. 47 conceptually shows a reference database that can be used in one illustrative implementation of the present technology.

FIG. 51 conceptually shows a reference database similar to that of FIG. 47.

DETAILED DESCRIPTION

Figure 1A:
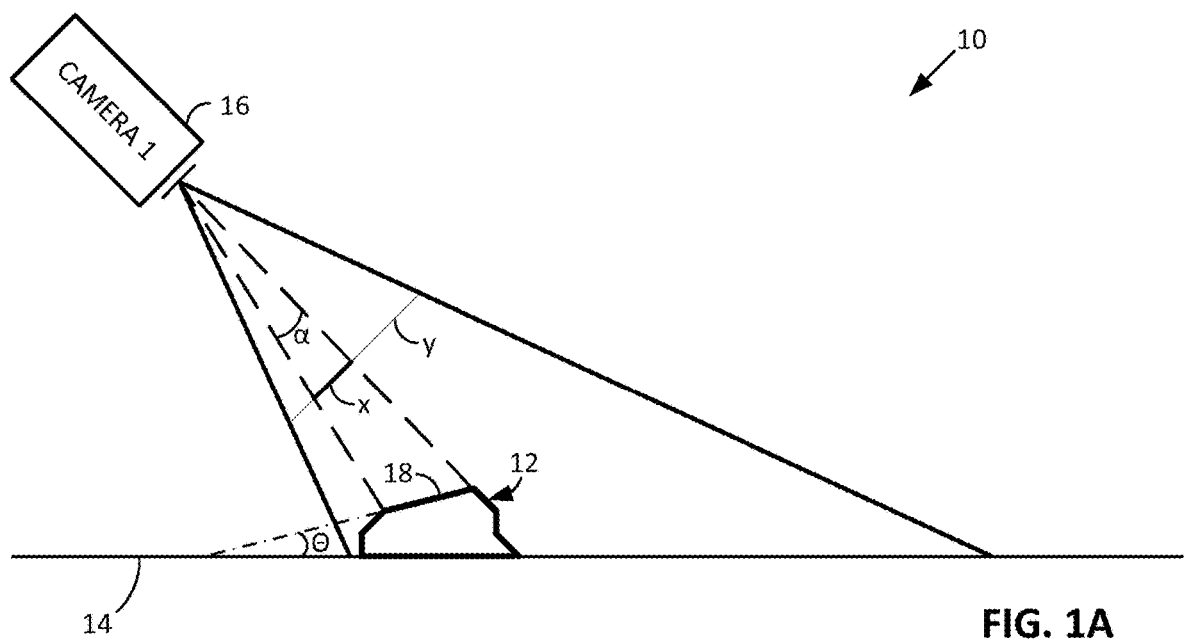
FIGS. 1A and 1B show a malleable item at two positions along a supermarket conveyor, being imaged by a camera.

Due to the great range and variety of subject matter detailed in this disclosure, an orderly presentation is difficult to achieve. As will be evident, many of the topical sections presented below are both founded on, and foundational to, other sections. Necessarily, then, the various sections are presented in a somewhat arbitrary order. It should be recognized that both the general principles and the particular details from each section find application in other sections as well. To prevent the length of this disclosure from ballooning out of control (conciseness always being beneficial, especially in patent specifications), the various permutations and combinations of the features of the different sections are not exhaustively detailed. Applicant intends to explicitly teach such combinations/permutations, but practicality requires that the detailed synthesis be left to those who ultimately implement systems in accordance with such teachings.

It should also be noted that the presently-detailed technologies build on, and extend, technology disclosed applicant's other patent documents referenced herein. The reader is thus directed to those documents, which detail arrangements in which applicant intends the present technology to be applied, and that technically supplement the present disclosure.

In accordance with one aspect, the present technology concerns a method for identifying items, e.g., by a supermarket checkout system. A first such method involves moving an item to be purchased along a path, such as by a conveyor. A first camera arrangement captures first 2D image data depicting the item when the item is at a first position along the path. Second 2D image data is captured when the item is at a second position along the path. A programmed computer, or other device, processes the captured image data—in conjunction with geometrical information about the path and the camera—to discern 3D spatial orientation information for a first patch on the item. By reference to this 3D spatial orientation information, the system determines object-identifying information from the camera's depiction of at least the first patch.

In a variant embodiment, the second 2D image data is captured by a second camera arrangement—either when the item is at its first position or its second position along the path.

The object-identifying information can be a machine-readable identifier, such as a barcode or a steganographic digital watermark, either of which can convey a plural-bit payload. This information can additionally or alternatively comprise text—recognized by an optical character recognition engine. Still further, the product can be identified by other markings, such as by image fingerprint information that is matched to reference fingerprint information in a product database.

In some embodiments, the system processes the first and second 2D image data—in conjunction with geometrical information about the path and the camera—to discern second 3D spatial orientation information—this time for a second patch on the item. This second 3D spatial orientation information is typically different than the first 3D spatial orientation information. That is, the second patch is not coplanar with the first patch (e.g., the patches may depict different sides of a carton, or the surface may be deformed or wrinkled). By reference to the discerned first and second 3D spatial orientation information, the system determines identification information for the item. In such arrangement, the identification information is typically based on at least a portion of the first patch and a portion of the second patch. In the case of a barcode, for example, it may span both patches.

In like fashion, the system can determine the 3D pose of an arbitrary number of non-parallel patches on the item, and identify the item based on information from plural such patches.

In some embodiments, the item is moved by a conveyor belt that is provided with markings (e.g., printed or otherwise applied to its surface). These markings can be steganographic or overt. The imagery captured by the camera arrangement(s) includes at least some of these markings. The system analyzes the markings in the captured imagery in connection with the product identification. For example, the system can employ such markings to sense the speed of the conveyor, or to sense the distance to a point on an item resting on the conveyor, or to sense a size of the item on the conveyor, or to calibrate color information in the image(s) (e.g., white balance), or to provide an "image prior" useful in determining a deblurring kernel for motion blur compensation or for other image enhancement processing, etc.

One illustrative marking is a pattern of white "+" indicia, of known dimensions, arrayed uniformly across a black conveyor. Another is a 2D barcode symbology (e.g., a QR code), again printed white-on-black. The same symbology may be regularly repeated, or different symbologies can be used at different locations on the belt (e.g., at different distances from a reading window; the barcode can encode information related to its position on the belt).

In some instances, the markings are visible and promotional (e.g., text markings), yet can still serve one or more of the purposes detailed herein.

The foregoing will be made clearer by a particular example:

FIG. 1A shows a supermarket checkout station 10 in which an item 12 to be purchased is transported by a conveyor belt 14. A first camera 16 captures image data depicting the item.

Item 12 may be irregular in shape, such as a package of frozen peas. Its configuration can be regarded as a collection of adjoining surface patches (e.g., patch 18), each oriented at a different angle. (The orientation of a patch may be characterized by two angles. One is the angle (theta) relative to the lengthwise axis of the conveyor, i.e., the angle at which the plane of the patch intersects that lengthwise axis. The second is the angle (phi, not depicted in FIG. 1A) relative to the crosswise axis of the conveyor, i.e., the angle at which the plane of the patch intersects that cross-wise axis. Other geometries can of course be substituted.)

Camera 16 generates imagery in which each patch is depicted with a particular size, shape and position within the image frame, based on (1) the two orientation angles for the patch, (2) the 2D position of the item on the conveyor, i.e., both along its length and width; (3) the height of the patch relative to the conveyor; (4) the lens function of the camera; and (5) the patch geometry itself.

In FIG. 1A, the patch 18 subtends an angle alpha (a). In the depicted representation, this patch spans a distance "x" across the camera sensor's field of view "y"—corresponding to a particular range of sensing elements in the camera's sensor (typically CCD or CMOS).

Figure 1B:
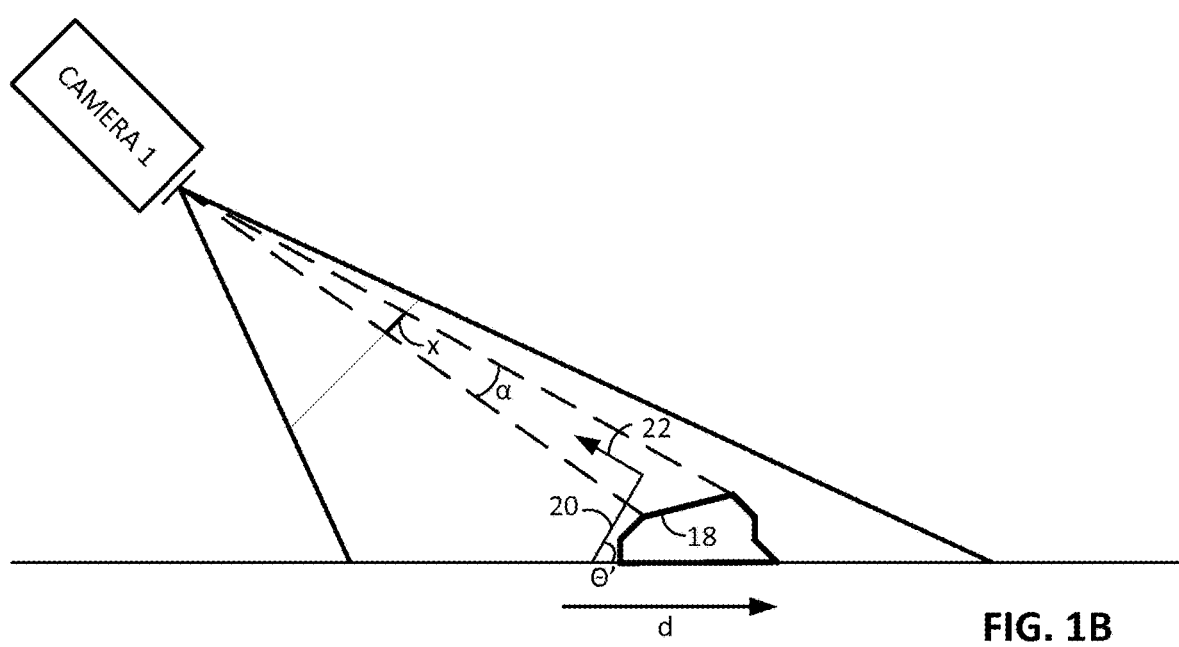

A moment later, the package of peas 12 has moved a distance "d" along the conveyor, as shown in FIG. 1B. The angle alpha has changed, as has the span "x" of the patch across the sensor's field of view.

By reference to known parameters, e.g., the conveyed distance d, the change in pixels spanned by the patch (which correlates with the angle alpha), and the camera lens function, the system determines the angle theta in FIG. 1B (and also in FIG. 1A).

Once the angle theta has been determined, an exemplary system performs a perspective-transform (e.g., an affine-transform) on the depiction of the patch 18 in the FIG. 1B captured imagery, to yield transformed imagery that compensates for the angle theta. That is, a transformed patch of imagery is produced in which the patch appears as if it lies in plane 20, with an angle θ' that is perpendicular to a ray 22 from the patch to the camera lens.

In like fashion, the angle phi (not shown in FIG. 1B, due to the side view) can be determined. Again, the depiction of the patch 18 can be correspondingly transformed to compensate for this angle phi, to yield a virtually reoriented patch that lies in a plane perpendicular to ray 22.

Techniques for deriving the 3D geometry of patch 18 from the captured imagery are familiar to those skilled in the art, and include "structure from motion" and "simultaneous localization and mapping" (SLAM) methods. These techniques commonly rely on identification of distinctive features (salient points) in one image, and identifying corresponding features in another image. The difference in relative positions of the features between the two images indicates the geometry of the surface on which they lie. (One class of distinctive feature suitable for such analysis is the class of "corner points." Corner points include features such as the ends of lines on contrasting backgrounds. It will be recognized that barcodes have multiple such features—two for each line in the barcode. Another such distinctive feature is the robust local identifier, e.g., as used in SIFT and SURF techniques.)

All of the other patches comprising item 12, which are viewable by the camera in both FIG. 1A and FIG. 1B, are similarly transformed. Such transformations desirably also transform the scale of the depicted patches so that each appears—after transformation—to lie the same distance from the camera sensor, perpendicular to the camera axis.

By such processing, the system renders a virtually flattened package of peas (or other 3D shape)—presented as if its component face patches are coplanar and facing the camera.

Figure 2A:
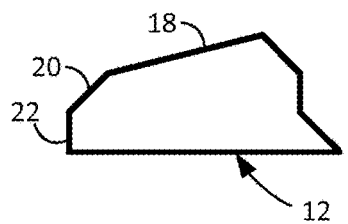
FIGS. 2A and 2B shows how an item with several component planar surfaces can be virtually "flattened" to aid in item identification.
Figure 2B:
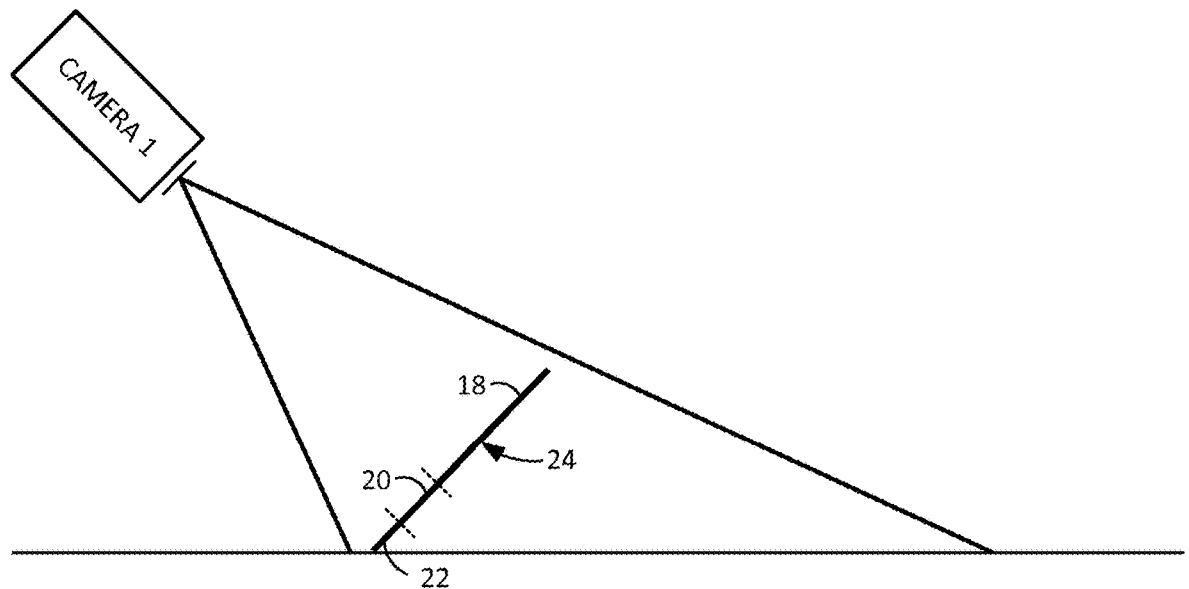

FIGS. 2A and 2B schematically illustrate this virtual flattening. Item 12 includes three component patches 18, 20 and 22, lying in different planes. These patches are imaged by camera 16, from two (or more) different perspectives (e.g., as the item is moved along the conveyor). Based on such information, the system determines the location of the three patches in 3D space. It then re-projects the three patches to lie in a common plane 24, as if facing the camera, i.e., parallel to the camera's image sensor. (Dashed lines separate the three component re-projected surfaces in FIG. 2B. Of course, this illustration only shows virtual flattening of the surface along one dimension. A preferred implementation also virtually flattens the surface along the crosswise dimension of the conveyor, i.e., into the page.)

To this set of re-mapped image data, an extraction process is applied to generate identification data corresponding to the item. The preferred embodiment applies a digital watermark decoding algorithm, but other identification technologies (e.g., barcode decoding, image fingerprinting, OCR, etc.) alternatively can be used.

If a watermark or barcode is present on item 12, it can likely be decoded, regardless of the irregular configuration or presentation of the item on the conveyor. Such marking may be found within a single patch, or it may span two or more patches. In a preferred embodiment, the digital watermarking spans a substantial portion of the packaging extent. In regions where there is no printing (e.g., white space), a yellow or other unobtrusive watermark tint can be applied. (Yellow watermarking is particularly discussed, e.g., in published application 20110274310 and U.S. Pat. No. 6,345, 104.)

In some embodiments, it is not necessary to virtually reorient the patch(es) to compensate for both angles theta and phi. Because many decoders are tolerant of some angular skew, a partial angular compensation of the patch (es), in theta and/or phi, is often sufficient for reliable decoding. For example, the patches may be remapped so they all have the same theta angle, but various phi angles. Or a partial correction in either or both of those dimensions can be applied. (A partial correction may be effected through use of affine transforms, whereas a perfect correction may require non-affine, perspective transforms.)

Image fingerprinting techniques (e.g., SIFT, SURF and ORB) that are used for object identification are also somewhat robust to non-plan views of the object. Yet some virtual remapping of the imagery to re-project it to a more flattened state is helpful to assure best results.

The distance along the conveyor can be determined by reference to the difference in times at which the images of FIGS. 1A and 1B are captured, if the conveyor velocity is uniform and known. As noted, the belt may be provided with markings by which its movement alternatively can be determined. (The markings can be promotional in nature, e.g., Tony the Tiger, sponsored by Kellogg's.) In still other embodiments, a conveyor is not used. Instead, the item is moved past the camera by hand. In such case, the distance and other path parameters can be estimated by feature tracking, from features in the captured imagery. Alternatively, a structured light scanning arrangement can be employed.

In some implementations, the speed of the conveyor varies in accordance with signals from a control unit, e.g., operated by a cashier's foot. The speed can be sensed by an electro-mechanical arrangement (e.g., a roller wheel and an optical chopper) or from analysis of the captured imagery. Such knowledge of the conveyor speed can be used in extracting identification information relating to objects on the conveyor (e.g., re mitigating motion blur before extracting identification information, etc.).

Figure 3C:
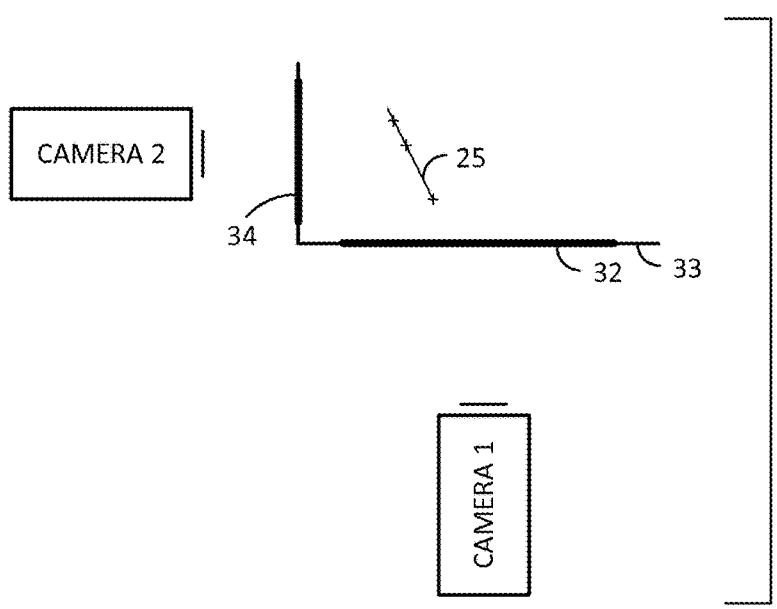
FIG. 3C shows another embodiment employing two cameras.
Figure 3A:
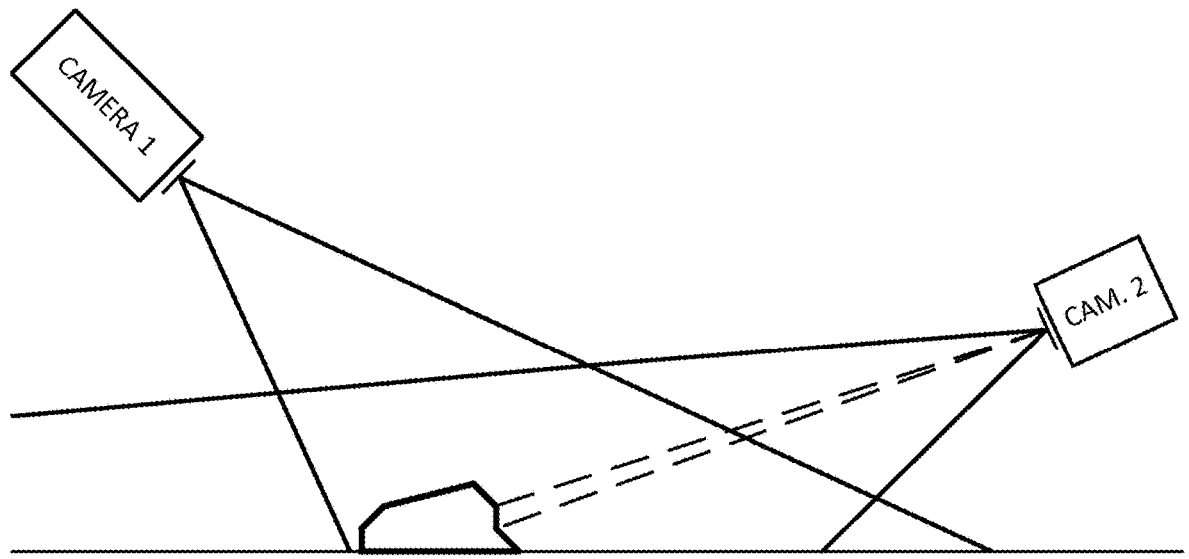
FIGS. 3A and 3B are similar to FIGS. 1A and 1B, but show the item being imaged by two cameras.
Figure 3B:
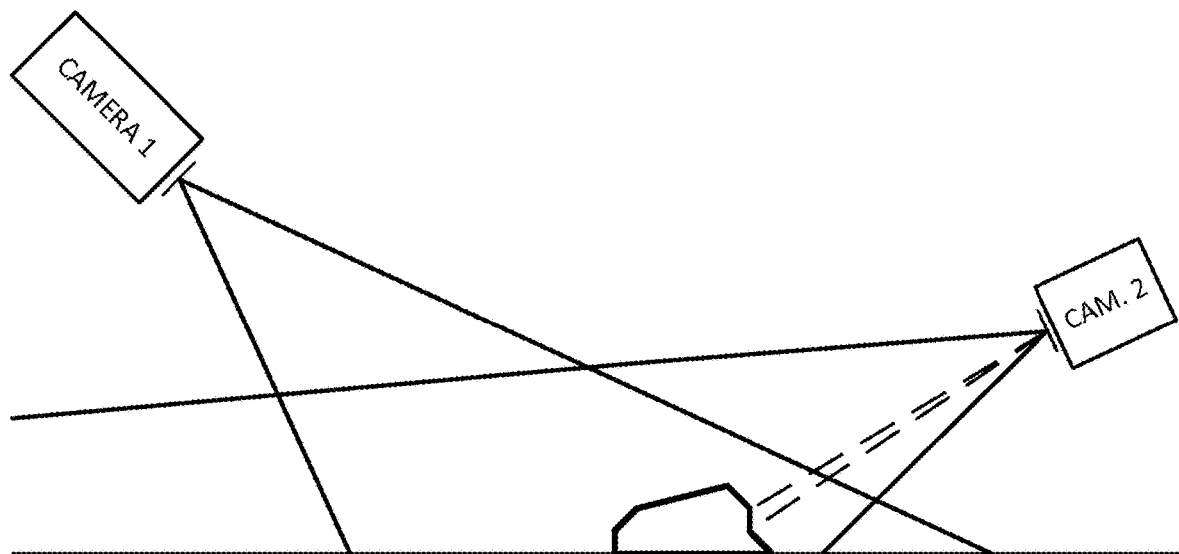

FIGS. 3A and 3B show a further arrangement in which two cameras are used. Such arrangement allows image capture from patches of the item that may not be visible to a single camera. In such embodiment, the cameras may be at different elevations relative to the conveyor (including below, e.g., looking up through a glass platen). They may also be oriented at different angles (theta and/or phi) relative to the conveyor. They can also be spaced at different positions along the length of the conveyor, so that the time intervals that the item is viewed by the two cameras are not co-extensive. That is, the first camera captures imagery of the item during a first period, and the second camera captures imagery of the item during later period (which may, or may not, overlap with the first period). If a patch is visible to both cameras, the additional captured imagery allows more accurate virtual transformation of the depicted image patches to facilitate identifier discernment. A virtual planar reconstruction of the package surface is desirably generated using imagery from the two cameras.

FIG. 3C shows another two-camera arrangement. This arrangement includes a first camera looking up through a glass window 32 in a checkout counter 33, and a second camera looking across the checkout counter through a window 34 in a vertical housing. The two cameras are positioned so that their camera axes intersect at right angles.

Segmentation techniques are used to identify different items within imagery captured by the two cameras. Feature points found in one camera's imagery within a segmented shape are matched with corresponding points in the second camera's imagery. If three or more such points are found in both images (e.g., as indicated by the "+" symbols in FIG. 3C), the orientation of the plane defined by such points can be determined by the positions of the three points in the two different images. (E.g., in the two-dimensional depiction of FIG. 3C, the orientation of the line 25 containing the three points causes the points to appear closer together in the imagery of camera 1 than in the imagery of camera 2.) With this clue as to the orientation of a product surface, imagery of the surface can be processed to remove associated perspective distortion (i.e., image rectification), prior to applying a watermark decoding algorithm to the imagery.

In other embodiments, three or more camera arrangements can be used.

In accordance with another aspect of the present technology, the checkout station captures imagery of different colors, e.g., by illuminating the area with different colors of light. The different colors of imagery can be captured simultaneously (e.g., by different cameras) or serially. The different frames of information can be processed to generate different information, or to serve different purposes.

One particular implementation illuminates the items with a repeating sequence of three colors: white, infrared, and ultraviolet. Each color is suited for different purposes. For example, the white light can capture an overt product identification symbology; the ultraviolet light can excite anti-counterfeiting markings on genuine products; and the infrared light can be used to sense markings associated with couponing and other marketing initiatives.

Different frames of captured imagery can be utilized to synthesize enhanced frames of imagery for use as described above (e.g., product identification, anti-counterfeiting, and marketing).

Other aspects of the present technology make use of one or more plenoptic cameras (sometimes termed multi-aperture sensors, radiance cameras, or light field cameras). Some such cameras employ an array of plural component cameras, typically formed on a common substrate, each with its own lens. These cameras may be viewed as sensing a 4D light field. From their collected data, they can produce frames of data at arbitrary focal planes. This allows captured imagery to be "focused after the fact."

Figure 4A:
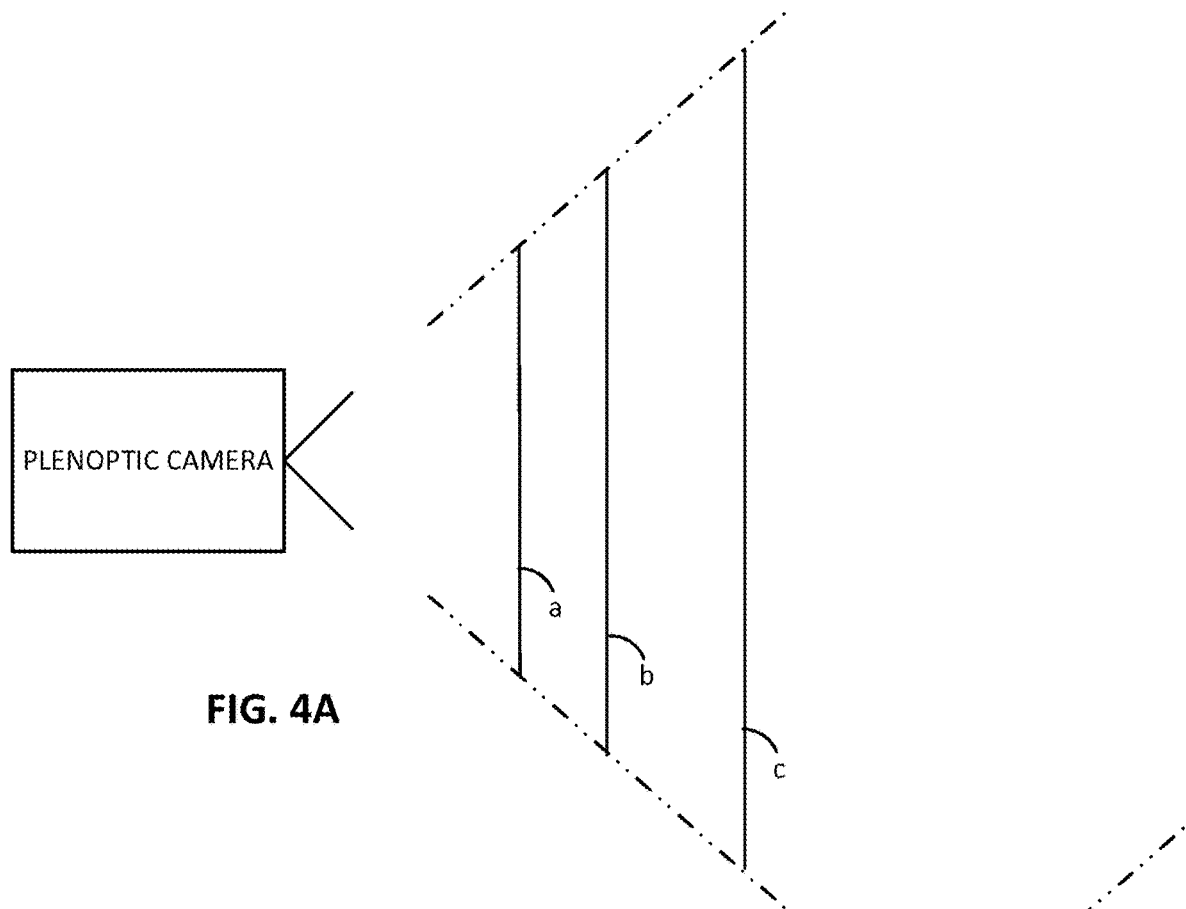
FIGS. 4A and 4B illustrate how a plenoptic sensor can be used to generate different planes of focused imagery within an imaging volume, including parallel planes and non-parallel planes.

For example, in FIG. 4A, a plenoptic camera system processes the data captured by its component sensors to yield a frame focused at focal plane "a." The same data can also be processed to yield a frame focused at focal plane "b" or "c."

Figure 4B:
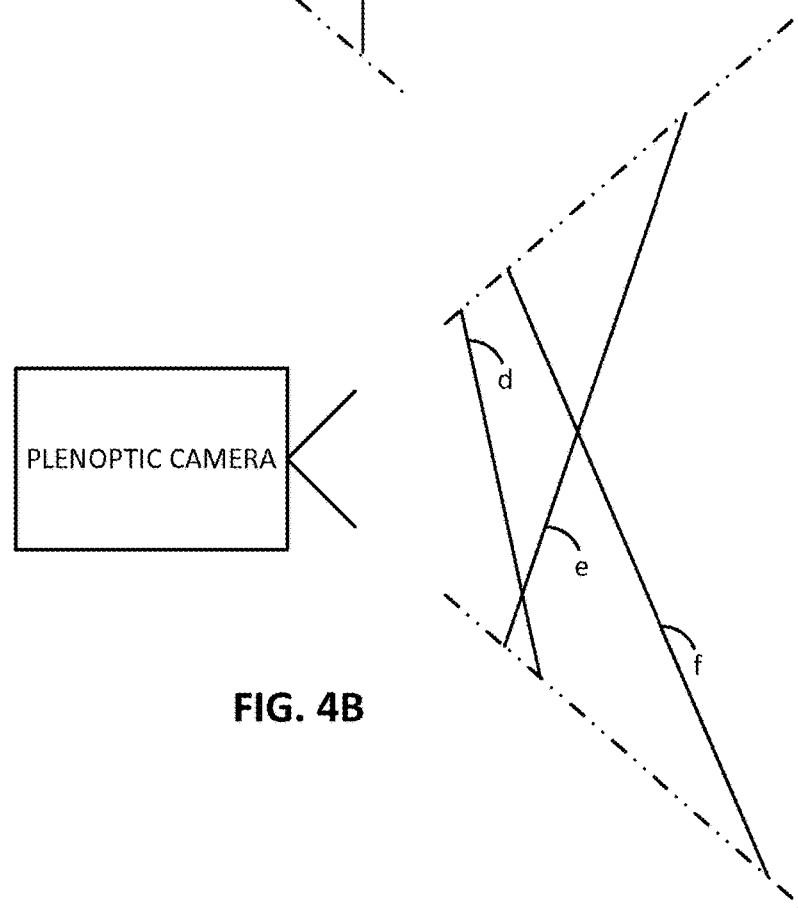

The focal planes needn't be parallel, as shown in FIG. 4A. Instead, they can be non-parallel (e.g., focal planes "d," "e" and "f" in FIG. 4B). One particular technique for synthesizing tilted focal plane imagery is known to artisans from Vaish et al, Synthetic Aperture Focusing using a Shear-Warp Factorization of the Viewing Transform, 2005 IEEE Computer Society Conference on Computer Vision and Pattern Recognition, pp. 129-136.

In one embodiment, captured plenoptic information is processed to yield a first set of imagery having a focal plane coincident with a first plane through a volume that encompasses at least part of an item. The plenoptic information is also processed to yield a second set of imagery having a focal plane coincident with a second plane through said volume, where the first and second planes are non-parallel. The thus-processed information is then analyzed to discern object identification information.

Figure 5:
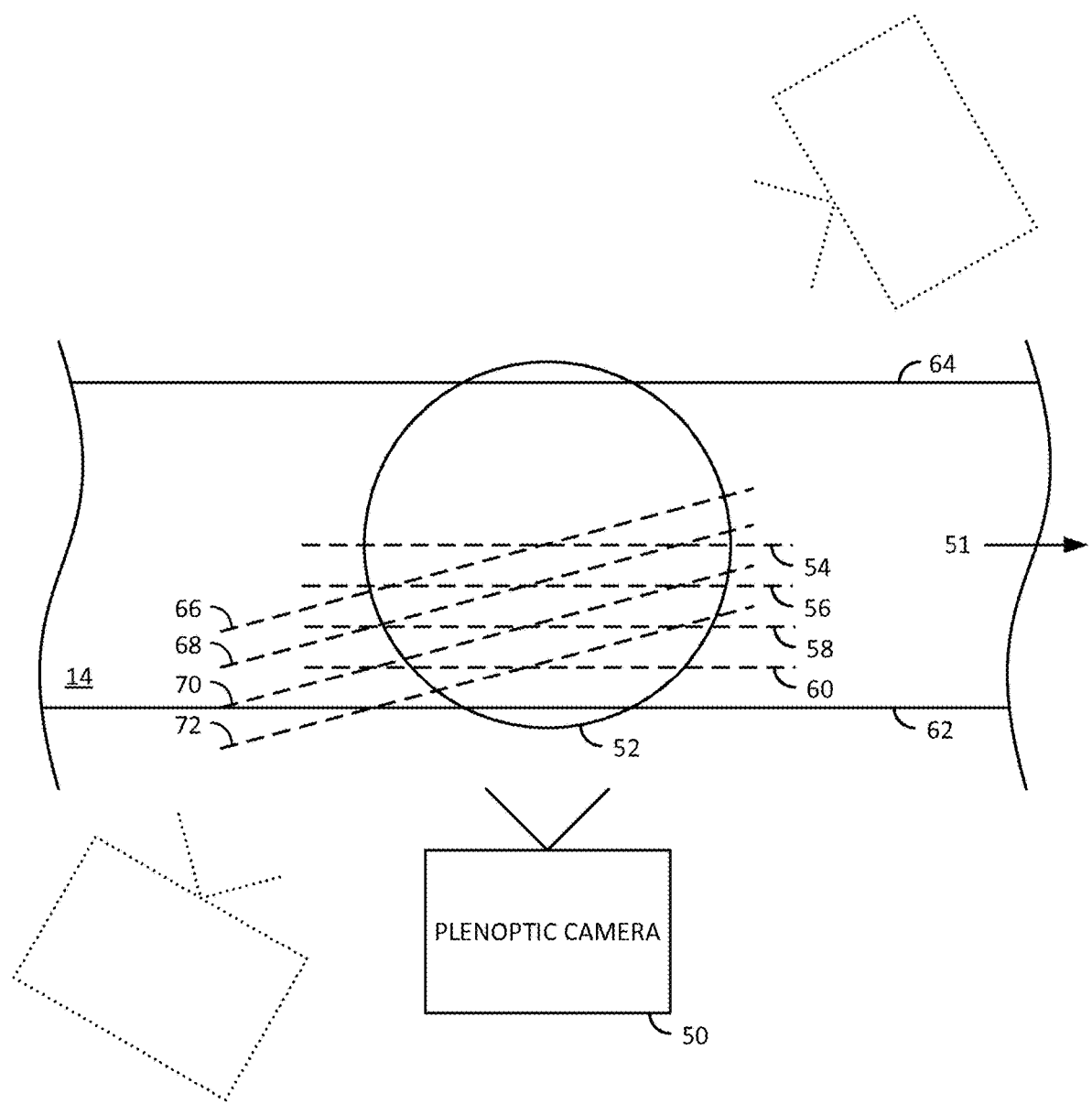
FIG. 5 illustrates a supermarket checkout conveyor that is imaged by a plenoptic camera system, allowing extraction of multiple frames of imagery at different focal planes.

Referring to FIG. 5 (which is a plan view looking down on a conveyor of an exemplary embodiment), the plenoptic information from camera 50 is processed to yield many different focal planes of imagery through a volume that encompasses the items on the conveyor. If the items are imagined as occupying a hemispherical region 52 on the conveyor 14, one focal plane 54 (shown in dashed lines) extends vertically up from the central axis 51 of the conveyor, bisecting the hemisphere. Three other planes 56, 58, 60 similarly extend up perpendicularly from the plane of the conveyor, spaced successively three inches closer to the edge 62 of the conveyor. (Three further planes—not shown, for clarity of illustration—are similarly disposed near the other edge 64 of the conveyor.)

In addition to this first plurality of parallel planes, the plenoptic data is also processed to yield a second plurality of focal planes that again extend vertically up from the plane of the conveyor, but are skewed relative to its central axis 51. The depicted planes of this second plurality, 66, 68, 70 and 72 correspond to the planes of the first plurality, but are skewed+15 degrees.

Although not shown in FIG. 5 (for clarity of illustration), additional sets of focal plane imagery are similarly derived from the plenoptic camera data, e.g., oriented at skew angles of +30, +45, and +60 degrees. Likewise, such planes are generated at skew angles of −15, −30, −45, and −60 degrees.

All the just-described planes extend vertically up, perpendicularly from the conveyor.

The plenoptic information is also processed to yield tilted focal planes, i.e., that do not extend vertically up from the conveyor, but instead are inclined. Counterparts to each of the above-described planes are generated at a tilt angle of 15 degrees. And others are generated at tilt angles of 30, 45 and 60 degrees. And still others are generated at tilt angles of −15, −30, −45, and −60 degrees.

Thus, in this exemplary embodiment, the plenoptic information captured by camera 50 is processed to yield a multitude of different focal planes of image information, slicing the hemispherical volume with planes every three inches, and at every 15 degrees. The resulting sets of image information are then analyzed for product identification information (e.g., by applying to watermark decoder, barcode decoder, fingerprint identification module, etc.). Depending on the location and orientation of the item surfaces within the examined volume, different of these planes can reveal different product identification information.

While plenoptic cameras are generally conceived as full color devices, they needn't be so for product identification. For example, a watermark signal may be encoded in product packaging in a red channel, and a corresponding monochrome (red) plenoptic camera can be used for decoding. In such a camera, the usual four-cell Bayer pattern of red/green/green/blue can be eliminated, and all of the sensor elements can sense red alone.

(Although described with reference to a single plenoptic camera, actual implementations can use two or more cameras, as shown in dotted lines in FIG. 5. Information from such plural cameras can be combined or otherwise used in concert.)

While detailed in connection with an embodiment employing plenoptic information, this concept of examining plural different focal planes of imagery for product identification information can be implemented in other manners. One is to use a fixed focus camera to capture a single plane of imagery, and provide the imagery to a GPU that applies a collection of different image transformations. For example, the GPU can apply a +15 degree corrective perspective transform. This process has the effect of taking any physical surface inclined −15 degrees relative to the image focal plane (i.e., inclined −15 degrees to the camera sensor in typical embodiments), and warp it so that it appears as if it squarely faced the camera. (Desirably, the scene is adequately lit so that the captured imagery has a depth of field that spans the surface being imaged.) The GPU can similarly re-project the original imagery at horizontal tilts of −60, −45, −30, −15, +15, +30, +45, and +60 degrees, and at vertical tilts −60, −45, −30, −15, +15, +30, +45, and +60 degrees. It can likewise warp the original image at each combination of these horizontal and vertical tilts. Each resultant set of image data can be processed by an identification module to extract object identification information.

(Before applying the captured image data to the GPU for perspective transformation, or before applying the GPU-transformed image data to the identification module, the data is desirably examined for suitable focus. Focused regions can be identified by their high frequency content, or their high contrast, as compared with out-of-focus imagery. Imagery that is determined to be out of focus needn't be further processed.)

If the depth of field of a conventional fixed focus camera is not adequate, known extended depth of field imaging techniques can be used (see, e.g., U.S. Pat. Nos. 7,218,448, 7,031,054 and 5,748,371).

In still other arrangements, the system uses a variable focus camera, and its focal plane is cyclically changed (e.g., mechanically or by fluid action) to capture successive planes of imagery at different focal lengths. These images are provided to a GPU to apply different image transformations, as detailed above.

A GPU is well suited for use in the detailed arrangements, because it employs a plurality of processing cores to execute similar instructions on several sets of data simultaneously. Such a GPU can likewise be employed to perform a watermark or barcode decoding operation, or a fingerprint extraction operation, or an OCR operation, on multiple sets of data (e.g., the differently-transformed image sets) simultaneously.

A GPU can also be used to perform processing of information acquired by a plenoptic camera arrangement. For example, a GPU can extract the different planes of focused imagery. Or another processor can extract parallel planes of focused imagery (e.g., planes 54-60 in FIG. 5), and then a GPU can perspective-transform these parallel planes to yield a diversity of other planes that are not parallel to planes 54-60. In still other arrangements, a GPU is employed both to process the captured information (to yield multiple sets of imagery in different focal planes), and also to process the multiple sets of imagery to extract identification information. In yet other arrangements, multiple GPUs are used, including in embodiments with multiple cameras.

Figure 8:
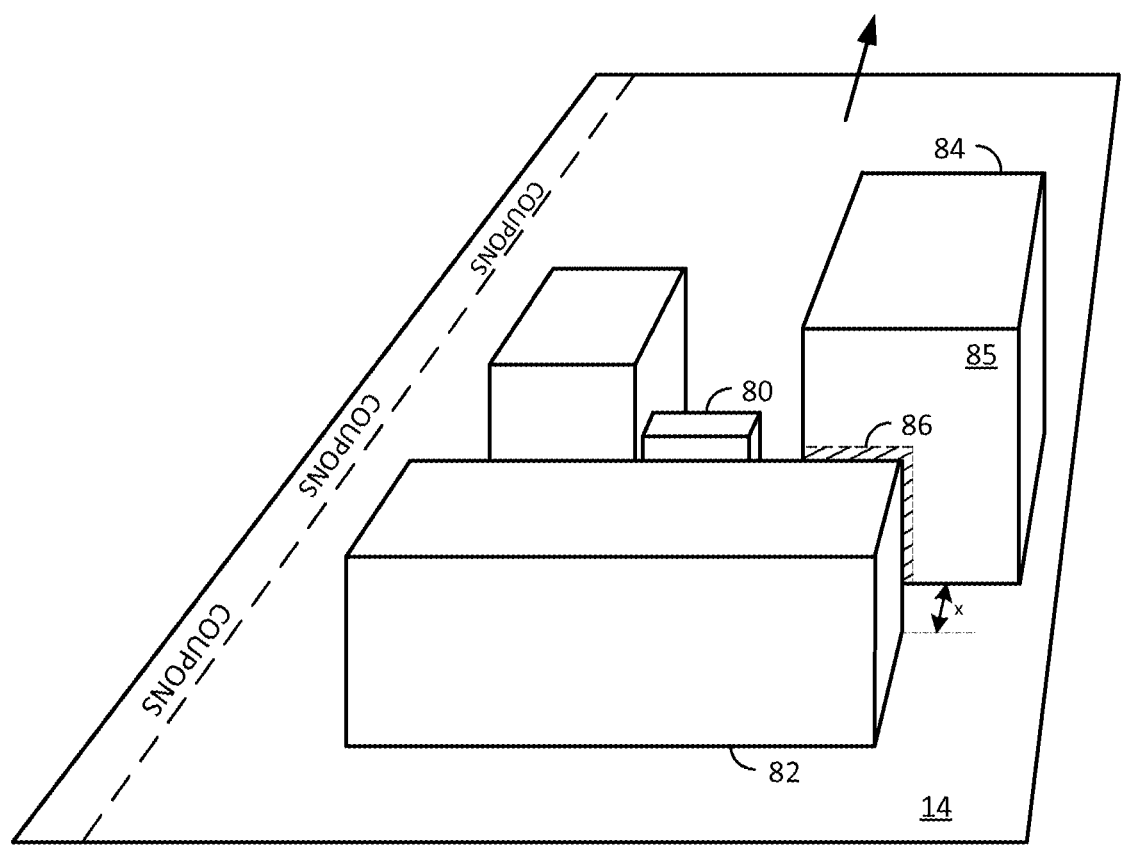
FIG. 8 is a perspective view of items on a checkout conveyor.

FIG. 8 shows a checkout conveyor 14 carrying various items for purchase, from the perspective of an illustrative imaging camera. The items are arranged on the conveyor in such a manner that item 80 is largely obscured. Its position may be such that no barcode is ever visible to any camera as the item passes along the conveyor, and its visible surfaces may be too small to enable object recognition based on other technologies, such as image fingerprinting or digital watermarking.

In accordance with another aspect of the present technology, a 3D image segmentation algorithm is applied to determine the different shapes on the conveyor. The system associates the different segmented shapes on the conveyor with the different object identifiers derived from sensor information. If there is a mismatch in number (e.g., segmentation shows four items on the FIG. 8 conveyor, but the system may output only three product identifications), this circumstance is flagged to the operator. Image data highlighting the outlier item (i.e., item 80 in FIG. 8) can be provided to a supervisor for review and action, and/or a diverter can divert the item from the flow of items through checkout—for manual processing without stopping other checkout progress.

(For a review of illustrative segmentation algorithms, see, e.g., Wirjadi, Survey of 3d Image Segmentation Methods, Reports of Fraunhofer ITWM, No. 123, 2007. Two popular classes of segmentation techniques are thresholding and region growing. Related technology for dimensioning objects on a supermarket conveyor is detailed in U.S. Pat. No. 7,344,082.)

In accordance with a further aspect of the present technology, the checkout conveyor of FIGS. 1 and 8 moves at a uniform rate. However, frames of imagery are not similarly captured at uniform intervals. Instead, the system captures frames at non-uniform intervals.

For example, the camera imagery may reveal a gap between items in the longitudinal direction of the conveyor. (Such a gap "x" is shown between items 82 and 84 of FIG. 8.) When such a gap is present, it presents an opportunity to capture imagery depicting a product face that may be exposed only briefly (e.g., part 86 of face 85 of item 84 that is generally occluded by item 82). The system controls the camera to capture an image frame when part 86 is maximally revealed. If this instant comes at time t=175 ms, and the system normally captures image frames at uniform intervals of 50 ms, then an extra frame is captured at t=175 ms (e.g., frames captures at 0 ms, 50 ms, 100 ms, 150 ms, 175 ms, 200 ms . . . ). Alternatively, the system may delay or advance a regular frame of image capture so as to capture a frame at the desired instant (e.g., 0 ms, 50 ms, 100 ms, 175 ms, 200 ms, 250 ms . . . ). Such an event-driven frame capture may establish the timing by which subsequent frames are uniformly captured (e.g., 0 ms, 50 ms, 100 ms, 175 ms, 225 ms, 275 ms . . . ).

In an alternative arrangement, frame capture is performed at regular intervals. However, the system slows or pauses the conveyor 14 so as to allow image capture from a surface that is only briefly visible to the camera (e.g., part 86). After such image has been captured, the conveyor resumes its normal motion.

FIG. 9 shows a similar conveyor, but this time including a cylindrical article 90. (Only part of the cylindrical surface is visible; some is downward-facing, and the camera's view of another portion of its surface is occluded by item 84.)

According to another aspect of the present technology, text found in imagery serves as rotation-orientation information useful in extracting item identification.

Consider the cylindrical grocery items shown in FIG. 10A. Each includes prominent text, and the generally-horizontal line of text is inclined (up to the right, as shown by the dashed lines). However, despite such inclination, the up-down axis of each letter points vertically upward (shown by the solid arrows).

FIG. 10B shows a contrary case. Here the up-down axis of each prominent letter points to the side, i.e., 270 degrees clockwise from vertically upward. ("Prominent" text here refers to text that is larger than the smallest text visible on an item.)

Naturally, there are exceptions. But by and large, the up-down axis of the biggest text on an item (cylindrical or otherwise) is generally parallel with one of the principle axes of the item.

Figure 12:
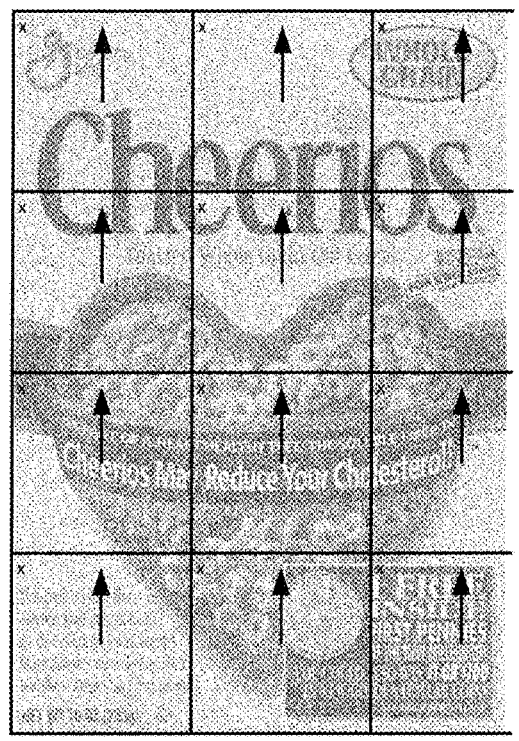
FIG. 12 shows tiled placement of a watermark pattern across a face of a cereal box.

As is familiar to artisans, digital watermarking patterns are typically applied to items in a tiled fashion, with a single square watermark pattern being replicated across and down the item being watermarked. FIG. 12 shows an example. Here artwork for a box of cereal is digitally watermarked with tiled patterns. The tiles are typically embedded with an upper left corner (indicated by an "x") of a first tile coincident with the upper left corner of the artwork. Tiles are then placed across and down from this starting point.

Each watermark pattern has an orientation (indicated by the arrows in FIG. 12). Again, common practice is to embed the watermark tiles so that they are oriented in the same manner as the artwork (i.e., with "up" in the artwork corresponding to "up" in the watermark pattern).

To read the watermark from image data, the watermark decoder must first determine the orientation of the watermark tiles. The watermark decoder's work may be eased, and decoding speed may be increased, if this task of determining orientation is shortcut in some fashion.

The up-down orientation of prominent text on packaging often provides such a shortcut. The orientation of the letter "C" in Cheerios in FIG. 12 indicates the orientation of the watermark encoded in the cereal box artwork.

Likewise, the orientation of the prominent text on the items of FIG. 10A indicates the orientation at which a watermark on these items likely is to be found.

If a watermark decode operation, based on an assumption that the watermark is oriented in the same direction as the prominent text, fails, a second watermark decode operation can be tried—this one assuming that the watermark is oriented 90 degrees from the orientation of the biggest text. Such is the case with the Coke can of FIG. 10B. (That is, the watermark pattern is applied as on the cereal box of FIG. 12, with the top of the watermark tile being oriented towards the top of the product, which in FIG. 10B is 90 degrees clockwise from the orientation of the prominent text "Coke.")

Returning to the conveyor example, a segmentation module identifies and extracts the portion of the camera imagery depicting the shaded surface of item 90. (Known 2D segmentation can be used here.) This image excerpt is passed to a text detector module that identifies at least one prominent alphabetic character. (Known OCR techniques can be used.) More particularly, such module identifies a prominent marking in the image excerpt as being a text character, and then determines its orientation, using various rules. (E.g., for capital letters B, D, E, F, etc., the rules may indicate that the longest straight line points up-down; "up" can be discerned by further, letter-specific, rules. The module applies other rules for other letters.) The text detector module then outputs data indicating the orientation of the analyzed symbol.

Figure 11:
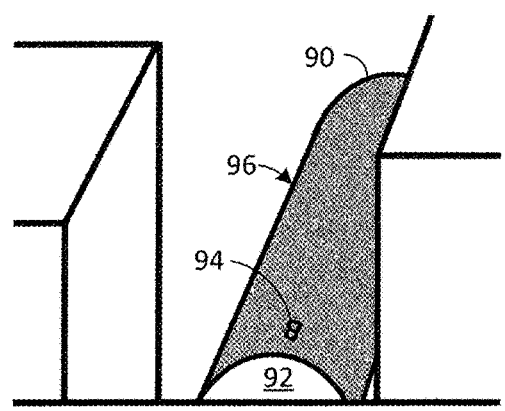
FIG. 11 is a detail of the cylindrical item of FIG. 9.
Figure 13:
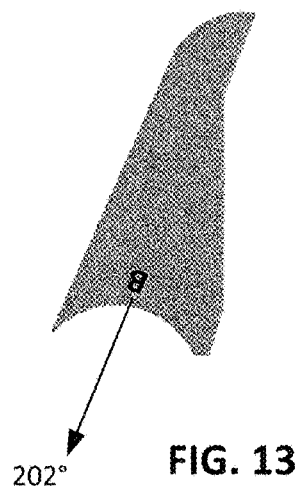
FIG. 13 shows the cylindrical surface portion of FIG. 11, and how text on this cylindrical surface provides an important clue to the surface orientation.

For clarity of illustration, the depicted surface includes only a single letter, a "B" (FIG. 11). The text detector module outputs data indicating that this letter is presented in the image excerpt at an orientation of 202 degrees (FIG. 13).

Figure 14A:
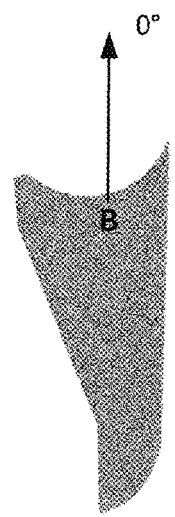
FIG. 14A shows the cylindrical surface in FIG. 9 rotated so that the most prominent text is oriented vertically.

With this as a clue as to the orientation of any embedded watermark, the system next rotates the image excerpt clockwise 158 degrees, so that the "B" is oriented vertically (i.e., 0 degrees), as shown in FIG. 14A. A watermark decode operation is then attempted on this excerpt. The decoder looks for a watermark pattern at this orientation. If unsuccessful, it may further try looking for the watermark pattern at small orientation offsets (e.g., at selected orientation angles+/−8 degrees of the FIG. 14A orientation).

Figure 14B:
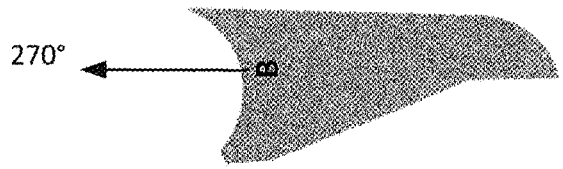
FIG. 14B shows the cylindrical surface in FIG. 9 rotated so that the most prominent text is oriented 270 degrees from vertical.

If no watermark is found, the system can next rotate the image excerpt a further 270 degrees clockwise, to the orientation depicted in FIG. 14B. Again, the same decode operations can be repeated.

In some embodiments, if no watermark is then decoded, the system may conclude that there probably is no watermark, and curtail further watermark processing of the image excerpt. Alternatively, it may employ a prior art method to undertake a more exhaustive analysis of the image excerpt to try to find a watermark—considering all possible orientations (e.g., as detailed in the assignee's U.S. Pat. No. 6,590,996).

Figure 15:
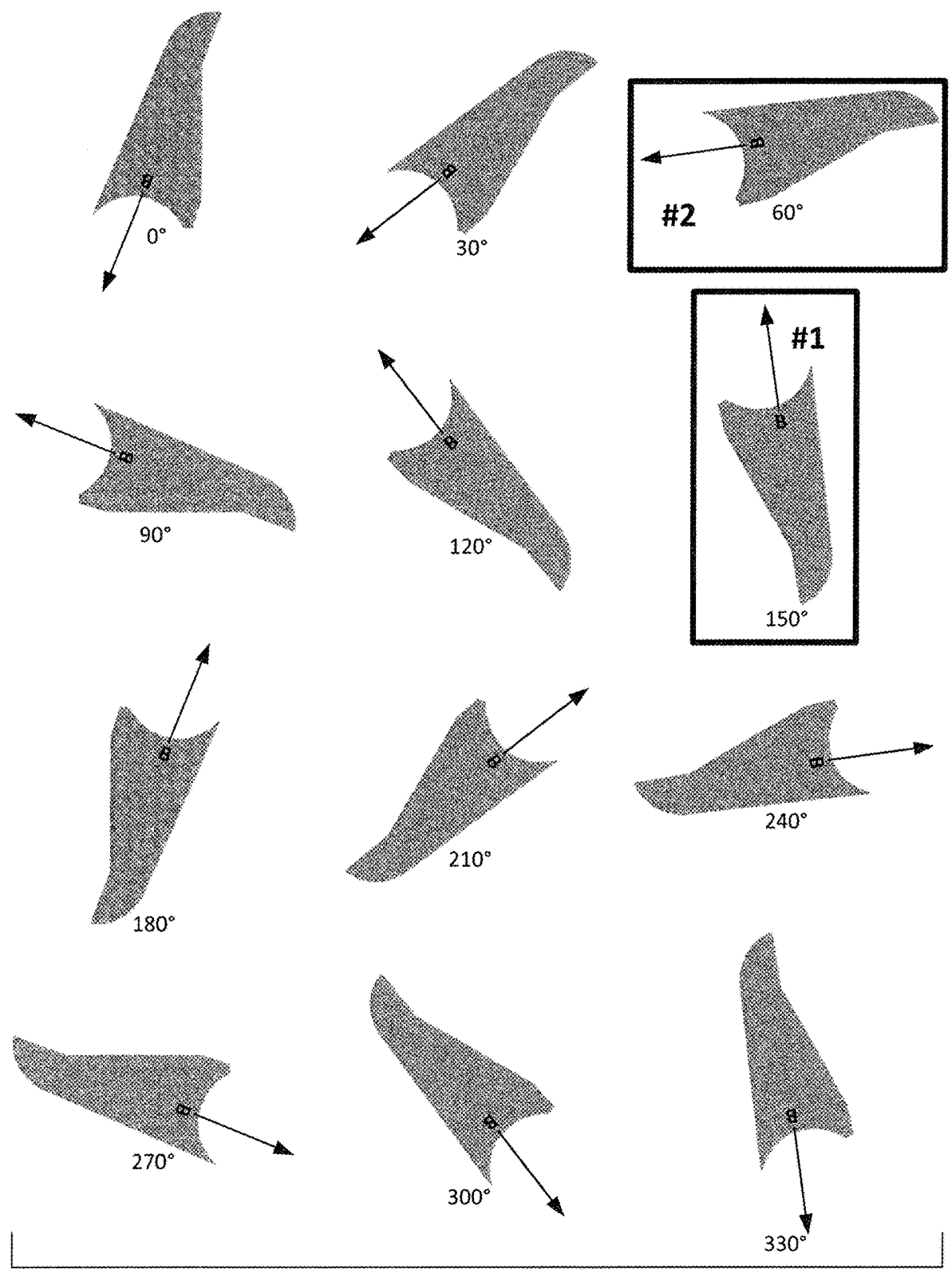
FIG. 15 shows the cylindrical surface portion of FIG. 12, rotated 30, 60, 90, 120, 150, 180, 210, 240, 270, 300, and 330 degrees by cores of a GPU, and indicating two of these rotations as potentially the best for deriving identifying information.

A variant embodiment is shown in FIG. 15. In this embodiment, the image excerpt is applied to a GPU, which uses one core to rotate it 30 degrees, another core to rotate it 60 degrees, and so on for all increments up through 330 degrees. All of these operations are performed simultaneously. Including the original image excerpt, there are 12 differently-rotated versions of the image excerpt. (12 was the maximum number that could be presented conveniently on a single drawing sheet; in actual practice there may be many more, e.g., 36 at rotational increments of 10 degrees, 120 at rotational increments of 3 degrees, etc.)

One approach is to examine each of these differently-rotated excerpts for a watermark—assuming the watermark is oriented "up" in the different depicted orientations (or within a small angular offset of +/−15 degrees).

More economical, however, is for the system to rank the different rotation states based on the likelihood of finding a watermark at that orientation state. In the FIG. 15 example, the system ranks the 150 degree rotation as number 1, because this rotation orients the prominent text character "B" most nearly upright. If a watermark is present in the image excerpt, it will most likely be found by examining this number 1-ranked excerpt (again, +/−15 degrees).

If no watermark is found, the system then considers the number 2-ranked excerpt. Here, the number 2-ranked excerpt is the one rotated 60 degrees. The system ranks this excerpt as number two because the orientation of the text character B is closest to 270 degrees (as in FIG. 10B). Again, the system applies a watermark decoding algorithm to this rotated version of the image excerpt—again examining nearby rotation states too (+/−15 degrees).

If no watermark is yet decoded, the system may give up, or it may consider other rotational states (e.g., perhaps ranked number 3 because of the orientation of other detected text). Or, again, it may invoke a prior art method to search for a watermark of any rotational state.

While the foregoing discussion of text focused on cylindrical objects, the same principles are applicable to items of arbitrary shape.

Another implementation functions without regard to the presence of text in the imagery. Referring to FIG. 16, the system passes the segmented region to an edge finding module, which identifies the longest straight edge 98 in the excerpt. (In one implementation, only boundary edges of the segmented region are considered; in another, internal edges are considered too). The angle of this line serves as a clue to the orientation of any watermark.

(A variety of edge detection technologies are known to artisans. The Canny edge detection technique is popular. Others include Sobel and Harris edge detectors.)

In FIG. 16, there is directional ambiguity—there is no text symbol to indicate which direction is "up." Thus, two possible orientations are indicated, 202 degrees and 22 degrees in this example.

The system then rotates the FIG. 16 excerpt to make this longest line vertical, as shown in FIG. 17A. As described above, a watermark decoding operation is tried, assuming the watermark is oriented up in this image presentation. If such attempt fails, the system next rotates the excerpt a further 180 degrees (FIG. 17B) and tries again.

As described above, a GPU implementation can also be utilized, with the system ranking different rotation states for further analysis, based on directional clues—in this case the orientation of the long edge.

A still further implementation relies on circles, rather than straight lines or text. Supermarkets contain countless cylindrical items—mostly canned goods. Such items have two circular faces, which commonly are not printed (e.g., face 92 in FIG. 11). Yet the presentation of the circular face (or part thereof, as in FIG. 11) provides a clue as to the orientation of watermark encoding on an adjoining cylindrical surface.

FIG. 18 shows a can 102, as it might be viewed on a conveyor. Its circular end 104 (which may be a top or bottom), viewed obliquely, appears as an ellipse. An ellipse is characterized by major and minor axes. The major axis 106 is the longest diameter; the minor axis 108 is the shortest diameter. The minor axis can be used like the long edge of FIG. 16, as a clue to the watermark orientation. That is, the minor axis, if extended, crosses the label side of the can from top-to-bottom (or bottom-to-top), as shown by line 110. The orientation of this line typically corresponds to the orientation of the watermark printed on the can's cylindrical surface.

Thus, a system according to this embodiment of the technology uses the orientation of line 110 in FIG. 18 like the orientation of line 98 in FIG. 16. For example, an image excerpt depicting the can is rotated to make this line 110 vertical, and watermark decoding is tried. If unsuccessful, the excerpt is rotated 180 degrees, and decoding is tried again. Again, a GPU implementation can be utilized, with the system ranking the two rotations in which line 110 is oriented most nearly vertically as the most likely contenders.

Often, as in FIG. 9, only a segment of an ellipse is visible to the camera. The system can analyze captured imagery to find segments of ellipses, e.g., using curve fitting techniques, or using a Hough transform. See, e.g., Yuen, et al, Ellipse Detection Using the Hough Transform, Proc. of the Fourth Alvey Vision Conf., 1988. Even from a segment, the direction of the minor axis can be estimated, and used as above.

One way of determining the minor axis of an ellipse, and thus of determining the up-down orientation of the cylindrical object (e.g., line 110 in FIG. 18), is to examine the curvature of the ellipse. Again, Hough or curve fitting techniques are used to identify an elliptical edge in an image excerpt. Consider FIG. 19, which shows an excerpt 118 of an ellipse—the remainder of the ellipse being occluded from the camera's view by other items on the conveyor. (Other parts of the captured imagery in which this excerpt is found are omitted for clarity.)

The minor axis of an ellipse passes through the point of minimum curvature on the elliptical edge. The curvatures at different points along this edge are determined by a curvature module, and the point 120 at which curvature is at a minimum is thereby identified. A tangent 122 to the curve at this point is identified by the curvature module. The minor axis of the ellipse lies along the perpendicular of this tangent, e.g., along line 124.

Sometimes, the point along an ellipse at which curvature is minimized is not depicted in the captured imagery (e.g., due to other objects blocking the camera's view). Even in such case, the "up-down" orientation of the cylinder can still be determined.

Consider FIG. 20, which shows the same ellipse 118 as FIG. 19, but more occluded. That is, the point of minimum curvature is not depicted.

In this case, the curvature module is used to detect the point of maximum curvature along the edge (i.e., point 126). The curvature module then determines a line 128 tangent to the edge at this point. The orientation of this line typically matches the "up-down" orientation of the digital watermark in the product label that adjoins the curve. As described above, the system rotates the image excerpt to re-orient line 128 vertically, and tries a watermark decoding operation. If unsuccessful, it rotates the image excerpt 180 degrees and tries again. Again, a GPU can perform a plurality of rotations of the imagery in parallel, and the system can consider certain of these in ranked order (i.e., giving first attention to those orientations at which line 128 is most nearly vertical).

Figure 21:
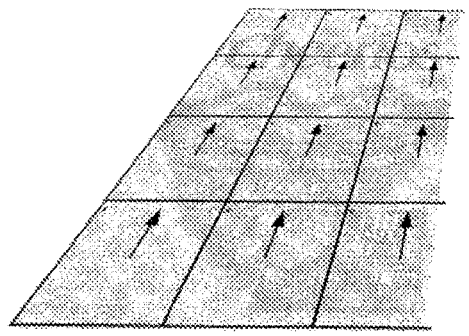
FIG. 21 shows perspective distortion of the cereal box artwork of FIG. 12.

Items imaged on the conveyor belt—regardless of their configuration (can or rectangular carton, etc.) commonly are depicted with perspective distortion. FIG. 21 illustrates how the face of the FIG. 12 cereal box, lying face-up on the conveyor belt, might be depicted in camera imagery. (The markings used to explain watermark tiling are again included in this depiction, but of course are not overtly visible in the camera imagery.)

To decode the watermark, it is helpful to first restore the depiction of the item to its proper aspect ratio.

One approach uses image segmentation to identify different items in the field of view. Most physical items are characterized by perpendicular edges (e.g., a cereal box is a rectangular cuboid; a can is a right cylinder). The edges discerned from the segmented imagery are examined to determine if any pair of edges is nearly parallel or nearly perpendicular (i.e., within, e.g., 20, 10 or 5 degrees or less). The physical edges to which these depictions correspond can be assumed to be truly parallel or perpendicular, with the angular variance in the depicted image due to perspective distortion. A corrective perspective transformation is then applied to restore these edges to parallel or perpendicular relationship.

While simple, this technique breaks down when the item does not have nearly straight edges (e.g., a bag of frozen peas), or if the items are arranged on the conveyor so that certain edges of an item are blocked from the camera's view.

Another approach simply characterizes the perspective distortion of the camera across its field of view, in a calibration operation—before use. This information is stored, and later recalled to correct imagery captured during use of the system.

One calibration technique places a known reference pattern (e.g., a substrate marked with a one-inch grid pattern) on the conveyor. This scene is photographed by the camera, and the resulting image is analyzed to discern the perspective distortion at each 2D location across the camera's field of view (e.g., for each pixel in the camera's sensor). The operation can be repeated, with the calibrated reference pattern positioned at successively elevated heights above the plane of the conveyor (e.g., at increments of one inch). Again, the resulting imagery is analyzed, and the results stored for later use.

In like fashion, a vertical gridded substrate can be placed perpendicularly across the conveyor. Imagery is captured and analyzed to discern perspective distortion in that plane. Again, the process can be repeated with the substrate moved to successive positions along the conveyor (e.g., at increments of one inch), to discern the apparent distortion of imagery captured at such planes.

Similarly, the gridded substrate can be placed longitudinally along the axis of the conveyor. Imagery can be captured and analyzed to discern apparent distortion of surfaces in that plane. Again, the substrate can be moved, and the operation repeated, at successive parallel planes.

When imagery is thereafter captured of items on the conveyor, this reference data can be consulted (and interpolated, e.g., for physical items presenting tilted surfaces) to discern the perspective distortion that influences each part of the captured imagery. Corrective counter-distortions are then applied before the imagery is passed to the identification module.

Correction of perspective distortion is a familiar exercise in image processing and photogrammetry. A variety of other techniques for image "rectification" are known in the art. (Many of the prior art techniques can be applied in simplified form, since the camera position and optics are typically fixed, so associated camera parameters can be determined and employed in the correction process.) If imagery from two different viewpoints is available, the stereo information provides still further opportunities for image correction.

Reference was made, above, to use of detected text as a way of discerning rotation-orientation, but it is also valuable as a metric of perspective distortion.

Most product labels use fonts in which vertical letter strokes are parallel. For example, in FIG. 29, the two vertical letter strokes in the letter "M" of "Mixed" are parallel. Put another way, most fonts have consistent letter widths, top to bottom. Again in FIG. 29, the letter "M" has the same width across its bottom as across its top. (So do the letters "x" and "u" etc.)

Similarly with most straight lines of text: the letters have consistent height. Most "tall" letters (t, k, l, etc.) and capital letters extend from the base text line to a first height, and any "short" letters (w, e, r, etc.) all extend to a second, lower, height. Lines along the tops and bottoms of the letters are generally parallel. (See lines "a," "b" and "c" in the first line of text in FIG. 29.)

Divergence from these norms is useful as a measure of perspective distortion. When detected by a corresponding detection module, a corrective image distortion is applied to restore the lines to parallel, and to restore the widths of letters to consistent values—top to bottom. Watermark detection is then applied to the correctively-distorted image.

Figure 30:
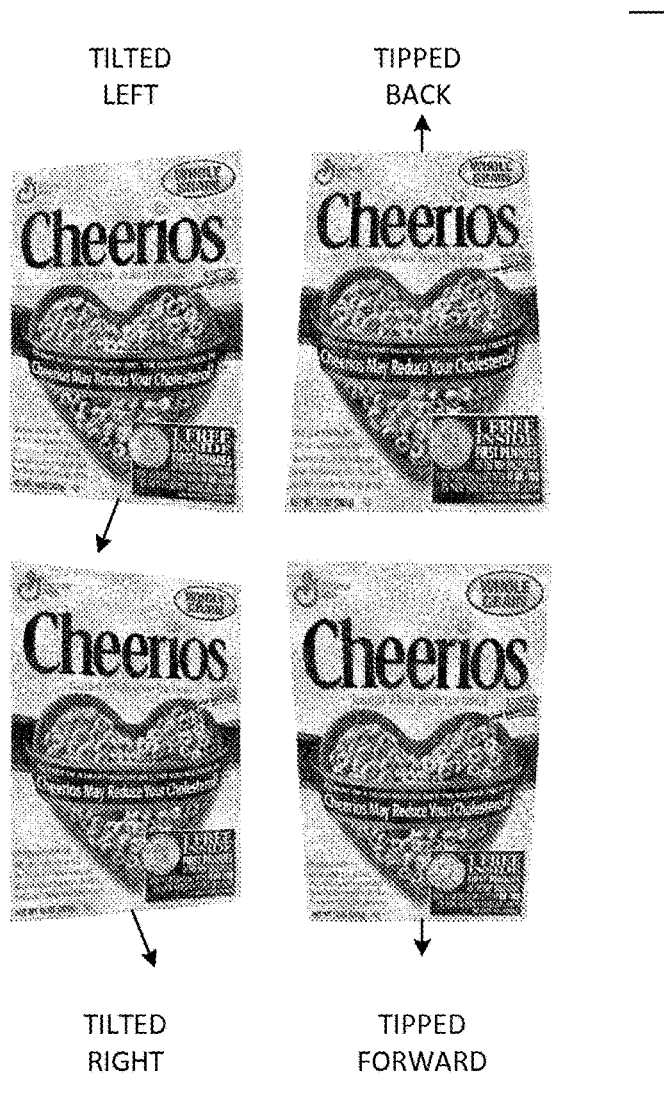
FIG. 30 shows two perpendicular dimensions of perspective distortion: tilt and tip.

FIG. 30 shows that perspective warps can arise in two perpendicular dimensions, here termed "tilt" and "tip." "Tilt" refers to a surface orientation that is inclined in a horizontal direction, to the right or to the left, from a straight-on, plan, view. Tilted-left refers to an orientation in which the left edge of the surface is at a greater focal distance from the camera than the center of the object. "Tip" refers to a surface orientation that is inclined in a vertical direction. Tipped back refers to an orientation in which the top edge of the surface is at a greater focal distance from the camera than the center of the object.

FIG. 30 also shows small arrows that are intended to indicate directions of surface-normals from the depicted cereal box. In the tilted-left case, the surface normal is inclined to the left—as seen by the camera. In the tipped-back case, the surface normal is inclined upwardly, as seen by the camera.

Figure 29:
FIG. 29 shows product packaging, demonstrating how lines of text can be used to assess perspective distortion.

A gross sense of perspective can be obtained by reference to techniques noted herein, such as the text lines of FIG. 29. If the lines converge as they move to the right, the right part of the label must be further from the camera, indicating a tilted-right pose.

Another gross sense of perspective can be obtained from the scale of the watermark tile. Referring again to FIG. 21, if the watermark tiles are smaller in scale towards the top of the object, this indicates the top of the object is more distant, i.e., a tipped-back pose. Other tip- and tilt-states are similarly indicated by different scales of the depicted tiles. (The scale of the preferred watermark tile is readily revealed from a log-polar plot of the embedded calibration signal, as detailed in U.S. Pat. No. 6,590,996.)

As indicated, if the orientation of the surface is accurately discerned (e.g., by analyzing two frames of imagery showing different viewpoints, and considering positions of keypoints in each), imagery can be distorted so as to accurately counter-act the apparent distortion—restoring it to a plan presentation. Object identification can then proceed on the basis of the corrected imagery.

If, instead of accurate orientation information, the system only has gross orientation information (e.g., tilted left, or tipped back, such as from fast analysis of letter shape or non-parallel lines), different counter-distortions can be tried. For example, if the object appears to be tipped back, but the amount of tip is uncertain, then the object identification module can first try to extract a watermark from the captured imagery without any correction. If unsuccessful, an image processing module can counter-distort the image to impose a perspective as if the image focal plane is tipped-forward 20 degrees (i.e., countering the tipped-back apparent presentation). The object identification module again tries to extract a watermark. If unsuccessful, a further corrective counter-distortion is applied, e.g., processing the original image to impose a perspective as if tipped-forward 30 degrees. The object identification module again tries to extract a watermark. If unsuccessful, a still further corrective warp is applied (e.g., imposing a perspective as if the focal plane is tipped forward 36 degrees). Etc.

Again, a GPU is well suited for such tasks—allowing the just-detailed sequence of attempts to be performed in parallel, rather than serially.

In the case of cylindrical objects, correction of cylindrical warping may be employed, to account for the apparent spatial compression of the packaging artwork as the curved surface recedes from view. (This correction can be applied separately from perspective correction, or as part of a combined operation.)

Figure 22:
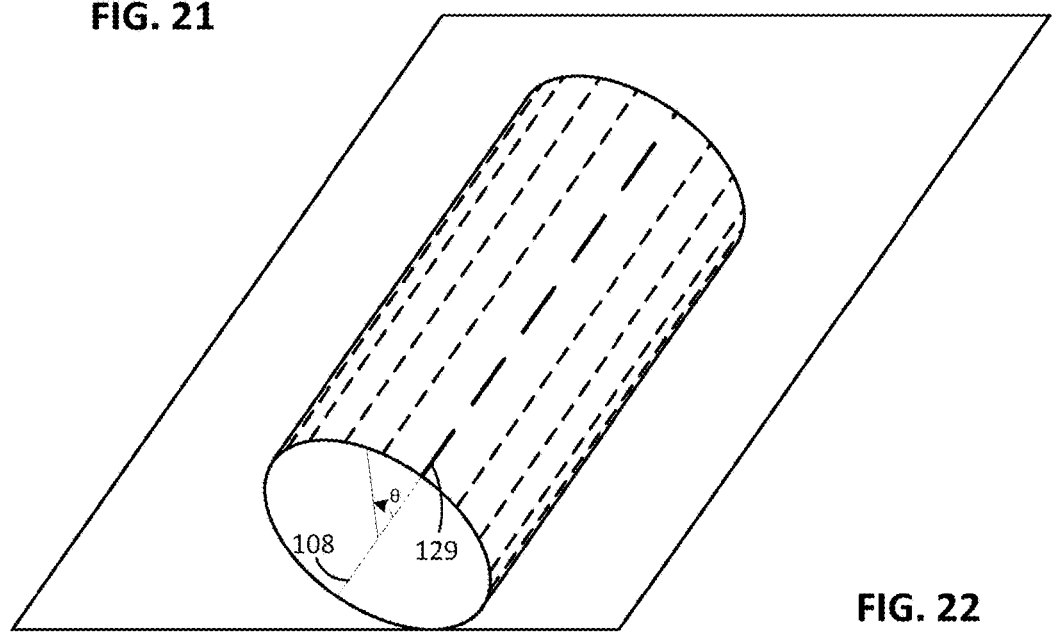
FIG. 22 is an isometric image depicting a cylinder (e.g., a can) on a conveyor.

Ignoring perspective, FIG. 22 shows an isometric view of a cylindrical object, viewed obliquely. Cylindrical distortion is at its maximum where the cylindrical surface curves out of view. It is at its minimum along a center line parallel to the cylinder axis, along the part of the surface closest to the camera. (This is the same line defined by extension of the minor axis 108 of the ellipse, discussed with FIG. 18.) If the cylinder is fully visible (i.e., it is not occluded by another item), this line of minimum cylindrical distortion bi-sects the visible cylindrical face, as shown by the dark, long-dashed line 129 of FIG. 22. The other dashed lines—closer to the edges—are in regions of progressively more spatial compression, causing the lines to appear closer together. (The dashed lines in FIG. 22 are at 20 degree spacings around the cylinder.)

Figure 23:
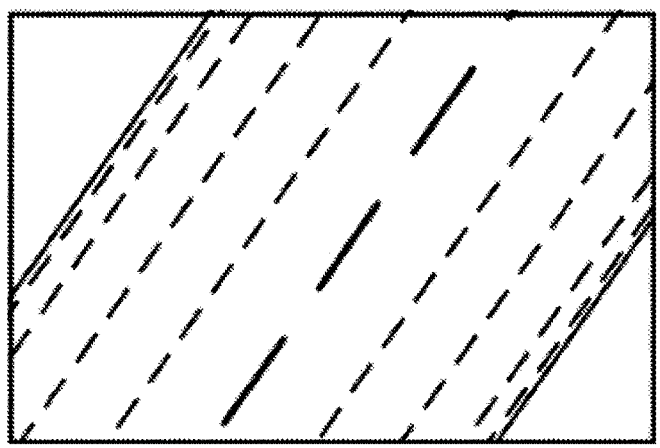
FIG. 23 is an enlarged detail of FIG. 22.

FIG. 23 shows an excerpt of FIG. 22, as might be passed to an object recognition module. The cylindrical item is first segmented from the background. Its up-down axis is next assessed, by reference to text, edges, ellipse features, or otherwise. The image excerpt is then rotated based on the assessed orientation information, yielding FIG. 24.

A cylindrical warp correction is next applied, counteracting the compression near the edges by applying a compensating horizontal expansion. Since the image excerpt spans the full width of the cylinder, and its boundaries were detected by the image segmentation (shown as the solid lines), a straightforward trigonometric correction function is applied.

In particular, if the distance from center line to the edge is a distance "x," then any intermediate distance "y" from the center line corresponds to an curvature angle theta ($\theta$)—from the cylinder's apparent center line—of arcsin (y/x). The horizontal scaling factor to be applied at this distance from the center line is $1/\cos(\theta)$.

Figure 24:
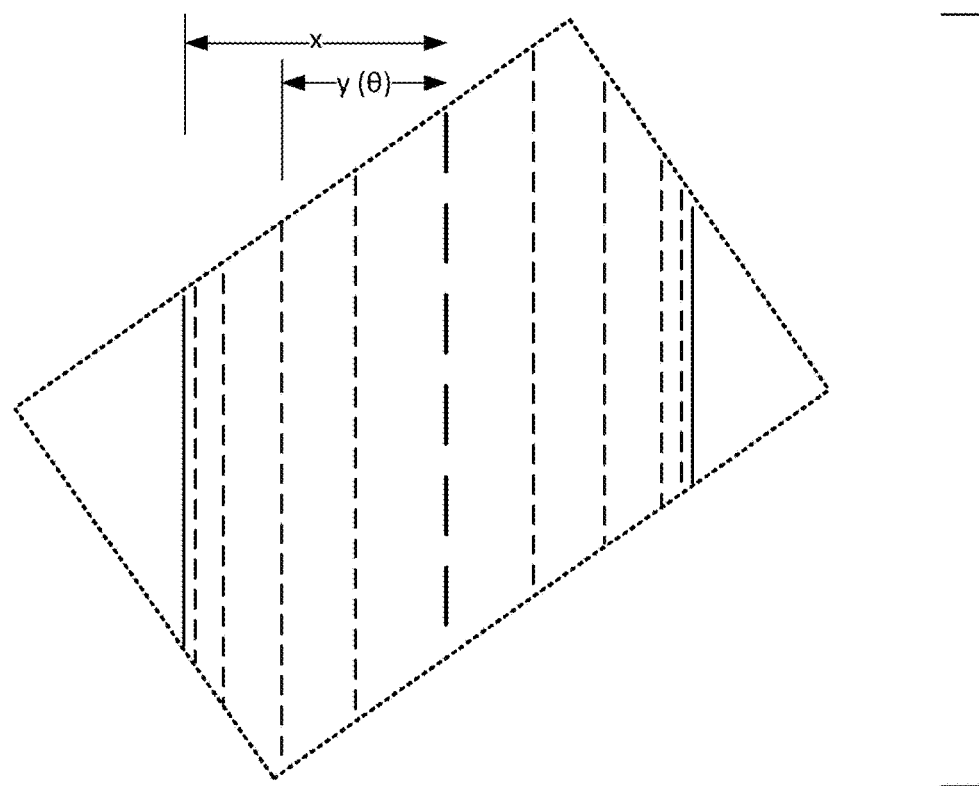
FIG. 24 shows the imagery of FIG. 23, with the axis of the can label reoriented to vertical.
Figure 25:
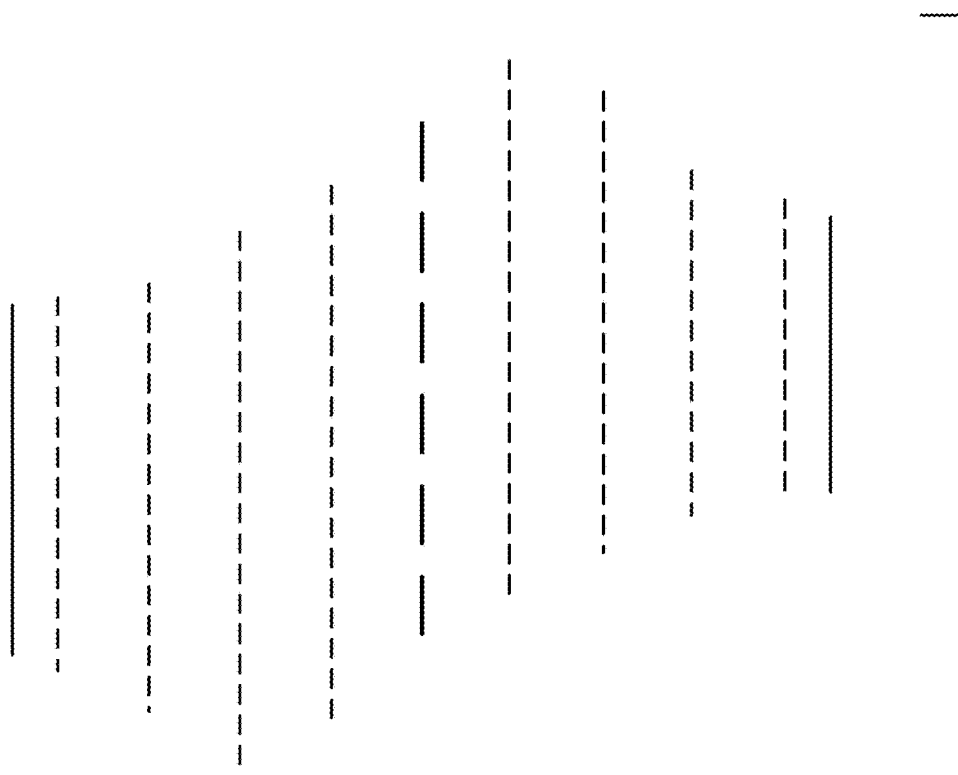
FIG. 25 shows the imagery of FIG. 24, processed to invert the apparent compression of the label artwork near the edges of the cylindrical can.

By such procedure, the FIG. 24 image is horizontally warped to yield a curvature-compensated FIG. 25. (The outline is no longer shown, as it is a curved shape that is difficult to reproduce. The image data would typically encompass the full visible surface of the cylinder, segmented from the camera's view of the conveyor, as opposed to the rectangular excerpt illustrated.) It will be recognized that the dashed lines—at uniform angular spacings of 20 degrees, are now at uniform spatial distances in this 2D representation. Thus, it is as if any label were removed from the cylindrical item, and viewed straight-on.

The compensated image data of FIG. 25 is then processed to yield object identification (e.g., by a watermark decoding module, etc.).

Figure 26:
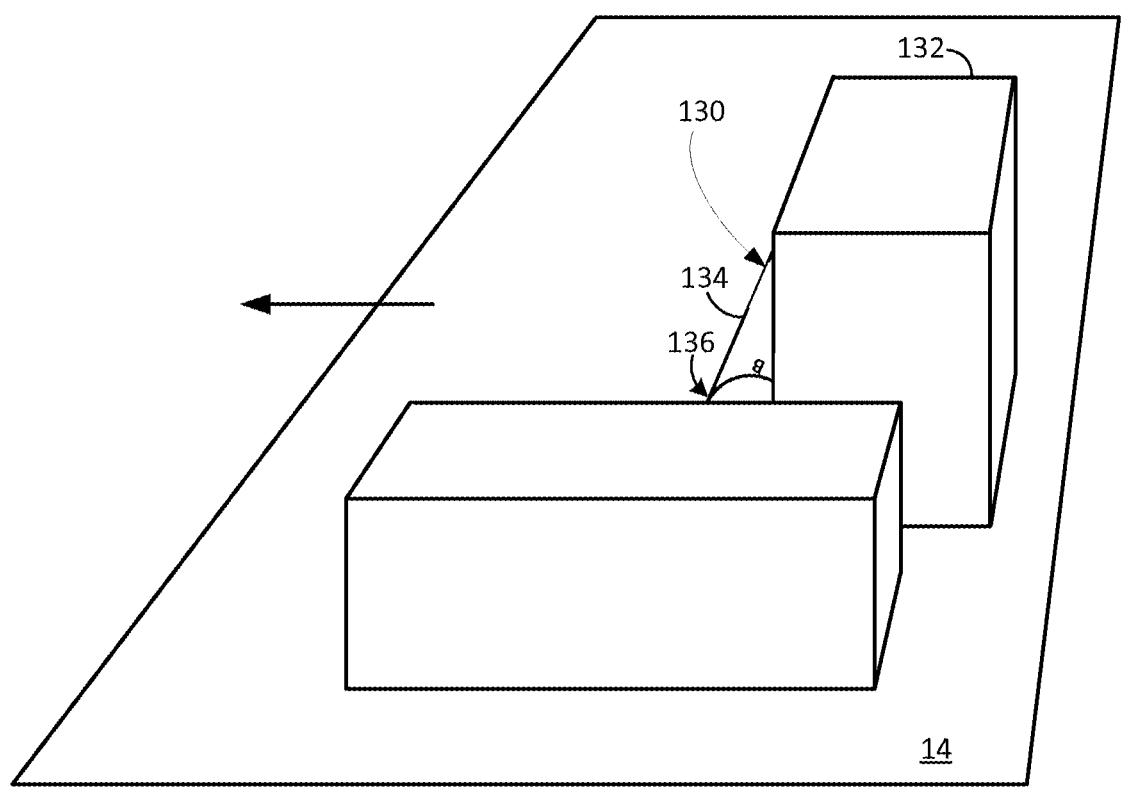
FIG. 26 is a view like FIG. 9, but the conveyor is oriented in a different direction, and the objects include a cylindrical article partially obscured by other items.

The case just-described, in which the cylindrical object is fully-viewable, and its side edges are unambiguous, is straightforward. More challenging are instances where these criteria are not met. FIG. 26 is an example.

In this captured image, much of the cylinder 130—including the entirety of one side edge, and part of the other—are occluded by item 132. Part of one side edge 134 is visible. While this edge line might be due to other features of the imagery, it is most likely the edge of cylindrical object, because the edge detector module finds a point of intersection 136 between this edge 134 and an elliptical curve 138 in the imagery.

Figure 27:
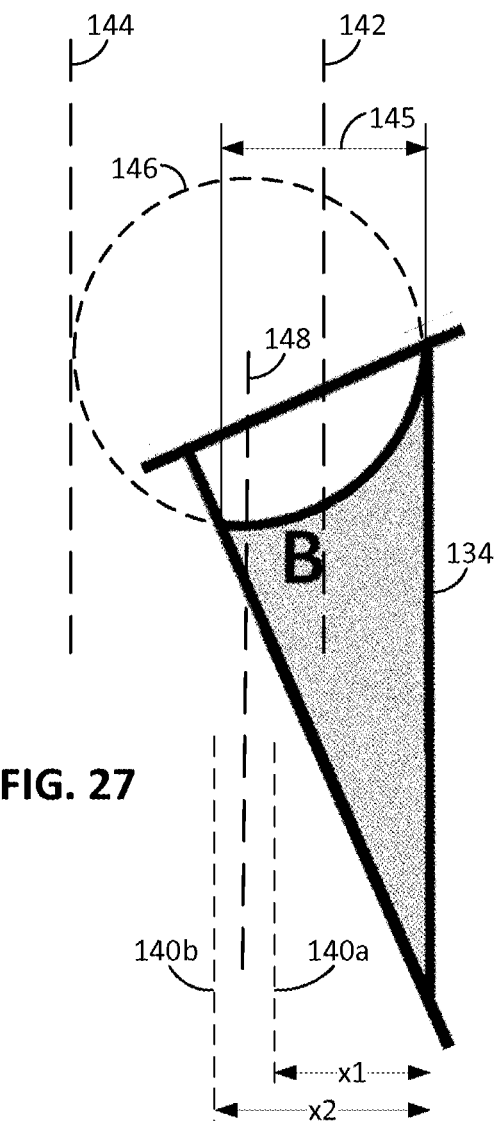
FIG. 27 illustrates the geometry used in "unrolling" the cylindrical artwork on a can, when an edge of the can is discernible.

As described above, e.g., in connection with FIGS. 13-20, the cylindrical surface is segmented from the imagery, and rotated to a likely up-down orientation, as shown in FIG. 27. (This rotation can be based, e.g., on lettering on the cylinder, or the ellipse section 138.) The position of the edge 134 is known, but the position of the center line of minimum distortion (corresponding to the long-dash line 129 of FIG. 22) is uncertain. Is the center line a line 140a that is distance x1 from the edge, or a line 140b that is a distance x2 from the edge, or some other line?

An exhaustive search is performed, e.g., at least partly employing a GPU—assuming different locations for the center line, performing the cylindrical compensation corresponding to that assumed center line, and then attempting to perform an item identification (e.g., by watermark decoding). At some assumed value of "x," the compensation yields an item identification.

The exhaustive search is not unbounded. The system knows that the center line cannot be to the right of line 142, nor to the left of line 144. It can't be right of line 142 because this is the mid-point of the exposed width 145 of the cylinder face, and the occluded portion of the cylinder is to the left. It can't be to the left of line 144, because the system curve-fits an ellipse 146 to the segment of the ellipse revealed in the imagery, and the center line cannot be to the left of this ellipse. (Indeed, it should be well to the right from line 144.)

The search may preferably start with an assumed center line based on the fitted ellipse 146, e.g., mid-way across its width—as shown in by line 148. The system then iterates from that starting point—trying lines at increasing distances either side of the assumed center line 148, in an attempt to extract an item identifier.

(A still simpler approach is to extend the minor axis of the fitted ellipse 146, and use this as the starting point for the center line. Such approach does not work in FIG. 27 because the view in FIG. 26 on which FIG. 27 is based uses only one-point perspective, rather than two, so the elliptical face of the cylinder is not accurately presented: it is presented as a section of a circle.)

Figure 28:
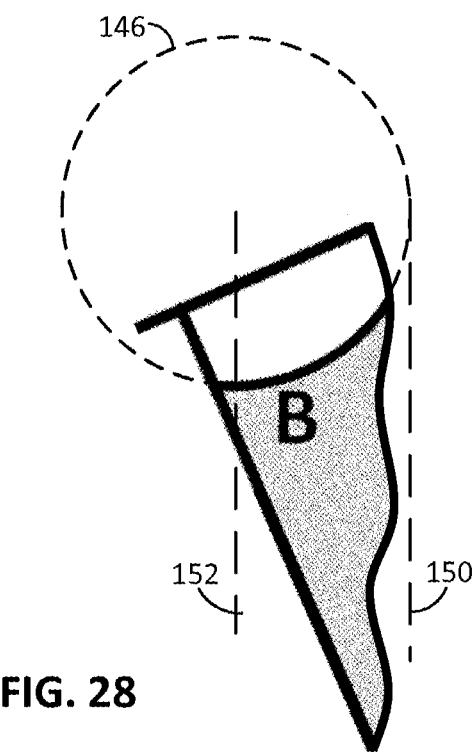
FIG. 28 is like FIG. 27, but for where the edge of the can is not discernible.

FIG. 28 shows a still more challenging scenario, in which the single edge boundary 134 of FIG. 27 is also occluded. Lettering detected on the item has been used to orient the segmented excerpt to an approximate up-down orientation.

In this case, a two-dimensional exhaustive search is done—varying both the assumed location of the edge of the cylinder, and also its assumed center line. That is, the system searches across different curvature states (one metric is the cylinder's radius of curvature, x), and cylinder locations (one metric is the location of the cylinder axis, as viewed from the camera).

Again, since part of the elliptical edge defined by the top of the item is detectable, the system fits an ellipse 146 to this edge, which helps bound the location of the partially-occluded cylindrical surface. In particular, the system starts by assuming that the boundary edge of the cylindrical surface is on line 150—dropped from the edge of the fitted-ellipse nearest the segmented imagery. It further assumes that the center line of the cylindrical surface is on line 152—dropped from the center of the ellipse. Both are then alternately iterated from these starting positions.

As before, for each trial location of the boundary and center lines, the system applies a corresponding corrective warp to "flatten" the presumed cylinder, and then attempts object recognition using the compensated image excerpt.

At some limiting point in the iteration, if object identification has not succeeded, the attempt terminates.

It will be recognized that multiple attempts may be required to extract an identifier (e.g., a watermark) from a partially-revealed cylindrical surface. For example, the estimated up-down orientation may need to be iterated. So, too, the assumed locations of the center line of the curved surface, and an edge location. If perspective is not calibrated in advance, then this too may be iterated. Fortunately, given the capability of multi-core devices, such processing can be effected within the typical time constraints of checkout systems.

Moreover, most item recognition technologies are robust to certain image distortions. For example, watermarks are commonly decoded at 50-200% of original scale, and with 15 degrees or more of perspective distortion. And some watermarks are fully robust to all rotation angles (although detection shortcuts may be implemented if the detector needn't consider all possible rotations). Still further, a complete watermark payload can be extracted from a single tile of watermarked artwork, so in the case of cylindrical objects, a small fraction of whatever surface is exposed will often suffice for decoding. (Barcodes do not have this latter advantage; the barcoded portion must be on the exposed surface. However, barcodes are similarly robust to rotation and scale, and presently are more robust to perspective.)

Due to the decoding latitude afforded by such robustness, the iterative increments in the described embodiments can be relatively large. For example, in FIG. 28, the positions of lines 150 and 152 may be moved laterally a distance equal to 20% of their spacing as an iterative step.

Some implementations may disregard cylindrical distortion, recognizing that a complete watermark tile is less than two inches across, and the side surface of the can closest to the camera may present an axially-oriented strip of label at least two inches in width. Although curved, the cylindrical distortion of this strip is relatively small. Such implementations may prefer to apply the thereby-saved processor effort to address perspective distortion, instead.

It will be understood that techniques like those detailed above can also be adapted for application to item shapes other than cylindrical.

If a conveyor is not present, and the objects are positioned before a camera system by hand, the system can compile a history (histogram) about the pose at which items are most commonly positioned for reading. That is, each time an object is successfully identified (by whatever technology), the system records information about the 3D orientation at which the object was presented to the checkout station (and, optionally, the path along which it traveled). The data may be collected on a per-cashier basis (or per-customer, for self-serve checkouts), to account for the different habits of different users. (Cashiers typically "sign-in" to POS systems, e.g., entering an employee ID and password on a keypad or similar device. Customers may identify themselves by loyalty card.) Once historical object-presentation data has been collected, it can be used to optimize the system's decoding procedure.

For example, if cashier A usually presents items to a camera system tipped-back and tilted-left, the system can apply corrective corresponding counter-distortions to the captured imagery—perhaps without even analyzing the captured imagery to estimate pose. If the cashier's next-most-common presentation is tipped-back and tilted-right, then a compensation adapted to this presentation can be tried if the first-compensated image fails to yield an object recognition.

Conversely, if cashier B usually presents items tipped-forward and tilted left, then a different, corresponding, correction can be applied to images captured at that cashier's station, etc.

The same techniques can be applied to conveyor-based systems. Over time, the system may discern the "canonical" way that objects are placed on the conveyor. Image processing can account for such typical placements by tailoring the order that different identification techniques are applied.

Different objects may be habitually presented, or placed (on a conveyor), differently. After an object has been identified, its presentation/placement data can be stored in association with the object ID and other identifying information, to compile a rich source of characteristic presentation information on a per-item-type basis.

Cashier A may most commonly present cereal boxes tipped-back and tilted left, but may present 12-packs of soft drinks tipped-forward. The system can acquire certain identification information (e.g., straight-edges or curvilinear shape, color histogram, temperature, weight, etc.) from sensors, and use this information to determine the most common presentation pose of objects having such attributes, and apply different image distortions or other identification techniques accordingly based on such sensor data.

As before, a GPU can effect multiple such image counter-distortions in parallel. When cashier A is using the system, the GPU may effect a different collection of image counter-distortions than when cashier B is using the system.

In some ways, it is easier to perform product identification on conveyor-based systems than hand-scanning systems. This is because the orientation of the products typically is constrained, in some fashion, by the conveyor—easing the recognition task. For example, a can nearly always rests on one of its two flat ends or—less likely—is positioned on its side, with its cylindrical axis parallel to the conveyor plane. This substantially limits the universe of camera views that might be encountered. Similarly, boxed-goods are regularly positioned with a planar surface facing down. This causes the adjoining four surfaces to all extend vertically, and the top surface to be disposed in a plane parallel to the conveyor. Again, this confines the range of poses that may be expected. (These are examples of the canonical poses referenced earlier.)

In like fashion, a conveyor imparts common, straight-line, movement to all objects resting on it. This makes the computational task of discerning surface orientations easier, since feature points recognized from two images—captured by a single camera at two different instants—have all moved the same distance in the same direction. (If one point moves 100 pixels, and a second point moves 50 pixels, then the second point is more remote than the first, etc.)

The difficulty of conveyor-based systems is that the camera's view of one product may be occluded by another. In contrast, hand-scanning systems typically present a single item at a time to the camera.

While the foregoing description focused on watermark decoding, it will be recognized that object identification by pattern recognition (e.g., fingerprinting, product configuration, etc.) is also simplified by understanding the rotational and perspective state of the object depiction, from a normal, or reference, presentation. Thus, for example, with SURF fingerprint-based recognition, the discerned feature points in a camera image may more quickly be matched with corresponding points in a reference image if the object depiction in the camera image is transformed to correspond to that in the reference imagery.

In some embodiments, rotational orientation is not important. For example, the watermarking arrangement detailed in Digimarc's U.S. Pat. No. 6,590,996 is fully robust to rotation. In such embodiments, computational effort is better focused on determining the inclination of the object surface, and perspective distortion.

In some embodiments, information determined through one recognition technology is useful to another. For example, by color histogram analysis, the system may make a tentative identification of an item as, e.g., a six-pack of Coke. With this tentative identification, the system can obtain—from the database—information about the configuration of such product, and can use this information to discern the pose or orientation of the product as depicted in the camera imagery. This pose information may then be passed to a digital watermark decoding module. Such information allows the watermark decoding module to shortcut its work (which typically involves making its own estimation of spatial pose).

In another example, image fingerprinting may indicate that an item is likely one that conveys a digital watermark on its packaging. The image fingerprinting may also provide information about the item's affine representation within the captured imagery. The system may then determine that if the image is rotated clockwise 67 degrees, the watermark will be easier to read (e.g., because it is then restored to its originally encoded orientation). The system performs a virtual 67 degree rotation of the imagery, and then passes it to a watermark decoding module.

Watermark indicia—like barcode indicia—cannot be decoded properly if they are depicted at too great an angular skew. In accordance with another aspect of the present technology, products for sale in a retail store are watermarked with multiple watermarks—pre-distorted to aid off-axis reading. In an exemplary arrangement, the watermark pattern (e.g., a watermark tile, as detailed in U.S. Pat. No. 6,590,996) is affine-distorted eight different ways (horizontally/vertically). The eight affine-transformed tiles are summed with the original tile, and this composite pattern is applied to the product or its packaging. The following Table I shows the nine component watermark tiles:

TABLE I

| | |
|---|---|
| 1 | Original watermark tile |
| 2 | Original tile, affine-transformed 30 degrees to right |
| 3 | Original tile, affine-transformed 30 degrees to right, and 30 degrees upwardly |
| 4 | Original tile, affine-transformed 30 degrees upwardly |
| 5 | Original tile, affine-transformed 30 degrees to left, and 30 degrees upwardly |
| 6 | Original tile, affine-transformed 30 degrees to left |

TABLE I-continued

| | |
|---|---|
| 7 | Original tile, affine-transformed 30 degrees to left, and 30 degrees downwardly |
| 8 | Original tile, affine-transformed 30 degrees downwardly |
| 9 | Original tile, affine-transformed 30 degrees to right, and 30 degrees downwardly |

If a product surface bearing this watermark pattern is tilted up, away from the camera by 45 degrees, component tile #8 in the above list still will be readily readable. That is, the 45 degrees of upward physical tilt, counteracts the 30 degrees of downward affine transformation of tile #8, to yield a net apparent upward skew of 15 degrees—well within the reading range of watermark decoders.

(In a variant embodiment, the composite watermark tile additionally or alternatively includes component tiles of different watermark scales. Similarly, the composite watermark tile can include component tiles that have been warped in non-planar fashion. For example, different curvilinear warps can be used in anticipation of sensing watermarks from curved surfaces, such as canned goods, viewed from different perspectives. In some embodiments, different watermark patterns may be applied in tiled fashion, e.g., one normal, an adjoining tile distorted to "tilt left," another adjoining one distorted to "tilt right," etc.)

In existing checkout stations, spinning mirrors are sometimes used to effect physical scanning of laser beams across product packaging. In accordance with a further aspect of the present technology, moving mirrors are used with camera systems to introduce different distortions (e.g., perspective distortions) in imagery provided to product identification modules.

For example, a camera may face a segmented cylinder having nine different mirrored surfaces. The cylinder may be turned by a stepper motor to successively present different of the mirrors to the camera. Each mirror reflects a differently-warped view of checkout items to a camera. These different warps may be, e.g., the nine different transformations detailed in Table I. For one frame capture, the cylinder presents an unwarped view of the imagery to the camera. For a next frame capture, the cylinder presents a view of the imagery as if skewed 30 degrees to the right, etc. The resulting sequence of frames can be provided, e.g., to a watermark decoder or other product identification module, for generation of product identification information.

In a related embodiment, moving mirrors serve to extend a camera's field of view—presenting scenes to the camera sensor that are otherwise outside the field of view of the camera lens.

Another useful approach to identifying unknown objects (e.g., reading watermarks from surfaces of unknown shape) is akin to a Taylor series expansion. First, assume the object is planar and squarely facing the camera. Try reading the watermark. If unsuccessful, use available data to make a best guess as to a planar slope term (e.g., tip and tilt). Apply a corrective counter-distortion based on the guessed surface slope term, and try reading the watermark. If unsuccessful, use available data to make a further refinement to the guess—adding a simple curvature term. Apply a corrective counter-distortion that is also based on the guessed curvature, and try reading the watermark. This process continues, each time further refining an estimate about the surface configuration, and each time trying to decode the watermark based on such estimate. Continue this procedure until time allocated to the task runs out, or until all available data useful in estimating product configuration has been applied. (Even in this latter case, "blind" attempts at image distortions that might allow watermark decoding may still be tried.)

Reference has been made to certain digital watermark indicia spanning a substantial portion of the packaging. This means at least 25% of the exposed surface area of the packaging. Increased performance can be achieved by increasing the coverage, e.g., to more than 50%, 75%, 90%, or 95%, of the exposed area—in some instances reaching 100% coverage.

While reference was made to processing imagery to counteract certain apparent distortions, this operation need not be done in the spatial (pixel) domain. Instead, the imagery may first be transformed into a complementary domain (e.g., the spatial frequency domain, or FFT domain). The desired counter-distortion can then be applied in this complementary domain.

Such arrangement is particularly favored in watermark-based object identification systems, because watermark decoding commonly operates on spatial-frequency domain data. The imagery can be FFT-transformed once, and then a variety of different distortions can be applied (e.g., by GPU), and each resulting set of data can be provided to a watermark detector. This is computationally easier than applying a variety of different distortions (e.g., by GPU) in the pixel domain, and then having to perform FFTs on each of the differently-distorted image sets, to perform similar watermark decoding.

While certain embodiments made use of image frames oriented at regular 15 degree increments, this is not essential. One alternative embodiment uses one frame parallel to the camera, four frames that are angled at least 20 degrees away from the first frame (e.g., two at +/−25 degrees in a horizontal direction, and two more at +/−25 degrees in a vertical direction), and four more frames that that are angled at least 50 degrees away from the first frame (e.g., two at +/−55 degrees horizontally, and two at +/−55 degrees vertically). This set of nine image frames provides a good diversity of item views, allowing simple watermark and barcode decoders to reliably decode indicia from most surfaces viewable from a camera—regardless of the surfaces' orientations.

Volumetric Modeling, Etc.

A further aspect of the present technology concerns identification of items, e.g., piled at a retail checkout.

Figure 31:
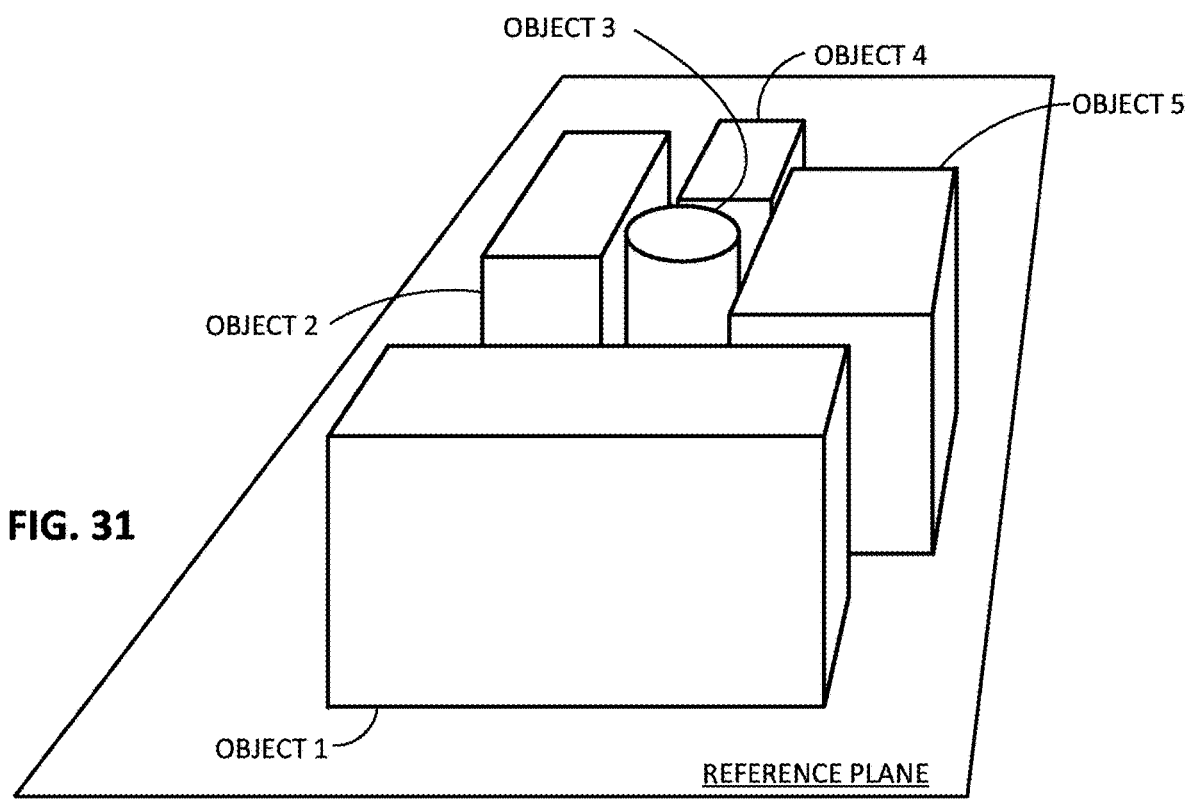
FIGS. 31, 31A, 32-37, 38A, 38B, 39A and 39B illustrate certain other aspects of the detailed technology.

Such an arrangement starts with 3D information about the assembled merchandise piled at the checkout. This 3D data set can be generated using any of the techniques identified elsewhere herein, including stereoscopic imaging, single camera imaging in conjunction with a moving belt, Kinect sensor, time of flight camera, etc. FIG. 31 shows an illustrative 3D image—showing what seem to be five objects on a conveyor belt.

This 3D information is processed to define plural component object volumes.

The science of reconstructing object volumes from imagery is an old one (e.g., Guzman, "Decomposition of a Visual Scene into Three-Dimensional Bodies," in *Automatic Interpretation and Classification of Images*, Academic Press, 1969). One of the landmarks in the field is Clowes, On Seeing Things, Artificial Intelligence, 2:79-116 (1971).

This earlier work was followed—largely at the MIT Artificial Intelligence Lab—by Waltz, Hoffman and others, who further refined algorithms for discerning component solid shapes based on information derived from imagery. Waltz, in particular, is known for his work on examining local properties in images (visible vertices and edges), and combining this information with geometrical rules to identify what polyhedra are depicted. His use of constraint propagation overcame combinatorial explosion problems to which certain earlier analytic methods were prone.

This volumetric object recognition research has been widely deployed in robotic "pick and place" applications. ("Bin picking" is a common task in which a robot images known 3D shapes that are randomly distributed in a bin. The robot processes the imagery to identify a desired one of the shapes, and then manipulates an arm to remove the item from the bin and place it at a desired location.)

While most such techniques rely on edge-derived geometries, some subsequent technologies shifted to analysis of point clouds (e.g., from range images or depth maps), to identify component shapes based on identification of surfaces. The recent commodification of ranging sensors (e.g., the Kinect sensor, and time of flight cameras) makes such approaches attractive for some implementations.

Additionally, a great deal of practical work has been done to reconstruct 3D building geometries from aerial cityscape images. That application is closely related to the retail checkout context, but on a different scale.

A few of the many writings detailing the foregoing include:

Brady, Computational Approaches to Image Understanding, MIT AI Lab, Memo 653, 1981;

Braun, Models for Photogrammetric Building Reconstruction, Computers & Graphics, Vol19, No 1, January-February 1995, pp. 109-118;

Dowson et al, Shadows and Cracks, MIT AI Lab, Vision Group, June, 1971;

Dowson, What Corners Look Like, MIT AI Lab, Vision Group, June, 1971;

Fischer, Extracting Buildings from Aerial Images using Hierarchical Aggregation in 2D and 3D, Computer Vision and Image Understanding, Vol. 72, No 2, November 1998, pp. 185-203;

Haala et al, An Update on Automatic 3D Building Reconstruction, ISPRS Journal of Photogrammetry and Remote Sensing 65, 2010, pp. 570-580;

*Handbook of Mathematical Models in Computer Vision*, N. Paragios ed., Springer, 2006;

Hoffman et al, Parts of Recognition, MIT AI Lab, AI Memo 732, December, 1983;

Mackworth, Interpreting Pictures of Polyhedral Scenes, Artificial Intelligence, Vol. 4, No 2, 1973, pp. 121-137;

Mundy, Object Recognition in the Geometric Era—a Retrospective, Lecture Notes in Computer Science, Volume 4170, 2006, pp. 3-28;

Shapira et al, Reconstruction of Curved-Surface Bodies from a Set of Imperfect Projections, Defense Technical Information Center, 1977;

Waltz, Understanding Scenes with Shadows, MIT AI Lab, Vision Group, November, 1971; and Zhao, Machine Recognition as Representation and Search, MIT AI Lab, AI Memo 1189, December, 1989.

The artisan is presumed to be familiar with the above-reviewed prior art, so it is not further detailed here.

Any of these prior art methods can be employed in the present application. However, for the sake of expository clarity, the technology is described with reference to a simple set of geometrical rules applied to edges.

Such a process begins by identifying straight and elliptical contours (edges), and associated vertices. Known edge-finding techniques can be used. Regions (surfaces) bounded by these edges are typically regarded as object faces.

Edge finding techniques based on Canny's algorithm are commonly employed. (See, e.g., Canny, A Computational Approach to Edge Detection, IEEE Trans. Pattern Analysis and Machine Intelligence, Vol. 8, 1986, pp. 679-714.) Canny edge finders are implemented in the popular OpenCV software library, e.g., version 2.4, which also includes a multitude of other useful tools, such as corner detectors, robust local feature detectors, ellipse-finders, etc.

Figure 31A:
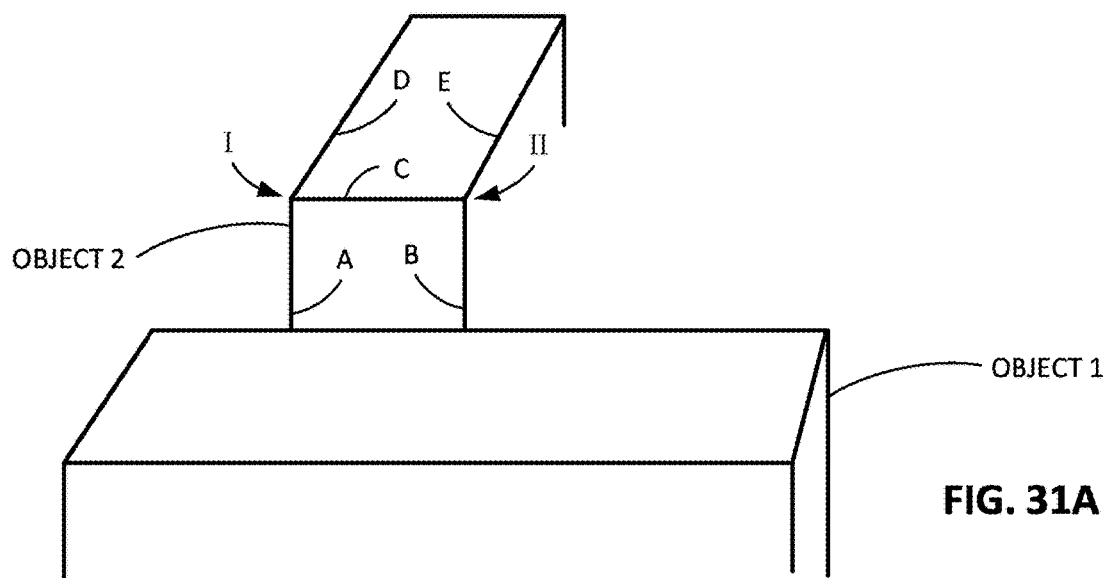

Geometrical rules are applied to identify faces that form part of the same object. For example, as shown in FIG. 31A, if edges A and B are parallel, and terminate at opposite end vertices (I, II) of an edge C—at which vertices parallel edges D and E also terminate, then the region between edges A and B is assumed to be a surface face that forms part of the same object as the region (surface face) between edges D and E.

Other rules are applied to discern locations of occluded features. For example, an edge that extends vertically downward, but that is interrupted (occluded) by an edge of a surface of a different object, is assumed to extend down to a common reference plane (i.e., the plane of the checkout stand), on which the objects are assumed to rest. (See, e.g., lines A and B in FIG. 31A.)

Figure 32:
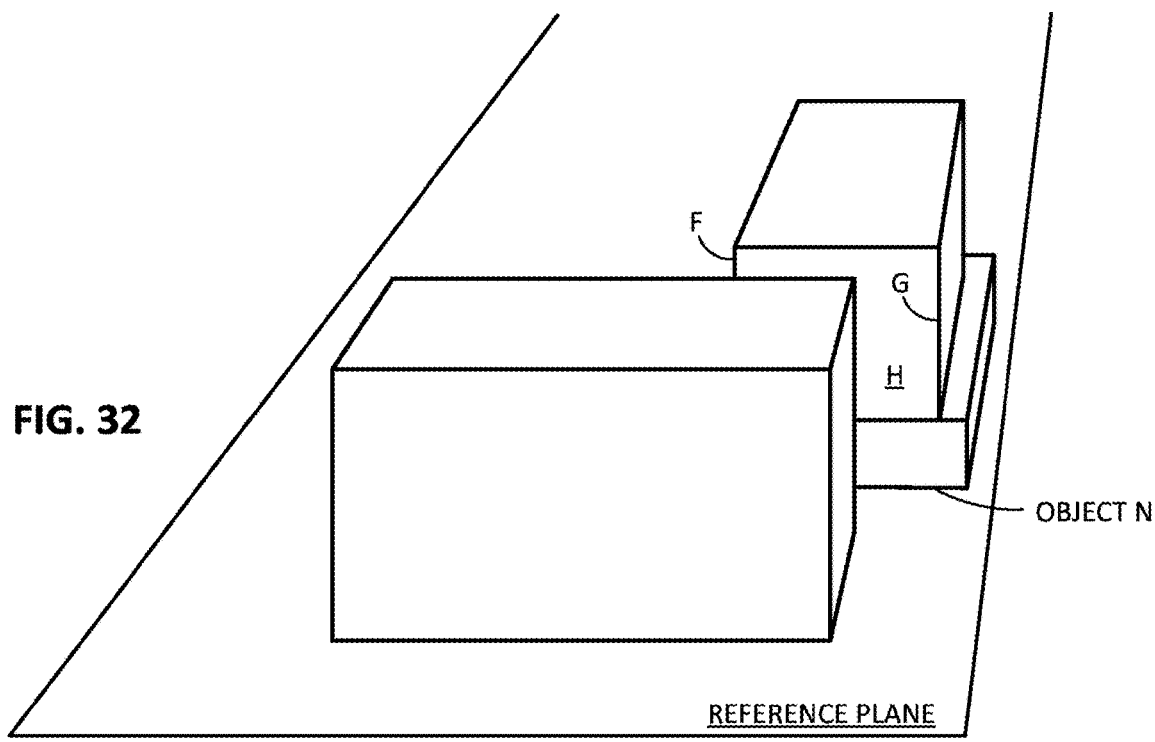

Such rules typically have exceptions. For example, some rules take precedence over others. Consider edge F in FIG. 32. Normal application of the just-stated rule would indicate that edge F extends all the way to the reference plane. However, a contrary clue is provided by parallel edge G that bounds the same object face (H). Edge G does not extend all the way to the reference plane; it terminates at the top plane of "Object N." This indicates that edge F similarly does not extend all the way to the reference plane, but instead terminates at the top plane of "Object N." This rule may be stated as: parallel edges originating from end vertices of an edge ("twin edges") are assumed to have the same length. That is, if the full length of one edge is known, a partially-occluded twin edge is deduced to have the same length.

Figure 33:
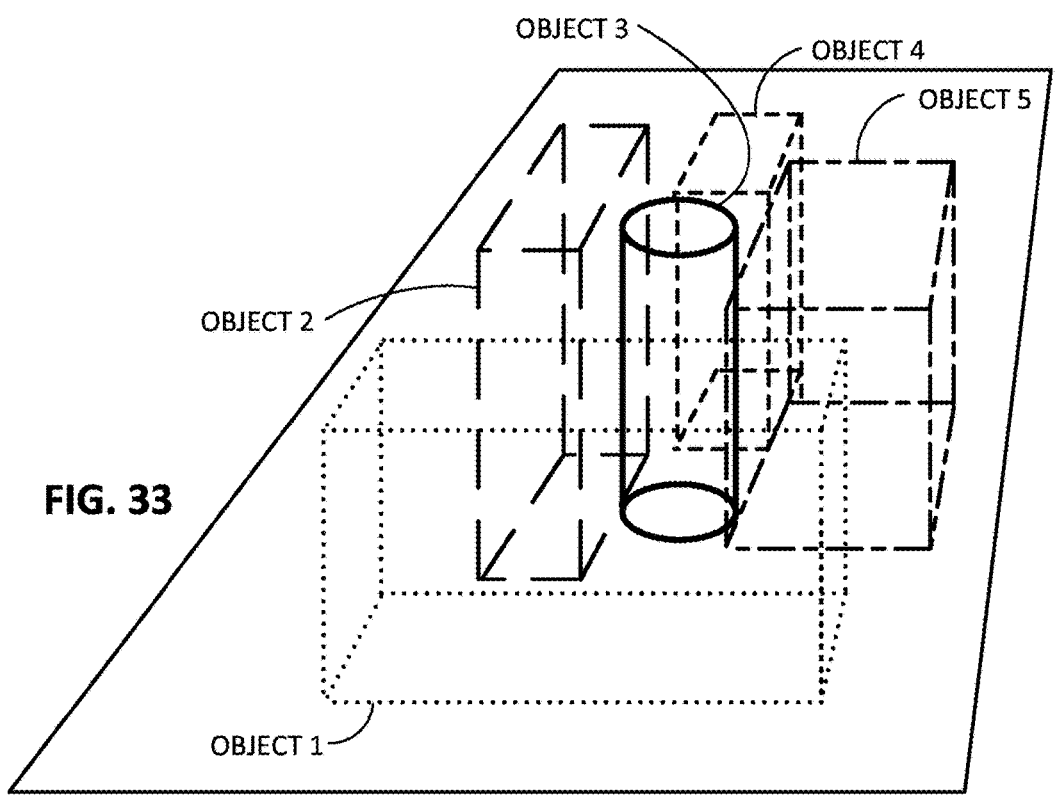

Application of the above procedure to the 3D arrangement of FIG. 31 results in a segmented 3D model, such as is represented by FIG. 33. Each object is represented by data stored in memory indicating, e.g., its shape, size, orientation, and position. An object's shape can be indicated by data indicating whether the object is a cylinder, a rectangular hexahedron, etc. The object's size measurements depend on the shape. The size of a right cylinder, for example, can be characterized by its diameter and its length. Orientation can be defined—for a cylinder—by the orientation of its principal axis (in the three-dimensional coordinate system in which the model is defined). For a regular hexahedron, orientation can be defined by the orientation of its longest axis. The position of the object can be identified by the location of an object keypoint. For a cylinder, the keypoint can be the center of the circular face that is nearest the origin of the coordinate system. For a hexahedron, the keypoint can be the corner of the object closest to the origin.

Comparison of the 3D image of FIG. 31 to the segmented model shown in FIG. 33 shows that the model has extrapolated structure that is unseen in the image. For example, while FIG. 31 reveals that Object 3 is a cylindrical object, only a fraction of the object is actually shown; the rest of the object is occluded by other shapes.

FIG. 33 has extrapolated the shape of Object 3 as being a cylinder with a length-to-diameter ratio of about 2.7. (This roughly corresponds to the shape of a Pringles brand potato chip can.) But this shape is supposition. The only information that is known, for a fact, is the information captured by the sensor system and revealed in FIG. 31, i.e., that the length-to-diameter ratio of Object 3 is 1.0 or greater. A shorter cylinder, such as a Campbell's soup can, also meets this description.

(Using known photogrammetry principles, dimensional data can be extracted from imagery captured under controlled/calibrated conditions. A supermarket checkout is such a controlled environment. In the FIG. 31 case, Object 3 may be determined to have a diameter of 3 inches, and its top surface (together with that of Object 4) may be found to be about 8 inches above the reference plane.

Figure 34:
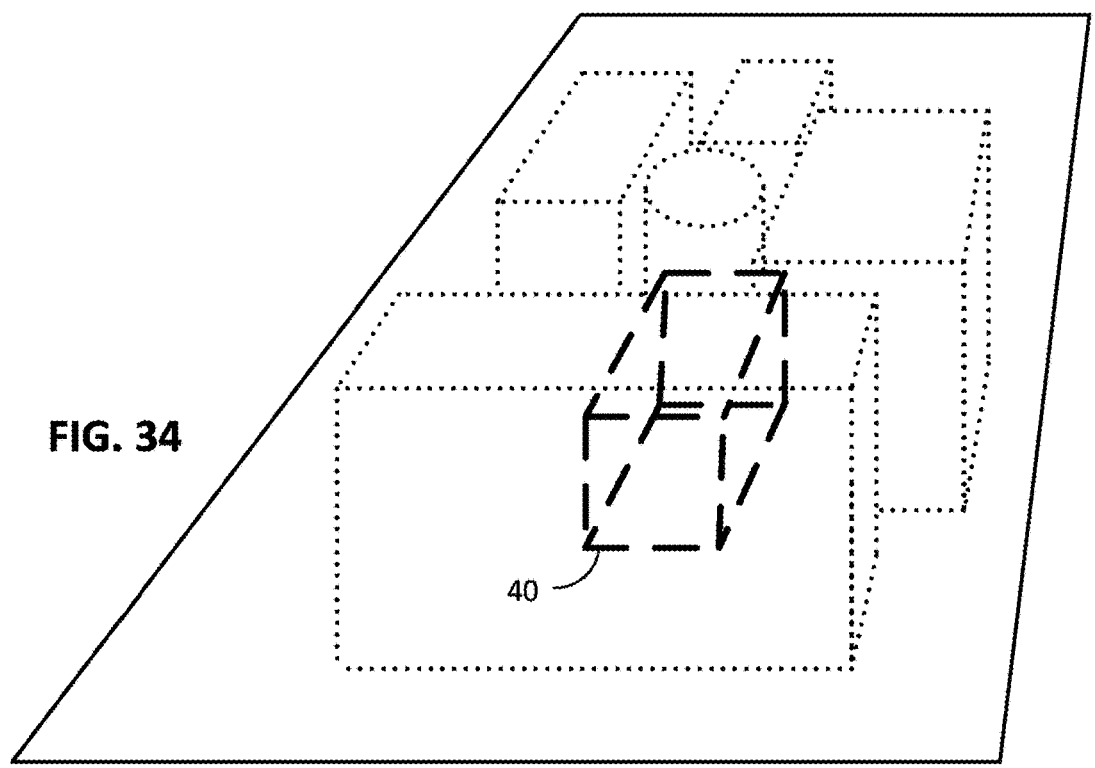

In accordance with another aspect of the present technology, the uncertainty between what is known and what is extrapolated (assumed/supposed) is identified. In one particular implementation, this uncertainty is communicated to a human operator, or to another element of the data processing system. FIG. 34 shows one such manner of communication to a human operator, i.e., a graphical depiction of the pile of merchandise, with a zone of high uncertainty 40 highlighted on a display screen (e.g., by color, bolding, flashing, etc.), so as to alert a checkout clerk about a location that may be checked for additional merchandise.

Figure 35:
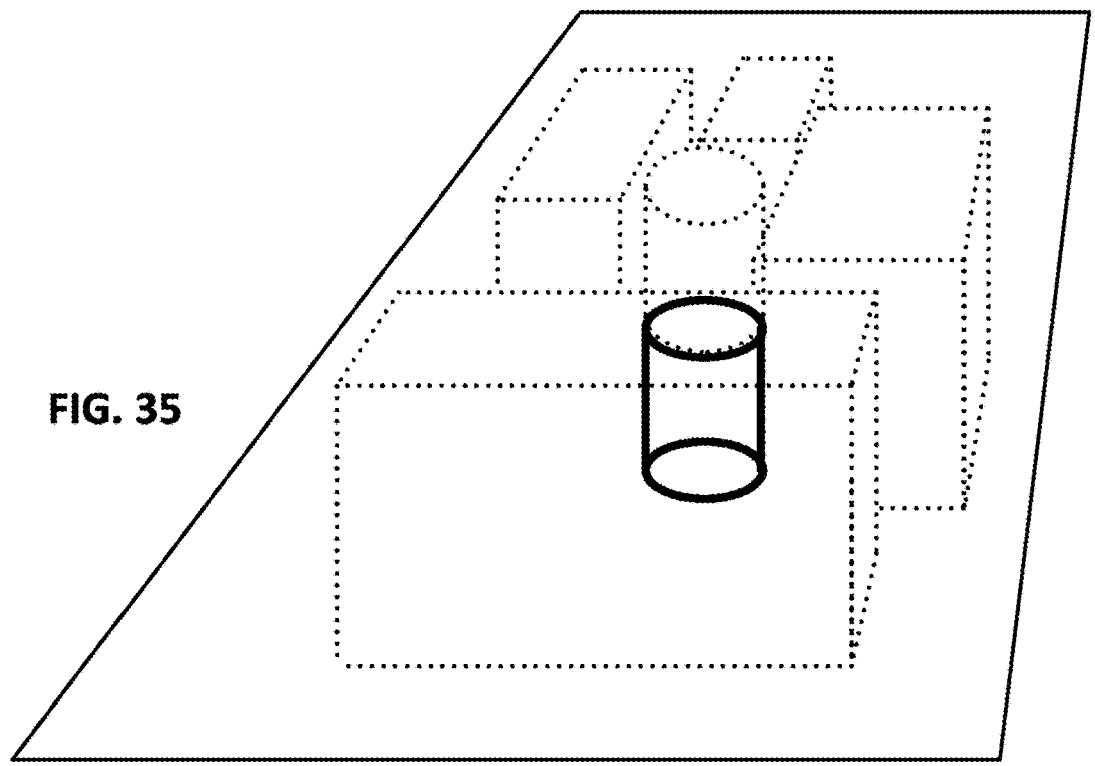

One possibility, depicted in FIG. 35, is that the visible cylinder (Object 3) in FIG. 31 is actually a 4" tall can of soup, positioned atop a second can of soup that is wholly hidden.

It will be recognized that the pile of merchandise shown in FIG. 31, as modeled in FIG. 33, has much uncertainty. For example, the human viewer will perceive (and rules followed by the present system can indicate) that the segmented model depiction of Object 2 and Object 4 are also uncertain. (Object 3 is probably more uncertain, since cylinders with a length-to-diameter ratio of 2.7 are relatively rare in supermarkets, whereas hexahedrons of the dimensions depicted for Objects 2 and 4 in FIG. 33 are relatively more common.)

Other segmented shapes in FIG. 33 are of relatively high certainty. For example, due to the prevalence of regular hexahedrons in supermarkets, and the rarity of any other shape that presents an appearance like that of Object 1 and Object 5 without being a hexahedron, the system can assign a high certainty score to these objects as depicted in FIG. 33.

As just indicated, the system desirably applies rules to compute—for each segmented shape in FIG. 33—a confidence metric. As additional information becomes available, these metrics are revised. For example, if a second view of the pile of merchandise becomes available (e.g., from another sensor, or because the pile moves on a conveyor), then some previously-occluded edges may be revealed, giving greater (or less) certainty to some of the segmented volumes in FIG. 33. In some cases, the segmented model of FIG. 33 is revised, e.g., if the additional data includes evidence of a new item not previously included in the model.

The confidence metric can be based, at least in part, on statistical data about the different products offered for sale in the supermarket. This statistical data can include dimensional information, as well as other data—such as historical sales volumes per item. (If the supermarket sells 100 cans of Pringles potato chips in a month, and 2000 cans of Campbell's soup, then the confidence score for Object 3 will be lower than if the sales volumes for these items were reversed.)

The particular formula for computing a confidence metric will depend on the particular implementation, and the available data. One particular formula comprises an equation in which different metrics are weighted to different degrees in accordance with their importance, and combined, e.g., in a polynomial expression.

The following exemplary confidence metric equation uses input data M1, M2, M3 and M4 to yield a score S for each segmented object. Factors A, B, C, D and exponents W, X, Y and Z can be determined experimentally, or by Bayesian techniques:

$$S=(A*M1)^W+(B*M2)^X+(C*M3)^Y+(D*M4)^Z$$

The uncertainty zone shown in FIG. 34, which is brought to the attention to the human clerk (or other system component), can be threshold-defined, using the computed confidence metric. For example, if Object 3 has a confidence metric of 20 (on a scale of 1-100), and if Objects 1, 2, 4 and 5 have confidence metrics of 97, 80, 70 and 97, respectively, then the uncertainty zone is as depicted in FIG. 34 if the threshold is set to highlight uncertainty zones associated with objects having confidence metrics less than 50.

However, if the threshold is set at 75, then a further uncertainty zone—associated with Object 4, would also be highlighted.

(In a variant embodiment, a binary approach to uncertainty is adopted. Segmented shapes either have certainty or they don't. For example, in FIG. 33, Objects 1 and 5 may be determined to be certain, while Objects 2, 3 and 4 are not. Uncertainty zones associated with the latter are flagged, e.g., for possible follow-up.

In accordance with a further aspect of the present technology, the system's assessments about the different segmented shapes are refined by reference to other sensor data. That is, the system employs other information to help refine an evidence-based determination, e.g., about certainty or shape.

Figure 36:
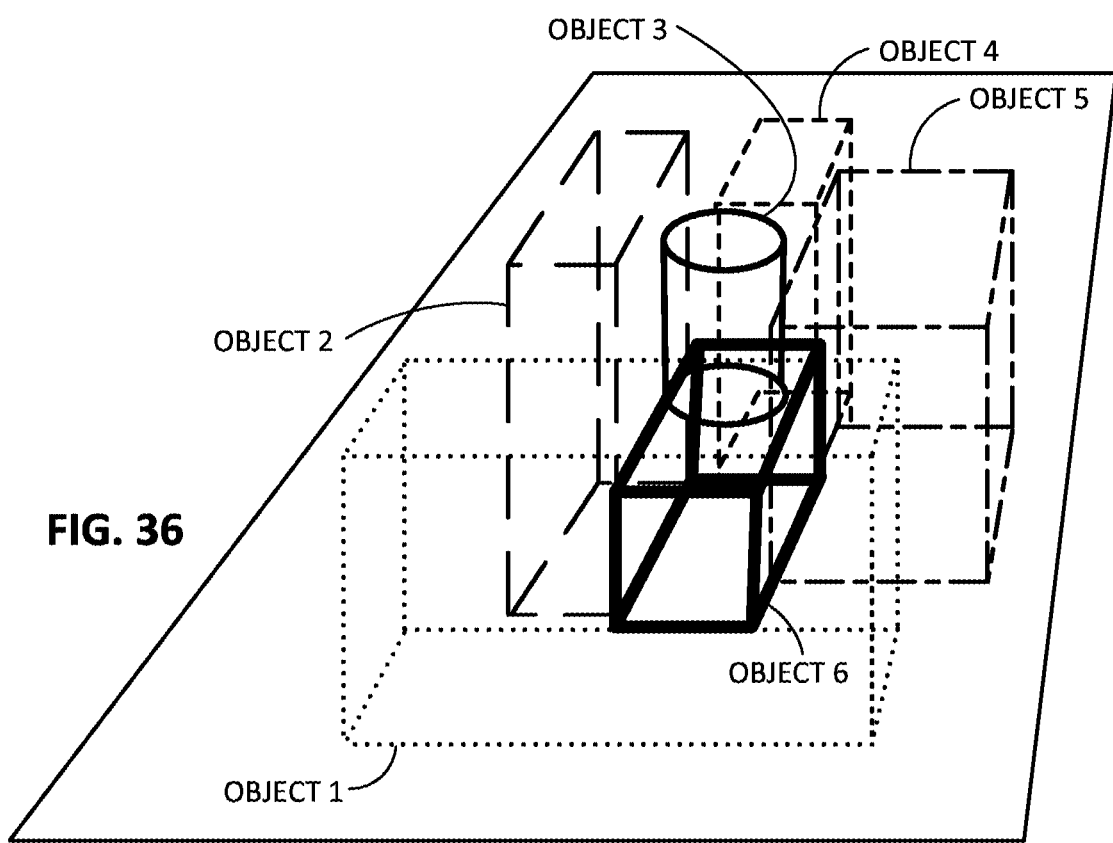

Consider Object 4, which is largely occluded in FIGS. 31 and 33. Scale information extracted from the imagery may indicate this item has a planar (top) face measuring about 2.2"×6". Many items in the supermarket inventory meet this criteria. However, if imagery is also available from an infrared camera, this item may be found to be at a temperature below freezing. Many boxed frozen vegetables (e.g., spinach) have a planar surface of this dimension, but such products commonly do not have a long dimension of 8", as extrapolated in FIG. 33. Based on the additional evidence contributed by the thermal image data, the system may reduce the confidence score for Object 4, e.g., from 70 to 40. A great variety of other information can be used in this manner Consider, for example, that the image of FIG. 31 may reveal identification markings on the cylindrical face of Object 3 exposed in that view. Such markings may comprise, for example, a barcode, or distinctive markings that comprise a visual fingerprint (e.g., using robust local features). A barcode database may thereby unambiguously identify the exposed cylindrical shape as a 10.5 oz. can of Campbell's Condensed Mushroom Soup. A database of product information—which may be the barcode database or another (located at a server in the supermarket or at a remote server)—is consulted with such identification information, and reveals that the dimensions of this Campbell's soup can are 3" in diameter and 4" tall. In this case, the model segmentation depicted in FIG. 33 is known to be wrong. The cylinder is not 8" tall. The model is revised as depicted in FIG. 36. The certainty score of Object 3 is increased to 100, and a new, wholly concealed Object 6 is introduced into the model. Object 6 is assigned a certainty score of 0—flagging it for further investigation. (Although depicted in FIG. 36 as filling a rectangular volume below Object 3 that is presumptively not occupied by other shapes, Object 6 can be assigned different shapes in the model.) For example, Objects 1, 2, 3, 4 and 5 can be removed from the volumetric model, leaving a remaining volume model for the space occupied by Object 6 (which may comprise multiple objects or, in some instances, no object).

A task list maintained by the system is updated to remove identification of Object 3 from identification tasks to be completed. That part of the pile has been identified with sufficient certainty. Knowing its shape, the geometrical model of the pile is updated, and the system continues with other identification tasks.

The position of a barcode (or other marking) on an object is additional evidence—even if the captured imagery does not permit such indicia to identify the object with certainty. For example, if a hexahedral shape is found to have has a barcode indicia on the smallest of three differently-sized faces, then candidate products that do not have their barcodes on their smallest face can be ruled out—effectively pruning the universe of candidate products, and increasing the confidence scores for products that have barcodes on their smallest faces.

Similarly, the aspect ratio (length-to-height ratio) of barcodes varies among products. This information, too, can be sensed from imagery and used in pruning the universe of candidate matches, and adjusting confidence scores accordingly.

(As suggested by the foregoing, the processing system may maintain multiple identification hypotheses about each item in the pile. For example, the system may separately compute confidence scores that the cylindrical shape in FIG. 31 is a particular can of soup, or a particular can of potato chips. Some evidence may increase or decrease both scores in tandem (e.g., thermal camera data indicating the cylinder is cold, or at room temperature). But other evidence will tend to increase confidence in one hypothesis, and reduce confidence in another.)

Figure 6:
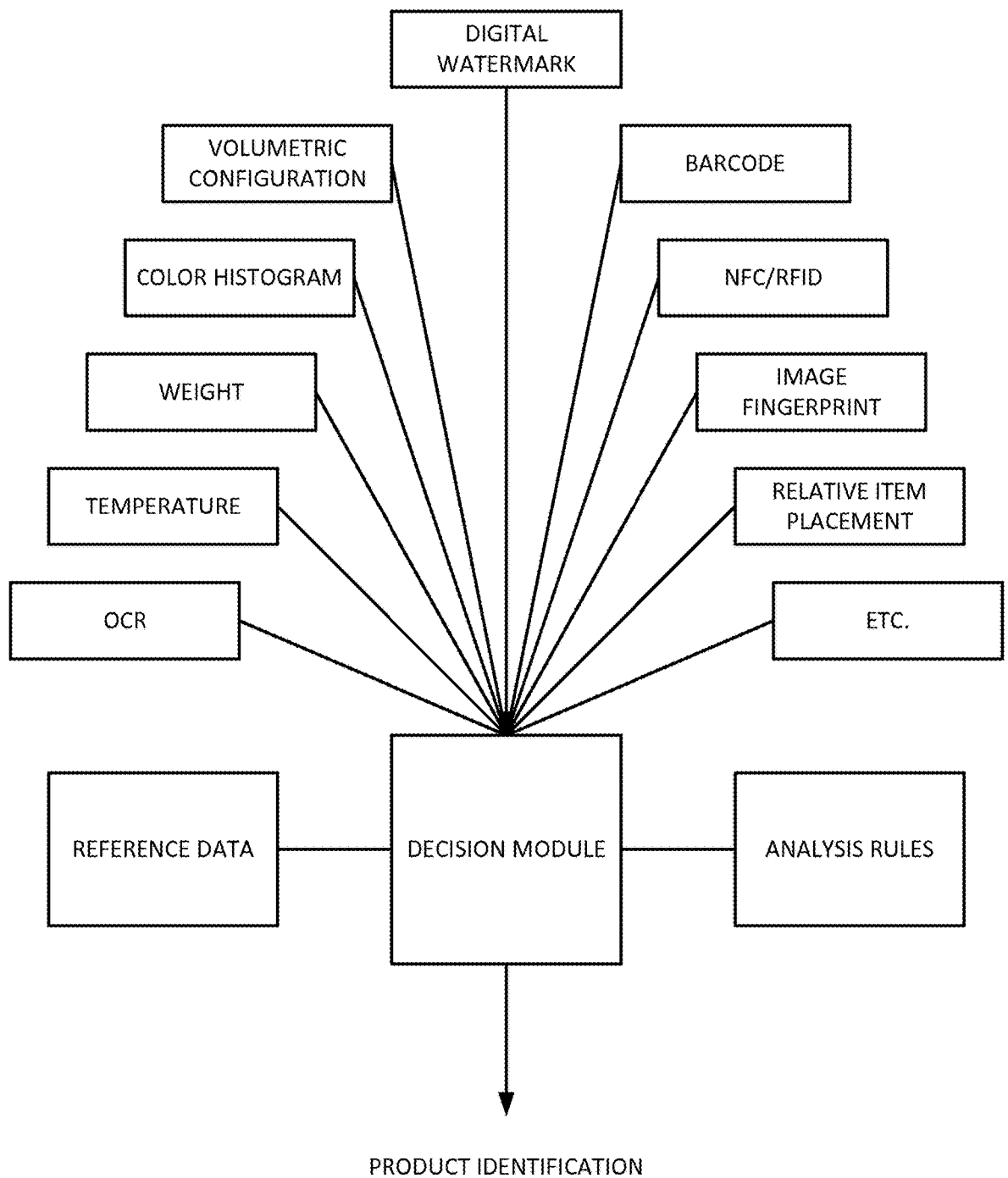
FIG. 6 shows a schematic illustration of a checkout system that considers multiple different types of input information, in conjunction with stored analysis rules and reference data, to determine product identification.

FIG. 6 shows some of the sensor-derived evidence that the system may consider in developing and refining hypotheses regarding product identification.

As another example of how the system's assessments about the different segmented shapes can be refined by reference to other sensor data, consider weight data. Where the weight of the pile can be determined (e.g., by a conveyor or cart weigh scale), this weight can be analyzed and modeled in terms of component weights from individual objects—using reference weight data for such objects retrieved from a database. When the weight of the identified objects is subtracted from the weight of the pile, the weight of the unidentified object(s) in the pile is what remains. This data can again be used in the evidence-based determination of which objects are in the pile. (For example, if one pound of weight in the pile is unaccounted for, items weighing more than one pound can be excluded from further consideration.)

It will be recognized that the above-described technology can be conceived, in one respect, as growing a model of known objects—adding objects as they are identified. An alternate conception is to model an unknown pile, and then subtract known objects from the model as the objects are identified.

An initial model of a total 3D volume presented for checkout can be generated based on sensed data (e.g., imagery). When an object in the pile is identified (e.g., by product markings, such as by fingerprinting, barcode, text OCR, or through use of other evidence), the object's shape (volume) is obtained from reference data stored in a database. The object's orientation (pose) is next determined—if not already known). Again, this may be done by comparing sensor data (e.g., showing edges, product markings, etc.) with reference information stored in a database. Once the object orientation is known, that object's shape—correspondingly oriented—is virtually subtracted from the 3D volumetric model. (Its weight may also be subtracted from the unknown pile weight, if weight information is known.) This process proceeds for all identifiable objects. The remaining volume is then checked for hidden objects, or an output signal can be issued, alerting that the pile needs to be spread out to reveal hidden contents.

For any method based on extracting geometrical edges from luminance images, there is a need to distinguish geometrical edges from pattern edges. One approach is to use range images/depth maps (in addition to, or in lieu of, intensity images) to avoid confusion arising from printing and other markings on the faces of objects.

While the above-detailed geometrical edge-based, rule-based procedure for segmenting 3D data into component volumes is a simple way of identifying conventional shapes, other items encountered in supermarkets can have less conventional shapes—such as egg cartons. These shapes can be defined by stored reference data (templates, akin to CAD-like models) to which the image processing system can resort for identification purposes, e.g., using known bin-picking object identification arrangements. In one such arrangement, the 3D imagery is searched for the various templates in a store's catalog, to determine whether any such item is at least partially visible in the pile. Such procedure can be applied before, or after, the rule-based segmentation of conventional shapes.

Further Remarks Concerning Conveyors

Reference was made, above, to various innovations associated with conveyors at retail checkouts. Most conveyor innovations may be regarded as falling into one of three classes: (1) aids in object recognition, to increase throughput and accuracy; (2) new features for the shopper; and (3) benefits for advertisers.

In the first class, markings on the conveyor can serve to identify the plane on which the objects rest—a helpful constraint in product recognition and object segmentation. The markings can also serve to identify the velocity of the conveyor, and any variations. Relatedly, the markings can serve as spatial references that help with pose estimation. In some embodiments, the markings serve as focus or calibration targets for one or more of the imaging systems. Such spatial reference information is also helpful to establish correspondence between information derived by different identification technologies (e.g., watermark and barcode).

Among new features for the shopper, such conveyor markings can define a lane (FIG. 8) on which the shopper can place coupons. The system is alert to this lane, and examines any imagery found there as candidate coupon imagery. When detected, the system responds according to known prior art coupon-processing methods.

A user may place a smartphone in this lane, with the display facing up. A coupon-redemption app on the smartphone may cyclically present different screens corresponding to different coupons collected by the user (e.g., by scanning promotions in the store, or in a newspaper, or sent to the smartphone electronically—such as by Groupon, etc.). As each coupon is successfully read by the checkout system (e.g., sensed by a camera, or with the coupon information otherwise-conveyed), the checkout system signals such success to the smartphone. This signal can comprise a beep of a particular tone, or other audible acknowledgement. Alternatively, another type of signal can be used (e.g., optical, radio, etc.). When the smartphone receives this signal, it then presents a next coupon to the checkout system (e.g., on its display). This process continues until all coupons available on the smartphone that are relevant to the merchandise being checked-out have been presented and acknowledged.

The check-out system camera can discern that the phone is on the conveyor belt—and not simply held over it—because its velocity matches that of the belt. The smartphone may automatically start the presentation of coupons (e.g., it may activate the coupon redemption app) in response to input from its sensors, e.g., sensing motion along a horizontal plane using its accelerometers, or sensing certain strobed illumination characteristic of a checkout lane using its front-facing camera, etc.

Conversely, the user's smartphone on the moving belt can collect visual information projected onto the conveyor by the projector. This information can represent discount coupons, redeemable at a subsequent visit for merchandise related to that being purchased by the consumer. (Such information can likewise be conveyed to the smartphone by audio, radio, or other communication technology.)

The conveyor can serve as a projection screen, onto which imagery is projected by, e.g., an overhead projector. (Typically, the projector is obliquely angled towards the conveyor, with corrective optics to redress, e.g., keystoning.) As objects on the conveyor are recognized, the projector can present related information, such as item name and price, other suggested purchases, related recipes, digital coupons, etc. The projected imagery desirably follows the associated items as they travel along the conveyor.

The user can touch any of the indicia projected onto the conveyor. A camera senses the user's action (e.g., a camera adjacent the conveyor that captures imagery for item recognition, or a camera positioned with the projector). The system understands the camera-sensed action to indicate user interest in the touched indicia. Several responses may be triggered.

One simply is to freeze the projected indicia in place relative to the user (while the belt and items advance). This allows, e.g., the user to capture an image of the indicia with a personal device, e.g., a smartphone. (This allows the user later to explore the presented information, e.g., pursuing web links indicated by digital watermarks encoded in the projected indicia.)

Another system response is to present a video to the user. The video can be projected at a stationary location, such as on the conveyor (which may continue to advance under the projected video) or on a display screen (e.g., a screen on which the user's purchases are tallied).

Another response is to credit a coupon discount to the amount owed by the consumer. By presenting cash-back coupons to the consumer as items are being checked-out, the consumer can be incented to watch the conveyor (or other device where information is presented). Much of the projected information may be promotional in nature, and the viewer's attention can be maintained by periodically presenting a coupon.

The projected indicia can be text, a logo, machine-readable data (e.g., barcode or watermark), etc. It may comprise a video.

For advertisers, the conveyor belt can be printed with brand messages, or carry temporary stickers for different branding events. In some instances the belt is dynamically printed each cycle, and wiped clean during its under-counter return. Known "white board" and "dry erase" markings can be used.

Further Improvements

The sensor evidence considered in identifying items being purchased needn't be collected at the checkout station. Consider, for example, an implementation in which the shopper's track through the store is monitored, such as by an indoor location technology (e.g., using a unit carried by the shopper or the shopper's cart to sense or emit signals from which location is determined, e.g., sensing a different flicker or modulation of LED lighting in different aisles, or other form of location-related signaling), or by ceiling-, floor- or shelf-mounted cameras or other sensors, etc. If the shopper stops for 15 seconds in front of the Campbell's soup shelf, this data helps reinforce a hypothesis that the cylindrical shape revealed in FIG. 31 is a can of soup—even if no barcode or other identifying information can be discerned from imagery captured at checkout.

Sometimes confidence scores can be revised based on the lack of certain evidence. For example, if the shopper's path through the store did not go down the aisle containing the Pringles potato chips, this tends to increase a confidence score that the cylindrical object is a soup can. (As is evident, certain embodiments of this technology rely on a database or other data store with information about the layout of the store, indicating locations of the different products in the store's inventory.)

Thus, knowing locations in the store visited by the shopper, and more particularly—knowing where the shopper or the shopper's cart paused in the store, is useful information is deducing the identity of items in the cart. Still better is knowing those locations in the store where an item was placed into the cart. (The introduction of an item into the cart can be sensed in various ways, including a cart weight sensor, a camera, an array of break-beam photo sensors that senses a hand or other item passing through a plane into the volume of the cart, photosensors that detects shadowing by a new item (or by the user's hand/arm, etc.) as it is moved into the cart, etc.)

A related class of evidence comes from inventory sensors. Cameras, weight transducers, near field chip readers, or other sensors can be positioned to monitor the removal of stock from shelves. If a ceiling mounted camera, imaging the soup shelves, captures video or periodic imagery revealing that a can of Campbell's Condensed Chicken Noodle Soup leaves the shelf at around 10:30 a.m., this tends to increase the confidence score that a cylindrical shape sensed at a checkout station at 10:40 a.m. is a can of Campbell's Condensed Chicken Noodle Soup. (This datum would increase the confidence score less for a cylindrical shape sensed at a checkout station at 11:10 a.m., and perhaps not at all for a cylindrical shape sensed at a checkout station at 2:00 p.m. That is, the analytic weight given to the data varies in accordance with a time-related factor.)

Data from such an inventory sensor, indicating removal of a can of chicken soup at 10:30 a.m., in conjunction with data from a location sensor—indicating presence of the shopper at the soup shelves at 10:30, is even stronger evidence that the cylindrical shape in the shopper's pile is a can of chicken soup. In some instances, inventory-tracking cameras are positioned or otherwise designed to avoid capturing imagery or other information about shoppers in the aisle, to avoid certain privacy concerns. Imagery from such cameras may be presented on public displays in the aisles or elsewhere in the store, to put shoppers at ease.

The foregoing has just touched on a few of the multiple sensors that can provide product-identifying evidence. A more lengthy, but still incomplete, list of technologies that can aid in product identification (and in discriminating between candidate products) includes: forced air (e.g., sensing disruption of air blown through a pile, as indicative of its contents—including change in its temperature, which can indicate a concealed frozen item), vibration (e.g., sensing resulting product movement and/or inertia, which can be indicative of density, and sensing sound, which can also be distinctive), other acoustic sensing (e.g., passing item surface past a pointed stylus, or vice versa, and analyzing the sound produced), ultrasonic excitation and imaging, radiographic screening (e.g., ultrasonic or millimeter wave scanning, such as is done by TSA equipment at airport security stations), light-polarization sensing (e.g., to reduce certain reflections and to help assess surface texture), other optical texture sensing, motion sensing (e.g., accelerometers), UV/IR cameras, watermarks, RFID/NFC chip sensing, weight sensing, shopper demographic sensing (e.g., by camera, or by reference to loyalty card profile), thermal time constants (e.g., how quickly a warm area caused by manual handling decays in temperature, haptic sensing (e.g., rubber membrane that deforms as items are placed onto it), time of flight cameras, chemical and olfactory sensing, gaze tracking (e.g., sensing that shopper is looking at Campbell's condensed chicken noodle soup; tracking of a checkout clerk's gaze can be used to identify salient points in captured imagery—such as the locations of product barcodes; Google Glass goggles can be used in gaze tracking), sensing pose of hand as shopper or clerk grasps an item, inertial modeling (heavy items are moved along a different track than light things), shopper's purchasing history (shopper prefers Coke to Pepsi, buys milk weekly, bought a 24-pack of paper towels last week so is unlikely to buy paper towels for a while), statistical item correlations (when a shopper buys spaghetti noodles, the shopper often buys spaghetti sauce too), crowdsourced human identification by Amazon Turk service or the like (e.g., relaying imagery of an otherwise unidentified product to one or more human evaluators for assessment), etc., etc.

The technologies detailed herein can utilize data collected from sensors at a variety of locations, including from the product itself (e.g., packaging includes certain wirelessly-coupled sensors), from store shelves, from ceilings (looking down onto aisles or shelves), in shopping carts, carried or worn by shoppers, at point of sale stations, associated with checkout conveyors, carried/worn by clerks or shoppers, in bagging areas, etc.

Such collected information is used in a data fusion manner, to successively narrow a universe of possible product identifications. Probabilistic modeling can often be employed (e.g., using Bayesian classifier, boosted tree, or random forest approaches).

Thus an exemplary supermarket system uses a multi-feature product identification procedure—the components of which contribute different evidence to a decision module that tests different product identification Bayesian hypotheses until one emerges as the winner.

One component of the supermarket's system may provide volumetric product configuration (shape) information. Another component may provide color histogram data generated from RGB imagery depicting the products. Another may provide barcode data (which may be incomplete or ambiguous). Another may contribute digital watermark data. Another may provide NFC/RFID information. Another may provide image fingerprint data. Another may contribute recognized text (OCR) data. Another may contribute weight information (e.g., from a conveyor weigh scale). Another may contribute item temperature information (e.g., discerned from infrared camera imagery or air temperature). Another may provide information about relative placement of different items (a consumer is more likely to put a 12-pack of soda on top of a bag of dog food than on top of a bag of potato chips). Others may contribute information gathered in the shopping aisles. Etc. Not all such information may be present for all items, depending on item characteristics, the manner in which the items are arrayed on a conveyor, availability of sensors, etc.

Outputs from plural such components are provided to a decision module that determines which product identification is most probably correct, giving the ensemble of input information. (FIG. 6.)

By such an arrangement, collected evidence is used to refine the confidence scores of the different objects seen, or deduced to be, presented for checkout, until all are identified within a given certainty (e.g., in excess of 99.99%). After all evidence is considered, any object(s) not identified with such accuracy is indicated for manual examination by a clerk, or is mechanically diverted from the pile for further evidence collection (e.g., by imaging, weighing, etc.)

In some embodiments, a projector can project information onto the pile of items to convey information. For example, the projector can project price information onto (or near) items as they are identified, to assure the customer that the price charged is as expected. Additionally, or alternatively, the projector can illuminate products in green (or some other distinctive fashion) after they have been successfully identified. Red can indicate products (or areas in the pile) about which the system is uncertain. A checkout clerk can thus examine the pile and remove anything illuminated in red for additional imaging (or other sensing), or simply scatter the pile to expose additional product faces for imaging, until the system has recognized all the items and the pile is uniformly illuminated in green.

Some arrangements have no checkout counter; items are moved (e.g., by the shopper) directly from a shopping cart (basket) to a bag. A system according to the present technology can monitor the space between the cart and the bag, and can sense one or more types of data from objects as they pass, to effect identification (sometimes in conjunction with previously-acquired information).

Shopping bags, and/or the bagging area, may also be enhanced to aid identification. For example, bags may be provided with features to aid in item recognition/identification—such as markers to assist in determining object pose.

Moreover, bags or the bagging area may also be equipped with sensors to aid identification. For example, a bag may be suspended from hooks allowing the weight of the bag to be sensed. A bag may also be positioned (e.g., hung or sat) in an instrumented area, with one or more sensors for collecting object identification data. The bags may be made of a material that is functionally transparent to the sensing technology (e.g., millimeter wave scanning, or UV/IR illumination), so that data can be sensed from the bag's contents from one or more external sensors. Alternatively, sensors may be placed inside the bag. In one particular arrangement, sensors are removably placed inside the bag. For example, a frame structure, comprising four vertically-oriented planar members coupled at their vertical edges, and defining a regular hexahedral volume—just smaller than that of the bag itself, is lowered into an empty bag (e.g., a fabric bag brought by the shopper). One or more panels of this frame is instrumented with one or more sensors. Items are then placed into the bag, by placing them within the frame structure. The sensor(s) acquires data from the items as they are placed—or as they rest—within the structure. After data has been collected by the sensors, the frame instrumented structure is lifted and removed from the bag—ready for re-use in another bag. With the declining cost of sensors, a bag brought by the shopper may itself be permanently equipped with sensors, which are polled at the bagging station for sensed data by the store computer system.

The order in which a human places items in a bag can also be used as evidence of item-identification. For example, the system may identify (e.g., by barcoding) a package of hamburger buns that is placed into the bottom of a bag. If a large shape is next placed into the same bag, the system can deduce that this next object is not a heavy object—such as a six-pack of soft drinks. More likely is that the large object is a light weight item—such as a pack of paper towels.

If a shopper's items are identified before being bagged, the system can suggest to the shopper—or a clerk—a rational bag-packing strategy. A procedure based on stored rule data can be followed. For example, the system can first determine the aggregate weight and volume of the shopper's items, and apply the stored rules to determine a number of bags required to hold such a weight/volume of items. Similarly, given N bags (e.g., three), the rules can indicate which items should be placed in the bottom of each bag (e.g., the heaviest or most crush-resistant/crush-tolerant items). Likewise, the rules can determine which items should be placed in the top of each bag (light items and the most crush-sensitive items). As a consequence of these determinations, the system can indicate which items should be placed in the middle of each bag. Other rules may lead to frozen and refrigerated items being placed together, and remote from items that may be frost damaged (and remote from deli items that may be warm). Etc. The suggestions may take the form of voiced instructions. Alternatively, projected light of different colors can illuminate different items, signaling that they should next be placed in bags that are similarly identified by color. In essence, such arrangement is a bagging expert system.)

A weight sensor in a cart may be used not just to weigh an item as it is placed into the cart (i.e., by sensing the before-after difference in weight); it can likewise be used to weigh an item as it is removed from the cart (again by reference to the weight difference).

Some implementations of the technology are self-learning. For example, the detailed system can statistically track data that—in the aggregate, begins to reveal clues for product identification. A data driven model for product identification thus evolves through exposure to additional data. The system may discern, for example, that a shopper who passes through the frozen foods aisle at the beginning of a fifteen minute shopping visit, is less likely to have a frozen food item presented for checkout than a shopper who passes through the frozen foods aisle at the end of such a shopping visit. Such probabilistic models can be constructed by humans, but are more readily—and accurately—developed by analysis of historical shopping data.

Information collected by distributed sensors (e.g., in carts, shelves, and/or ceilings, etc.) can be used, in conjunction with shopping list data received from consumers, to aid in traffic management through the store. If the system finds a "milk" entry is found on the lists of five shoppers, it can suggest routes through the store for the different shoppers that allow them to pick up other items on their respective lists, and arrive at the milk cooler in time-staggered fashion—avoiding a bottleneck as one shopper carefully studies carton expiration dates while others wait.

The artisan will recognize that shoppers can be identified in various known ways, including loyalty cards, routine radio emissions from smartphones, smartphone apps that exchange data with a store computer, facial recognition and other camera-based techniques, etc.

Existing checkout systems commonly issue an audible signal (e.g., a beep) to confirm successful reading of a barcode. In accordance with another aspect of the present technology, the system issues different audible signals—depending on the manner of product identification. If a product is identified by barcode reading, one type of beep is issued (e.g., 250 milliseconds of 523 Hz signal). If the product is identified by digital watermark decoding, a second type of beep is issued (e.g., 400 milliseconds of 660 Hz signal). If the product is identified by fingerprint recognition, a third type of beep is issued (e.g., 500 milliseconds of 784 Hz signal).

Of course, these signals are exemplary only; any different signals can be used (including signals that are sequences of beeps—either all of the same frequency, or of different frequencies).

If item recognition is based on several different types of object data, still other signals can be used. Alternatively, a signal indicating the identification technology that served as a primary basis for identification can be issued.

Watermarks will gain deployment gradually in supermarkets. As with barcodes, some time will pass before all items are watermark-encoded. The different audible feedback signals noted above will help train the checkout staff about which types of product identification are typically successful with which types of products. For example, if a cashier learns, by repeated exposure, that boxes of Kleenex tissues always issue a barcode "beep" and not a watermark "beep," then the cashier will learn to slow down with such items, and be sure that the barcode on Kleenex boxes is oriented towards the sensing device. On the other hand, if the cashier learns that General Mills cereal boxes are reliably read by watermark recognition, then these items may be passed more quickly through checkout, since the cashier has confidence that they will be read regardless of orientation.

While certain embodiments discern the geometrical pose of component patches on items being checked-out, and then process the imagery depicting such patches so as to yield processed imagery showing the patches as if presented squarely to the camera, in other embodiments, this latter action is not necessary. Instead, the discerned pose information can be provided to the system module that derives product identification information. Such module can then work with the original imagery, expecting its geometrically distorted state, and discerning the identification information taking such distortion into account.

In some of the detailed embodiments, the geometrical pose information for component surfaces on products/packaging is discerned from the camera imagery. In other implementations, the pose information can be determined otherwise. One such alternative is to use the Microsoft Kinect sensor device to sense the 3D environment. Tools extending the use of such device far beyond its original gaming application are now widely available. Microsoft, for example, distributes a software development kit ("Kinect for Windows SDK") that enables programmers to use the sensor's various capabilities in arbitrary applications. Open source drivers for the Kinect sensor are available from Adafruit Industries and PrimeSense, Ltd. In a further aspect of the present technology, such a sensor is used in assessing the pose of product surfaces at a supermarket checkout.

Unlike some other pose-assessment arrangements, the Kinect sensor does not rely on feature extraction or feature tracking. Instead, it employs a structured light scanner (a form of range camera) that works by sensing the apparent distortion of a known pattern projected into an unknown 3D environment by an infrared laser projector, and imaged by a monochrome CCD sensor. From the apparent distortion, the distance to each point in the sensor's field of view is discerned.

Microsoft researchers have demonstrated use of a movable Kinect sensor to generate a volumetric model of an unknown space (Azadi et al, KinectFusion: Real-Time Dynamic 3D Surface Reconstruction and Interaction, Article 23, SIGGRAPH 2011). The model relies on continually-tracking 6DOF information about the sensor (e.g., defining its X-, Y-, and Z-position, and its pitch/roll/yaw orientation, by auxiliary sensors), and uses this information—with the depth data output from the moving range sensor system—to generate a 3D model of the space. As the sensor is moved, different views of the scene and objects are revealed, and these are incorporated into the evolving 3D model.

In Kinect-related embodiments of the present technology, the sensor typically is not moved. Its 6DOF information is fixed. Instead, the items on the checkout conveyor move. Their motion is typically in a single dimension (along the axis of the conveyor), simplifying the volumetric modeling. As different surfaces become visible to the sensor (as the conveyor moves), the model is updated to incorporate the newly-visible surfaces. The speed of the conveyor can be determined by a physical sensor, and corresponding data can be provided to the modeling system.

In addition to providing pose information for component item surfaces, such arrangement provides an additional manner of product identification—by volumetric product configuration. As noted, some existing products have distinctive shapes, and packaging for others readily could be tailored to impart a distinctive product configuration. Even features as small as 1 mm in size can be discerned by such volumetric modeling, allowing logos and other distinctive markings to be presented on products/packaging in raised embossing, or depressed engraving, fashion. Volumetric data from an item can be used, at checkout, for product identification—matching against a catalog of reference volumetric product configuration data (in a manner akin to present use of image fingerprinting for product identification).

In an implementation that uses the Kinect sensor for pose determination and/or volumetric configuration sensing, the Kinect RGB camera can be used as the sensor for capturing imagery from which other product identification information is determined. In such embodiments a checkout conveyor can be marked with volumetrically-sensible features, such as raised grooves or other prominences, embossed logos, etc. Such features can be used in a manner akin to the conveyor markings described earlier.

Volumetric modeling can also be performed without a Kinect-like sensor. With two or more different views of an item, or of items on a checkout conveyor, a 3D model of the depicted item(s) can be produced.

In many implementations, volumetric modeling is not used independently for product identification. Instead, it is one aspect of the above-noted multi-feature identification procedure—the components of which contribute different evidence to a decision module that tests different product identification Bayesian hypotheses until one emerges as the winner.

As described above, outputs from plural such components are provided to a decision module that determines which product identification is most probably correct, giving the ensemble of input information. This module can rely on reference information about products in the store's inventory, stored in a database or other data structure. It can likewise rely on analysis rules, stored in similar fashion. These rules may cause the module to accord the different input information with different evidentiary weight, depending on circumstances and candidate item identifications.

For example, if a weight sensor indicates an item weighs 12 ounces, the rules can specify that this is highly probative that the item is not a 40 pound bag of dog food. However, the rules may indicate that such information is of little value in determining whether the item is a can of corn or beans (for which the stored rules may indicate color histogram data has a greater discriminative value). Similarly, if a cylindrical carton is sensed to have a temperature below freezing, this is strong collaborating evidence that the item may be a container of ice cream, and is negating evidence that the item is a container of oats.

In one illustrative implementation, the decision module performs a staged analysis. Tests that are fastest, and/or simplest, are performed early, and are used to rule-out large numbers of possible items from the store's catalog of inventory. For example, if the weigh scale indicates a weight of one pound, all items having weights above three pounds may be disqualified immediately (e.g., six- and twelve-packs of soda, large containers of liquid detergent, 40 pound bags of dog food, etc.). Tests that are highly discriminative, e.g., having the potential to identify a single item out of the store's catalog (analysis of captured data for digital watermark and barcode information is of this sort), may also be applied early in the staged process.

Generally speaking, a minority of the products in a supermarket comprise most of the sales volume. Coke is seen frequently on checkout counters; not so with smoked oysters and obscure ethnic condiments. Desirably, the checkout system is optimized for recognition of the products that constitute most of the volume. Thus, for example, the analysis rules in the embodiment of FIG. 6 may be selected, and ordered, to most quickly identify the most popular grocery items.

Such a system may be self-learning. A new product may be recognized, initially, by an express identifier, such as a watermark or a barcode. Through repeated exposure, the system collects information about image fingerprints, weights, color histograms, temperature, etc., that it associates with such product. Later, the system becomes able to recognize the item even without reference to the original identifier.

In some staged recognition systems, data from one stage of the analysis is used in determining an order of a later part of the analysis. For example, information captured in the first stage of analysis (e.g., color histogram data) may indicate that the item is probably a carton of Diet Coke product, but may leave uncertain whether it is a 6-pack or a 12-pack. This interim result can cause the analysis next to consider the item weight. If the item weighs between 9 and 10 pounds, it can be identified as highly likely to be a 12-pack carton of Diet Coke. If the item weighs half that amount, it can be identified as highly likely to be a 6-pack. (If it weighs less than 4.5 pounds, the initial identification hypothesis is strongly refuted.)

In contrast, if the initial histogram indicates the product is likely a carton of Reese's product, but leaves uncertain whether the carton contains ice cream bars or peanut butter cups, a temperature check may next be considered to most quickly reach a reliable item identification.

The rules data consulted by the decision modulation assign weighting values to different evidentiary parameters and different items. These values are used to determine an evolving probabilistic certainty that a tentative product identification is correct. When the decision module has considered enough evidence to make a product identification with a probabilistic certainty exceeding a threshold value (e.g., 99.99%), further analysis is skipped, the module outputs the product identification, and it can then consider a next item in the checkout. If all of the available evidence is considered, and the threshold certainty value is not met, this circumstance can be flagged to a human operator (e.g., providing an image of the item and/or other associated item information) for follow-up.

In a related implementation, a voting arrangement is used, with different identification technologies each casting virtual votes for different item identifications. The votes of some identification technologies may be more heavily weighted than others, reflecting their greater granularity of identification, or reliability of identification. The item identification with the most votes wins.

In some embodiments, an item that is not reliably identified—after consideration of all the available evidence, is physically diverted so that the flow of subsequent items through the checkout procedure is not stopped while the troublesome item is manually examined Such diversion can be by an arrangement such as compressed air, a diverting arm, or a trap door.

It will be recognized that smartphone apps (and the successors to smartphones and their apps) can be adapted to cooperate with and supplement (e.g., in terms of sensor data collection and data processing) the detailed systems. For example, a shopper may maintain a shopping list on the smartphone, which list data is shared with the store computer (perhaps in advance of the shopper's visit) to aid in the shopping experience. (An entry of an item on a shopper's electronic list is still additional evidence that can be used in identifying items presented for checkout. Indeed, the list can comprise a suitable set of initial identification hypotheses about items in that shopper's checkout pile.)

Relatedly, data can be captured at home and used in connection with shopping. For example, Tupperware and other re-usable food containers can be equipped with sensors, e.g., that provide data about the weight, chemical/smell, and appearance of their contents. A camera/illuminator in a lid of such a container can apply object recognition techniques to visually distinguish different products (e.g., popcorn, sugar, nuts, flour, etc.). Existing containers may be retro-fit with sensor-equipped lids. Such devices can be self-powered (e.g., by battery), or energized based on parasitic excitation from another source. Such devices wirelessly communicate with other such devices, or with a computer, via a mesh or other network. A cookie container may have its own social networking presence (e.g., a Facebook or Twitter account)—informing humans or other data consumers about its fill level, when last refreshed, when last opened (and by whom), etc. When the inventory of such a monitored food product falls below a threshold (which may be determined by the historical inventory level at which the container has been re-filled in the past), that food item can be added to the user's shopping list.

Similarly, in a social network vein, when a consumer adds a food item to a shopping list, or when such item is added to the consumer's shopping cart, this information may be published by social network channels (e.g., Facebook or Twitter). This information may be made available (with the consumer's permission) to companies that want to market to the consumer. To illustrate, if Tony puts a can of Campbell's soup on his list or in his cart, this information—or the opportunity to respond to it—may be offered to Campbell's and its competitors (e.g., General Mills' Progresso soups). For example, in an automated auction, these different companies may bid increasing amounts of cash (or other consideration) to determine which—if any—gets to interact with Tony, or gets access to certain of Tony's demographic profile data for marketing or research purposes. (The consideration may be split between Tony and the store.) The interaction may come via a display screen in the cart or at the checkout station, via a portable device carried by Tony, via imagery projected on the conveyor at checkout, etc. Such object-related encounters can also be added to a stored repository of Tony's grocery profile data—serving as context information useful, e.g., in tailoring the search results (or order of search results) presented when Tony thereafter uses the Google search service or engages in other activities. If Tony does a Google search for a recipe (e.g., to make use of a surplus of tomatoes harvested from his garden), he might get different search results than Alice, who enters the same search terms—but whose grocery profile data is different.

These concepts needn't be applied only when Tony places an item on a list or in a cart. The same concepts can likewise be applied when Tony looks at a product in a supermarket. Eye tracking systems—coupled with a store's layout data—allow a shopper's gaze to be accurately discerned, e.g., to identify that Tony is looking at a shelf location where Campbell's Cream of Mushroom soups are stocked. The dwell time of the gaze can be noted as well. This information can be logged, published, and/or made available to others, as detailed above, and corresponding actions can be taken.

Some stores may choose to implement a Trusted Shopper checkout option—available to shoppers who meet certain qualification standards. These standards can include, e.g., purchases averaging more than $300/month, a loyalty-card shopping history with the store that dates back at least two years, an address within two miles of the store, etc. Other indicia of trustworthiness can be gathered from public and private databases, e.g., including credit scores, employment history, background checks, etc. The Trusted Shopper option is designed to enable such shoppers to more quickly check out, due to a heightened level of trust. For example, in a self-service checkout station, some of the alarms that occasionally bedevil regular shoppers ("Place item in the bagging area!") can be disabled for Trusted Shoppers. Similarly, instead of requiring goods to be machine-identified, the shopper can self-identify the items (e.g., by tapping a displayed entry from a list of items commonly purchased by that shopper, or by submitting a shopping list to indicate items being purchased). Qualified shoppers can be authenticated by facial recognition, card swipe and PIN number (e.g., loyalty card or credit/debit card), etc.

Still Further Improvements

Electronic shelf labeling is increasingly common in retail stores. Such labeling employs LCD or other display units, attached to the fronts of shelves, to present prices and product information for items offered for sale on the shelves. The displayed information is typically controlled by wireless transmission from a store computer. Such units may be powered by a battery, by a photoelectric cell, or otherwise.

One vendor of such equipment is the Swedish company Pricer AB. Its technology is detailed, e.g., in U.S. Pat. Nos. 7,005,962, 7,213,751, 7,461,782, 20040012485 and 20060100967. In accordance with a further aspect of the present technology, an enhanced type of shelf-mounted display unit is provided. Such a unit is additionally equipped with a rear-facing sensor that senses identifying information from an item presented for sale on the store shelf.

In a particular embodiment, the sensor comprises a 2D image sensor. Imagery captured by the sensor is processed (within the shelf-mounted unit, or at a remote computer processor) to decode machine readable data from a retail item stocked on the shelf. For example, a digital watermark payload on the item can be sensed and decoded.

The unit may also include an illumination source (e.g., a visible, IR, or UV LED) which is activated during a period of image capture (e.g., a thirtieth of a second, every 5 minutes) to assure adequate illumination.

By reference to the sensed identifier, a remote computer identifies the item, and sends the appropriate price and product information for presentation on the display screen.

The sensor may sense data from several different adjoining products. For example, the sensor camera's field of view may encompass two or more different types of Campbell's soups. A different digital watermark payload is decoded from each. In this case, the unit can be configured to cyclically present price/product information for each product so-sensed. Alternatively, the image processing software may be arranged to identify only a single product, e.g., by a block of watermark data that is sensed closest to the center of the captured image frame.

(As in the other embodiments, barcode, RFID, and other sensing/identifying technologies can alternatively be employed.)

Certain of the foregoing features are illustrated in FIGS. 44A-44D.

Figure 44B:
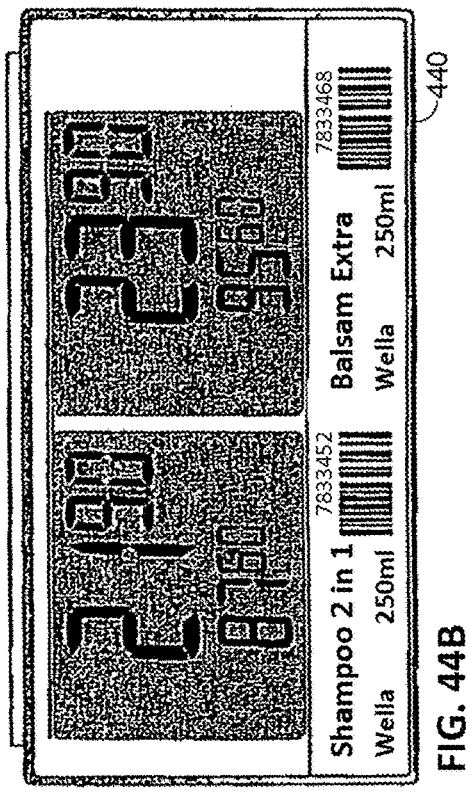
FIGS. 44A, 44B, 44C and 44D shows aspects of the technology relating to electronic price label display units.
Figure 44A:
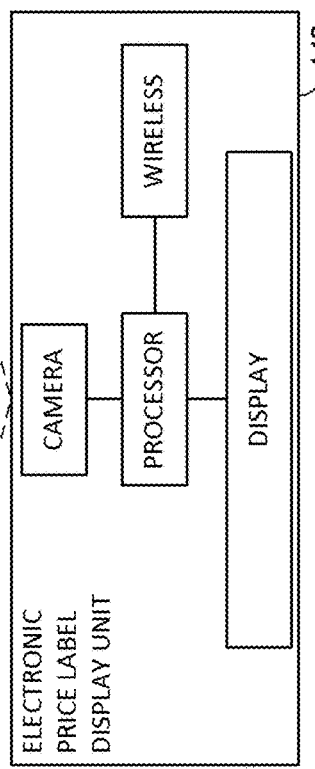
Figure 44D:
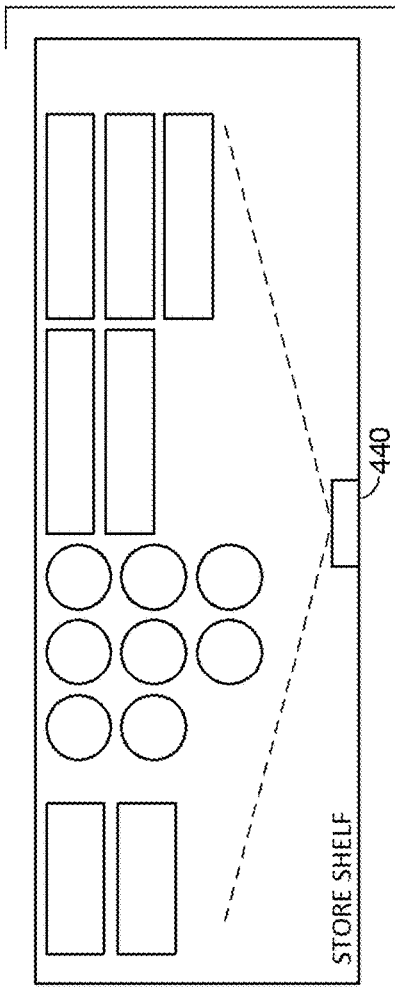
Figure 44C:

FIG. 44A is a block diagram showing certain elements of an illustrative electronic price label display unit 440, including a rear-facing camera sensor, and an aisle-facing electronic display. FIG. 44B depicts the front face of unit 440, showing the aisle-facing electronic display. FIG. 44C shows a collection of retail items facing an aisle on a grocery store shelf, as might be seen by the camera of unit 440. Each of these items is encoded with a machine-readable indicia printed thereon. (Such encoding is not evident in the figure because the encoding is steganographic; a digital watermark.) FIG. 44D is a plan view looking down on a store shelf and aisle, showing an electronic price label display unit 440 attached to the front of a shelf, with its rear-facing sensor sensing information from retail items stocked on the shelf.

In a variant arrangement, price/product information is projected from a data projector, onto the product or onto the shelf. Such display can be instead of, or in addition to, a display screen of the shelf-mounted unit.

Such arrangements permit store personnel to move inventory about the shelves as-needed, and the electronic shelf labeling adapts automatically—displaying the price of the proximate item.

A related embodiment employs shelf-mounted units with aisle-facing cameras. Each such unit captures imagery of shelving on the opposite side of the aisle. From such imagery, the contents of those shelves can be determined (e.g., by watermark decoding, product fingerprints, or otherwise). Such cameras may be used both to aid identification of products presented for checkout (e.g., a can of soup disappeared from a shelf between images taken a minute apart; such a product will likely be soon presented for checkout). The camera imagery can also serve to aid with automated inventorying. For example, each night the imagery can be analyzed to identify depleted stock. If the Campbell's Tomato Soup shelf is looking bare—with only two identifiable cans on the shelf, then the stocking staff can make sure to provide more stock. (Such stocking can be triaged. The most popular, or highest margin, products can be restocked before slower-moving, lower margin items are dealt with.)

A variant implementation does not use fixed cameras. Instead, one or more movable cameras (which may be panoramic or hemispherical, or dodecahedral) are transported by a conveyance and capture imagery as they move—akin to Google Street View. In a particular implementation, the camera is moved down the aisles—when the store is closed—by a robotic vehicle following a prescribed path on the floor, or even by a store clerk on a skateboard.

(Technology used in Google Street View is detailed, e.g., in US patent documents U.S. Pat. No. 7,843,451 and 20110242271. Related technology is detailed in U.S. Pat. Nos. 5,703,604 and 6,141,034 to Immersive Media Corp.)

Data collected by any of the foregoing arrangements can be compiled and presented in map form, and made available to store customers, e.g., via an online service from outside the store. Such a service can receive consumer queries asking whether the store has a particular item in stock. Such questions can be answered by reference to store inventory information determined from the collected imagery. A customer can also be provided with a floor map and shelf photo detailing where, in the store, a requested item is located.

A related aspect of the technology concerns projecting onto (or near) different retail packages, different indicia (e.g., red, yellow, or green colors) to indicate product expiration information. Again, the products can be sensed and identified by watermarks or barcodes—preferably encoded with information by which expiration information can be determined. Some industry-standard product identification codes, such as GS1 DataBar-Expanded barcodes and the GS1 PTI standard, have payload fields expressly for the purpose of encoding expiration date (or for expressing a product's lot code, which can be used to look up a corresponding expiration date in a database). Such codes can be conveyed as watermark payloads. Alternatively, expiration date information can be encoded in a watermark, which is supplemental to other product-identifying technology (e.g., barcode or fingerprint).

A particular implementation comprises a fixed camera positioned to view into a dairy case of a grocery store, and an associated projector that projects a "heat map"-like pattern of colored areas onto the displayed products, indicating which items are relatively fresher, and which are relatively older. A store can apply a differential pricing policy, e.g., applying a 50% discount for products that are purchased on their expiration dates, a 30% discount for products that are purchased the day prior, a 20% discount products that are purchased two or three days before their expiration date, etc. The consumer can select from the differently-illuminated products in the dairy case, based on pricing considerations and date of expected use.

(The item's production date, packaging date, "best before" date, etc., can alternatively be the basis for projection of different indicia.)

In variant arrangements, the colors simply indicate different product pricing (e.g., green indicates $1.89; blue indicates $1.49, etc.). These prices can reflect expiration-based discounts.

Instead of projecting colored indicia, the projector can project alphanumeric information onto the respective products, e.g., indicating expiration date, price, or other information.

(The projection of indicia in registered alignment onto products is a straightforward application of known augmented reality techniques, in which graphical indicia are overlaid in registered alignment with features of imagery captured by a camera from a real world scene and presented on a display screen. In the present case, however, the indicia are not overlaid on a screen displaying imagery of a real world scene, captured by a camera. Instead, the indicia are projected onto the real world scene itself, from which the camera captures imagery. Although there is typically not an identity mapping between pixels in the projector LCD and corresponding pixels in the camera data, the appropriate mapping for any projector/camera pair can readily be determined.)

A related arrangement does not use a fixed camera in the store, but rather employs a camera-equipped device conveyed by the shopper (e.g., a smartphone or head mounted display device). Again, imagery is captured depicting one or more product packages on a store shelf. The imagery is processed to decode machine readable indicia (e.g., digital watermark data) encoded on the packaging. The decoded information may literally express expiration date information. Alternatively, it may comprise an index code that is resolved—by reference to a table or other data structure, either within the portable device or remote from it—to obtain corresponding expiration date information.

In such arrangements, the portable device may project information onto the product(s)—as in the fixed store camera case. More typically, the portable device presents the user with an augmented reality display, in which expiration indicia for different packages is displayed as a graphical overlay on the captured imagery. (Again, a colored heat map can be employed, whereby the shopper can quickly identify newest and oldest inventory among the imaged packages.)

Another aspect of the technology involves determining demographic information about a person near a particular shelf product display (e.g., age, gender, ethnicity, historical shopping history, etc.). Based on this demographic information, the system presents an animated display promoting a product.

The person's demographic classification can be determined in various ways. One is by a shopper loyalty card that identifies the person, and provides some associated demographic information. A related technique senses radio emissions from a portable device carried by the person (e.g., Bluetooth or cell signals). From such signals, the person's identity may be determined. Still another technique relies on image-based facial analysis, through which age, gender, mood and ethnicity may be estimated. A variety of "smart sign" systems operate in this way. Such systems are available, e.g., from Intel (the Intel Audience Impression Metric Suite) and the French company Quividi (the VidiCube). Additional information is provided in PCT patent publication WO 2007/120686.

The animation can be presented as an augmented reality overlay on the display of the person's portable device. For example, imagine that in 2020 a boy is walking down the cereal aisle of a grocery with his father, and both are wearing head-mounted display devices. The boy's display may present an animated sword fight between Captain Crunch and his nemesis, appearing on the floor or on the shelf near the Captain Crunch cereal. The dad, in contrast, may see an excerpt of a fitness video appearing near the Shredded Wheat cereal. Competing with that, next to the adjoining Life cereal, the father may see an animation promoting Life, and offering 20% off a box of Captain Crunch if the two are purchased together. (The system that identified the boy's demographics also notes that his gaze is cast in the direction of the Captain Crunch cereal, prompting such cross-promotion. Both cereals are products of the Quaker Oats Company.)

Audio may also accompany such animated presentations (and be delivered, e.g., to the shopper's Bluetooth ear bud).

Without some limit, there could be a countless number of "Buy me! Buy me!" messages, everywhere shoppers look. To quell the distraction, the user's portable device preferably allows only a few such products/brands to present promotional messages. In one such arrangement, the user device sends data indicating it will receive ten promotional messages during this visit to the store, and will grant those ten rights to the ten companies that bid the most for the shopper's attention. An automated auction is conducted each time a shopper enters a store. The more demographic information the shopper reveals to the potential bidders, the more accurately the shopper can be targeted, and the higher the bids are likely to be. The ten highest bidders provide the bid-for consideration to the user (e.g., depositing funds in a user account), and presentations from those parties are then presented to the user in the store.

(Such automated auctions are known from Google AdWords, and from applicant's published application 20110143811. Additional information about limiting the number of augmented reality overlays presented on a scene is detailed in applicant's published application 20110161076.)

Another aspect of the technology helps draw a shopper's attention to certain products, e.g., which may be on their shopping list.

Such list information is provided by the shopper to the store computer system. When the shopper is sensed in an aisle where an item on the list is stocked, the shopper's attention is drawn to the item location by illumination on or near such product. The illumination can be from a shelf-mounted device (e.g., an LED), or can be projected from a data projector (e.g., mounted on the ceiling, or an opposite shelf).

The location of the desired product on a shelf can be determined by reference to sensor data, as described elsewhere (e.g., fixed store cameras, such as on the ceiling, or on opposite shelves, or on the back of electronic label units; portable cameras—such as conveyed by shoppers, robots, or skateboarding clerks; RFID, etc.).

Relatedly, the shopper's attention can be drawn to items that are "on special." The shopper's mobile device can present a store map that highlights locations in the store where items are reduced in price—identifying both where the items are, and where the shopper is. A similar display can be presented on a stationary display panel in the store, or in an image presented from a stationary store projector.

Such a display/projector can also be operated to identify locations, in the store, where items found on the shopper's shopping list can be found. (The shopping list may be transferred from the shopper to the store computer in certain implementations.)

Still another aspect of the technology concerns assessing advertising efficacy (e.g., newspaper advertising).

Advertising (outside of the store, not inside) is placed, promoting a premium that is available to purchasers of a required group of items. For example, a $5 discount may be awarded if a Heinz product (e.g., ketchup), a box of cereal from the Quaker Oats Company (e.g., Life), and a Chicken of the Sea product (e.g., tuna), are all purchased together.

Inside the store (e.g., at checkout), the store computer analyzes collections of goods purchased by shoppers—looking for the specified combination. If the required combination is sensed, the premium is awarded to the shopper.

Since the prize is not promoted inside the store, and the specified collection of products would not regularly be purchased together (although they might—by chance), their presentation together at checkout is some evidence that the advertising was effective in driving customer behavior. The store may assess the relative effectiveness of different advertising media by publicizing different promotions in each, and noting the respective effectiveness of each.

A further aspect of the present technology concerns use of heads up-like displays at checkout stations. As is familiar, a heads-up display involves the projection of information onto a transparent surface, so a viewer sees both the projected information, and the scene beyond the surface.

In the present situation, such a surface is placed between the shopper and a checkout conveyor. A data projector presents information on the surface, for viewing by the shopper. This information can include, e.g., price information, discount information, expiration information, calorie information, whether the item has been identified yet (e.g., a green overlay if identified, red if not), etc.

Desirably, such information is presented on the surface at a position so that the shopper views the information in registered alignment with the items to which it corresponds. This requires knowledge about the position of the shopper's eyes/face, so that the projected image can be presented where it appears to overlay (or be presented adjacent to) the actual item as seen through the surface. A fixed camera at the checkout station, pointed across the checkout conveyor to the area where the shopper stands, provides imagery that is analyzed to determine the position of the shopper's eyes. (The position of the camera in a reference frame is known, allowing pixel positions from its captured imagery to be correlated with real-world position.) With this information, the position at which certain information should be projected on the transparent surface—to align with a certain item as viewed by the shopper—can be geometrically computed.

The fixed camera may only collect 2D information, and may not be able to discern the shopper's position in a third dimension (i.e., towards or away from the camera). But this is generally not critical to placement of the projected information. If more accuracy is desired, one of the known depth-sensing camera arrangements can be employed.

A similar heads-up display arrangement can alternatively, or additionally, be provided for the checkout clerk (if any). However, since the clerk may need to manipulate certain items as part of the checkout, the presence of the transparent surface between the clerk and the items may be an obstacle. Better, for the clerk, is to wear a head-mounted display (HMD) that overlays the information on the image presented by the HMD, in augmented-reality fashion.

The HMD approach lacks the known camera position of the fixed camera arrangement. However, the camera is close enough to the wearer's eyes that parallax can be disregarded. This allows a one-to-one mapping between the camera and the display to be employed. For example, if an item appears in the center of the camera field of view, the overlaid information for that item is similarly presented in the center of the display.

(Widespread HMD use by clerks is expected to occur before widespread HMD use by the general public. However, when shoppers do routinely have HMD apparatuses, their HMDs can be used in lieu of the transparent medium approach.)

In both the transparent medium and HMD cases, still further accuracy in overlaying item information adjacent the corresponding item can be gained by identifying locations of known reference points in the camera field of view. SIFT/SURF/ORB-like approaches can be used for this, by matching feature points in a field of view to corresponding feature points in a reference set of imagery. The feature points may comprise static features that are commonly in the camera's field of view, e.g., corner points on the conveyor, other structural elements of the checkout station, credit card terminal, candy rack, adjoining checkout station, etc. Additionally or alternatively, reference markers (e.g., as detailed in patent publication 20110087497), placed at known positions, can be used. Such markers include calibrated features permitting their distance and pose (and reciprocally, the distance and pose of the camera) to be determined.

In the just-described embodiments, camera data is also used to identify the positions of items presented for checkout. This data can be captured by one of the cameras noted above (e.g., a fixed camera looking towards the shopper, to determine eye positions, or a HMD camera). Alternatively, a different camera can be employed (again, having a position that is known, or discernible by reference to known features). In the latter case, the field of view of the two cameras can be geometrically related by an appropriate transform.

Imagery from the above-noted cameras can also be used, by itself, or in conjunction with other sensor data, to identify the objects presented for checkout.

In accordance with another aspect of the technology, a checkout station is equipped with a horizontal display panel (e.g., LCD, plasma, etc.). The panel is desirably positioned where items being purchased by a shopper are placed on it, or moved over it, during checkout.

The panel is controlled by an associated processor/display driver to present item information relating to items above it. For example, if a can of soup is placed on the panel, the panel may present the price of the soup so that it is positioned next to the item (e.g., between the can and the shopper, in a font that is sized for easy viewing). Similarly, if the soup can is passed over the display, the price can be presented in animated fashion—following underneath the can as it moves. When the can passes off the panel, the price can be maintained at its final position, until a price for another item needs to take that position.

Instead of, or in addition, to price, the display panel may present other alphanumeric information, such as discount, expiration date, etc. It may also indicate whether the item has yet been recognized by the system. For example, if the item has not yet been identified, a red region can be presented on the display where the alphanumeric item information would otherwise be presented. Once the item has been identified, a green region can be presented (or the fact of item identification can simply be indicated by presentation of the alphanumeric information).

Figure 37:
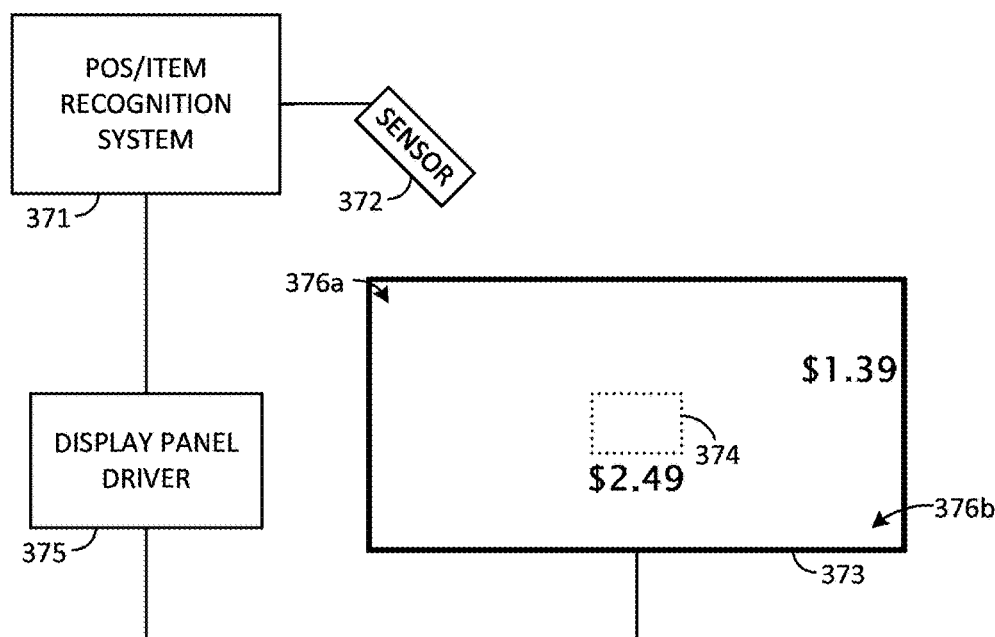

Such an arrangement is shown in FIG. 37. A point of sale system 371 includes an item recognition portion coupled to a sensor 372 (e.g., one or more cameras, etc.). A display panel 373 has an item 374 resting on it, which is recognized and determined by the POS station to have a price of $2.49 (e.g., by reference to a database system). The sensed position of the item, together with its determined price, is passed to a display panel driver 375, which causes this text to be presented on the display panel, adjacent the item. (Shown on the right edge of the panel is a $1.39 price left by another item that was recently removed off that edge, e.g., for bagging.)

In some embodiments, the display panel 373 can comprise a touch panel that both displays information and receives human input associated with item checkout. For example, the keypad presently found on the POS station may instead, or also, be presented on the touchpad panel, for operation by the clerk during the checkout process. A keypad may similarly be presented on the panel for operation by the shopper, e.g., to enter a bankcard PIN number, a shopper loyalty number, or other data entry. Such data-entry displays may be positioned in the corners 376a, 376b of the touch panel.

Providing a horizontal display panel at a checkout station requires a substantial reworking of existing checkout station hardware. In accordance with another aspect of the technology, a more modest arrangement is employed—one that is well suited to retrofitting of existing checkout stations.

In accordance with this aspect of the technology, a camera system captures imagery from items at a checkout station, as in other embodiments. However, instead of presenting visual feedback on a horizontal display panel underneath the items, this arrangement employs an array of elongated visual indicators (e.g., LCD displays, or LEDs) along an edge of the checkout station—such as along a checkout conveyor. The visual indicators are operated by a processor (responsive to input data from the camera system) to identify items that have not been identified. For example, red LEDs can illuminate adjacent items that the system has not yet identified. In a conveyor embodiment, the red indication can "follow" the item down the conveyor, until the system has identified it—at which time it changes to green. If the item reaches the checkout clerk and the adjoining LED is still red, the checkout clerk can reposition the item on the conveyor to aid in identification, or take other responsive action.

Figure 38A:
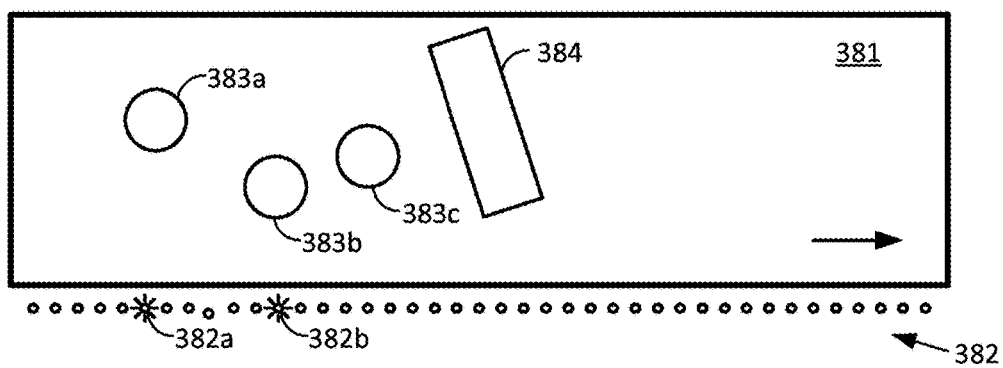

FIG. 38A is a partial plan view of such an arrangement. Three cans (383a, 383b, 383c) and a box (384) are traveling on a conveyor 381 towards the right. An array 382 of LEDs lines one side of the conveyor. LEDs 382a and 382b are illuminated in red—indicating that the adjoining two items (cans 383a and 383b) have not yet been identified. As the conveyor moves the cans, the red indicia follows them (until they are recognized, at which time such LEDs turn green).

Figure 38B:
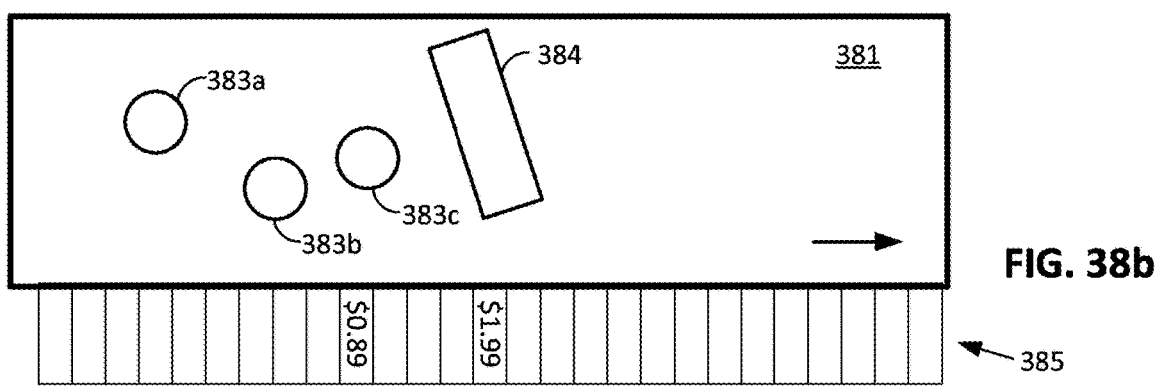

An alternative such embodiment presents price data adjacent the items as they travel down a conveyor, e.g., using an LCD display 385. FIG. 38B shows such an arrangement (not to scale). Items that haven't yet been recognized have no adjoining price display.

In accordance with yet another aspect of the present technology, a sensor system is employed at an exit area of a retail store (i.e., an area between the checkout station(s) and the exit door) to identify items of merchandise by reference to data sensed by the system. For example, the system may detect—by an RFID sensor, that a box of Tide laundry detergent is in the exit area, and may detect—by image fingerprinting or digital watermark decoding—that a package of disposable diapers is also in the exit area. Such data is checked against the store's database record of recent checkout transactions (e.g., in the past 2 or 5 minutes) to confirm that the identified item was the subject of a recent checkout transaction at a store checkout station.

Another aspect of the present technology concerns a collaborative checkout method, in which the shopper and the clerk both simultaneously present items for identification (e.g., to one or more scanners).

In a particular arrangement, items from the shopper's cart are partitioned into two flows. One comprises "easy" items that are reliably machine-identified without extra effort. These items include items in watermarked packaging, since such items commonly have watermarks on multiple different faces (e.g., canned and boxed items). This flow is handled by the shopper. The other comprises more difficult items, e.g., in which produce must be identified and weighed, or items that are lacking watermarking, etc. This flow is handled by the clerk. (The clerk may also assist with the first item flow.)

The partitioning may simply comprise the clerk reaching into the shopper's basket for items known to be more difficult to machine-identify—allowing the shopper to handle the other items. Alternatively, material handling technology can be employed, e.g., with cans and boxes being identified by shape and mechanically routed to the shopper, with all other items being routed for handling by the clerk.

As just suggested above, produce handling can be a bottleneck in grocery checkout. The clerk must visually identify the item, and then look up the current price—commonly in a guidebook or other unabridged listing. (Weighing is sometimes required as well.) Some produce may be easily identified, but other requires much more scrutiny. For example, a store may stock multiple types of similar-looking apples (some organic, some not).

To help relieve this bottleneck, one or more sensors are used to collect data from the produce. Sometimes the clerk may open a bag to present the produce to, e.g., an overhead camera. Sometimes the produce may be contained in a bag that is transparent at a particular sensing wavelength. In other arrangements, olfactory/chemical sensors are used.

From the sensor data, a class of the produce is recognized (e.g., by object recognition based on imagery, or chemical signature). The system may recognize, for example, that the bag contains apples. Based on the class, the system presents a listing of only the items in that class. For example, a POS display may present on a touch screen a display with just 5 tiles—one labeled with each apple type presently stocked by the store (MacIntosh, Red Delicious, Yellow Delicious, Fuji, and Braeburn), and associated price. The clerk touches the tile corresponding to the correct item, without having to browse a listing that includes bananas, oranges, etc. If the produce manager sells out of a particular type of apple, the POS system is alerted to this fact, and the tile for that type of apple is not thereafter presented to the clerk (until the item is restocked).

Such arrangement can similarly be employed for self-checkout, by the shopper.

Industrial fruit inspection techniques can also be used. For example, multi-spectral imaging can be used, in which the fruit is illuminated with one or more known light sources, and reflection from the fruit is sensed at multiple different wavelengths (e.g., 450, 500, 625, 750 and 800 nm.). It will be recognized that some of these are outside the range of human vision (e.g., 750 and 800 nm.). LED light sources of different wavelengths can be used, operated in sequential fashion, or simultaneously. Some embodiments employ the infrared illumination provided by certain depth sensing cameras, to provide illumination.

Terahertz radiation and sensing can also be employed (e.g., in the 0.3-3 THz frequency range).

Classification techniques can additionally or alternatively be employed, wherein the store system is trained to recognize fruits of different types, by reference to training data (optical or otherwise) collected from known samples.

In one such arrangement, when a batch of produce arrives at a store, it is processed to identify a distinguishing multi-spectral optical or chemical signature—before produce from the batch is made available to customers. Such signature data is entered into the store's computer system—in association with data identifying the produce (e.g., by name, price, arrival date, supplier, etc.).

When, thereafter, any such produce is presented for checkout by a shopper, one or more sensors at the checkout station repeats the sensing operation. The collected data is checked against the reference data earlier collected—to identify a best match. If the produce is unambiguously identified, it is added to the checkout tally without further intervention (except, perhaps, weighing). If the sensed signature appears to potentially correspond to several reference items, tiles for each possible are presented on the clerk's touch panel, for selection among the presented options.

Another aspect of the technology concerns bulk items that are packaged at the time of shopper selection. An example is cold cuts from a deli counter.

In accordance with this aspect of the technology, a clerk employs a sheet of wrapping medium (e.g., butcher paper) that has been pre-printed to encode an identifier, by which that sheet can be distinguished from other such sheets. In one particular arrangement, the sheets are sold in packages of 250, and each is encoded with a different identifier (i.e., serialized).

The clerk wraps the cold-cuts in such a sheet, places it on a weigh-scale, and enters a product code on the scale UI. The product code identifies the product (e.g., Lebanon Bologna), and allows the system to recall the price for that item (e.g., $4.39/pound). From the per-pound price, and the weight, the scale computes the price of the item. This price can be shown to the shopper from the scale display, and reported to the shopper by the clerk.

The scale includes a camera that captures an image of the package, and extracts the wrapper medium identifier from such imagery. The scale sends the extracted medium identifier—together with the other product details (e.g., product code, product name, measured weight, price per pound, total price) to the store's central computer database for storage.

When the shopper later presents the packaged item for checkout, a camera system at the checkout station senses the identifier from the wrapping medium, and recalls from the store database the associated product particulars (product code, weight, price, etc.). The price is added to the checkout tally.

Sometimes—both with barcode scanning and other technologies—a single item may be twice-sensed when passing through a checkout station. This can occur, for example, when a product box has barcodes on two or more surfaces. Each barcode may be sensed, causing the system to conclude that multiple items are being purchased.

Checkout stations typically emit an audible alert each time an item is identified (e.g., a beep). To alert the clerk—or shopper—that a possible duplicate identification of a single item has occurred, the station can emit a distinctive tone when the same product identifier is sensed twice, and included twice on the checkout tally. Such distinctive tone can be of a frequency different than the usual beep, or it may consist of a chirp or other time-varying signal.

If a clerk (or shopper) finds that a product has been mis-counted, the error can be corrected by gesturing with the product. For example, the clerk (shopper) can make a shaking gesture with the product. This shaking gesture is sensed by a camera system at the checkout station. The system understands this gesture to indicate that the product has been added an extra time—erroneously—to the tally. It responds by canceling one of the duplicate entries for that item.

More gamification elements may be introduced into the shopping experience to make it less tedious. One approach is to steganographically mark one or a minority of items in a store with an identifier, which permits the item to be identified as a prize-winning item.

At checkout, imagery captured from items presented for purchase is analyzed to see if any is one of the prize-winning items. If so, a prize (e.g., a discount, special merchandise, or other premium) is awarded to the shopper.

Such arrangement can be practiced by applying stickers to several grocery items. Only one (or a few) of the stickers, however, encodes the steganographic identifier indicating it is a prize-winning item. To the shoppers, all of the stickers are indistinguishable. Analysis of the imagery at checkout, however, reveals the winners.

(While such "treasure hunt" promotions have previously been employed in supermarkets, they have usually relied on human-visible indicia revealed only when a product is opened for consumption. The winners can then return the winning indicia to the store—or mail it back to the producer—to redeem the prize. Such approach, however, led some consumers to open packaging in the store—looking for the winners—and leaving the non-winners opened on the store shelves.)

In accordance with another aspect of the technology, a shopper's mobile device is employed to identify items being purchased while the shopper is still in the shopping aisle.

In such arrangement, a camera of the mobile device captures imagery from each item to be purchased—either while the item is still on the shelf, or after it has been placed in a basket. The imagery is analyzed to produce identification data for such item.

If watermarking or fingerprinting is used, the product can typically be recognized regardless of its orientation (pose) relative to the camera. If, however, barcode reading is used, the shopper must commonly manipulate the item so as to present the barcode to the camera. (Items are rarely stocked with barcodes facing the aisle.) This manipulation may be a two-handed operation—one to hold the mobile device and one to turn the item. Fingerprint- and watermark-based item identification, in contrast, can commonly be done single-handedly—pointing the camera to whatever surface of the item is facing the camera, from the shelf or cart.

The shopper's mobile device can be executing a branded application—such as a Wal-Mart app—that performs the item recognition task (optionally in conjunction with a partner processor in the cloud, e.g., matching image fingerprint data, or looking-up barcode/watermark payloads). The shopper can sign-in to the app with a loyalty shopper number, or other identifier.

In some arrangements, the device launches an app appropriate to the store based on sensed context information. For example, the device may track its location (e.g., by GPS), and if it finds its location is in a Wal-Mart store, it can launch the Wal-Mart app. In contrast, if it finds its location is in a Target store, it can launch the Target app.

Context other than location can be used. For example, audio sampled by the mobile device microphone can be analyzed to extract identifying information. A Target store, for example, may play a digitally-watermarked music track in its stores that allows mobile devices to discern that they are in a Target store. (Shopkick works on a similar principle, e.g., as detailed in its patent publication 20110029370.)

When the shopper arrives at a checkout station, the tally of items in the cart is transferred to the store computer (if same wasn't done previously, e.g., in real-time as the items were identified). The tally can be transferred wirelessly (e.g., Bluetooth or Zigbee), by RFID, optically, or otherwise. Optical transmission can be by a series of visible indicia (e.g., barcodes or watermarks), each briefly displayed on a display of the mobile device (e.g., for a fifth, tenth or twentieth of a second), and sensed by a camera/scanner at the checkout station (essentially, a movie of barcodes/watermarks). If the mobile device is a head-mounted display, the series of visible indicia may be projected (e.g., from the HMD) onto the counter or other surface, for capture by the checkout station camera. A store clerk—if present—can facilitate payment and bagging. Or these, too, can be handled by the shopper in self-serve fashion (e.g., with payment completed using the mobile device).

In accordance with a further aspect, the technology includes capturing imagery from an item, and processing the captured imagery to extract first data encoded in a first machine readable form. By reference to this extracted first data, information is obtained about second data encoded in a second machine readable form different than the first. The captured imagery is then processed to extract that second data—using the just-obtained information. In such arrangement, one or both of the first or second machine readable forms can comprise a steganographically-encoded digital watermark.

Additional Details of One Particular Embodiment

This particular embodiment involves an item at a checkout station that is moved along a path, such as by a conveyor or by a human. A first camera arrangement captures first 2D image data depicting the item when the item is at a first position along the path. (Suitable 2D imaging scanners are provided, e.g., by DataLogic ADC INC., located in Eugene, Oreg.)

The moving item includes a digital watermark pattern printed or carried on the product packaging. In this particular embodiment, the digital watermarking spans a substantial portion of the packaging extent. In regions where there is no printing (e.g., white space), a yellow or other unobtrusive watermark tint is applied. (Yellow watermarking is particularly discussed, e.g., in Digimarc's published patent application 20110274310 and U.S. Pat. No. 6,345,104.)

The following discussion concerns both enhancements to watermark embedding and watermark detection for this particular application scenario.

Consider, first, general color embedding. In offset printing, a spot color is generated without a screens or dots. Colors are usually generated by printing cyan, magenta, yellow, or black using a single run, but sometimes extra colors are added to print spot colors which are not combinations of CMYK. Care must be taken when altering a cover image that contains spot colors. (An image that is to be encoded to convey a digital watermark pattern is commonly called a host, or cover, image.) Further, there might be constraints on the ink densities that are allowable at each pixel. Traditional watermark embedding, which usually alters pixel values in the RGB space, may not work well for packaging and other materials printed using spot colors. In particular, it can produce objectionable artifacts in these uniformly-colored spot color areas. The present embodiment employs a different method that embeds a watermark in an optimal ink color direction, to make these artifacts much less visible.

Some watermark embedders use the sRGB color space, which spans a limited gamut that will not handle the extended dynamic range of packaging printed with spot colors. By directly modifying the spot color ink densities, the color accuracy and gamut of the cover image are maintained. By changing two inks, we can construct a closed form for the optimal color direction of a grayscale embedder by using a local linear approximation. Extension to other definitions of watermark signal is also discussed.

More particularly, this embodiment embeds a watermark signal in a printed image by changing ink densities. By modifying combinations of inks, we can construct a signal in different color directions. The perceptibility of the change is measured with a visibility function which is just length in a modified version of the Lab color coordinate system. Obviously there is a tradeoff between visibility and watermark detection robustness, but below certain level of distortion, we would like to maximize the watermark signal that we insert that meets this visibility constraint.

An example watermark embedder takes a color image and converts it to gray scale image as a starting point for message modulation. We generalize this by allowing a more general function of color space. For example, we might create a U detector (from YUV color space) which has a watermark signal embedded in $S_u(R,B,G)=(-0.15\ R)+(-0.29\ G)+(0.44\ B)$. We call this signal definition the watermark signal ($S_{wm}$), for short.

Once the watermark signal is defined, we can construct the embedder which finds the optimal ink changes to maximize watermark signal for a given visibility constraint. This optimal ink mix depends on the definition of both the watermark signal and the visibility function. We describe an enumerated (e.g., brute force) optimization that will work for any color combinations.

Changing the available inks in a small region R allows one to change the original base color to a color in a subset of the full gamut available on the printer. If N inks are available for watermark signal insertion, then the set of all ink combinations, which we denote by $\Sigma_{ink}$, is a bounded N dimensional set. Given a point in $\Sigma_{ink}$, we can combine the inks to get a color. The space of all available colors for R, which we denote by $\Gamma_{ink}$, is a subset of the full printer gamut. The watermark signal is a real valued mapping on the color gamut $\Gamma_{ink}$. For example we could define a watermark signal function by $S_{Grey}(R,G,B)=((R+G+B)/3)$ which maps a pixel color to a grayscale. The definition of $S_{Grey}$ is given in sRGB coordinates but should be smooth across the entire printer gamut.

From the original color location, the visibility increases as we change the ink density. We choose from $\Sigma_{ink}$ the ink combinations that have acceptable visibility. The set of colors generated by these ink combinations is the compact set $\Gamma_{ink}$, and the watermark signal function $S_{wm}$ has a maximum and minimum on $\Gamma_{ink}$.

Figure 39A:
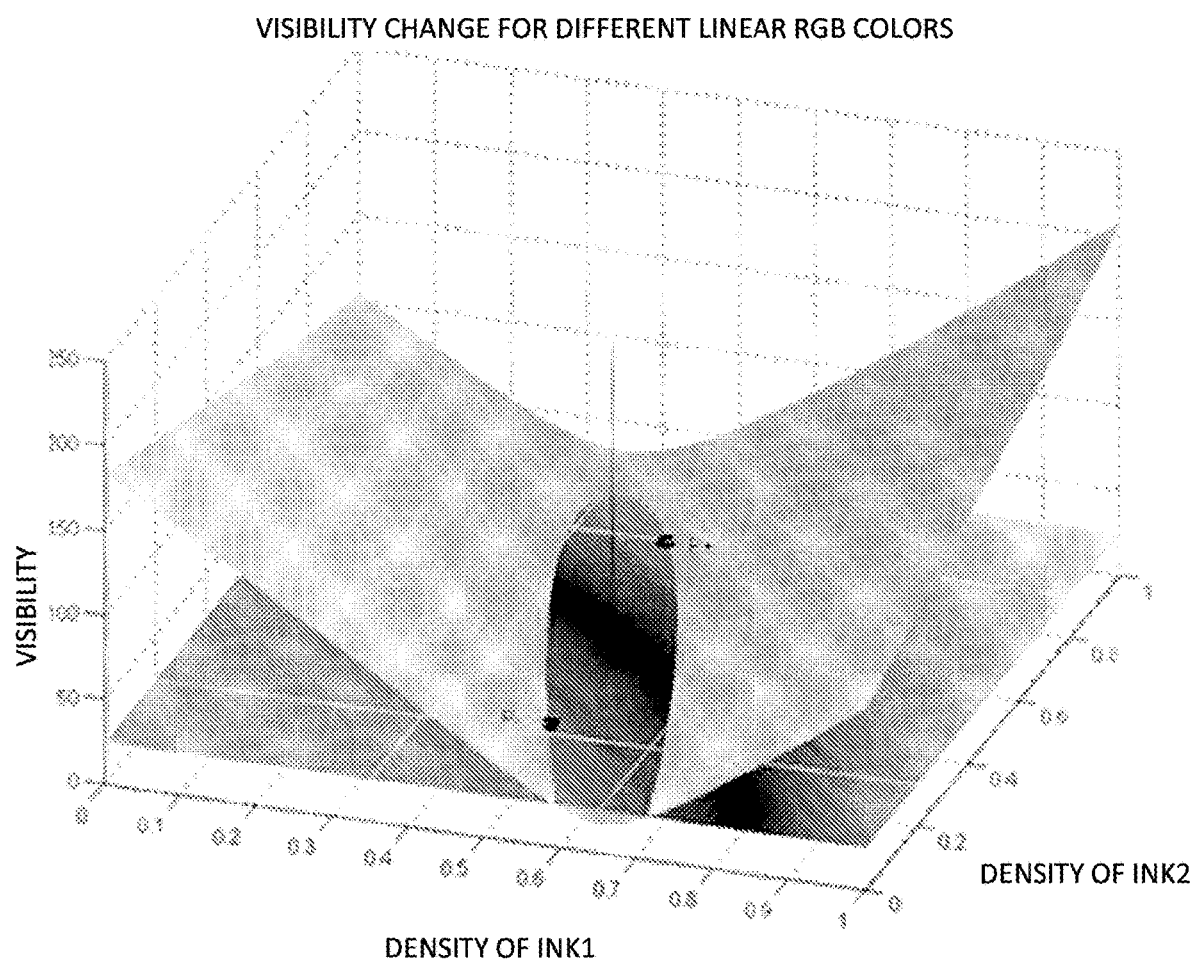

If only two inks are available at a point, then changing these two inks will typically result in a two dimensional surface of the available colors, and both $\Sigma_{ink}$ and $\Gamma_{ink}$ are two dimensional. In this case we can think of $\Gamma_{ink}$ as a two dimensional surface in three dimensional color space. In FIG. 39A we show an example plot of how visibility changes when two inks are combined. It is important to emphasize that this graph is the possible range of values for one particular pixel on the image. The colors of the plane in the plot are the actual colors generated by the various combinations of ink densities. The flat gray plane is a plane of constant visibility and has gray values that indicate the change, $\Delta S_{wm}$, in the watermark signal. The watermark signal in this case is defined by $S_{wm}(R, B, G)=(R+G+B)/3$. The white lines in the gray plane indicate extra ink constraints for these two inks, and the tall vertical black line in the center of the plot indicates the starting base color. The pool of values below the gray visibility plane are ink density pairs that are within the acceptable visibility constraint. The two points (P+, P−) in this pool with the largest signal are the optimal points for watermark embedding (corresponding to positive and negative $\Delta S_{wm}$) and are indicated by black squares.

The optimum points (P+, P−) have changes mainly in ink 2. As we raise the visibility constraint, the gray plane of acceptable visibility will rise and the gray pool of acceptable ink values (at the center) will grow larger. But at each visibility, the goal is to find the points in the acceptable visibility pool that have the largest positive and negative watermark signal.

Figure 39B:
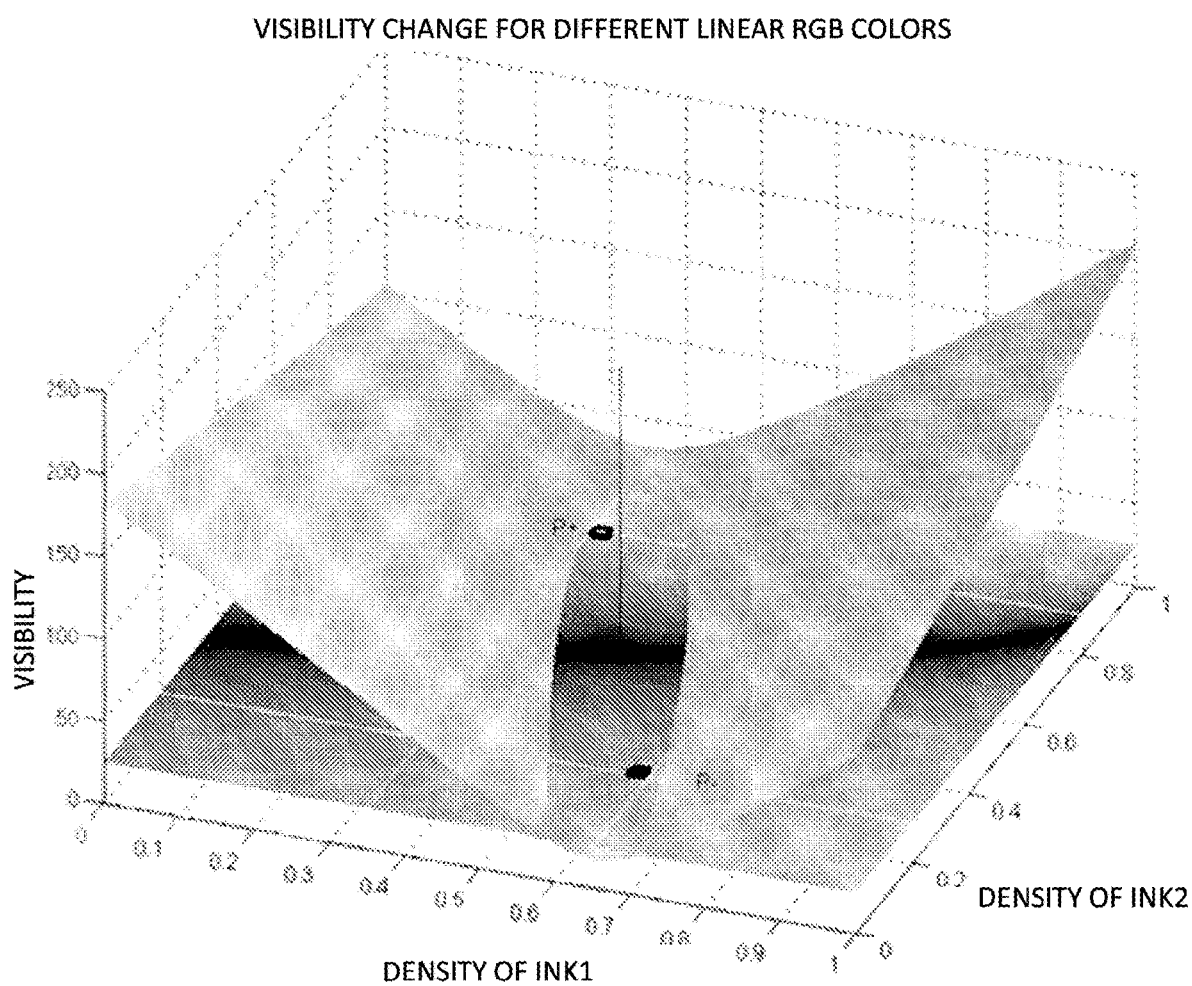
Figure 40A:
FIGS. 40A-40F show six images captured from a checkout camera when sweeping a soft drink can for checkout (at a medium pace of sweeping, by a non-professional checker).
Figure 40B:
Figure 40C:
Figure 40D:
Figure 40E:
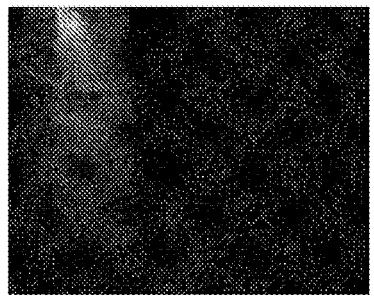
Figure 40F:
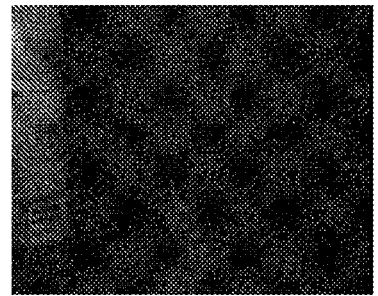

In FIG. 39B we show the same color point with the same visibility and ink constraints, but we change the watermark signal to the function $S_{wm}(R,B,G)=(-0.15\ R)+(-0.29\ G)+(0.44\ B)$. One can insert a larger watermark signal, and the ink constraints are the limiting factor. In this case, it is clear that the optimal positive watermark signal corresponds to increasing ink 2 but decreasing ink 1.

We define a mapping $L:\Sigma_{ink} \to \Gamma_{ink}$. We write the color set $\Gamma_{ink}$, in Lab or some other perceptually uniform color coordinates.

In the case of two inks we can derive a precise formula. We construct the Jacobian of the mapping L. In this case, our pools of acceptable visibility are ellipses. There is a closed form for the optimal grayscale value on this ellipse. If $c_r$ is the color of cover image, then we take the Jacobian derivative of L at $c_r$. Let $u_1$, $u_2$ in $\Sigma_{ink}$, be changes along ink 1 and ink2 respectively. We define quantities, $$E(c_r)=J_L(c_r)u_1 \cdot J_L(c_r)u_1, F(c_r)=J_L(c_r)u_1 \cdot J_L(c_r)u_2, G(c_r)=J_L(c_r)u_2 \cdot J_L(c_r)u_2.$$

The ink change vectors $\alpha\ u_1+\beta\ u_2$ that meet a visibility constraint $R_v$ can be written in terms of E, F and G, $$R_v^2 = \alpha^2 E(c_r) + 2\alpha\beta F(c_r) + \beta^2 G(c_r)$$

This is an ellipse. If we assume a grayscale watermark signal then using Lagrangian multipliers we can find the optimal embed points in terms of which is linear in the visibility $R_v$, $$\begin{bmatrix} \alpha \\ \beta \end{bmatrix} = \lambda \begin{bmatrix} G(w \cdot v_1) - F(w \cdot v_2) \\ -F(w \cdot v_1) + E(w \cdot v_2) \end{bmatrix} \text{ where } w = \frac{1}{\sqrt{3}}(1, 1, 1)^t$$

Now back to some checkout scenarios. Recall from above that an item to be purchased moves along a path, such as a conveyor. A first camera arrangement captures image data depicting the item when the item is at a first position along the path.

This next section discusses a prioritization of watermark titles in captured image data (e.g., 30 frames or more per second) fed to a watermark detector. Sometimes, a digital watermark detector is fed a video feed of much larger resolution (e.g., 1024×1280 pixels) than what is covered by a watermark tile detector (e.g., 256×256 pixels). If a detector is looking at single-blocks (tiles), then the detector may run multiple times for every frame to analyze each tile. Given the resource constraints of the hardware (e.g., embedded device, ARM processor, etc.), it may be difficult to process the whole area of every frame in a timely manner (e.g., as packaged items are buzzing by on the conveyor past the camera). Therefore, it is beneficial to limit the number of single-block analyses running on every frame, and to present those image blocks most likely to have decodable watermark data before less promising blocks.

This may not be an issue for well-marked large packages, because they fill large portions of the camera field of view, and thus the chance that a single block detector is placed on a watermarked area is high. On the other hand, small packages, like cans and small boxes (e.g., a tea box), may only occupy a small portion of the whole field of view, as shown in FIGS. 40A-40F, making the chance of a single block detecting being placed on a well watermarked area very low.

During a normal checkout pace, when the camera is running at its normal speed of 30 FPS, a typical small package will show up in 2 to 4 frames with good presence, as shown in FIGS. 40A-F. Since a small package covers a small area of the camera's field of view, the strategy of reading the watermark from many blocks may have diminishing returns in terms of complexity vs. robustness. Most possibly, the detector will spend time looking for a watermark in background areas of the image, or in blocks spanning the package boundary, but not on the package itself.

It will be recognized that the entering frame (FIG. 40A) and the leaving frame (FIG. 40F) are not considered good for watermark detection, e.g., since the item occupies such a small fraction of the image frame.

For this camera system, where the input is a video stream, we have found that background subtraction from moving averages of previous frames is a computationally efficient and effective method to extract the fast moving foreground objects. This method separates static or slow moving objects (classified as background) from fast moving objects (classified as foreground), and focuses the computational resource on the more meaningful foreground objects.

The foreground detection works as follows:
1. Background(k+1)=alpha*Frame(k+1)+(1−alpha) *Background(k),
2. Foreground(k+1)=Frame(k+1)−Background(k+1), if Frame(k+1)−Background(k+1)>threshold, where indices k or k+1 represents the incoming frame's temporal axis, alpha is the learning rate which controls how to update background from the incoming frame, and the threshold is to suppress any noise from illumination variations.

This process is computationally efficient because it simply uses pixel-wise subtraction, addition and comparison. Also, its memory usage is low, since it does not require saving all previous frames, but only an average of most recent frames. By efficient post-processing and clustering the results of each pixel (or groups of pixels), approximate information about location/shape of the foreground object can be obtained. All processing is done in real time.

The location/shape of the object can be utilized to constrain the area where the detector needs to be placed. Significant savings in the complexity can be achieved without losing detection robustness.

Figure 41A:
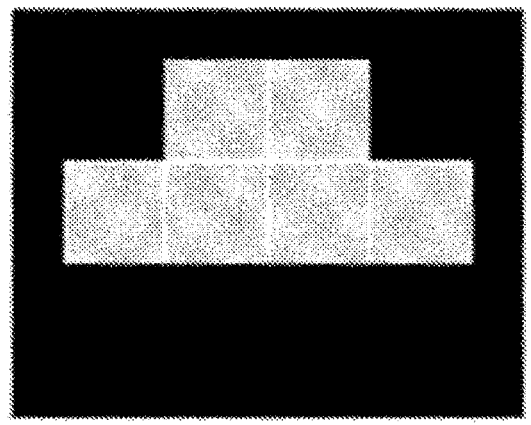
FIGS. 41A and 41B show a "B17" block pattern used to select candidate blocks of imagery for watermark decoding.
Figure 41B:
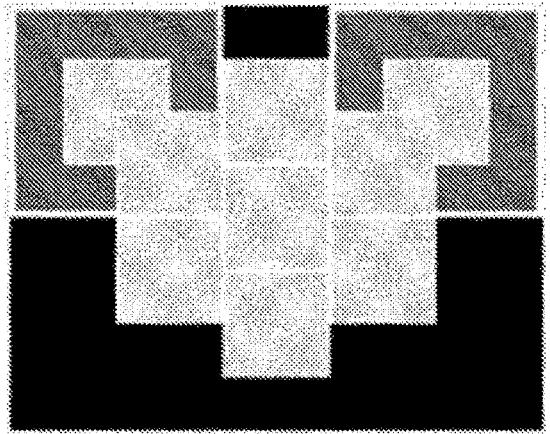

Once the foreground region has been detected, we can assign detection blocks to locations in the imagery to enhance detection. For example, a static pattern, nick-named B17, is shown in FIGS. 41A and 41B. FIG. 41A shows the location of 6 blocks, and FIG. 41B shows the location of 9 more. Two additional, larger blocks (corresponding to watermark tiles that are twice as large in each direction as tiles for the other blocks) bring the total number of blocks to 17.

One option is to use the detected foreground region to mask the blocks of the B17 pattern. That is, for each of the 17 blocks, such block is processed for watermark detection only if it falls inside the foreground region.

Another, second option is a bit more complex.

First, the detected foreground region is expanded to a square window, encompassing all the foreground pixels. Then the square foreground region is divided into equally spaced zones (e.g., one, four, nine, etc. —whichever yields zones most similar in size to the 15 smaller blocks of the B17 pattern). The foreground pixels (i.e., incoming pixel values from the camera, minus averages of corresponding pixels in previous frames) inside each zone are summed together. This summation is a representation of the illumination of the foreground in each zone.

Second, two other approaches are used to prioritize the placement of single block detectors (i.e., areas in which the watermark detector will look for watermark signal) inside the square foreground region, because the number of single block analysis areas may not be enough to cover the whole region. The first approach is based on illumination (or brightness). If the zones are ranked according to their illumination, those of high rank may indicate good illumination and those of low rank may indicate poor illumination. We would prefer not to place the single block detectors on poorly illuminated zones. Also we may decide to discard zones with extreme high illumination values because they indicate over-saturated pixels from glare (caused, e.g., by specular reflection from the packaging by the scanner illumination). An ordered ranking of the remaining zones is established, and pixels for these zones are sent in that order to the watermark decoder for processing.

The second approach is based on the geometric position of each zone. In some cases, the areas at the top and bottom of the image frame detect poorly, due to over-saturated pixels on the top (i.e., those nearest the illumination source) and poorly-illuminated pixels on the bottom (i.e., those most remote from the illumination source). So we assign a weight to each zone based on its geometric location within the frame. For example, center blocks may be weighted more significantly than edge blocks. Or edge blocks may only be consulted if no signal is found in center blocks. Again, a ranking of the different zones, based on these criteria, is established, and pixels for these zones are sent in that order to the watermark decoder for processing.

To merge the two approaches, we can combine a ranking based on the normalized illumination value of each zone with a ranking based on geometric position, yielding a hybrid ranking Those zones that appear most likely to contain a decodable watermark signal are sent to the decoder in an order established by such hybrid ranking.

Another option is illustrated in FIGS. 42A-42J. These illustrations are based on a sequence of images captured while a coffee can was passed in front of a camera.

Each of FIGS. 42A-42J is a composed frame based on one of the images in the sequence. Each Figure is composed of (a) the incoming frame, shown in the upper left quadrant, (b) the detected square foreground region, shown in the lower left quadrant, and (c) the single block detectors overlaid on top of the incoming frame, shown in the upper right quadrant. (The lower right quadrant is nil.) The minimum offset between the selected blocks is set to a predetermined pixel value, e.g., 64 pixels, to avoid choosing blocks with a large overlap (i.e. blocks that are from similar image areas).

Preliminary experiments have been conducted to verify the process. The test datasets used are ad-hoc captures from non-professional checkers. There are two datasets, one named YangScan and the other named BeckyScan. The YangScan dataset contains mostly small packages (cans) and comprises 1025 frames of about 30 seconds recording from a digital camera, while the BeckyScan dataset contains both small and large packages and comprises 596 frames. The BeckyScan dataset contains more frames depicting packages, so it has more frames in which watermarks were detected.

The results of using the first option, which uses the foreground region to trim down the B17 pattern, are shown in Table I. There are 168 frames and 53 frames detected as containing watermark from BeckyScan and YangScan datasets, respectively, using the fixed static B17 pattern. By switching to the flexible foreground trimmed B17, to get the same detection rate, on average, only 10 frames are required for BeckyScan, and only 7 frames are required for YangScan. Since YangScan contains more small packages, and the benefits of using foreground detection are more obvious on small packages, the saving in terms of number of blocks per frame is more significant for YangScan.

TABLE I

|  | 168 frames detected with flex pattern | 168 frames detected with fixed pattern |
|---|---|---|
| BeckyScan | 2680/275 = 9.75 blocks/frame | 17 blocks/frame |
|  | 53 frames detected with flex pattern | 53 frames detected with fixed pattern |
| YangScan | 978/162 = 6.04 blocks/frame | 17 blocks/frame |

Figure 43A:
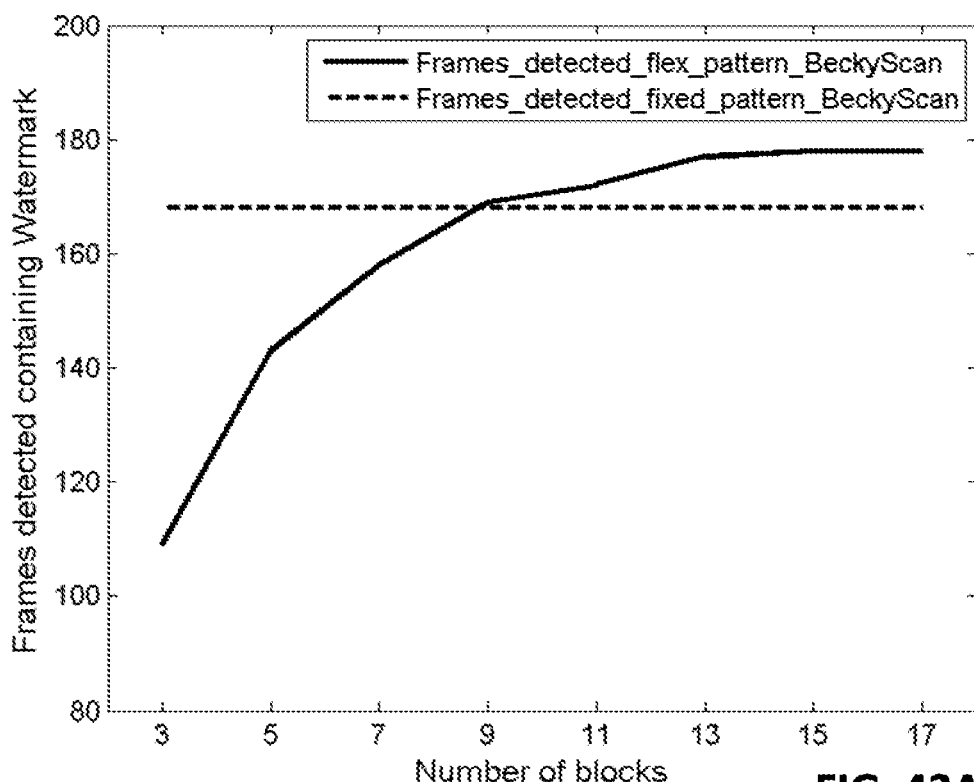
FIGS. 43A and 43B are graphs detailing results achieved with different detection approaches.
Figure 43B:
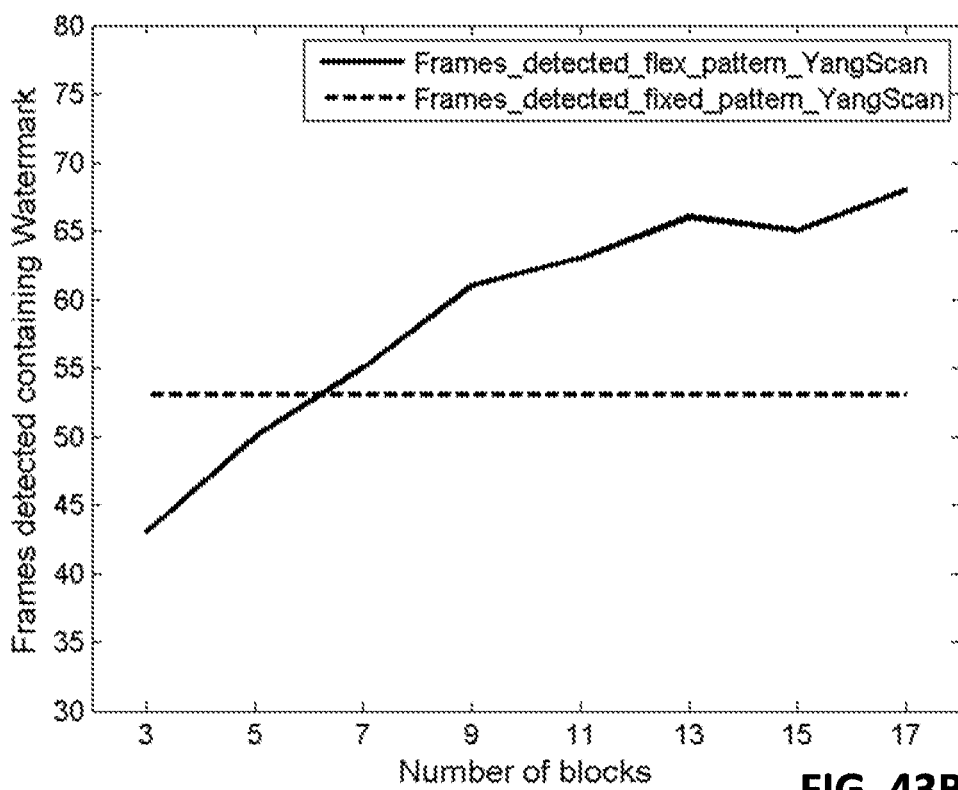

The results of using the second option are shown in FIGS. 43A and 43B, which compare flexible pattern from foreground (Option 2) with fixed static pattern, in placing single block detectors.

The straight lines in FIGS. 43A and 43B mark the number of detected frames from BeckyScan and YangScan datasets using the static B17 pattern, 168 and 53, respectively. The curves indicate the number of detected frames when choosing different numbers of blocks placed inside the foreground region. In general, if there are enough detector blocks, say, e.g., 17, then the flexible block pattern gives better detection results. And if the number of detector blocks is reduced, say, e.g., down to 9, the flexible block pattern still provides a good detection rate with much reduced computational cost.

In other cases we implement a "smart watermark detector"—one that can train itself based on user or cashier habits or preferences. For example, through a series of training check-out runs, it is determined that cashier 1 holds packaged items at a certain angle, or at predetermined distances from the camera, or at a certain swipe speed, or places items on a conveyor at certain orientations. Other training information may include, e.g., proximity to the scanner, speed of scanning, production rotation habits, professional vs. amateur checker, etc. Or the detector may determine that it is only getting watermark reads from certain block areas when a certain checker checks out. All this information (or subsets of this information) can be used to adjust the watermark detector, e.g., by determining which blocks to prioritize in a detection process. For example, it might be found that cashier 1 commonly swipes items in front of the camera so that the packages are in the top or bottom of the field of view. Whereas, above, these block areas would typically be given low prioritization. But if the detector knows that the cashier is cashier 1, then these areas can be more highly prioritized.

A user's self-checkout habits—including how and at what speed they present objects to the check-out camera—can be monitored and stored for later use in configuring a watermark detector, e.g., by prioritizing certain block selections for watermark detection. A user's store loyalty card ID can be associated with a database or other record that stores such information, enabling the proper detector prioritization. Such information can then be used to inform the watermark detector on how to better process imagery when that person is checking out.

Some checkout stations will continue to monitor barcodes even if supplemental symbologies like watermarking are present during checkout. In these case, consider the flowing flow:

1. Imagery is presented to a watermark detector.
2. The watermark detector analyzes the imagery and detects a watermark. The watermark may include a payload or index or other information.
3. A process is invoked that utilizes that watermark information to create an image overlay for captured imagery. The image overlay preferably includes a barcode or other symbology that includes the watermark information, or information obtained from utilizing the watermark information. That way, if the same imagery that was analyzed for a digital watermark is then fed to a barcode reader the graphic overlay barcode will be easily recognizable even if the depicted product packaging did not display a barcode.

One challenge may occur if two or more of the same packaged items are within a single image frame. For example, 2 cans of Diet Mountain Dew might be pictured in the same frame. The watermark detector finds a read, but in different, non-contiguous image areas. In such cases a watermark payload may be used to look up a spatial template. The spatial template is sized roughly to represent a particular item (e.g., diet soda). The spatial template is placed around a block area where watermarks were detected. If watermarks (or watermark components like orientation components) are located outside of the spatial template then there is a likelihood that the image frame includes two or more watermarked objects.

The cashier can be warned to examine this area more carefully, or the system may make a determination independently to ring up two items.

In another implementation, the checkout camera includes or cooperates with special illumination. The illumination projects watermark orientation information (e.g., a grid, which may be steganographic) on the packaging. The projected illumination is captured along with the packaged items. The projected grid is deciphered by the watermark detector to help determine orientation information include relative depth, orientation, etc. This information can be used in watermark detection, or foreground/background decisions.

In still another implementation, watermark information is used to identify certain areas on packaging. For example, a watermark signal (e.g., an orientation component) might be used to outline the nutrition facts on a package. The watermarked area is then used to create a spatial position on a reading device (in this case, e.g., a smartphone like an iPhone or Android device). An augmented reality display is overlaid on the watermarked area.

Logos and Close-Ups

As noted earlier, one advantage to fingerprint-based object identification techniques is that they allow object identification from the front panel of packaging—without manipulation to find a barcode. This can facilitate checkout, since clerks needn't search to find a barcode—they can just scan the front of the object. This also facilitates object identification by shoppers using their smartphones in store aisles—they can simply point their phone cameras at objects sitting on store shelves, and quickly obtain product information, such as ingredients, nutritional information, etc.

However, applicant has found that fingerprint-based identification of objects using just front-panel artwork is unreliable. In particular, fingerprint-based arrangements exhibit a false-positive behavior that is unacceptably high, e.g., indicating that an object has been identified, but providing wrong identification information.

In point-of-sale applications, where the object identification controls the price charged to the customer, mis-identification is unacceptable, e.g., because it results in erroneous charges to customers, and incorrect sales data for store inventory and stocking purposes. Moreover, object mis-identification to shoppers seeking product information in store aisles is also a serious problem, e.g., as it may identify a product as peanut- or gluten-free, when the shopper is looking for products that are free of ingredients to which they are allergic.

In accordance with a further aspect of the present technology, the false positive problem of fingerprint-based object identification is alleviated by collecting information on product logos. Such logos are identically presented on a variety of different products, introducing an element of confusion in fingerprint-based recognition systems. By treating logo artwork different than other front panel artwork, less confusion results, and better performance is achieved.

FIG. 44 shows four of the cereals marketed by Kellogg Co. Each front panel includes distinctive artwork. But all share an element in common—the Kellogg's logo. Automated recognition systems sometimes become confused by this commonality—increasing the risk that one product will be mis-identified as another.

As is familiar to artisans, fingerprint-based recognition systems generally identify a set of scale invariant robust features (also sometimes termed "interest points" or "keypoints") from captured imagery, and try to match data about these features with feature data earlier identified from reference imagery. (Corners and line-ends are commonly used as robust features.) If sufficient correspondence is found between features of the captured imagery, and features of one of the reference images, the two are found to match, and the captured imagery can then be identified by information associated with the reference imagery.

FIG. 45 conceptually shows some of the reference data used in a particular embodiment of such a fingerprint-based identification system. Artwork from a reference sample of product packaging is processed to derive SIFT keypoint descriptors. Each descriptor comprises a 128 part feature vector that characterizes aspects of the imagery around the keypoint, and requires a total of 512 bytes to express. A front panel of a cereal box or the like may have on the order of 1000 such keypoints, each with a corresponding descriptor.

Figure 46B:
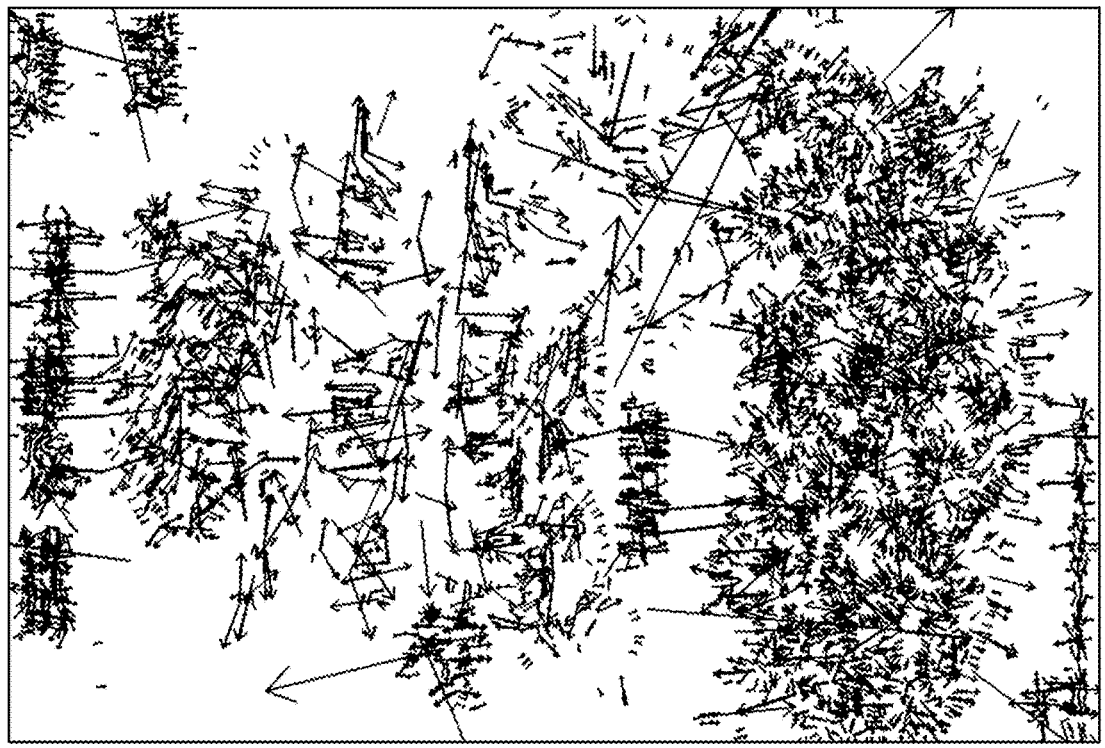
FIG. 46B illustrates SIFT feature descriptors extracted from the artwork of FIG. 46A.
Figure 46A:
FIG. 46A shows artwork from Kellogg's Raisin Bran cereal.

(FIG. 46A shows artwork from a front panel of Kellogg's Raisin Bran cereal, and FIG. 46B shows a representation of the keypoint descriptors for this artwork. Due in part to the complex features in the depicted cereal bowl, a SIFT algorithm generated 5651 keypoints.)

At the top left of FIG. 45, under the Keypoint Descriptor heading, is a first keypoint. While this datum is actually 512 bytes in length, it is abbreviated in FIG. 45 by its first and last bytes, i.e., "26DE4 . . . 1BD1A." That row of the table also indicates the product package to which the keypoint descriptor corresponds, i.e., a box of Kellogg's Raisin Bran cereal, having a UPC identifier of 038000391095.

Following this initial entry in the FIG. 45 table are several more rows, showing several more of the keypoint descriptors from the Kellogg's Raisin Bran artwork—each associated with the cereal name and its UPC code. Ellipses interrupt the table at various places—each indicating hundreds of omitted rows.

After the thousand or so of keypoint descriptors associated with the Kellogg's Raisin Bran cereal artwork are fully detailed, the table next starts listing keypoints associated with a Kellogg's Rice Crispies Cereal box. Again, there may be a thousand or so such keypoint descriptors—associated with the name and UPC code for the Kellogg's Rice Crispies cereal.

Although just two cereals are identified in FIG. 45, the data structure can stretch for millions of rows, detailing keypoint descriptors for thousands of different products found in a supermarket.

In use, a point of sale terminal (or a shopper's smartphone camera) captures an image of a retail product. Software then identifies about a thousand robust features in the image, and computes descriptors for each of these keypoints. A matching process then ensues.

Matching can be done in various ways. For expository convenience, an exhaustive search is described, although more efficient techniques may be used.

The first keypoint descriptor from the input image is compared against each of the million or so reference keypoint descriptors in the FIG. 45 data structure. For each comparison, a Euclidean distance is computed, gauging the similarity between the subject keypoint, and a keypoint in the reference data. One of the million reference descriptors will thereby be found to be closest to the input descriptor. If the Euclidean distance is below a threshold value ("A"), then the input keypoint descriptor is regarded as matching a reference keypoint. A vote is thereby cast for the product associated with that reference keypoint, e.g., Kellogg's Rice Crispies cereal.

(The value of threshold "A" can be determined empirically, based on testing with known matching and non-matching artwork.)

This descriptor matching process is repeated for the second keypoint descriptor determined for the input image. It is compared against every descriptor in the reference data and, if a close enough correspondence is found (i.e., a Euclidean distance less than threshold "A"), then another vote for a product is cast.

This process continues through all thousand or so of the keypoint descriptors derived from the input image. As a result, hundreds of votes will be cast. (Many hundred more descriptors may not be close enough, i.e., within threshold "A," of a reference descriptor to merit a vote.) The final tally may show 208 votes for Kellogg's Rice Crispies cereal, 33 votes for Kellogg's Raisin Bran cereal, 21 votes for Kellogg's Nutri-Grain Snack bars, and lesser votes for many other products.

A second threshold test is then applied. In particular, the cast votes are examined to determine if a reference product received votes exceeding a second threshold (e.g., 20%) of the total possible votes (e.g., 200, if the input image yielded 1000 keypoint descriptors). In the example just-given, this second threshold of 200 was exceeded by the 208 votes cast for Kellogg's Rice Crispies cereal. If this second threshold is exceeded by votes for one product, and only one product, then the input image is regarded to have matched that product. In the example case, the input image is thus identified as depicting a package of Kellogg's Crispies cereal, with a UPC code of 038000291210.

As noted earlier, however, some of these matches between input image descriptors, and reference descriptors, may be due to the Kellogg's logo, rather than other aspects of the packaging. In fact, the presence of the Kellogg's logo in both the input image and the reference Kellogg's Raisin Bran imagery may have tipped the vote count across the "B" threshold of 200. (See, in FIG. 46B, the multiplicity of keypoints in the region of the Kellogg's logo.)

In accordance with one aspect of the technology, robust features associated with product logos—and the associated keypoint descriptors—are flagged in the data structure. Such an arrangement is shown in FIG. 47, which is similar to FIG. 45, with the addition of a company name, and the right-most column: "Auxiliary Info." This column includes information (e.g., a flag bit, or text) indicating that the keypoint corresponds to a logo graphic.

There are many ways logos can be identified. One is by examining reference images for similarity (i.e., examining their keypoint descriptors for similarity). Such an arrangement is shown conceptually in FIG. 48. Logos are usually found in the top half of front panel artwork—often in the top third or top quarter. They are generally found in the center, but other placements are not uncommon. By such heuristics, an algorithm can be made to search for common graphical features across multiple reference images.

Figure 48:
FIG. 48 shows the top quarter of four reference artworks.
Figure 49:
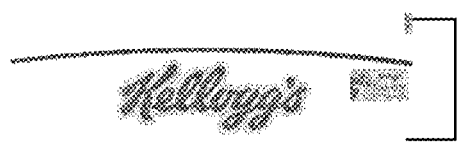
FIG. 49 shows common graphical features extracted from the FIG. 48 artworks.

In FIG. 48, the top quarter of various reference images are shown. FIG. 49 shows graphical elements that are found to be in common. Once graphical elements that are common between a threshold number (e.g., 2, 4, 10, 30, etc.) of reference images are found, they can be deduced to be logos. A robust feature identification procedure is then applied to the "logo," and keypoint descriptors are calculated. The reference data is then searched for reference keypoint descriptors that match, within the Euclidean distance threshold "A," these logo descriptors. Those that match are flagged, in the data structure, with information such as is shown in the right-most column FIG. 47.

It will be noted that this analysis produces graphical features that may not conventionally be regarded as product logos, e.g., the curved arch and the box to the right side (which states "Kellogg's Family Rewards") in FIG. 49. As used herein, however, such common elements are regarded as logos, and keypoints corresponding to such graphical elements are flagged accordingly in the reference data structure of FIG. 47. (Such set of common artwork elements may be termed "extended logos," and may include text artwork, e.g., "Net Wt. 8 oz," if it recurs across multiple products.)

It will be recognized that descriptors in the reference database needn't be checked against all others in the database to identify similarities. Other information can shortcut the task. For example, if company name information is available for products—as in FIG. 47, then descriptors need only be checked within products from the same company. (A logo on a Kellogg's cereal typically won't be found on a Pepsi drink.)

Figure 50:
FIG. 50 shows artwork for a Kellogg's trademark, available from the U.S. Patent and Trademark Office.

A different way to identify logos makes use of artwork submitted to the US Patent and Trademark Office, in connection with federal registration of trademark rights. Such logos are classified by the goods with which they are associated. Packaged items found in grocery stores are commonly in trademark Classes 5 (pharmaceuticals), 21 (kitchen utensils and containers), 29 (foodstuffs of animal origin), 30 (foodstuffs of plant origin), 32 (non-alcoholic beverages), and 33 (alcoholic beverages). Artwork for such logos ("registered logos") can be downloaded in bulk from the US Patent and Trademark Office, or other services, and processed to derive keypoint descriptors. These descriptors can be stored in a separate data structure, or in the FIG. 47 data structure. In the latter case the UPC, Company and Product Name fields may be repurposed, e.g., to indicate the federal registration number, the registrant name, and the goods for which the trademark is used. Or the descriptors can be compared against other keypoint descriptors in the data structure, so that matching descriptors (e.g., those matching within threshold "A") can be flagged as in FIG. 47. By such technique, just descriptors for the branded logo shown in FIG. 50, rather than for the deduced logo of FIG. 49, can be flagged in the database.

Again, if the reference data identifies the companies that produced the products, or if the product names include the trademarked names, then the task is simplified. The federal trademark database can be searched for only those trademarks that are owned by listed companies, or that include those trademarked brand name. Registered logos from such search can be processed to identify keypoints and derive descriptors, and the reference data can be searched to tag those descriptors that appear to correspond to descriptors of the registered logos.

Once keypoint descriptors (recognition features) associated with logos are identified, the system can take different responsive actions, depending on whether keypoints in input imagery match with logo keypoints or other keypoints.

For example, some consumers who capture imagery of products on a shelf (e.g., to obtain more information) may assume—mistakenly—that it is helpful to zoom-in on a product logo. When such a captured image is analyzed for keypoint descriptor matches, the software may find that a large number of the keypoints (e.g., more than 20%, 50% or 70% of the keypoints) are associated with a logo. This is evidence that the logo is too dominant a fraction of the imagery (i.e., it spans more than 15%, 30% or 60% of the image area—the particular value in this range being set by application constraints). The software may respond by controlling the user interface to present a text- or voiced-instruction to the user suggesting that they back-up and capture a view of more of the product—to provide a view of more package artwork surrounding the logo.

Alternatively, if the software finds such a large fraction of logo keypoints in the shopper-captured imagery, it may decide that the shopper actually is interested in the brand represented by the logo—rather than one particular product. Thus, another response is for the software to disregard keypoints in the captured imagery that do not match keypoints in the FIG. 47 data structure flagged as logo points, and instead seek to identify all products in that database that have that same logo on their artwork. The requirement that one—and only one—product be identified can be ignored. Instead, all reference products whose logo-flagged keypoints match keypoints in the shopper-submitted artwork may be identified. (Again, not all keypoints need match. A threshold test can be applied, e.g., that 25% of the logo-flagged keypoints in a reference image must correspond—within Euclidean distance "A"—to a keypoint descriptor in the shopper-submitted imagery, in order for that reference image to be among the matches identified to the shopper, e.g., on the user interface.)

Another way the logo-flagged descriptors in the reference database can be used is by ignoring them. For example, in the exhaustive search example, the process can skip comparing keypoints in the input image against logo-flagged keypoints in the reference database. (In some extreme examples, logo-flagged keypoints in the reference database may even be deleted.) Thus, any match between an input image keypoint, and a keypoint known to correspond to a logo, is given no consideration in determining an object match.

A less draconian approach is not to ignore logo-flagged reference descriptors altogether, but rather to accord such descriptors less weight in a matching process. For example, if an input descriptor matches a logo-flagged descriptor associated with Kellogg's Raisin Bran cereal, then such match doesn't count as a full-vote towards a Kellogg's Raisin Bran match. Instead, it may count only as one-fifth of a vote. The reference data may include a weighting value among the data associated with each keypoint descriptor.

Such arrangement is shown in FIG. 51. Those descriptors flagged in FIG. 47 as "LOGO POINT" are here annotated with a numeric value of 0.2, which can be used as the aforementioned weighting value. (In contrast, other descriptors are assigned a weighting value of 1.0, i.e., a full vote.)

To review, it will be understood that the just-discussed technology includes identifying a retail product, based at least in part on assessing correspondence between image recognition features associated with the retail product and image recognition features associated with a collection of reference products. Such a method includes receiving plural recognition features derived from imagery associated with the retail product; distinguishing a subset of the received features that are associated with a logo, the logo being present on plural of said reference products; and taking an action in response to said distinguishing.

The technology also includes enrolling a retail product in a reference product database, by acts such as: receiving plural recognition features derived from imagery associated with the retail product; distinguishing a subset of the received features that are associated with a logo, the logo being present on plural of the reference products; and treating the determined subset of features differently in enrolling the received recognition features in the reference product database.

Likewise, the technology extends to receiving plural recognition features derived from imagery associated with a retail product; identifying recognition features in a reference data structure that correspond to certain of the received features; and scoring a match between the retail product and a reference product based on the correspondence, said scoring being performed by a hardware processor configured to perform such act. In such method, the scoring includes weighting, based on auxiliary data stored in the data structure, correspondence between one recognition feature in the reference data structure and one recognition feature among the received recognition features.

Similarly, the technology includes obtaining trademark registration information comprising logo artwork; deriving recognition features from the logo artwork; storing the derived recognition features in a data structure, together with information flagging the stored features as corresponding to a logo; also storing recognition features derived from retail product packaging in a data structure; and using the stored recognition features in recognizing a retail product.

By these and various other techniques, descriptors associated with logos are treated differently than other descriptors in identifying matching products.

While the above description has focused on shoppers using camera-equipped portable devices in grocery aisles, it will be recognized that the same techniques are applicable elsewhere, e.g., at point of sale checkouts, etc.

Similarly, while the detailed arrangements described annotating the reference database to indicate which descriptors correspond to logos, it will be recognized that the descriptors produced from the shopper-captured imagery can be similarly-tagged. For example, such descriptors can be checked for correspondence against descriptors associated with logos, and when a match is found (e.g., a Euclidean distance less than threshold "A"), that input image descriptor can be tagged as being a logo point.

Of course, instead of tagging descriptors as corresponding to logos, other descriptors may instead be tagged as corresponding to non-logo artwork.

While the discussion has focused on SIFT descriptors, the artisan will recognize that such techniques can be applied to any type of fingerprinting. Moreover, other arrangements— such as bag of features (aka "bag of words") approaches can be used with such technology, with logo-associated features/words treated differently than others. (Bag of features methods are further detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.)

Similarly, while SIFT approaches are generally location un-constrained, the technologies described herein can also be used with location-constrained fingerprinting approaches. (See, e.g., Schmid, et al, Local grayvalue invariants for image retrieval, IEEE Trans. on Pattern Analysis and Machine Intelligence, 19.5, pp. 530-535, 1997; Sivic, et al, Video Google: A text retrieval approach to object matching in videos, Proc. Ninth IEEE Int'l Conf. on Computer Vision, 2003; and Philbin, et al, Object retrieval with large vocabularies and fast spatial matching, IEEE Conf. on Computer Vision and Pattern Recognition, 2007.)

The reference images, from which reference keypoint descriptor data shown in FIGS. 47 and 51 are derived, can be those produced by commercial services such as Gladson and ItemMaster, as detailed elsewhere in this specification (including documents incorporated by reference).

Although the foregoing discussion has emphasized processing of imagery from the fronts of consumer packaged goods, it will be recognized that the same principles are applicable to imagery of any view, or source.

(Even with the logo-based improvements noted above, certain implementations may nonetheless show a false-positive rate higher than is acceptable for point-of-sale checkout. Such false positives may be due, e.g., to a vendor selling chicken broth in both boxes and cans, with the same front artwork on each; or ketchup sold in differently-sized bottles, but with identical front labels except for the net weight. As discussed earlier, the fix for this problem is to gather more evidence that can be weighed in making an identification conclusion. Steganographic watermark data—if available, puts the identification question to rest, due to its highly deterministic character. Less certain, but nonetheless useful, is shape recognition. With stereo cameras, Kinect, or other depth-sensing technology, the exposed profile of an object can be sensed and used to determine size and configuration data about the product. This will often go a long way towards resolving ambiguities in fingerprint-based identification.)

Reference was made to a consumer who may capture product imagery from too-close a perspective—interfering with accurate fingerprint-based product identification. The above-noted technique identified this situation by finding an unusually high percentage of keypoints associated with logo artwork in the captured imagery. Another way this situation may be identified is by examining the captured imagery to determine if it appears to span the full package width (or height).

Most packages (boxes, cans, etc.) have parallel outer edges. Although perspective distortion can warp strict parallelism, full-width product images typically include two generally straight long edges at outer boundaries of the package. Detection of such paired edges can serve as a check that adequate imagery is being captured.

Figure 52:
FIG. 52 shows captured imagery of a cracker-box taken from too-close a vantage point to allow reliable product identification.
Figure 53:
FIG. 53 shows an alternative image of the cracker box of FIG. 52, taken from a better vantage point.

This is illustrated by FIGS. 52 and 53. In FIG. 52, a shopper has used a smartphone to capture an image from a cracker box on a store shelf—zooming in on the product logo. However, such an image may not capture enough image detail to perform reliable fingerprint-based identification.

Software can analyze the captured imagery to see if it has paired edges indicative of an image spanning across the package. FIG. 52 lacks such edges. The software responds by instructing the user to zoom-out to capture more of the desired packaging.

After the shopper follows such instructions, the image shown in FIG. 53 may be captured. This image includes two extended edges 110 and 112. The software can perform various checks. One is that each edge spans at least half of the image (image height in this example). Another is that the two edges are found in opposite halves of the image (left- and right-halves in this example). Another is that the average angular orientations of the two edges differ by less than a threshold amount (e.g., 15 degrees, 8 degrees, 4 degrees, etc.) If all of these tests are met, then the image seems suitable for fingerprint detection, and such action proceeds.

Edge detection is familiar to artisans. Wikipedia has an article on the topic. A few suitable algorithms include Canny, Canny-Deriche, Differential, Sobel, Prewitt, Roberts cross, etc.

Some embodiments may not require a pair of straight edges. Instead, a pair of shaped edges may suffice, provided that they are mirror-images. (The generic case, encompassing both straight edges and mirrored shaped edges may be termed a pair of complementary edges.)

Feature Recognition

As noted, certain implementations of the detailed technology employ recognition of robust feature descriptors (e.g., SIFT, SURF, and ORB) to aid in object identification.

Generally speaking, such techniques rely on locations within imagery where there is a significant local variation with respect to one or more chosen image features—making such locations distinctive and susceptible to detection. Such features can be based on simple parameters such as luminance, color, texture, etc., or on more complex metrics (e.g., difference of Gaussians). Each such point can be represented by data indicating its location within the image, the orientation of the point, and/or a feature vector representing information associated with that location. (A feature vector commonly used in SURF implementations comprises 64 data, detailing four values of luminance gradient information for each of 16 different square pixel blocks arrayed around the interest point.)

Such image features may comprise individual pixels (or sub-pixel locations within an image), but these technologies typically focus on 2D structures, such as corners, or consider gradients within square areas of pixels.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are robust to image scale, rotation and affine transformation. They are also robust to changes in illumination, noise, and some changes in viewpoint. In addition to these properties, they are distinctive, relatively easy to extract, allow for correct object identification with low probability of mismatch, and are straightforward to match against a (large) database of local features. Object description by a set of SIFT features is also robust to partial occlusion; as few as three SIFT features from an object are enough to compute its location and pose.

The technique starts by identifying local image features ("keypoints") in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints of different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with σ 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25% to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. Another is Se et al, "Vision Based Modeling and Localization for Planetary Exploration Rovers," Proc. of Int. Astronautical Congress (IAC), October, 2004.

Published patent application WO07/130688 concerns a cell phone-based implementation of SIFT, in which the local descriptor features are extracted by the cell phone processor, and transmitted to a remote database for matching against a reference library.

While SIFT is perhaps the most well-known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A feature vector commonly used in SURF implementations comprises 64 data, detailing four values of luminance gradient information for each of 16 different square pixel blocks arrayed around the interest point.)

ORB feature-based identification is detailed, e.g., in Calonder et al, BRIEF: Computing a Local Binary Descriptor Very Fast, IEEE Transactions on Pattern Analysis and Machine Intelligence, Vol. 34, No. 7, pp. 1281-1298; Calonder, et al, BRIEF: Binary Robust Independent Elementary Features, ECCV 2010; and Rublee et al, ORB: an efficient alternative to SIFT or SURF, ICCV 2011. ORB, like the other noted feature detection techniques, is implemented in the popular OpenCV software library (e.g., version 2.3.1).

Exemplary Watermark Embedding and Reading Arrangements

The patent documents cited herein detail a variety of particular digital watermark embedding and reading arrangements. The following discussion reproduces text from one of these patents: U.S. Pat. No. 6,590,996. (Patent documents cited in this following discussion <sections A—Q> are incorporated-by-reference into U.S. Pat. No. 6,590,996, but are not incorporated into the present application as essential material.)

A. Digital Watermark Embedder and Reader Overview

The following sections describe implementations of a watermark embedder and reader that operate on digital signals. The embedder encodes a message into a digital signal by modifying its sample values such that the message is imperceptible to the ordinary observer in output form. To extract the message, the reader captures a representation of the signal suspected of containing a watermark and then processes it to detect the watermark and decode the message.

Figure 54:
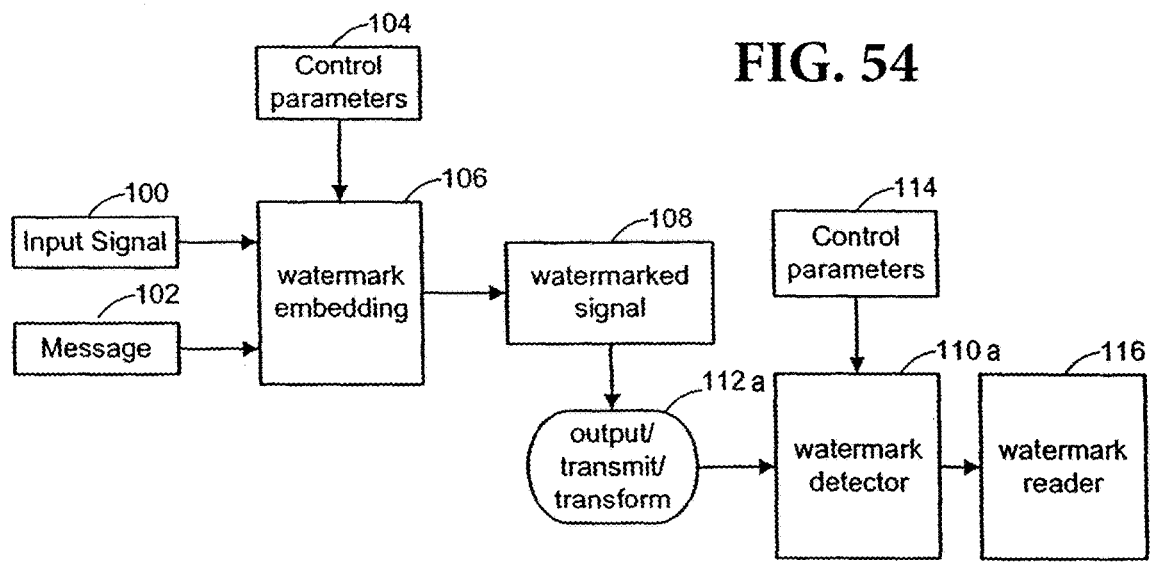
FIG. 54 is a block diagram illustrating a watermark system.

FIG. 54 is a block diagram summarizing signal processing operations involved in embedding and reading a watermark. There are three primary inputs to the embedding process: the original, digitized signal 100, the message 102, and a series of control parameters 104. The control parameters may include one or more keys. One key or set of keys may be used to encrypt the message. Another key or set of keys may be used to control the generation of a watermark carrier signal or a mapping of information bits in the message to positions in a watermark information signal.

The carrier signal or mapping of the message to the host signal may be encrypted as well. Such encryption may increase security by varying the carrier or mapping for different components of the watermark or watermark message. Similarly, if the watermark or watermark message is redundantly encoded throughout the host signal, one or more encryption keys can be used to scramble the carrier or signal mapping for each instance of the redundantly encoded watermark. This use of encryption provides one way to vary the encoding of each instance of the redundantly encoded message in the host signal. Other parameters may include control bits added to the message, and watermark signal attributes (e.g., orientation or other detection patterns) used to assist in the detection of the watermark.

Apart from encrypting or scrambling the carrier and mapping information, the embedder may apply different, and possibly unique carrier or mapping for different components of a message, for different messages, or from different watermarks or watermark components to be embedded in the host signal. For example, one watermark may be encoded in a block of samples with one carrier, while another, possibly different watermark, is encoded in a different block with a different carrier. A similar approach is to use different mappings in different blocks of the host signal.

The watermark embedding process 106 converts the message to a watermark information signal. It then combines this signal with the input signal and possibly another signal (e.g., an orientation pattern) to create a watermarked signal 108. The process of combining the watermark with the input signal may be a linear or non-linear function. Examples of watermarking functions include: $S^*=S+gX$; $S^*=S(1+gX)$; and $S^*=S\ e^{gX}$; where $S^*$ is the watermarked signal vector, S is the input signal vector, and g is a function controlling watermark intensity. The watermark may be applied by modulating signal samples S in the spatial, temporal or some other transform domain.

To encode a message, the watermark encoder analyzes and selectively adjusts the host signal to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

Some processes for combining the watermark with the input signal are termed non-linear, such as processes that employ dither modulation, modify least significant bits, or apply quantization index modulation. One type of non-linear modulation is where the embedder sets signal values so that they have some desired value or characteristic corresponding to a message symbol. For example, the embedder may designate that a portion of the host signal is to encode a given bit value. It then evaluates a signal value or set of values in that portion to determine whether they have the attribute corresponding to the message bit to be encoded. Some examples of attributes include a positive or negative polarity, a value that is odd or even, a checksum, etc. For example, a bit value may be encoded as a one or zero by quantizing the value of a selected sample to be even or odd. As another example, the embedder might compute a checksum or parity of an N bit pixel value or transform coefficient and then set the least significant bit to the value of the checksum or parity. Of course, if the signal already corresponds to the desired message bit value, it need not be altered. The same approach can be extended to a set of signal samples where some attribute of the set is adjusted as necessary to encode a desired message symbol. These techniques can be applied to signal samples in a transform domain (e.g., transform coefficients) or samples in the temporal or spatial domains.

Quantization index modulation techniques employ a set of quantizers. In these techniques, the message to be transmitted is used as an index for quantizer selection. In the decoding process, a distance metric is evaluated for all quantizers and the index with the smallest distance identifies the message value.

The watermark detector 110a operates on a digitized signal suspected of containing a watermark. As depicted generally in FIG. 54, the suspect signal may undergo various transformations 112a, such as conversion to and from an analog domain, cropping, copying, editing, compression/decompression, transmission etc. Using parameters 114 from the embedder (e.g., orientation pattern, control bits, key(s)), it performs a series of correlation or other operations on the captured image to detect the presence of a watermark. If it finds a watermark, it determines its orientation within the suspect signal.

Using the orientation, if necessary, the reader 116 extracts the message. Some implementations do not perform correlation, but instead, use some other detection process or proceed directly to extract the watermark signal. For instance in some applications, a reader may be invoked one or more times at various temporal or spatial locations in an attempt to read the watermark, without a separate pre-processing stage to detect the watermark's orientation.

Some implementations require the original, un-watermarked signal to decode a watermark message, while others do not. In those approaches where the original signal is not necessary, the original un-watermarked signal can still be used to improve the accuracy of message recovery. For example, the original signal can be removed, leaving a residual signal from which the watermark message is recovered. If the decoder does not have the original signal, it can still attempt to remove portions of it (e.g., by filtering) that are expected not to contain the watermark signal.

Watermark decoder implementations use known relationships between a watermark signal and a message symbol to extract estimates of message symbol values from a signal suspected of containing a watermark. The decoder has knowledge of the properties of message symbols and how and where they are encoded into the host signal to encode a message. For example, it knows how message bit values of one and a zero are encoded and it knows where these message bits are originally encoded. Based on this information, it can look for the message properties in the watermarked signal. For example, it can test the watermarked signal to see if it has attributes of each message symbol (e.g., a one or zero) at a particular location and generate a probability measure as an indicator of the likelihood that a message symbol has been encoded. Knowing the approximate location of the watermark in the watermarked signal, the reader implementation may compare known message properties with the properties of the watermarked signal to estimate message values, even if the original signal is unavailable. Distortions to the watermarked signal and the host signal itself make the watermark difficult to recover, but accurate recovery of the message can be enhanced using a variety of techniques, such as error correction coding, watermark signal prediction, redundant message encoding, etc.

One way to recover a message value from a watermarked signal is to perform correlation between the known message property of each message symbol and the watermarked signal. If the amount of correlation exceeds a threshold, for example, then the watermarked signal may be assumed to contain the message symbol. The same process can be repeated for different symbols at various locations to extract a message. A symbol (e.g., a binary value of one or zero) or set of symbols may be encoded redundantly to enhance message recovery.

In some cases, it is useful to filter the watermarked signal to remove aspects of the signal that are unlikely to be helpful in recovering the message and/or are likely to interfere with the watermark message. For example, the decoder can filter out portions of the original signal and another watermark signal or signals. In addition, when the original signal is unavailable, the reader can estimate or predict the original signal based on properties of the watermarked signal. The original or predicted version of the original signal can then be used to recover an estimate of the watermark message. One way to use the predicted version to recover the watermark is to remove the predicted version before reading the desired watermark. Similarly, the decoder can predict and remove un-wanted watermarks or watermark components before reading the desired watermark in a signal having two or more watermarks.

B. Image Watermark Embedder

Figure 55:
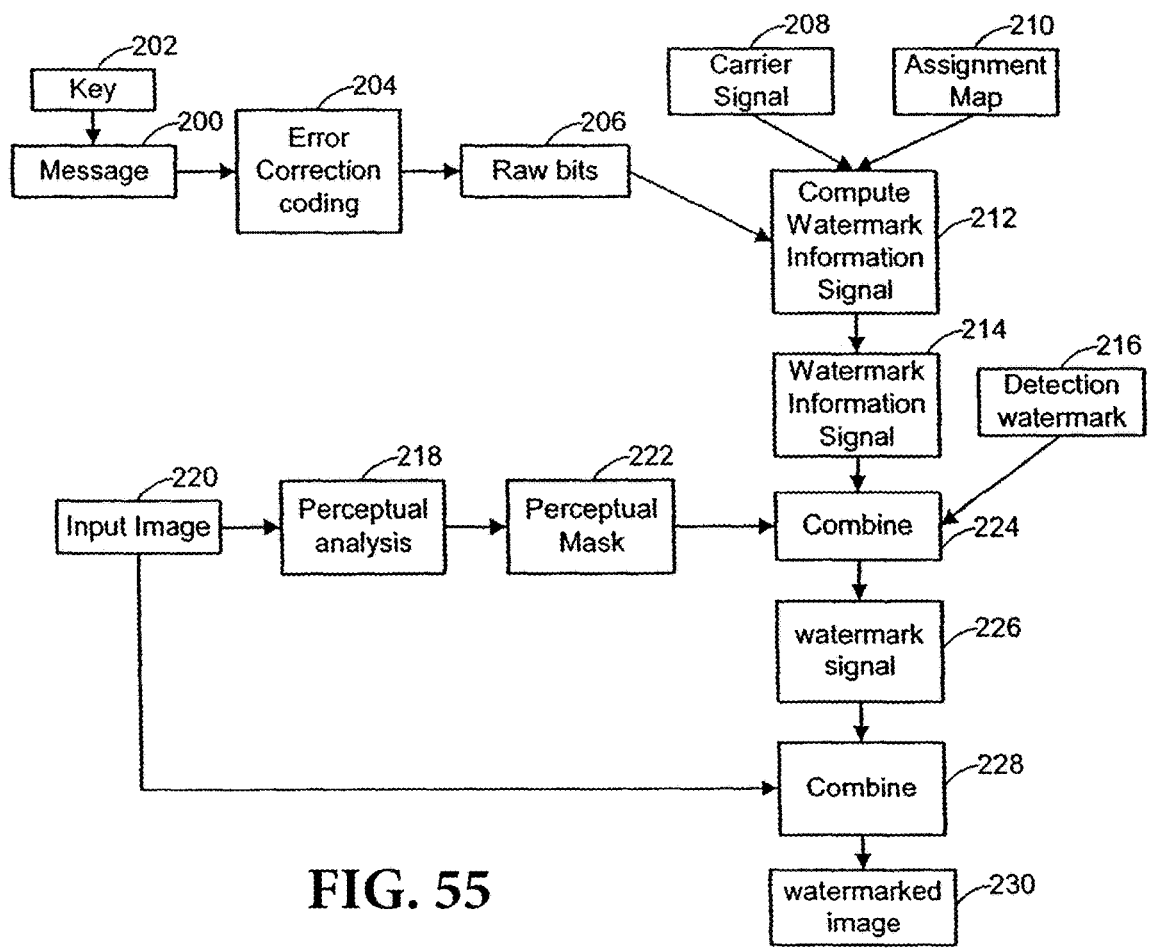
FIG. 55 is a block diagram illustrating a watermark embedder.

FIG. 55 is a block diagram illustrating an implementation of an exemplary embedder in more detail. The embedding process begins with the message 200. As noted above, the message is binary number suitable for conversion to a watermark signal. For additional security, the message, its carrier, and the mapping of the watermark to the host signal may be encrypted with an encryption key 202. In addition to the information conveyed in the message, the embedder may also add control bit values ("signature bits") to the message to assist in verifying the accuracy of a read operation. These control bits, along with the bits representing the message, are input to an error correction coding process 204 designed to increase the likelihood that the message can be recovered accurately in the reader.

There are several alternative error correction coding schemes that may be employed. Some examples include BCH, convolution, Reed Solomon and turbo codes. These forms of error correction coding are sometimes used in communication applications where data is encoded in a carrier signal that transfers the encoded data from one place to another. In the digital watermarking application discussed here, the raw bit data is encoded in a fundamental carrier signal.

In addition to the error correction coding schemes mentioned above, the embedder and reader may also use a Cyclic Redundancy Check (CRC) to facilitate detection of errors in the decoded message data.

The error correction coding function 204 produces a string of bits, termed raw bits 206, that are embedded into a watermark information signal. Using a carrier signal 208 and an assignment map 210, the illustrated embedder encodes the raw bits in a watermark information signal 212, 214. In some applications, the embedder may encode a different message in different locations of the signal. The carrier signal may be a noise image. For each raw bit, the assignment map specifies the corresponding image sample or samples that will be modified to encode that bit.

The embedder depicted in FIG. 55 operates on blocks of image data (referred to as 'tiles') and replicates a watermark in each of these blocks. As such, the carrier signal and assignment map both correspond to an image block of a pre-determined size, namely, the size of the tile. To encode each bit, the embedder applies the assignment map to determine the corresponding image samples in the block to be modified to encode that bit. Using the map, it finds the corresponding image samples in the carrier signal. For each bit, the embedder computes the value of image samples in the watermark information signal as a function of the raw bit value and the value(s) of the corresponding samples in the carrier signal.

To illustrate the embedding process further, it is helpful to consider an example. First, consider the following background. Digital watermarking processes are sometimes described in terms of the transform domain in which the watermark signal is defined. The watermark may be defined in the spatial or temporal domain, or some other transform domain such as a wavelet transform, Discrete Cosine Transform (DCT), Discrete Fourier Transform (DFT), Hadamard transform, Hartley transform, Karhunen-Loeve transform (KLT) domain, etc.

Consider an example where the watermark is defined in a transform domain (e.g., a frequency domain such as DCT, wavelet or DFT). The embedder segments the image in the spatial domain into rectangular tiles and transforms the image samples in each tile into the transform domain. For example in the DCT domain, the embedder segments the image into N by N blocks and transforms each block into an N by N block of DCT coefficients. In this example, the assignment map specifies the corresponding sample location or locations in the frequency domain of the tile that correspond to a bit position in the raw bits. In the frequency domain, the carrier signal looks like a noise pattern. Each image sample in the frequency domain of the carrier signal is used together with a selected raw bit value to compute the value of the image sample at the location in the watermark information signal.

Now consider an example where the watermark is defined in the spatial domain. The embedder segments the image in the spatial domain into rectangular tiles of image samples (i.e. pixels). In this example, the assignment map specifies the corresponding sample location or locations in the tile that correspond to each bit position in the raw bits. In the spatial domain, the carrier signal looks like a noise pattern extending throughout the tile. Each image sample in the spatial domain of the carrier signal is used together with a selected raw bit value to compute the value of the image sample at the same location in the watermark information signal.

With this background, the embedder proceeds to encode each raw bit in the selected transform domain as follows. It uses the assignment map to look up the position of the corresponding image sample (or samples) in the carrier signal. The image sample value at that position in the carrier controls the value of the corresponding position in the watermark information signal. In particular, the carrier sample value indicates whether to invert the corresponding watermark sample value. The raw bit value is either a one or zero. Disregarding for a moment the impact of the carrier signal, the embedder adjusts the corresponding watermark sample upward to represent a one, or downward to represent a zero. Now, if the carrier signal indicates that the corresponding sample should be inverted, the embedder adjusts the watermark sample downward to represent a one, and upward to represent a zero. In this manner, the embedder computes the value of the watermark samples for a raw bit using the assignment map to find the spatial location of those samples within the block.

From this example, a number of points can be made. First, the embedder may perform a similar approach in any other transform domain. Second, for each raw bit, the corresponding watermark sample or samples are some function of the raw bit value and the carrier signal value. The specific mathematical relationship between the watermark sample, on one hand, and the raw bit value and carrier signal, on the other, may vary with the implementation. For example, the message may be convolved with the carrier, multiplied with the carrier, added to the carrier, or applied based on another non-linear function. Third, the carrier signal may remain constant for a particular application, or it may vary from one message to another. For example, a secret key may be used to generate the carrier signal. For each raw bit, the assignment map may define a pattern of watermark samples in the transform domain in which the watermark is defined. An assignment map that maps a raw bit to a sample location or set of locations (i.e. a map to locations in a frequency or spatial domain) is just one special case of an assignment map for a transform domain. Fourth, the assignment map may remain constant, or it may vary from one message to another. In addition, the carrier signal and map may vary depending on the nature of the underlying image. In sum, there many possible design choices within the implementation framework described above.

The embedder depicted in FIG. 55 combines another watermark component, shown as the detection watermark 216, with the watermark information signal to compute the final watermark signal. The detection watermark is specifically chosen to assist in identifying the watermark and computing its orientation in a detection operation.

Figure 56:
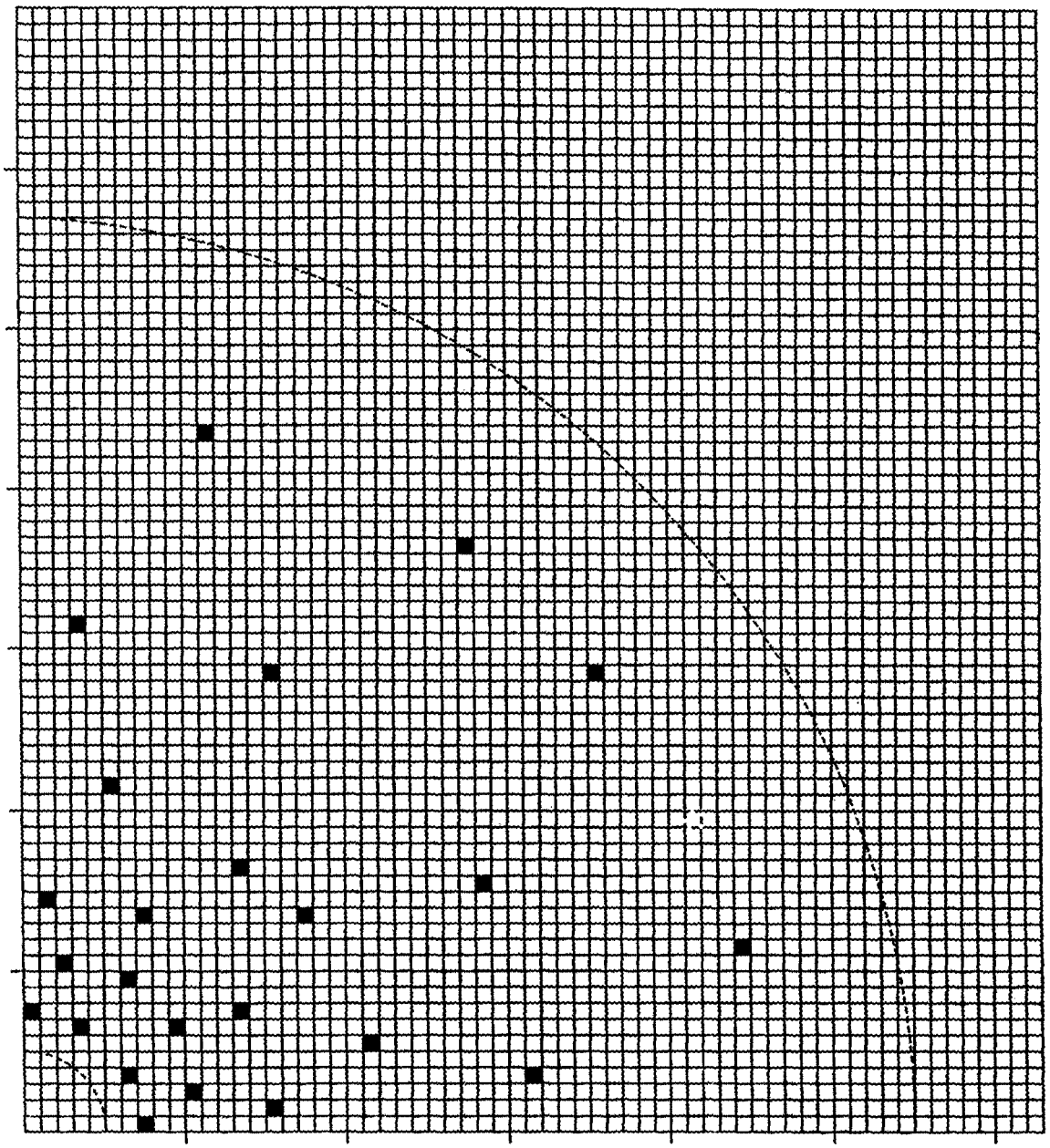
FIG. 56 is a spatial frequency domain plot of a watermark orientation signal.

FIG. 56 is a spatial frequency plot illustrating one quadrant of a detection watermark. The points in the plot represent impulse functions indicating signal content of the detection watermark signal. The pattern of impulse functions for the illustrated quadrant is replicated in all four quadrants. There are a number of properties of the detection pattern that impact its effectiveness for a particular application. The selection of these properties is highly dependent on the application. One property is the extent to which the pattern is symmetric about one or more axes. For example, if the detection pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in an image, and aids in extracting the rotation angle. However, in the case of an octally symmetric pattern, the detector includes an additional step of testing which of the four quadrants the orientation angle falls into.

Another criterion is the position of the impulse functions and the frequency range that they reside in. Preferably, the impulse functions fall in a mid frequency range. If they are located in a low frequency range, they may be noticeable in the watermarked image. If they are located in the high frequency range, they are more difficult to recover. Also, they should be selected so that scaling, rotation, and other manipulations of the watermarked signal do not push the impulse functions outside the range of the detector. Finally, the impulse functions should preferably not fall on the vertical or horizontal axes, and each impulse function should have a unique horizontal and vertical location. While the example depicted in FIG. 56 shows that some of the impulse functions fall on the same horizontal axis, it is trivial to alter the position of the impulse functions such that each has a unique vertical or horizontal coordinate.

Returning to FIG. 55, the embedder makes a perceptual analysis 218 of the input image 220 to identify portions of the image that can withstand more watermark signal content without substantially impacting image fidelity. Generally, the perceptual analysis employs a HVS model to identify signal frequency bands and/or spatial areas to increase or decrease watermark signal intensity to make the watermark imperceptible to an ordinary observer. One type of model is to increase watermark intensity in frequency bands and spatial areas where there is more image activity. In these areas, the sample values are changing more than other areas and have more signal strength. The output of the perceptual analysis is a perceptual mask 222. The mask may be implemented as an array of functions, which selectively increase the signal strength of the watermark signal based on a HVS model analysis of the input image. The mask may selectively increase or decrease the signal strength of the watermark signal in areas of greater signal activity.

The embedder combines (224) the watermark information, the detection signal and the perceptual mask to yield the watermark signal 226. Finally, it combines (228) the input image 220 and the watermark signal 226 to create the watermarked image 230. In the frequency domain watermark example above, the embedder combines the transform domain coefficients in the watermark signal to the corresponding coefficients in the input image to create a frequency domain representation of the watermarked image. It then transforms the image into the spatial domain. As an alternative, the embedder may be designed to convert the watermark into the spatial domain, and then add it to the image.

In the spatial watermark example above, the embedder combines the image samples in the watermark signal to the corresponding samples in the input image to create the watermarked image 230.

The embedder may employ an invertible or non-invertible, and linear or non-linear function to combine the watermark signal and the input image (e.g., linear functions such as S*=S+gX; or S*=S(1+gX), convolution, quantization index modulation). The net effect is that some image samples in the input image are adjusted upward, while others are adjusted downward. The extent of the adjustment is greater in areas or subbands of the image having greater signal activity.

C. Overview of a Detector and Reader

Figures 57, 58:
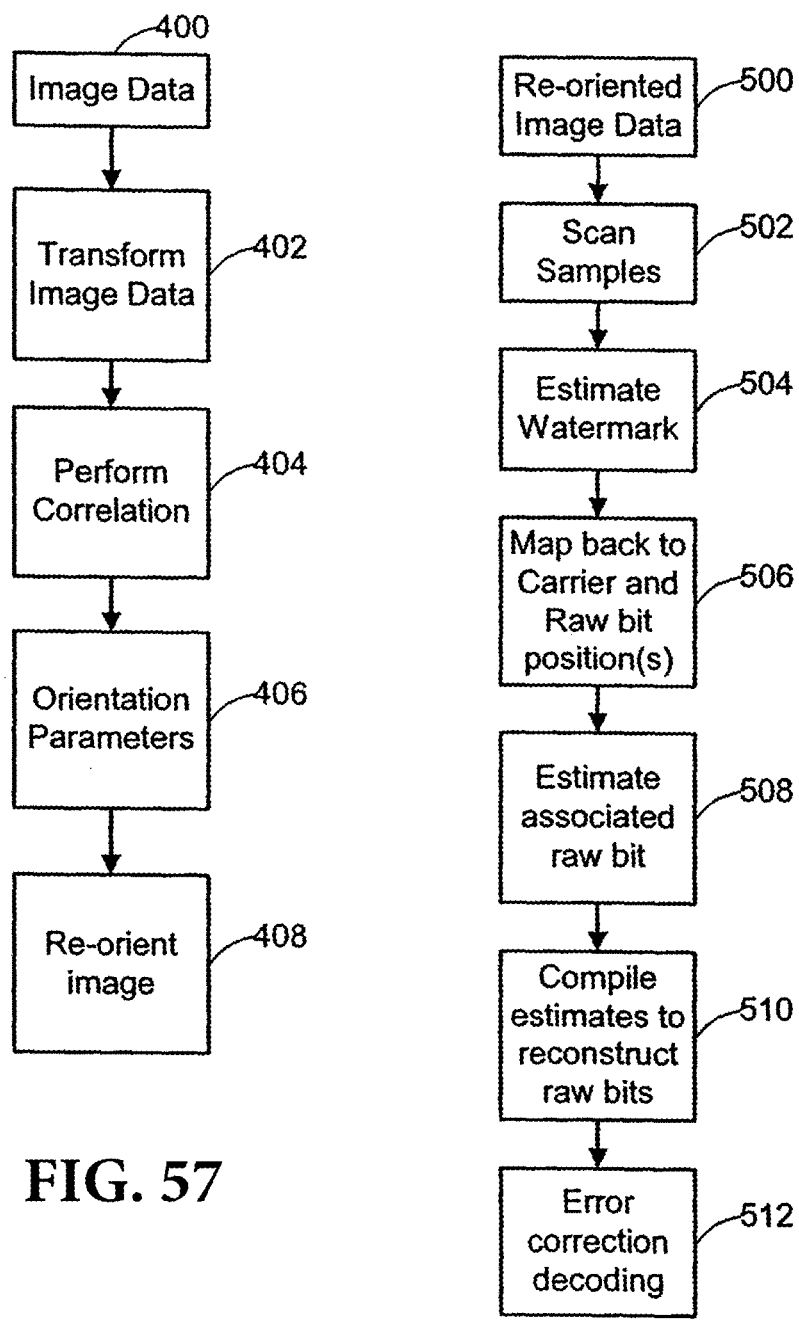
FIG. 57 is a flow diagram of a process for detecting a watermark signal in an image and computing its orientation within the image.
FIG. 58 is a flow diagram of a process reading a message encoded in a watermark.

FIG. 57 is a flow diagram illustrating an overview of a watermark detection process. This process analyzes image data 400 to search for an orientation pattern of a watermark in an image suspected of containing the watermark (the target image). First, the detector transforms the image data to another domain 402, namely the spatial frequency domain, and then performs a series of correlation or other detection operations 404. The correlation operations match the orientation pattern with the target image data to detect the presence of the watermark and its orientation parameters 406 (e.g., translation, scale, rotation, and differential scale relative to its original orientation). Finally, it re-orients the image data based on one or more of the orientation parameters 408.

If the orientation of the watermark is recovered, the reader extracts the watermark information signal from the image data (optionally by first re-orienting the data based on the orientation parameters). FIG. 58 is flow diagram illustrating a process of extracting a message from re-oriented image data 500. The reader scans the image samples (e.g., pixels or transform domain coefficients) of the re-oriented image (502), and uses known attributes of the watermark signal to estimate watermark signal values 504. Recall that in one example implementation described above, the embedder adjusted sample values (e.g., frequency coefficients, color values, etc.) up or down to embed a watermark information signal. The reader uses this attribute of the watermark information signal to estimate its value from the target image. Prior to making these estimates, the reader may filter the image to remove portions of the image signal that may interfere with the estimating process. For example, if the watermark signal is expected to reside in low or medium frequency bands, then high frequencies may be filtered out.

In addition, the reader may predict the value of the original un-watermarked image to enhance message recovery. One form of prediction uses temporal or spatial neighbors to estimate a sample value in the original image. In the frequency domain, frequency coefficients of the original signal can be predicted from neighboring frequency coefficients in the same frequency subband. In video applications for example, a frequency coefficient in a frame can be predicted from spatially neighboring coefficients within the same frame, or temporally neighboring coefficients in adjacent frames or fields. In the spatial domain, intensity values of a pixel can be estimated from intensity values of neighboring pixels. Having predicted the value of a signal in the original, un-watermarked image, the reader then estimates the watermark signal by calculating an inverse of the watermarking function used to combine the watermark signal with the original signal.

For such watermark signal estimates, the reader uses the assignment map to find the corresponding raw bit position and image sample in the carrier signal (506). The value of the raw bit is a function of the watermark signal estimate, and the carrier signal at the corresponding location in the carrier. To estimate the raw bit value, the reader solves for its value based on the carrier signal and the watermark signal estimate. As reflected generally in FIG. 58 (508), the result of this computation represents only one estimate to be analyzed along with other estimates impacting the value of the corresponding raw bit. Some estimates may indicate that the raw bit is likely to be a one, while others may indicate that it is a zero. After the reader completes its scan, it compiles the estimates for each bit position in the raw bit string, and makes a determination of the value of each bit at that position (510). Finally, it performs the inverse of the error correction coding scheme to construct the message (512). In some implementations, probabilistic models may be employed to determine the likelihood that a particular pattern of raw bits is just a random occurrence rather than a watermark.

D. Example Illustrating Detector Process

Figure 59:
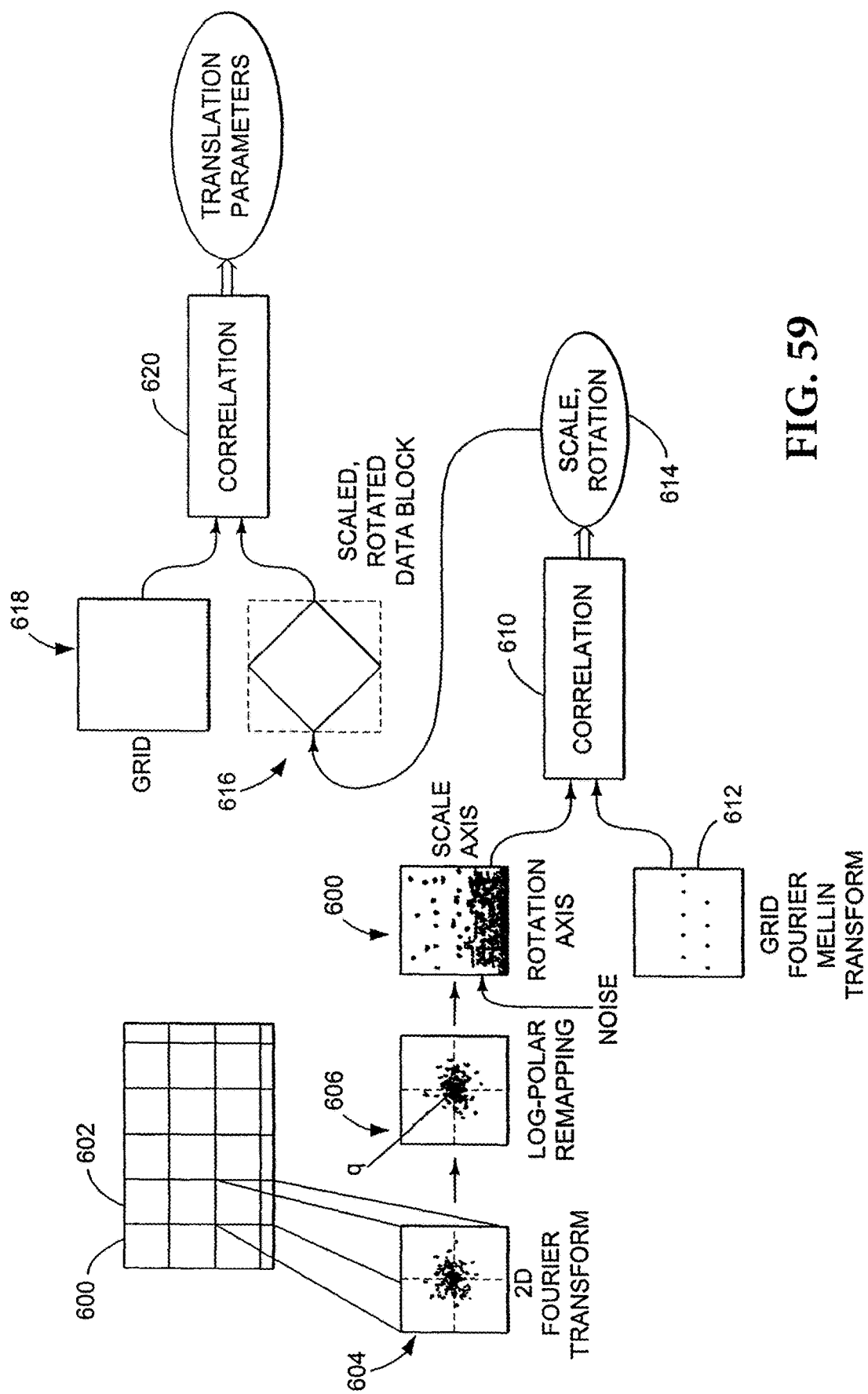
FIG. 59 is a diagram depicting an example of a watermark detection process.

FIG. 59 is a diagram depicting an example of a watermark detection process. The detector segments the target image into blocks (e.g., 600, 602) and then performs a 2-dimensional fast Fourier transform (2D FFT) on several blocks. This process yields 2D transforms of the magnitudes of the image contents of the blocks in the spatial frequency domain as depicted in the plot 604 shown in FIG. 59.

Next, the detector process performs a log polar remapping of each transformed block. The detector may add some of the blocks together to increase the watermark signal to noise ratio. The type of remapping in this implementation is referred to as a Fourier Mellin transform. The Fourier Mellin transform is a geometric transform that warps the image data from a frequency domain to a log polar coordinate system. As depicted in the plot 606 shown in FIG. 59, this transform sweeps through the transformed image data along a line at angle theta., mapping the data to a log polar coordinate system shown in the next plot 608. The log polar coordinate system has a rotation axis, representing the angle.theta., and a scale axis. Inspecting the transformed data at this stage, one can see the orientation pattern of the watermark begin to be distinguishable from the noise component (i.e., the image signal).

Next, the detector performs a correlation 610 between the transformed image block and the transformed orientation pattern 612. At a high level, the correlation process slides the orientation pattern over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. As explained further below, these candidates may be subjected to one or more additional correlation stages to select the one that provides the best match.

There are a variety of ways to implement the correlation process. Any number of generalized matching filters may be implemented for this purpose. One such filter performs an FFT on the target and the orientation pattern, and multiplies the resulting arrays together to yield a multiplied FFT. Finally, it performs an inverse FFT on the multiplied FFT to return the data into its original log-polar domain. The position or positions within this resulting array with the highest magnitude represent the candidates with the highest correlation.

When there are several viable candidates, the detector can select a set of the top candidates and apply an additional correlation stage. Each candidate has a corresponding rotation and scale parameter. The correlation stage rotates and scales the FFT of the orientation pattern and performs a matching operation with the rotated and scaled pattern on the FFT of the target image. The matching operation multiplies the values of the transformed pattern with sample values at corresponding positions in the target image and accumulates the result to yield a measure of the correlation. The detector repeats this process for each of the candidates and picks the one with the highest measure of correlation. As shown in FIG. 59, the rotation and scale parameters (614) of the selected candidate are then used to find additional parameters that describe the orientation of the watermark in the target image.

The detector applies the scale and rotation to the target data block 616 and then performs another correlation process between the orientation pattern 618 and the scaled and rotated data block 616. The correlation process 620 is a generalized matching filter operation. It provides a measure of correlation for an array of positions that each has an associated translation parameter (e.g., an x, y position). Again, the detector may repeat the process of identifying promising candidates (i.e. those that reflect better correlation relative to others) and using those in an additional search for a parameter or set of orientation parameters that provide a better measure of correlation.

At this point, the detector has recovered the following orientation parameters: rotation, scale and translation. For many applications, these parameters may be sufficient to enable accurate reading of the watermark. In the read operation, the reader applies the orientation parameters to re-orient the target image and then proceeds to extract the watermark signal.

In some applications, the watermarked image may be stretched more in one spatial dimension than another. This type of distortion is sometimes referred to as differential scale or shear. Consider that the original image blocks are square. As a result of differential scale, each square may be warped into a parallelogram with unequal sides. Differential scale parameters define the nature and extent of this stretching.

There are several alternative ways to recover the differential scale parameters. One general class of techniques is to use the known parameters (e.g., the computed scale, rotation, and translation) as a starting point to find the differential scale parameters. Assuming the known parameters to be valid, this approach warps either the orientation pattern or the target image with selected amounts of differential scale and picks the differential scale parameters that yield the best correlation.

Another approach to determination of differential scale is set forth in patent application Ser. No. 09/452,022 (filed Nov. 30, 1999), and entitled Method and System for Determining Image Transformation.

E. Example Illustrating Reader Process

Figure 60:
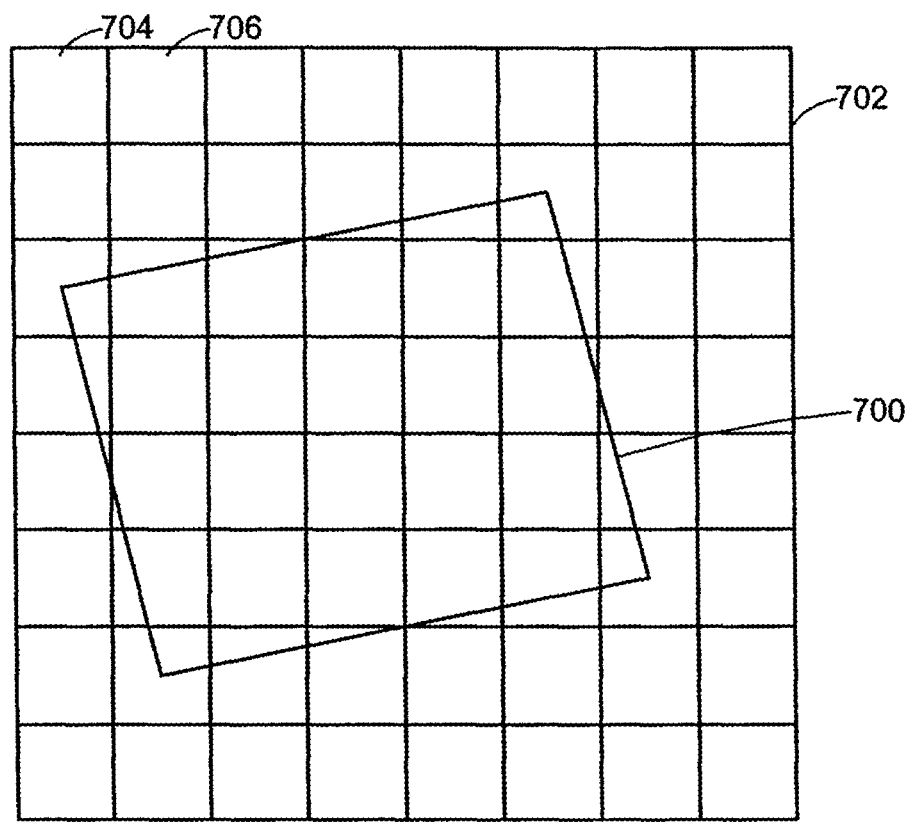
FIG. 60 is a diagram depicting the orientation of a transformed image superimposed over the original orientation of the image at the time of watermark encoding.

FIG. 60 is a diagram illustrating a re-oriented image 700 superimposed onto the original watermarked image 702. The difference in orientation and scale shows how the image was transformed and edited after the embedding process. The original watermarked image is sub-divided into tiles (e.g., pixel blocks 704, 706, etc.). When superimposed on the coordinate system of the original image 702 shown in FIG. 60, the target image blocks typically do not match the orientation of the original blocks.

The reader scans samples of the re-oriented image data, estimating the watermark information signal. It estimates the watermark information signal, in part, by predicting original sample values of the un-watermarked image. The reader then uses an inverted form of the watermarking function to estimate the watermark information signal from the watermarked signal and the predicted signal. This inverted watermarking function expresses the estimate of the watermark signal as a function of the predicted signal and the watermarked signal. Having an estimate of the watermark signal, it then uses the known relationship among the carrier signal, the watermark signal, and the raw bit to compute an estimate of the raw bit. Recall that samples in the watermark information signal are, a function of the carrier signal and the raw bit value. Thus, the reader may invert this function to solve for an estimate of the raw bit value.

Recall that the embedder implementation discussed in connection with FIG. 55 redundantly encodes the watermark information signal in blocks of the input signal. Each raw bit may map to several samples within a block. In addition, the embedder repeats a mapping process for each of the blocks. As such, the reader generates several estimates of the raw bit value as it scans the watermarked image.

The information encoded in the raw bit string can be used to increase the accuracy of read operations. For instance, some of the raw bits act as signature bits that perform a validity checking function. Unlike unknown message bits, the reader knows the expected values of these signature bits. The reader can assess the validity of a read operation based on the extent to which the extracted signature bit values match the expected signature bit values. The estimates for a given raw bit value can then be given a higher weight depending on whether they are derived from a tile with a greater measure of validity.

F. Embedder Implementation

Figure 61:
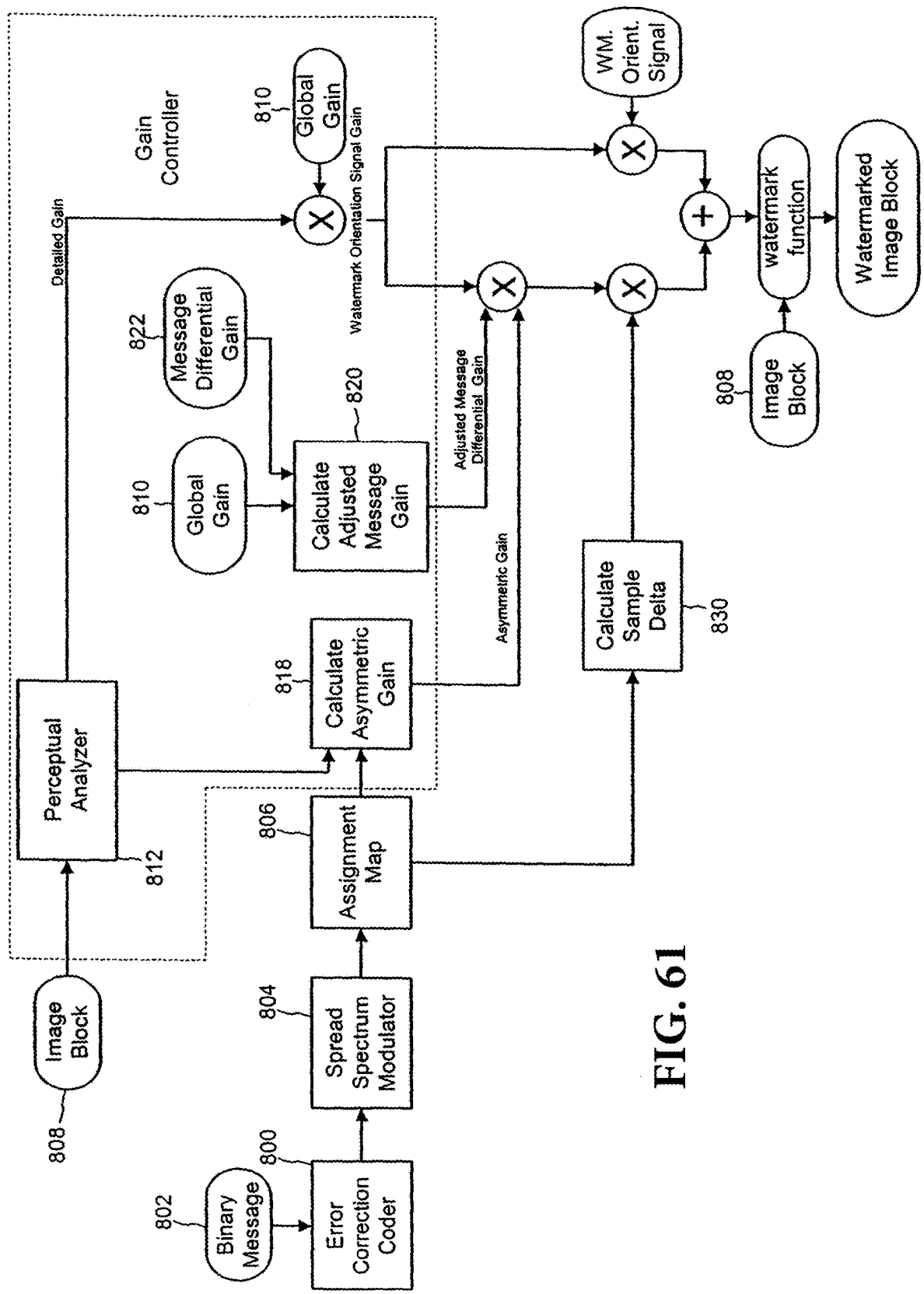
FIG. 61 is a diagram illustrating an implementation of a watermark embedder.

The following sections describe an implementation of the digital image watermark embedder depicted in FIG. 61. The embedder inserts two watermark components into the host image: a message component and a detection component (called the orientation pattern). The message component is defined in a spatial domain or other transform domain, while the orientation pattern is defined in a frequency domain. As explained later, the message component serves a dual function of conveying a message and helping to identify the watermark location in the image.

The embedder inserts the watermark message and orientation pattern in blocks of a selected color plane or planes (e.g., luminance or chrominance plane) of the host image. The message payload varies from one application to another, and can range from a single bit to the number of image samples in the domain in which it is embedded. The blocks may be blocks of samples in a spatial domain or some other transform domain.

G. Encoding the Message

The embedder converts binary message bits into a series of binary raw bits that it hides in the host image. As part of this process, a message encoder 800 appends certain known bits to the message bits 802. It performs an error detection process (e.g., parity, Cyclic Redundancy Check (CRC), etc.) to generate error detection bits and adds the error detection bits to the message. An error correction coding operation then generates raw bits from the combined known and message bit string.

For the error correction operation, the embedder may employ any of a variety of error correction codes such as Reed Solomon, BCH, convolution or turbo codes. The encoder may perform an M-ary modulation process on the message bits that maps groups of message bits to a message signal based on an M-ary symbol alphabet.

In one application of the embedder, the component of the message representing the known bits is encoded more redundantly than the other message bits. This is an example of a shorter message component having greater signal strength than a longer, weaker message component. The embedder gives priority to the known bits in this scheme because the reader uses them to verify that it has found the watermark in a potentially corrupted image, rather than a signal masquerading as the watermark.

H. Spread Spectrum Modulation

The embedder uses spread spectrum modulation as part of the process of creating a watermark signal from the raw bits. A spread spectrum modulator 804 spreads each raw bit into a number of "chips." The embedder generates a pseudo random number that acts as the carrier signal of the message. To spread each raw bit, the modulator performs an exclusive OR (XOR) operation between the raw bit and each bit of a pseudo random binary number of a pre-determined length. The length of the pseudo random number depends, in part, on the size of the message and the image. Preferably, the pseudo random number should contain roughly the same number of zeros and ones, so that the net effect of the raw bit on the host image block is zero. If a bit value in the pseudo random number is a one, the value of the raw bit is inverted. Conversely, if the bit value is a zero, then the value of the raw bit remains the same.

The length of the pseudorandom number may vary from one message bit or symbol to another. By varying the length of the number, some message bits can be spread more than others.

I. Scattering the Watermark Message

The embedder scatters each of the chips corresponding to a raw bit throughout an image block. An assignment map 806 assigns locations in the block to the chips of each raw bit. Each raw bit is spread over several chips. As noted above, an image block may represent a block of transform domain coefficients or samples in a spatial domain. The assignment map may be used to encode some message bits or symbols (e.g., groups of bits) more redundantly than others by mapping selected bits to more locations in the host signal than other message bits. In addition, it may be used to map different messages, or different components of the same message, to different locations in the host signal.

Figure 62:
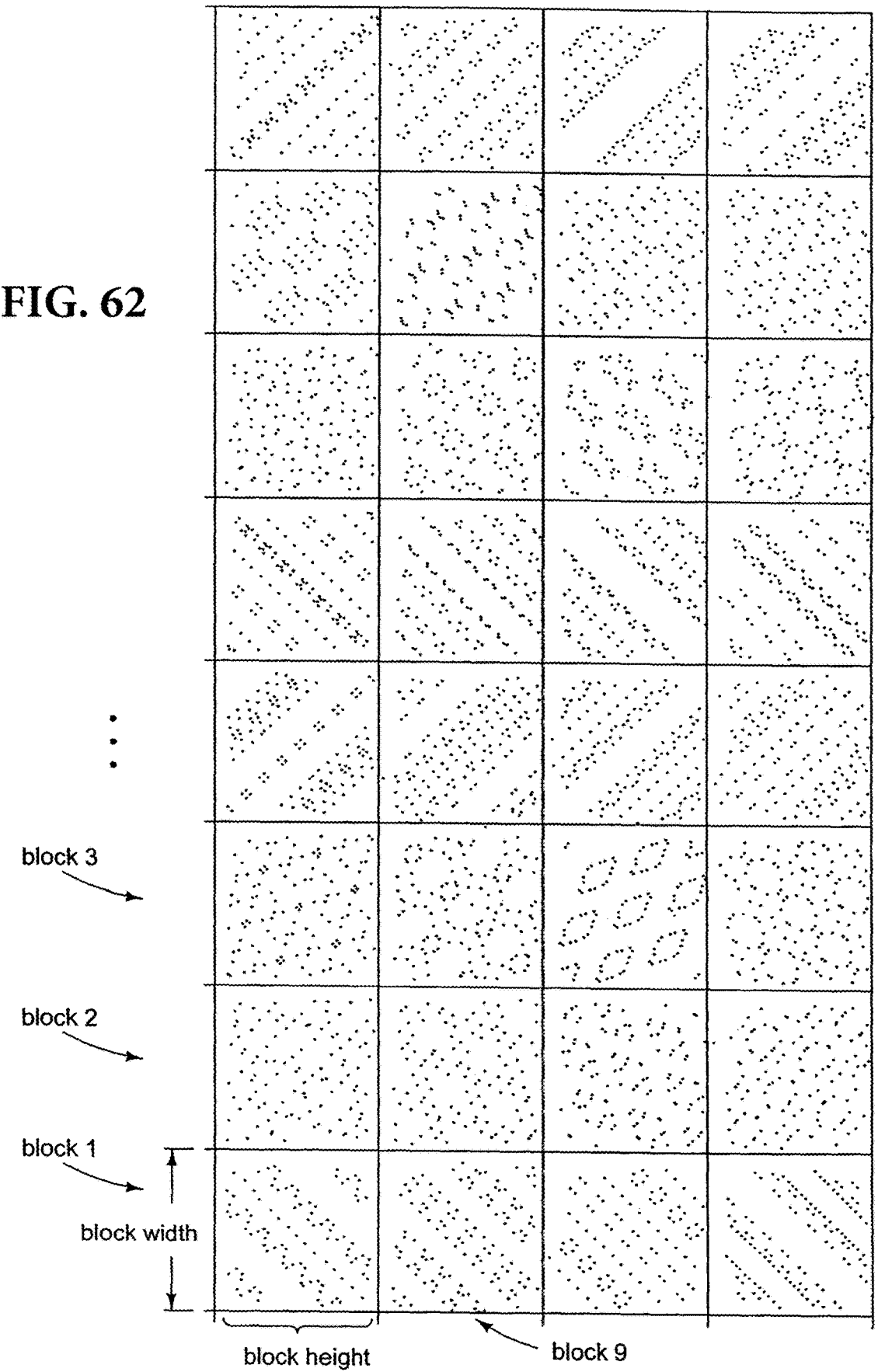
FIG. 62 is a diagram depicting an assignment map used to map raw bits in a message to locations within a host image.

FIG. 62 depicts an example of the assignment map. Each of the blocks in FIG. 62 correspond to an image block and depict a pattern of chips corresponding to a single raw bit. FIG. 62 depicts a total of 32 example blocks. The pattern within a block is represented as black dots on a white background. Each of the patterns is mutually exclusive such that each raw bit maps to a pattern of unique locations relative to the patterns of every other raw bit. Though not a requirement, the combined patterns, when overlapped, cover every location within the image block.

J. Gain Control and Perceptual Analysis

To insert the information carried in a chip to the host image, the embedder alters the corresponding sample value in the host image. In particular, for a chip having a value of one, it adds to the corresponding sample value, and for a chip having a value of zero, it subtracts from the corresponding sample value. A gain controller in the embedder adjusts the extent to which each chip adds or subtracts from the corresponding sample value.

The gain controller takes into account the orientation pattern when determining the gain. It applies a different gain to the orientation pattern than to the message component of the watermark. After applying the gain, the embedder combines the orientation pattern and message components together to form the composite watermark signal, and combines the composite watermark with the image block. One way to combine these signal components is to add them, but other linear or non-linear functions may be used as well.

Figure 63:
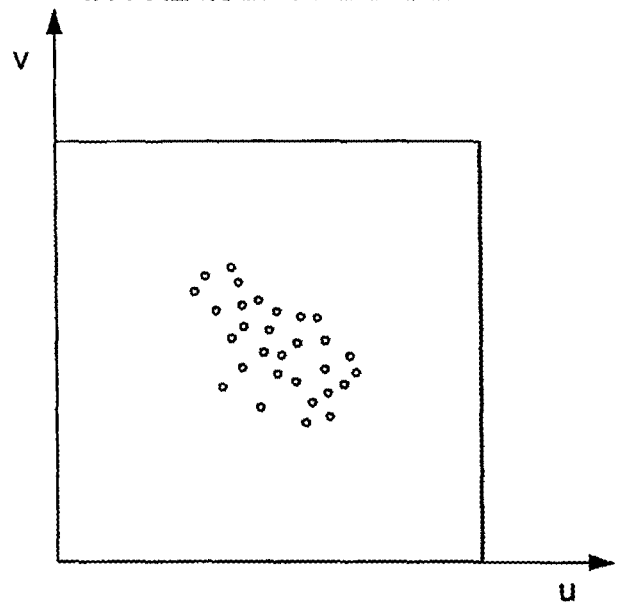
FIG. 63 illustrates an example of a watermark orientation signal in a spatial frequency domain.
Figure 64:
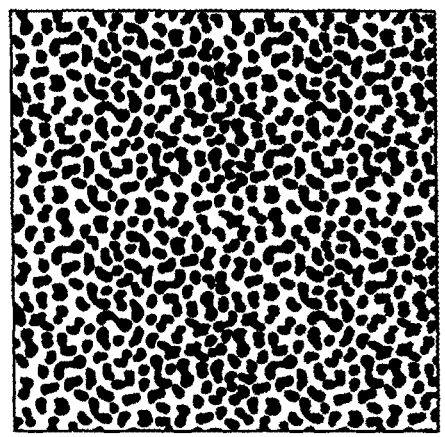
FIG. 64 illustrates the orientation signal shown in FIG. 63 in the spatial domain.

The orientation pattern is comprised of a pattern of quad symmetric impulse functions in the spatial frequency domain. In the spatial domain, these impulse functions look like cosine waves. An example of the orientation pattern is depicted in FIGS. 63 and 64. FIG. 63 shows the impulse functions as points in the spatial frequency domain, while FIG. 64 shows the orientation pattern in the spatial domain. Before adding the orientation pattern component to the message component, the embedder may transform the watermark components to a common domain. For example, if the message component is in a spatial domain and the orientation component is in a frequency domain, the embedder transforms the orientation component to a common spatial domain before combining them together.

FIG. 61 depicts the gain controller used in the embedder. Note that the gain controller operates on the blocks of image samples 808, the message watermark signal, and a global gain input 810, which may be specified by the user. A perceptual analyzer component 812 of the gain controller performs a perceptual analysis on the block to identify samples that can tolerate a stronger watermark signal without substantially impacting visibility. In places where the naked eye is less likely to notice the watermark, the perceptual analyzer increases the strength of the watermark. Conversely, it decreases the watermark strength where the eye is more likely to notice the watermark.

The perceptual analyzer shown in FIG. 61 performs a series of filtering operations on the image block to compute an array of gain values. There are a variety of filters suitable for this task. These filters include an edge detector filter that identifies edges of objects in the image, a non-linear filter to map gain values into a desired range, and averaging or median filters to smooth the gain values. Each of these filters may be implemented as a series of one-dimensional filters (one operating on rows and the other on columns) or two-dimensional filters. The size of the filters (i.e. the number of samples processed to compute a value for a given location) may vary (e.g., 3 by 3, 5 by 5, etc.). The shape of the filters may vary as well (e.g., square, cross-shaped, etc.). The perceptual analyzer process produces a detailed gain multiplier. The multiplier is a vector with elements corresponding to samples in a block.

Another component 818 of the gain controller computes an asymmetric gain based on the output of the image sample values and message watermark signal.

This component analyzes the samples of the block to determine whether they are consistent with the message signal. The embedder reduces the gain for samples whose values relative to neighboring values are consistent with the message signal.

The embedder applies the asymmetric gain to increase the chances of an accurate read in the watermark reader. To understand the effect of the asymmetric gain, it is helpful to explain the operation of the reader. The reader extracts the watermark message signal from the watermarked signal using a predicted version of the original signal. It estimates the watermark message signal value based on values of the predicted signal and the watermarked signal at locations of the watermarked signal suspected of containing a watermark signal. There are several ways to predict the original signal. One way is to compute a local average of samples around the sample of interest. The average may be computed by taking the average of vertically adjacent samples, horizontally adjacent samples, an average of samples in a cross-shaped filter (both vertical and horizontal neighbors, an average of samples in a square-shaped filter, etc. The estimate may be computed one time based on a single predicted value from one of these averaging computations. Alternatively, several estimates may be computed based on two or more of these averaging computations (e.g., one estimate for vertically adjacent samples and another for horizontally adjacent samples). In the latter case, the reader may keep estimates if they satisfy a similarity metric. In other words, the estimates are deemed. valid if they within a predetermined value or have the same polarity.

Knowing this behavior of the reader, the embedder computes the asymmetric gain as follows. For samples that have values relative to their neighbors that are consistent with the watermark signal, the embedder reduces the asymmetric gain. Conversely, for samples that are inconsistent with the watermark signal, the embedder increases the asymmetric gain. For example, if the chip value is a one, then the sample is consistent with the watermark signal if its value is greater than its neighbors. Alternatively, if the chip value is a zero, then the sample is consistent with the watermark signal if its value is less than its neighbors.

Another component 820 of the gain controller computes a differential gain, which represents an adjustment in the message vs. orientation pattern gains. As the global gain increases, the embedder emphasizes the message gain over the orientation pattern gain by adjusting the global gain by an adjustment factor. The inputs to this process 820 include the global gain 810 and a message differential gain 822. When the global gain is below a lower threshold, the adjustment factor is one. When the global gain is above an upper threshold, the adjustment factor is set to an upper limit greater than one. For global gains falling within the two thresholds, the adjustment factor increases linearly between one and the upper limit. The message differential gain is the product of the adjustment factor and the global gain.

At this point, there are four sources of gain: the detailed gain, the global gain, the asymmetric gain, and the message dependent gain. The embedder applies the first two gain quantities to both the message and orientation watermark signals. It only applies the latter two to the message watermark signal. FIG. 61 depicts how the embedder applies the gain to the two watermark components. First, it multiplies the detailed gain with the global gain to compute the orientation pattern gain. It then multiplies the orientation pattern gain with the adjusted message differential gain and asymmetric gain to form the composite message gain.

Finally, the embedder forms the composite watermark signal. It multiplies the composite message gain with the message signal, and multiplies the orientation pattern gain with the orientation pattern signal. It then combines the result in a common transform domain to get the composite watermark. The embedder applies a watermarking function to combine the composite watermark to the block to create a watermarked image block. The message and orientation components of the watermark may be combined by mapping the message bits to samples of the orientation signal, and modulating the samples of the orientation signal to encode the message.

The embedder computes the watermark message signal by converting the output of the assignment map 806 to delta values, indicating the extent to which the watermark signal changes the host signal. As noted above, a chip value of one corresponds to an upward adjustment of the corresponding sample, while a chip value of zero corresponds to a downward adjustment. The embedder specifies the specific amount of adjustment by assigning a delta value to each of the watermark message samples (830).

K Detector Implementation

Figure 65:
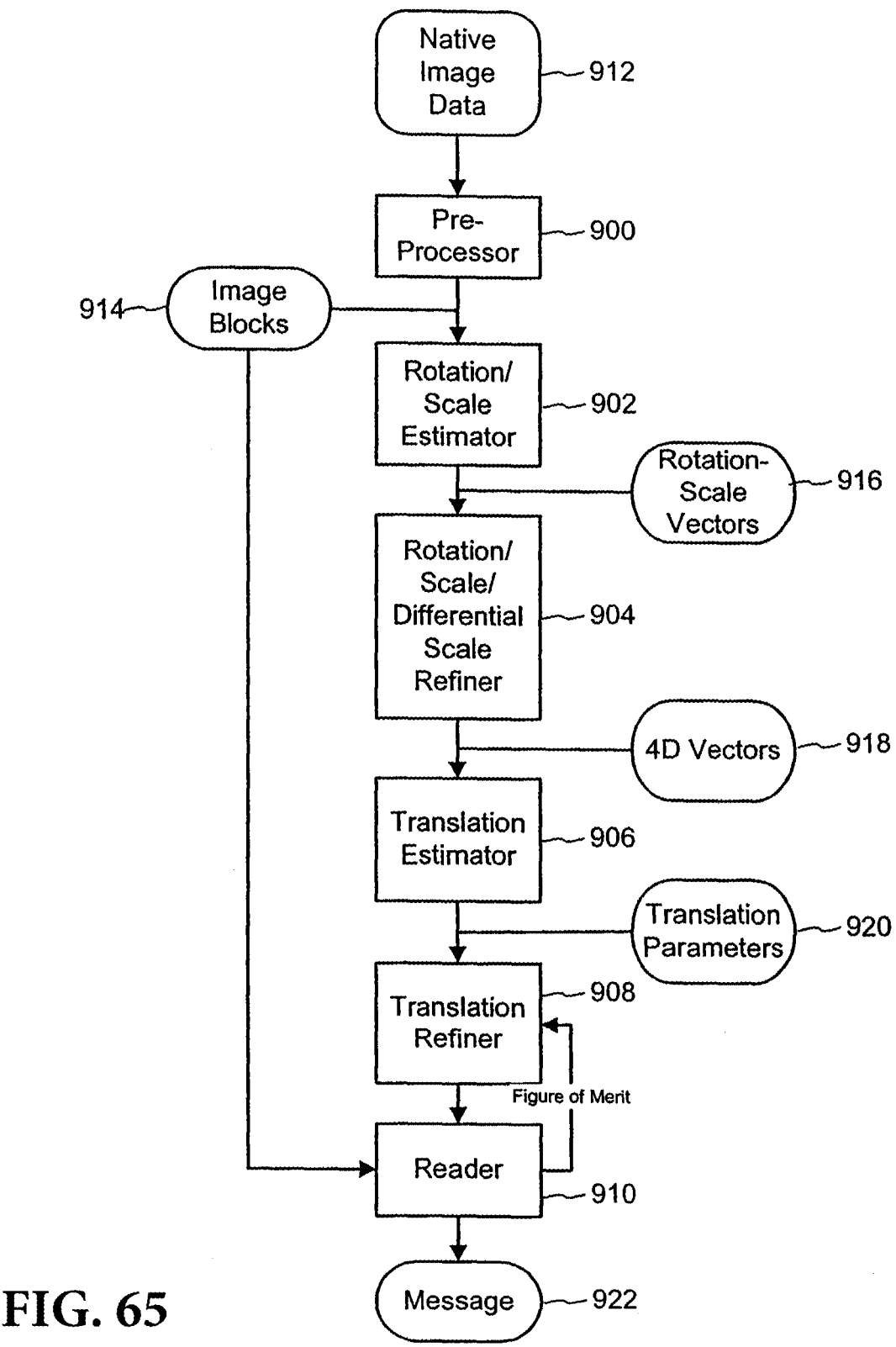
FIG. 65 is a diagram illustrating an overview of a watermark detector implementation.

FIG. 65 illustrates an overview of a watermark detector that detects the presence of a detection watermark in a host image and its orientation. Using the orientation pattern and the known bits inserted in the watermark message, the detector determines whether a potentially corrupted image contains a watermark, and if so, its orientation in the image.

Recall that the composite watermark is replicated in blocks of the original image. After an embedder places the watermark in the original digital image, the watermarked image is likely to undergo several transformations, either from routine processing or from intentional tampering. Some of these transformations include: compression, decompression, color space conversion, digital to analog conversion, printing, scanning, analog to digital conversion, scaling, rotation, inversion, flipping differential scale, and lens distortion. In addition to these transformations, various noise sources can corrupt the watermark signal, such as fixed pattern noise, thermal noise, etc.

When building a detector implementation for a particular application, the developer may implement counter-measures to mitigate the impact of the types of transformations, distortions and noise expected for that application. Some applications may require more counter-measures than others. The detector described below is designed to recover a watermark from a watermarked image after the image has been printed, and scanned. The following sections describe the counter-measures to mitigate the impact of various forms of corruption. The developer can select from among these counter-measures when implementing a detector for a particular application.

For some applications, the detector will operate in a system that provides multiple image frames of a watermarked object. One typical example of such a system is a computer equipped with a digital camera. In such a configuration, the digital camera can capture a temporal sequence of images as the user or some device presents the watermarked image to the camera.

As shown in FIG. 65, the principal components of the detector are: 1) pre-processor 900; 2) rotation and scale estimator 902; 3) orientation parameter refiner 904; 4) translation estimator 906; 5) translation refiner 908; and reader 910.

The preprocessor 900 takes one or more frames of image data 912 and produces a set of image blocks 914 prepared for further analysis. The rotation-scale estimator 902 computes rotation-scale vectors 916 that estimate the orientation of the orientation signal in the image blocks. The parameter refiner 904 collects additional evidence of the orientation signal and further refines the rotation scale vector candidates by estimating differential scale parameters. The result of this refining stage is a set of 4D vectors candidates 918 (rotation, scale, and two differential scale parameters). The translation estimator 906 uses the 4D vector candidates to re-orient image blocks with promising evidence of the orientation signal. It then finds estimates of translation parameters 920. The translation refiner 908 invokes the reader 910 to assess the merits of an orientation vector. When invoked by the detector, the reader uses the orientation vector to approximate the original orientation of the host image and then extracts values for the known bits in the watermark message. The detector uses this information to assess the merits of and refine orientation vector candidates.

By comparing the extracted values of the known bits with the expected values, the reader provides a figure of merit for an orientation vector candidate. The translation refiner then picks a 6D vector, including rotation, scale, differential scale and translation, that appears likely produce a valid read of the watermark message 922. The following sections describe implementations of these components in more detail.

L. Detector Pre-Processing

Figure 66:
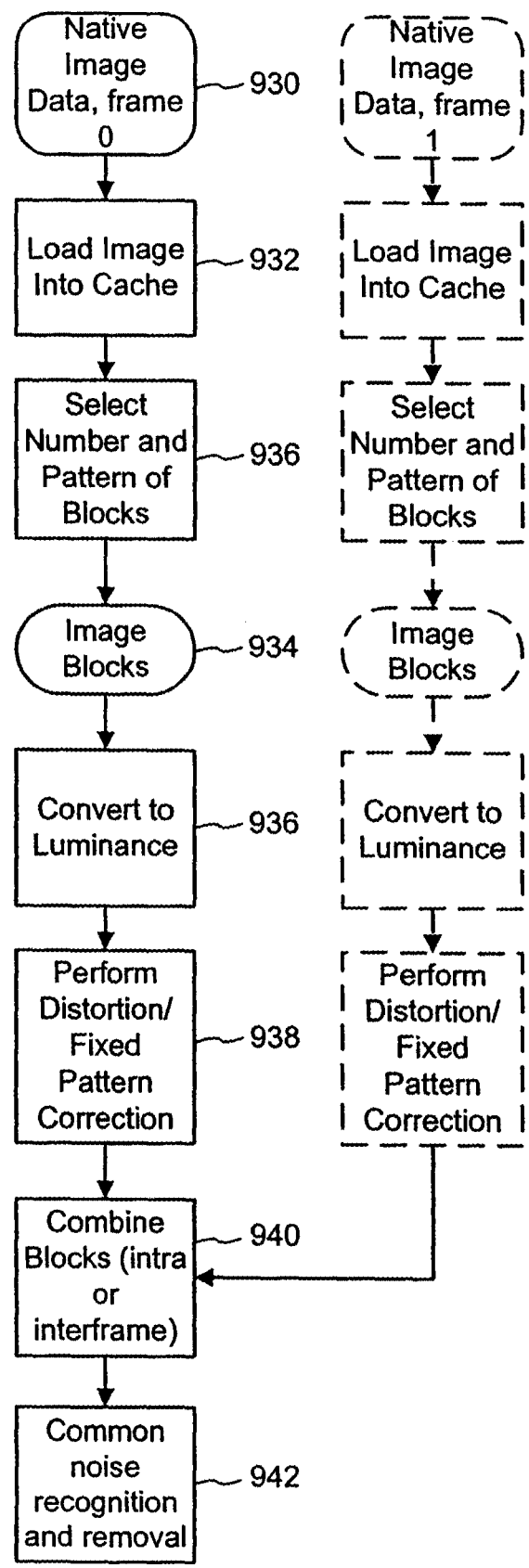
FIG. 66 is a diagram illustrating an implementation of the detector pre-processor depicted generally in FIG. 65.

FIG. 66 is a flow diagram illustrating preprocessing operations in the detector shown in FIG. 65. The detector performs a series of pre-processing operations on the native image 930 to prepare the image data for further analysis. It begins by filling memory with one or more frames of native image data (932), and selecting sets of pixel blocks 934 from the native image data for further analysis (936). While the detector can detect a watermark using a single image frame, it also has support for detecting the watermark using additional image frames. As explained below, the use of multiple frames has the potential for increasing the chances of an accurate detection and read.

In applications where a camera captures an input image of a watermarked object, the detector may be optimized to address problems resulting from movement of the object. Typical PC cameras, for example, are capable of capturing images at a rate of at least 10 frames a second. A frustrated user might attempt to move the object in an attempt to improve detection. Rather than improving the chances of detection, the movement of the object changes the orientation of the watermark from one frame to the next, potentially making the watermark more difficult to detect. One way to address this problem is to buffer one or more frames, and then screen the frame or frames to determine if they are likely to contain a valid watermark signal. If such screening indicates that a frame is not likely to contain a valid signal, the detector can discard it and proceed to the next frame in the buffer, or buffer a new frame. Another enhancement is to isolate portions of a frame that are most likely to have a valid watermark signal, and then perform more detailed detection of the isolated portions.

After loading the image into the memory, the detector selects image blocks 934 for further analysis. It is not necessary to load or examine each block in a frame because it is possible to extract the watermark using only a portion of an image. The detector looks at only a subset of the samples in an image, and preferably analyzes samples that are more likely to have a recoverable watermark signal.

The detector identifies portions of the image that are likely to have the highest watermark signal to noise ratio. It then attempts to detect the watermark signal in the identified portions. In the context of watermark detection, the host image is considered to be a source of noise along with conventional noise sources. While it is typically not practical to compute the signal to noise ratio, the detector can evaluate attributes of the signal that are likely to evince a promising watermark signal to noise ratio. These properties include the signal activity (as measured by sample variance, for example), and a measure of the edges (abrupt changes in image sample values) in an image block. Preferably, the signal activity of a candidate block should fall within an acceptable range, and the block should not have a high concentration of strong edges. One way to quantify the edges in the block is to use an edge detection filter (e.g., a Laplacian, Sobel, etc.).

In one implementation, the detector divides the input image into blocks, and analyzes each block based on pre-determined metrics. It then ranks the blocks according to these metrics. The detector then operates on the blocks in the order of the ranking. The metrics include sample variance in a candidate block and a measure of the edges in the block. The detector combines these metrics for each candidate block to compute a rank representing the probability that it contains a recoverable watermark signal.

In another implementation, the detector selects a pattern of blocks and evaluates each one to try to make the most accurate read from the available data. In either implementation, the block pattern and size may vary. This particular implementation selects a pattern of overlapping blocks (e.g., a row of horizontally aligned, overlapping blocks). One optimization of this approach is to adaptively select a block pattern that increases the signal to noise ratio of the watermark signal. While shown as one of the initial operations in the preparation, the selection of blocks can be postponed until later in the pre-processing stage.

Next, the detector performs a color space conversion on native image data to compute an array of image samples in a selected color space for each block (936). In the following description, the color space is luminance, but the watermark may be encoded in one or more different color spaces. The objective is to get a block of image samples with lowest noise practical for the application. While the implementation currently performs a row by row conversion of the native image data into 8 bit integer luminance values, it may be preferable to convert to floating-point values for some applications. One optimization is to select a luminance converter that is adapted for the sensor used to capture the digital input image. For example, one might experimentally derive the lowest noise luminance conversion for commercially available sensors, e.g., CCD cameras or scanners, CMOS cameras, etc. Then, the detector could be programmed to select either a default luminance converter, or one tuned to a specific type of sensor.

At one or more stages of the detector, it may be useful to perform operations to mitigate the impact of noise and distortion. In the pre-processing phase, for example, it may be useful to evaluate fixed pattern noise and mitigate its effect (938). The detector may look for fixed pattern noise in the native input data or the luminance data, and then mitigate it.

One way to mitigate certain types of noise is to combine data from different blocks in the same frame, or corresponding blocks in different frames 940. This process helps augment the watermark signal present in the blocks, while reducing the noise common to the blocks. For example, merely adding blocks together may mitigate the effects of common noise.

In addition to common noise, other forms of noise may appear in each of the blocks such as noise introduced in the printing or scanning processes. Depending on the nature of the application, it may be advantageous to perform common noise recognition and removal at this stage 942. The developer may select a filter or series of filters to target certain types of noise that appear during experimentation with images. Certain types of median filters may be effective in mitigating the impact of spectral peaks (e.g., speckles) introduced in printing or scanning operations.

In addition to introducing noise, the printing and image capture processes may transform the color or orientation of the original, watermarked image. As described above, the embedder typically operates on a digital image in a particular color space and at a desired resolution. The watermark embedders normally operate on digital images represented in an RGB or CYMK color space at a desired resolution (e.g., 100 dpi or 300 dpi, the resolution at which the image is printed). The images are then printed on paper with a screen printing process that uses the CYMK subtractive color space at a line per inch (LPI) ranging from 65-200. 133 lines/in is typical for quality magazines and 73 lines/in is typical for newspapers. In order to produce a quality image and avoid pixelization, the rule of thumb is to use digital images with a resolution that is at least twice the press resolution. This is due to the half tone printing for color production. Also, different presses use screens with different patterns and line orientations and have different precision for color registration.

One way to counteract the transforms introduced through the printing process is to develop a model that characterizes these transforms and optimize watermark embedding and detecting based on this characterization. Such a model may be developed by passing watermarked and unwatermarked images through the printing process and observing the changes that occur to these images. The resulting model characterizes the changes introduced due to the printing process. The model may represent a transfer function that approximates the transforms due to the printing process. The detector then implements a pre-processing stage that reverses or at least mitigates the effect of the printing process on watermarked images. The detector may implement a pre-processing stage that performs the inverse of the transfer function for the printing process.

A related challenge is the variety in paper attributes used in different printing processes. Papers of various qualities, thickness and stiffness, absorb ink in various ways. Some papers absorb ink evenly, while others absorb ink at rates that vary with the changes in the paper's texture and thickness. These variations may degrade the embedded watermark signal when a digitally watermarked image is printed. The watermark process can counteract these effects by classifying and characterizing paper so that the embedder and reader can compensate for this printing-related degradation.

Variations in image capture processes also pose a challenge. In some applications, it is necessary to address problems introduced due to interlaced image data. Some video camera produce interlaced fields representing the odd or even scan lines of a frame. Problems arise when the interlaced image data consists of fields from two consecutive frames. To construct an entire frame, the preprocessor may combine the fields from consecutive frames while dealing with the distortion due to motion that occurs from one frame to the next. For example, it may be necessary to shift one field before interleaving it with another field to counteract inter-frame motion. A de-blurring function may be used to mitigate the blurring effect due to the motion between frames.

Another problem associated with cameras in some applications is blurring due to the lack of focus. The preprocessor can mitigate this effect by estimating parameters of a blurring function and applying a de-blurring function to the input image.

Yet another problem associated with cameras is that they tend to have color sensors that utilize different color pattern implementations. As such, a sensor may produce colors slightly different than those represented in the object being captured. Most CCD and CMOS cameras use an array of sensors to produce colored images. The sensors in the array are arranged in clusters of sensitive to three primary colors red, green, and blue according to a specific pattern. Sensors designated for a particular color are dyed with that color to increase their sensitivity to the designated color. Many camera manufacturers use a Bayer color pattern GR/BG. While this pattern produces good image quality, it causes color mis-registration that degrades the watermark signal. Moreover, the color space converter, which maps the signal from the sensors to another color space such as YUV or RGB, may vary from one manufacturer to another. One way to counteract the mis-registration of the camera's color pattern is to account for the distortion due to the pattern in a color transformation process, implemented either within the camera itself, or as a pre-processing function in the detector.

Another challenge in counteracting the effects of the image capture process is dealing with the different types of distortion introduced from various image capture devices. For example, cameras have different sensitivities to light. In addition, their lenses have different spherical distortion, and noise characteristics. Some scanners have poor color reproduction or introduce distortion in the image aspect ratio. Some scanners introduce aliasing and employ interpolation to increase resolution. The detector can counteract these effects in the pre-processor by using an appropriate inverse transfer function. An off-line process first characterizes the distortion of several different image capture devices (e.g., by passing test images through the scanner and deriving a transfer function modeling the scanner distortion). Some detectors may be equipped with a library of such inverse transfer functions from which they select one that corresponds to the particular image capture device Yet another challenge in applications where the image is printed on paper and later scanned is that the paper deteriorates over time and degrades the watermark. Also, varying lighting conditions make the watermark difficult to detect. Thus, the watermark may be selected so as to be more impervious to expected deterioration, and recoverable over a wider range of lighting conditions.

At the close of the pre-processing stage, the detector has selected a set of blocks for further processing. It then proceeds to gather evidence of the orientation signal in these blocks, and estimate the orientation parameters of promising orientation signal candidates. Since the image may have suffered various forms of corruption, the detector may identify several parts of the image that appear to have attributes similar to the orientation signal. As such, the detector may have to resolve potentially conflicting and ambiguous evidence of the orientation signal. To address this challenge, the detector estimates orientation parameters, and then refines theses estimates to extract the orientation parameters that are more likely to evince a valid signal than other parameter candidates.

M. Estimating Initial Orientation Parameters

Figure 67:
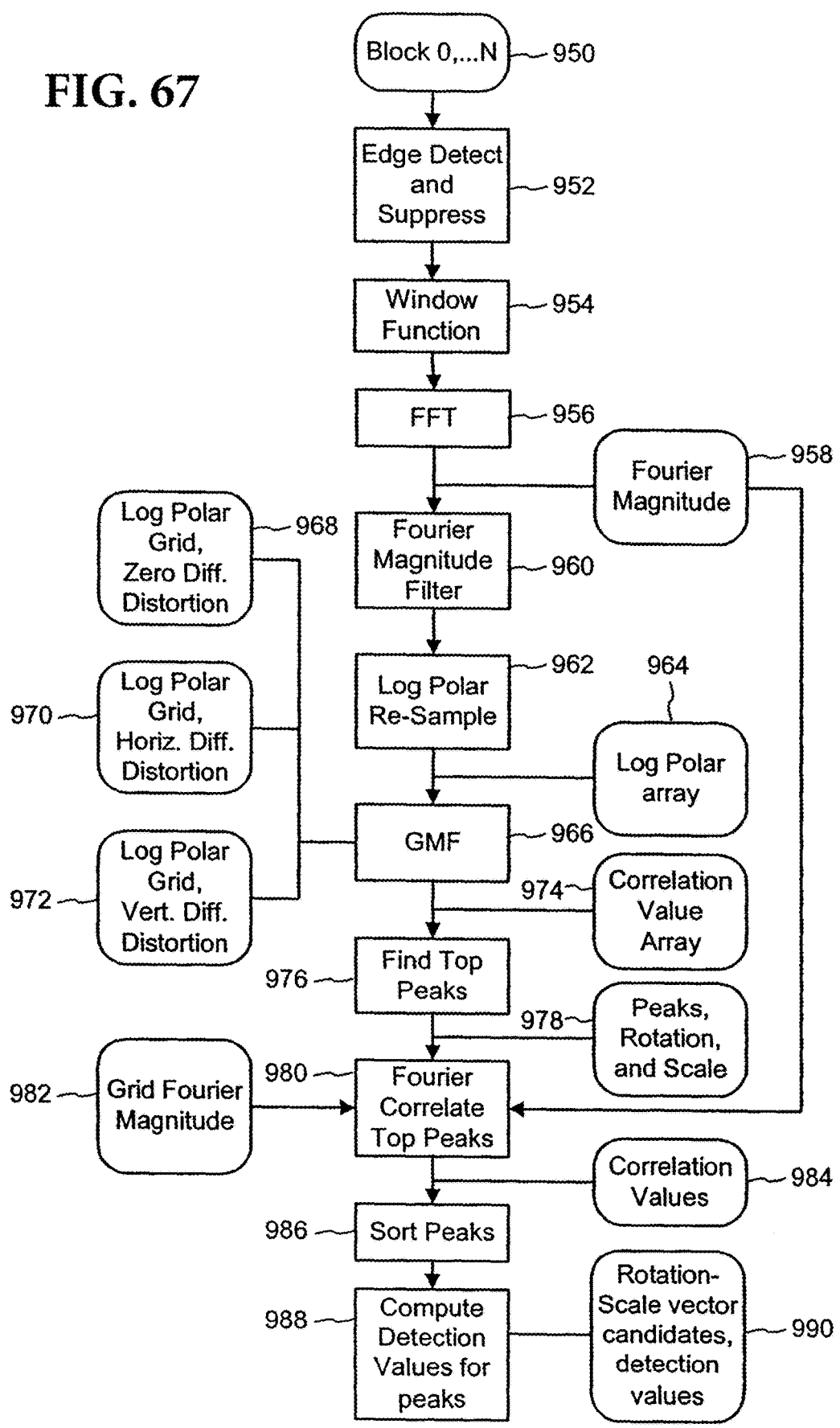
FIG. 67 is a diagram illustrating a process for estimating rotation and scale vectors of a watermark orientation signal.

FIG. 67 is a flow diagram illustrating a process for estimating rotation-scale vectors. The detector loops over each image block (950), calculating rotation-scale vectors with the best detection values in each block. First, the detector filters the block in a manner that tends to amplify the orientation signal while suppressing noise, including noise from the host image itself (952). Implemented as a multi-axis Laplacian filter, the filter highlights edges (e.g., high frequency components of the image) and then suppresses them. The term, "multi-axis," means that the filter includes a series of stages that each operates on particular axis. First, the filter operates on the rows of luminance samples, then operates on the columns, and adds the results. The filter may be applied along other axes as well. Each pass of the filter produces values at discrete levels. The final result is an array of samples, each having one of five values: $\{-2, -1, 0, 1, 2\}$.

Next, the detector performs a windowing operation on the block data to prepare it for an FFT transform (954). This windowing operation provides signal continuity at the block edges. The detector then performs an FFT (956) on the block, and retains only the magnitude component (958).

In an alternative implementation, the detector may use the phase signal produced by the FFT to estimate the translation parameter of the orientation signal. For example, the detector could use the rotation and scale parameters extracted in the process described below, and then compute the phase that provided the highest measure of correlation with the orientation signal using the phase component of the FFT process.

After computing the FFT, the detector applies a Fourier magnitude filter (960) on the magnitude components. The filter in the implementation slides over each sample in the Fourier magnitude array and filters the sample's eight neighbors in a square neighborhood centered at the sample. The filter boosts values representing a sharp peak with a rapid fall-off, and suppresses the fall-off portion. It also performs a threshold operation to clip peaks to an upper threshold.

Next, the detector performs a log-polar re-sample (962) of the filtered Fourier magnitude array to produce a log-polar array 964. This type of operation is sometimes referred to as a Fourier Mellin transform. The detector, or some off-line pre-processor, performs a similar operation on the orientation signal to map it to the log-polar coordinate system. Using matching filters, the detector implementation searches for an orientation signal in a specified window of the log-polar coordinate system. For example, consider that the log-polar coordinate system is a two dimensional space with the scale being the vertical axis and the angle being the horizontal axis. The window ranges from 0 to 90 degrees on the horizontal axis and from approximately 50 to 2400 dpi on the vertical axis. Note that the orientation pattern should be selected so that routine scaling does not push the orientation pattern out of this window. The orientation pattern can be designed to mitigate this problem, as noted above, and as explained in patent application No. 60/136,572, filed May 28, 1999, by Ammon Gustafson, entitled Watermarking System With Improved Technique for Detecting Scaling and Rotation, filed May 28, 1999.

The detector proceeds to correlate the orientation and the target signal in the log polar coordinate system. As shown in FIG. 67, the detector uses a generalized matched filter GMF (966). The GMF performs an FFT on the orientation and target signal, multiplies the resulting Fourier domain entities, and performs an inverse FFT. This process yields a rectangular array of values in log-polar coordinates, each representing a measure of correlation and having a corresponding rotation angle and scale vector. As an optimization, the detector may also perform the same correlation operations for distorted versions (968, 970, 972) of the orientation signal to see if any of the distorted orientation patterns results in a higher measure of correlation. For example, the detector may repeat the correlation operation with some pre-determined amount of horizontal and vertical differential distortion (970, 972). The result of this correlation process is an array of correlation values 974 specifying the amount of correlation that each corresponding rotation-scale vector provides.

The detector processes this array to find the top M peaks and their location in the log-polar space 976. To extract the location more accurately, the detector uses interpolation to provide the inter-sample location of each of the top peaks 978. The interpolator computes the 2D median of the samples around a peak and provides the location of the peak center to an accuracy of 0.1 sample.

The detector proceeds to rank the top rotation-scale vectors based on yet another correlation process 980. In particular, the detector performs a correlation between a Fourier magnitude representation for each rotation-scale vector candidate and a Fourier magnitude specification of the orientation signal 982. Each Fourier magnitude representation is scaled and rotated by an amount reflected by the corresponding rotation-scale vector. This correlation operation sums a point-wise multiplication of the orientation pattern impulse functions in the frequency domain with the Fourier magnitude values of the image at corresponding frequencies to compute a measure of correlation for each peak 984. The detector then sorts correlation values for the peaks (986).

Finally, the detector computes a detection value for each peak (988). It computes the detection value by quantizing the correlation values. Specifically, it computes a ratio of the peak's correlation value and the correlation value of the next largest peak. Alternatively, the detector may compute the ratio of the peak's correlation value and a sum or average of the correlation values of the next n highest peaks, where n is some predetermined number. Then, the detector maps this ratio to a detection value based on a statistical analysis of unmarked images.

The statistical analysis plots a distribution of peak ratio values found in unmarked images. The ratio values are mapped to a detection value based on the probability that the value came from an unmarked image. For example, 90% of the ratio values in unmarked images fall below a first threshold T1, and thus, the detection value mapping for a ratio of T1 is set to 1. Similarly, 99% of the ratio values in unmarked images fall below T2, and therefore, the detection value is set to 2. 99.9% of the ratio values in unmarked images fall below T3, and the corresponding detection value is set to 3. The threshold values, T1, T2 and T3, may be determined by performing a statistical analysis of several images. The mapping of ratios to detection values based on the statistical distribution may be implemented in a look up table.

The statistical analysis may also include a maximum likelihood analysis. In such an analysis, an off-line detector generates detection value statistics for both marked and unmarked images. Based on the probability distributions of marked and unmarked images, it determines the likelihood that a given detection value for an input image originates from a marked and unmarked image.

Figure 68:
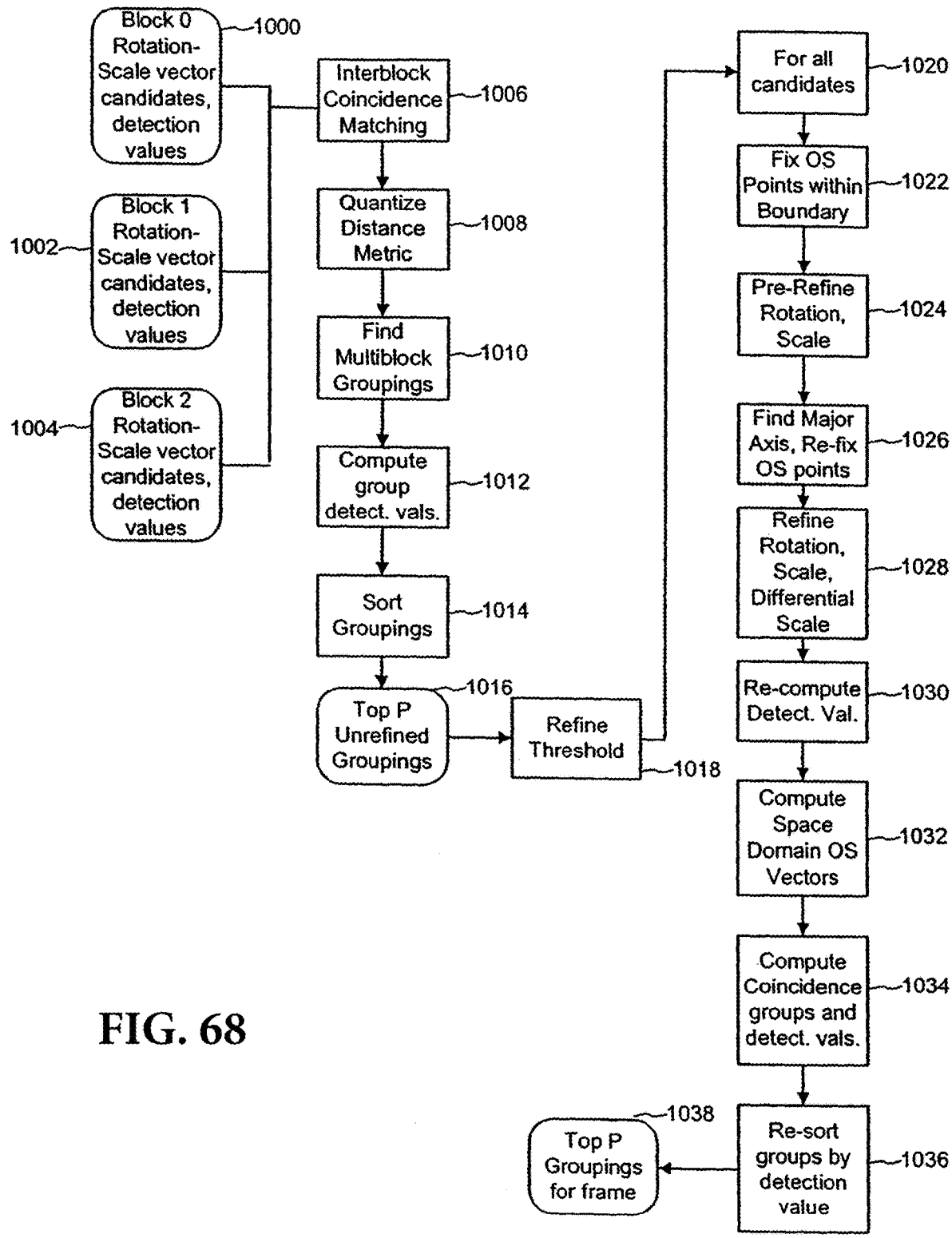
FIG. 68 is a diagram illustrating a process for refining the rotation and scale vectors, and for estimating differential scale parameters of the watermark orientation signal.

At the end of these correlation stages, the detector has computed a ranked set of rotation-scale vectors 990, each with a quantized measure of correlation associated with it. At this point, the detector could simply choose the rotation and scale vectors with the highest rank and proceed to compute other orientation parameters, such as differential scale and translation. Instead, the detector gathers more evidence to refine the rotation-scale vector estimates. FIG. 68 is a flow diagram illustrating a process for refining the orientation parameters using evidence of the orientation signal collected from blocks in the current frame.

Continuing in the current frame, the detector proceeds to compare the rotation and scale parameters from different blocks (e.g., block 0, block 1, block 2; 1000, 1002, and 1004 in FIG. 68). In a process referred to as interblock coincidence matching 1006, it looks for similarities between rotation-scale parameters that yielded the highest correlation in different blocks. To quantify this similarity, it computes the geometric distance between each peak in one block with every other peak in the other blocks. It then computes the probability that peaks will fall within this calculated distance. There are a variety of ways to calculate the probability. In one implementation, the detector computes the geometric distance between two peaks, computes the circular area encompassing the two peaks ($\pi$(geometric distance)$^2$), and computes the ratio of this area to the total area of the block. Finally, it quantizes this probability measure for each pair of peaks (1008) by computing the log (base 10) of the ratio of the total area over the area encompassing the two peaks. At this point, the detector has calculated two detection values: quantized peak value, and the quantized distance metric.

The detector now forms multi-block grouping of rotation-scale vectors and computes a combined detection value for each grouping (1010). The detector groups vectors based on their relative geometric proximity within their respective blocks. It then computes the combined detection value by combining the detection values of the vectors in the group (1012). One way to compute a combined detection value is to add the detection values or add a weighted combination of them.

Having calculated the combined detection values, the detector sorts each grouping by its combined detection value (1014). This process produces a set of the top groupings of unrefined rotation-scale candidates, ranked by detection value 1016. Next, the detector weeds out rotation-scale vectors that are not promising by excluding those groupings whose combined detection values are below a threshold (the "refine threshold" 1018). The detector then refines each individual rotation-scale vector candidate within the remaining groupings.

The detector refines a rotation-scale vector by adjusting the vector and checking to see whether the adjustment results in a better correlation. As noted above, the detector may simply pick the best rotation-scale vector based on the evidence collected thus far, and refine only that vector. An alternative approach is to refine each of the top rotation-scale vector candidates, and continue to gather evidence for each candidate. In this approach, the detector loops over each vector candidate (1020), refining each one.

One approach of refining the orientation vector is as follows: fix the orientation signal impulse functions ("points") within a valid boundary (1022); pre-refine the rotation-scale vector (1024); find the major axis and re-fix the orientation points (1026); and refine each vector with the addition of a differential scale component (1028).

In this approach, the detector pre-refines a rotation-scale vector by incrementally adjusting one of the parameters (scale, rotation angle), adjusting the orientation points, and then summing a point-wise multiplication of the orientation pattern and the image block in the Fourier magnitude domain. The refiner compares the resulting measure of correlation with previous measures and continues to adjust one of the parameters so long as the correlation increases. After refining the scale and rotation angle parameters, the refiner finds the major axis, and re-fixes the orientation points. It then repeats the refining process with the introduction of differential scale parameters. At the end of this process, the refiner has converted each scale-rotation candidate to a refined 4D vector, including rotation, scale, and two differential scale parameters.

At this stage, the detector can pick a 4D vector or set of 4D vector and proceed to calculate the final remaining parameter, translation. Alternatively, the detector can collect additional evidence about the merits of each 4D vector.

One way to collect additional evidence about each 4D vector is to re-compute the detection value of each orientation vector candidate (1030). For example, the detector may quantize the correlation value associated with each 4D vector as described above for the rotation-scale vector peaks (see item 988, FIG. 67 and accompanying text). Another way to collect additional evidence is to repeat the coincidence matching process for the 4D vectors. For this coincidence matching process, the detector computes spatial domain vectors for each candidate (1032), determines the distance metric between candidates from different blocks, and then groups candidates from different blocks based on the distance metrics (1034). The detector then re-sorts the groups according to their combined detection values (1036) to produce a set of the top P groupings 1038 for the frame.

Figure 69:
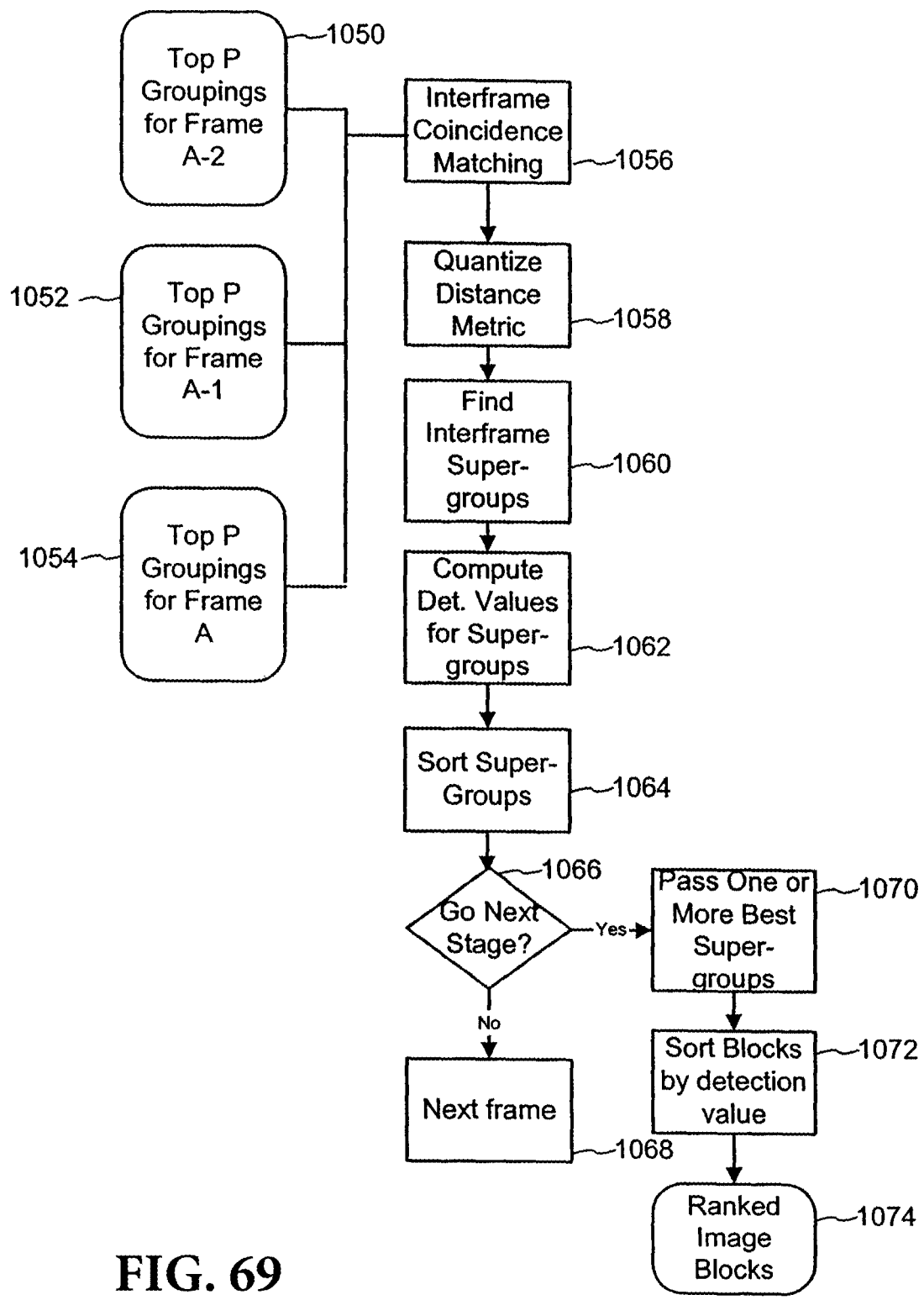
FIG. 69 is a diagram illustrating a process for aggregating evidence of the orientation signal and orientation parameter candidates from two or more frames.

FIG. 69 is a flow diagram illustrating a method for aggregating evidence of the orientation signal from multiple frames. In applications with multiple frames, the detector collects the same information for orientation vectors of the selected blocks in each frame (namely, the top P groupings of orientation vector candidates, e.g., 1050, 1052 and 1054). The detector then repeats coincidence matching between orientation vectors of different frames (1056). In particular, in this inter-frame mode, the detector quantizes the distance metrics computed between orientation vectors from blocks in different frames (1058). It then finds inter-frame groupings of orientation vectors (super-groups) using the same approach described above (1060), except that the orientation vectors are derived from blocks in different frames. After organizing orientation vectors into super-groups, the detector computes a combined detection value for each super-group (1062) and sorts the super-groups by this detection value (1064). The detector then evaluates whether to proceed to the next stage (1066), or repeat the above process of computing orientation vector candidates from in another frame (1068).

If the detection values of one or more super-groups exceed a threshold, then the detector proceeds to the next stage. If not, the detector gathers evidence of the orientation signal from another frame and returns to the inter-frame coincidence matching process. Ultimately, when the detector finds sufficient evidence to proceed to the next stage, it selects the super-group with the highest combined detection value (1070), and sorts the blocks based on their corresponding detection values (1072) to produce a ranked set of blocks for the next stage (1074).

N. Estimating Translation Parameters

Figure 70:
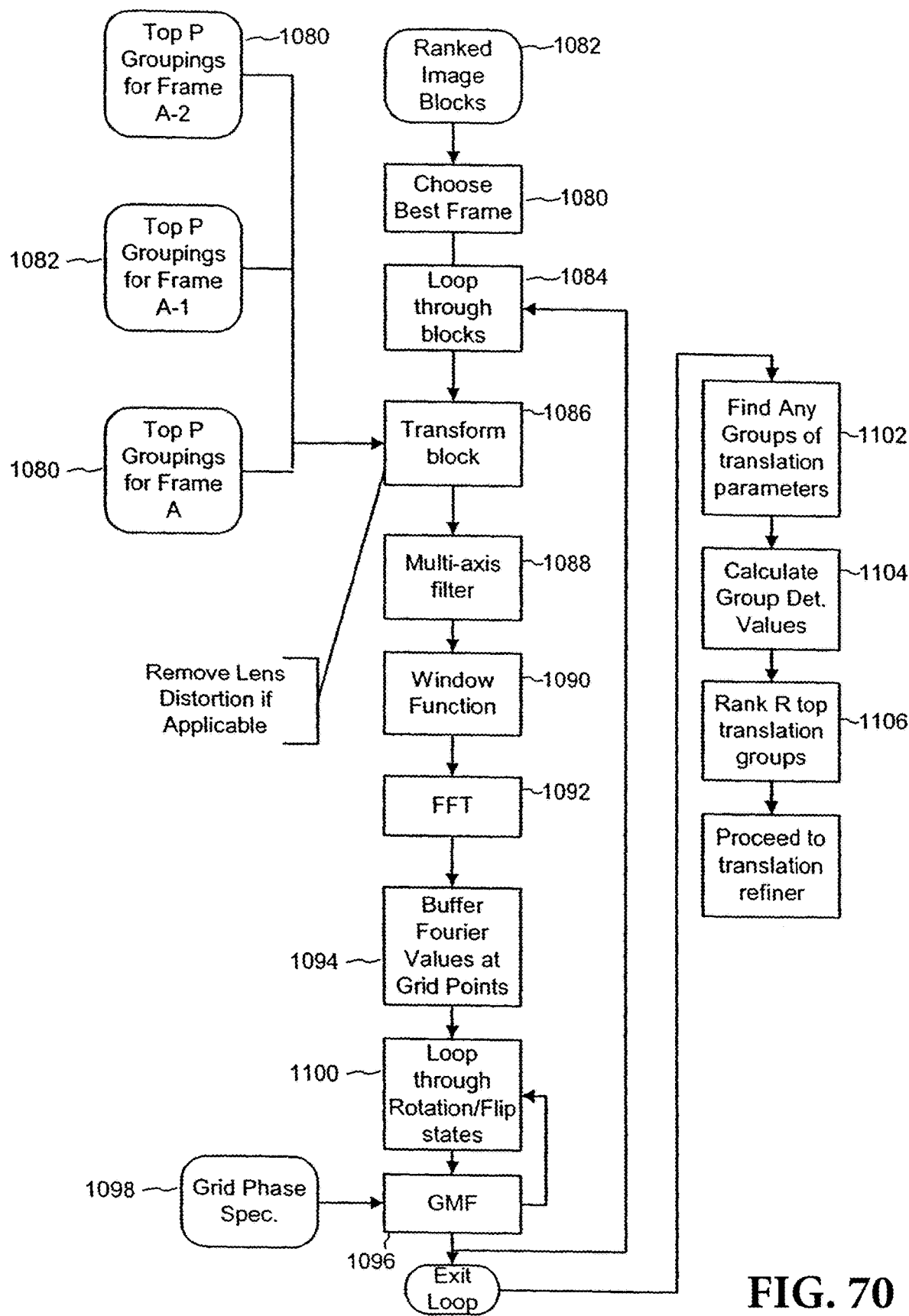
FIG. 70 is a diagram illustrating a process for estimating translation parameters of the watermark orientation signal.

FIG. 70 is a flow diagram illustrating a method for estimating translation parameters of the orientation signal, using information gathered from the previous stages.

In this stage, the detector estimates translation parameters. These parameters indicate the starting point of a watermarked block in the spatial domain. The translation parameters, along with rotation, scale and differential scale, form a complete 6D orientation vector. The 6D vector enables the reader to extract luminance sample data in approximately the same orientation as in the original watermarked image.

One approach is to use generalized match filtering to find the translation parameters that provide the best correlation. Another approach is to continue to collect evidence about the orientation vector candidates, and provide a more comprehensive ranking of the orientation vectors based on all of the evidence gathered thus far. The following paragraphs describe an example of this type of an approach.

To extract translation parameters, the detector proceeds as follows. In the multi-frame case, the detector selects the frame that produced 4D orientation vectors with the highest detection values (1080). It then processes the blocks 1082 in that frame in the order of their detection value. For each block (1084), it applies the 4D vector to the luminance data to generate rectified block data (1086). The detector then performs dual axis filtering (1088) and the window function (1090) on the data. Next, it performs an FFT (1092) on the image data to generate an array of Fourier data. To make correlation operations more efficient, the detector buffers the Fourier values at the orientation points (1094).

The detector applies a generalized match filter 1096 to correlate a phase specification of the orientation signal (1098) with the transformed block data. The result of this process is a 2D array of correlation values. The peaks in this array represent the translation parameters with the highest correlation. The detector selects the top peaks and then applies a median filter to determine the center of each of these peaks. The center of the peak has a corresponding correlation value and sub-pixel translation value. This process is one example of getting translation parameters by correlating the Fourier phase specification of the orientation signal and the image data. Other methods of phase locking the image data with a synchronization signal like the orientation signal may also be employed.

Depending on the implementation, the detector may have to resolve additional ambiguities, such as rotation angle and flip ambiguity. The degree of ambiguity in the rotation angle depends on the nature of the orientation signal. If the orientation signal is octally symmetric (symmetric about horizontal, vertical and diagonal axes in the spatial frequency domain), then the detector has to check each quadrant (0-90, 90-180, 180-270, and 270-360 degrees) to find out which one the rotation angle resides in. Similarly, if the orientation signal is quad symmetric, then the detector has to check two cases, 0-180 and 180-270.

The flip ambiguity may exist in some applications where the watermarked image can be flipped. To check for rotation and flip ambiguities, the detector loops through each possible case, and performs the correlation operation for each one (1100).

At the conclusion of the correlation process, the detector has produced a set of the top translation parameters with associated correlation values for each block. To gather additional evidence, the detector groups similar translation parameters from different blocks (1102), calculates a group detection value for each set of translation parameters 1104, and then ranks the top translation groups based on their corresponding group detection values 1106.

O. Refining Translation Parameters

Figure 71:
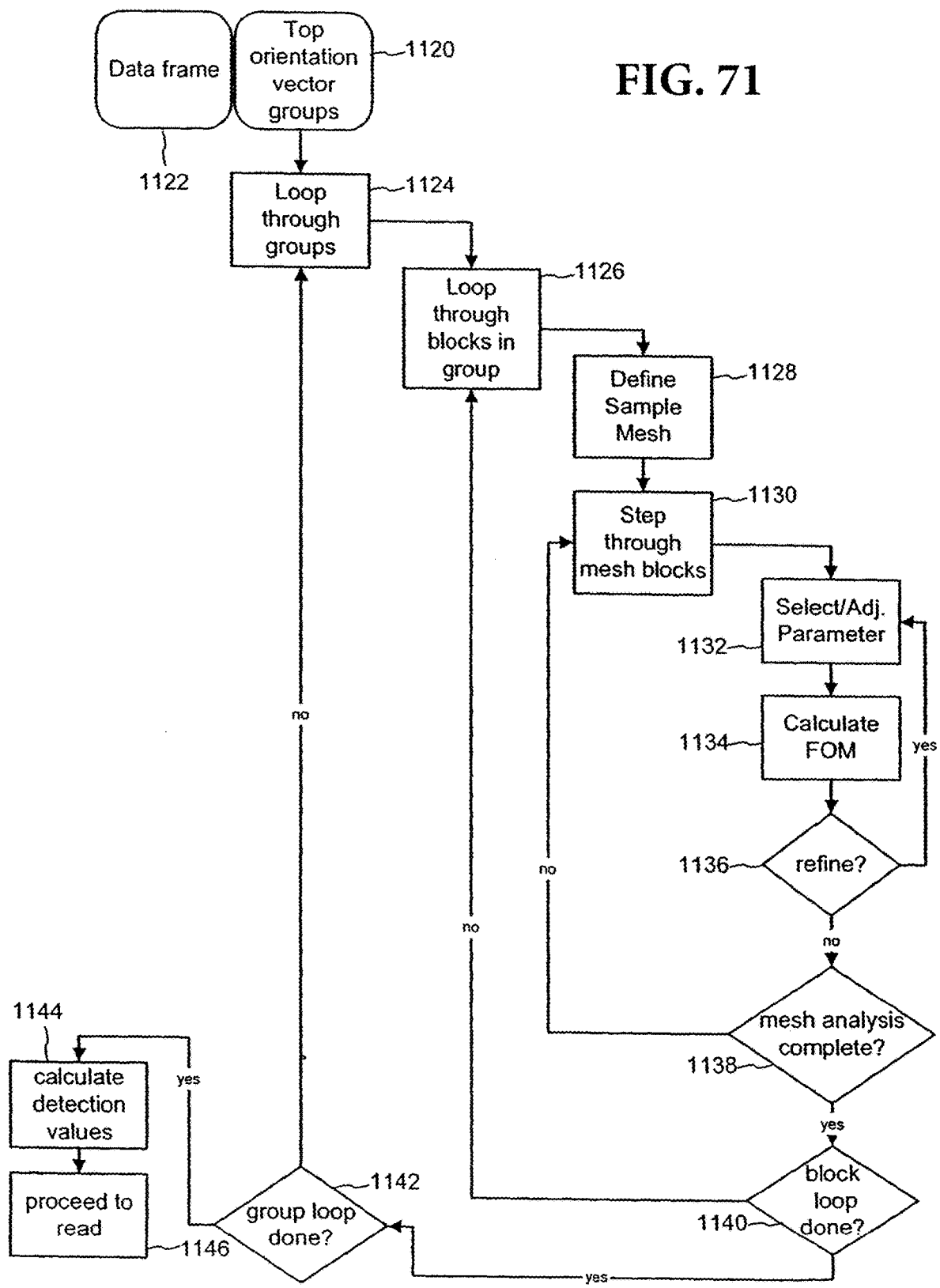
FIG. 71 is a diagram illustrating a process for refining orientation parameters using known message bits in the watermark message.

Having gathered translation parameter estimates, the detector proceeds to refine these estimates. FIG. 71 is a flow diagram illustrating a process for refining orientation parameters. At this stage, the detector process has gathered a set of the top translation parameter candidates 1120 for a given frame 1122. The translation parameters provide an estimate of a reference point that locates the watermark, including both the orientation and message components, in the image frame. In the implementation depicted here, the translation parameters are represented as horizontal and vertical offsets from a reference point in the image block from which they were computed.

Recall that the detector has grouped translation parameters from different blocks based on their geometric proximity to each other. Each pair of translation parameters in a group is associated with a block and a 4D vector (rotation, scale, and 2 differential scale parameters). As shown in FIG. 71, the detector can now proceed to loop through each group (1124), and through the blocks within each group (1126), to refine the orientation parameters associated with each member of the groups. Alternatively, a simpler version of the detector may evaluate only the group with the highest detection value, or only selected blocks within that group.

Regardless of the number of candidates to be evaluated, the process of refining a given orientation vector candidate may be implemented in a similar fashion. In the refining process, the detector uses a candidate orientation vector to define a mesh of sample blocks for further analysis (1128). In one implementation, for example, the detector forms a mesh of 32 by 32 sample blocks centered around a seed block whose upper right corner is located at the vertical and horizontal offset specified by the candidate translation parameters. The detector reads samples from each block using the orientation vector to extract luminance samples that approximate the original orientation of the host image at encoding time.

The detector steps through each block of samples (1130). For each block, it sets the orientation vector (1132), and then uses the orientation vector to check the validity of the watermark signal in the sample block. It assesses the validity of the watermark signal by calculating a figure of merit for the block (1134). To further refine the orientation parameters associated with each sample block, the detector adjusts selected parameters (e.g., vertical and horizontal translation) and re-calculates the figure of merit. As depicted in the inner loop in FIG. 71 (block 1136 to 1132), the detector repeatedly adjusts the orientation vector and calculates the figure of merit in an attempt to find a refined orientation that yields a higher figure of merit.

The loop (1136) may be implemented by stepping through a predetermined sequence of adjustments to parameters of the orientation vectors (e.g., adding or subtracting small increments from the horizontal and vertical translation parameters). In this approach, the detector exits the loop after stepping through the sequence of adjustments. Upon exiting, the detector retains the orientation vector with the highest figure of merit.

There are a number of ways to calculate this figure of merit. One figure of merit is the degree of correlation between a known watermark signal attribute and a corresponding attribute in the signal suspected of having a watermark. Another figure of merit is the strength of the watermark signal (or one of its components) in the suspect signal. For example, a figure of merit may be based on a measure of the watermark message signal strength and/or orientation pattern signal strength in the signal, or in a part of the signal from which the detector extracts the orientation parameters. The detector may computes a figure of merit based the strength of the watermark signal in a sample block. It may also compute a figure of merit based on the percentage agreement between the known bits of the message and the message bits extracted from the sample block.

When the figure of merit is computed based on a portion of the suspect signal, the detector and reader can use the figure of merit to assess the accuracy of the watermark signal detected and read from that portion of the signal. This approach enables the detector to assess the merits of orientation parameters and to rank them based on their figure of merit. In addition, the reader can weight estimates of watermark message values based on the figure of merit to recover a message more reliably.

The process of calculating a figure of merit depends on attributes the watermark signal and how the embedder inserted it into the host signal. Consider an example where the watermark signal is added to the host signal. To calculate a figure of merit based on the strength of the orientation signal, the detector checks the value of each sample relative to its neighbors, and compares the result with the corresponding sample in a spatial domain version of the orientation signal. When a sample's value is greater than its neighbors, then one would expect that the corresponding orientation signal sample to be positive. Conversely, when the sample's value is less than its neighbors, then one would expect that the corresponding orientation sample to be negative. By comparing a sample's polarity relative to its neighbors with the corresponding orientation sample's polarity, the detector can assess the strength of the orientation signal in the sample block. In one implementation, the detector makes this polarity comparison twice for each sample in an N by N block (e.g., N=32, 64, etc.): once comparing each sample with its horizontally adjacent neighbors and then again comparing each sample with its vertically adjacent neighbors. The detector performs this analysis on samples in the mesh block after re-orienting the data to approximate the original orientation of the host image at encoding time. The result of this process is a number reflecting the portion of the total polarity comparisons that yield a match.

To calculate a figure of merit based on known signature bits in a message, the detector invokes the reader on the sample block, and provides the orientation vector to enable the reader to extract coded message bits from the sample block. The detector compares the extracted message bits with the known bits to determine the extent to which they match. The result of this process is a percentage agreement number reflecting the portion of the extracted message bits that match the known bits. Together the test for the orientation signal and the message signal provide a figure of merit for the block.

As depicted in the loop from blocks 1138 to 1130, the detector may repeat the process of refining the orientation vector for each sample block around the seed block. In this case, the detector exits the loop (1138) after analyzing each of the sample blocks in the mesh defined previously (1128). In addition, the detector may repeat the analysis in the loop through all blocks in a given group (1140), and in the loop through each group (1142).

After completing the analysis of the orientation vector candidates, the detector proceeds to compute a combined detection value for the various candidates by compiling the results of the figure of merit calculations. It then proceeds to invoke the reader on the orientation vector candidates in the order of their detection values.

P. Reading the Watermark

Figure 72:
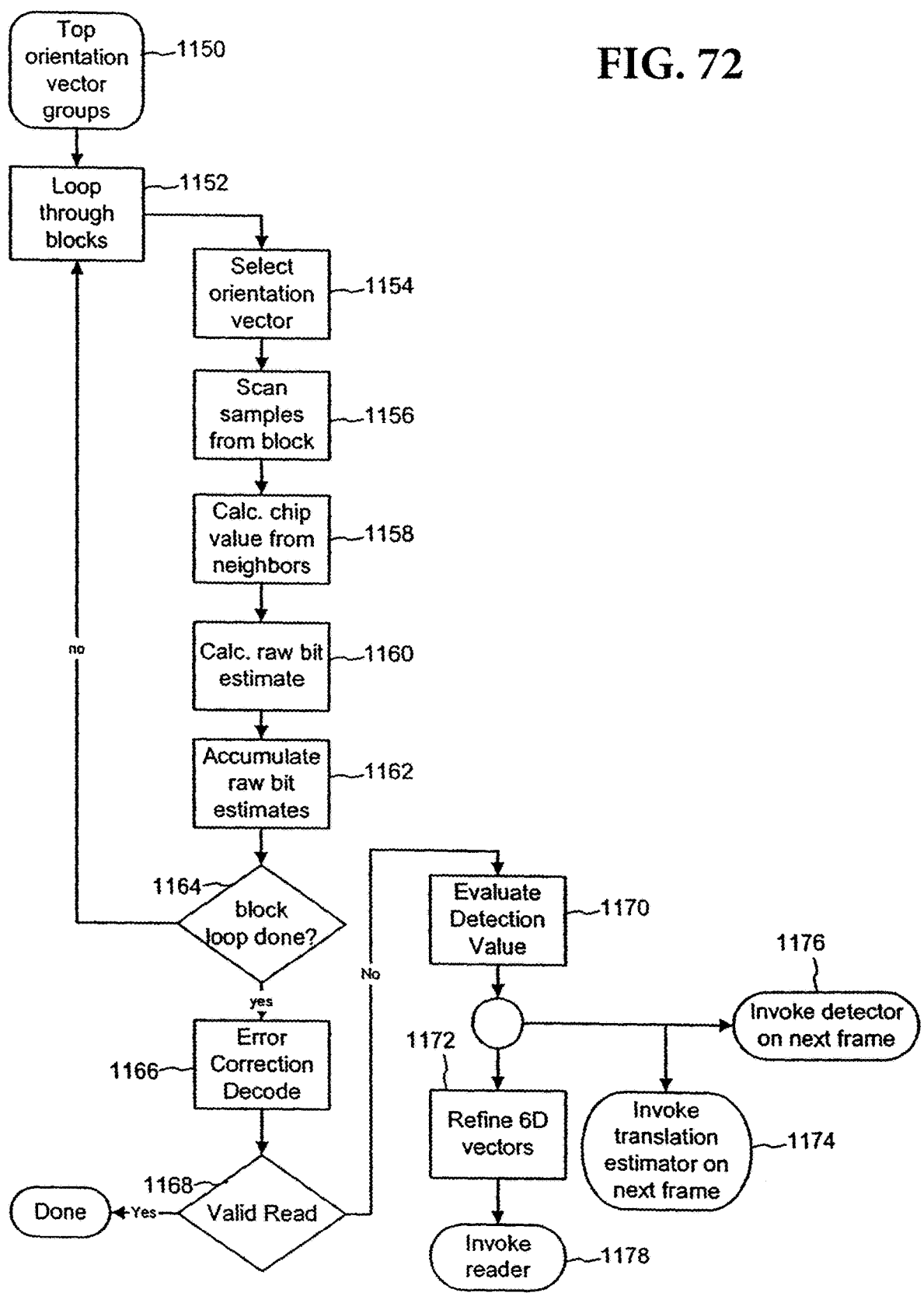
FIG. 72 is a diagram illustrating a process for reading a watermark message from an image, after re-orienting the image data using an orientation vector.

FIG. 72 is a flow diagram illustrating a process for reading the watermark message. Given an orientation vector and the corresponding image data, the reader extracts the raw bits of a message from the image. The reader may accumulate evidence of the raw bit values from several different blocks. For example, in the process depicted in FIG. 72, the reader uses refined orientation vectors for each block, and accumulates evidence of the raw bit values extracted from the blocks associated with the refined orientation vectors.

The reading process begins with a set of promising orientation vector candidates 1150 gathered from the detector. In each group of orientation vector candidates, there is a set of orientation vectors, each corresponding to a block in a given frame. The detector invokes the reader for one or more orientation vector groups whose detection values exceed a predetermined threshold. For each such group, the detector loops over the blocks in the group (1152), and invokes the reader to extract evidence of the raw message bit values.

Recall that previous stages in the detector have refined orientation vectors to be used for the blocks of a group. When it invokes the reader, the detector provides the orientation vector as well as the image block data (1154). The reader scans samples starting from a location in a block specified by the translation parameters and using the other orientation parameters to approximate the original orientation of the image data (1156).

As described above, the embedder maps chips of the raw message bits to each of the luminance samples in the original host image. Each sample, therefore, may provide an estimate of a chip's value. The reader reconstructs the value of the chip by first predicting the watermark signal in the sample from the value of the sample relative to its neighbors as described above (1158). If the deduced value appears valid, then the reader extracts the chip's value using the known value of the pseudo-random carrier signal for that sample and performing the inverse of the modulation function originally used to compute the watermark information signal (1160). In particular, the reader performs an exclusive OR operation on the deduced value and the known carrier signal bit to get an estimate of the raw bit value. This estimate serves as an estimate for the raw bit value. The reader accumulates these estimates for each raw bit value (1162).

As noted above, the reader computes an estimate of the watermark signal by predicting the original, un-watermarked signal and deriving an estimate of the watermark signal based on the predicted signal and the watermarked signal. It then computes an estimate of a raw bit value based on the value of the carrier signal, the assignment map that maps a raw bit to the host image, and the relationship among the carrier signal value, the raw bit value, and the watermark signal value. In short, the reader reverses the embedding functions that modulate the message with the carrier and apply the modulated carrier to the host signal. Using the predicted value of the original signal and an estimate of the watermark signal, the reader reverses the embedding functions to estimate a value of the raw bit.

The reader loops over the candidate orientation vectors and associated blocks, accumulating estimates for each raw bit value (1164). When the loop is complete, the reader calculates a final estimate value for each raw bit from the estimates compiled for it. It then performs the inverse of the error correction coding operation on the final raw bit values (1166). Next, it performs a CRC to determine whether the read is valid. If no errors are detected, the read operation is complete and the reader returns the message (1168).

However, if the read is invalid, then the detector may either attempt to refine the orientation vector data further, or start the detection process with a new frame. Preferably, the detector should proceed to refine the orientation vector data when the combined detection value of the top candidates indicates that the current data is likely to contain a strong watermark signal. In the process depicted in FIG. 72, for example, the detector selects a processing path based on the combined detection value (1170). The combined detection value may be calculated in a variety of ways. One approach is to compute a combined detection value based on the geometric coincidence of the top orientation vector candidates and a compilation of their figures of merit. The figure of merit may be computed as detailed earlier.

For cases where the read is invalid, the processing paths for the process depicted in FIG. 72 include: 1) refine the top orientation vectors in the spatial domain (1172); 2) invoke the translation estimator on the frame with the next best orientation vector candidates (1174); and 3) re-start the detection process on a new frame (assuming an implementation where more than one frame is available)(1176). These paths are ranked in order from the highest detection value to the lowest. In the first case, the orientation vectors are the most promising. Thus, the detector re-invokes the reader on the same candidates after refining them in the spatial domain (1178). In the second case, the orientation vectors are less promising, yet the detection value indicates that it is still worthwhile to return to the translation estimation stage and continue from that point. Finally, in the final case, the detection value indicates that the watermark signal is not strong enough to warrant further refinement. In this case, the detector starts over with the next new frame of image data.

In each of the above cases, the detector continues to process the image data until it either makes a valid read, or has failed to make a valid read after repeated passes through the available image data.

Q. Operating Environment for Computer Implementations

Figure 73:
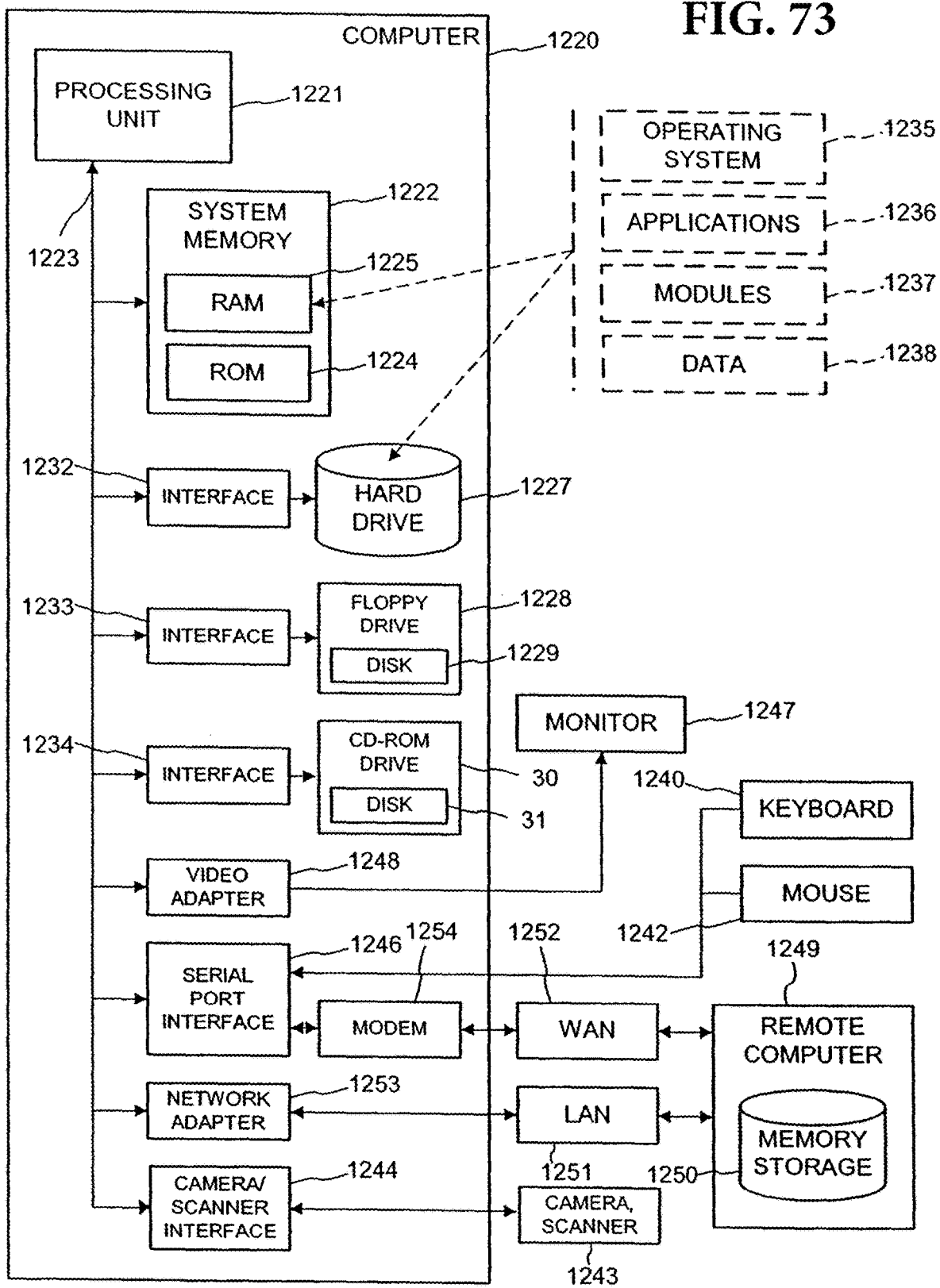
FIG. 73 is a diagram of a computer system that serves as an operating environment for software implementations of a watermark embedder, detector and reader.

FIG. 73 illustrates an example of a computer system that serves as an operating environment for software implementations of the watermarking systems described above. The embedder and detector implementations are implemented in C/C++ and are portable to many different computer systems. FIG. 73 generally depicts one such system.

The computer system shown in FIG. 73 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the computer 1220 through a keyboard 1240 and pointing device, such as a mouse 1242. Other input devices may include a microphone, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

Other input devices may be connected to the processing unit 1221 through a serial port interface 1246 or other port interfaces (e.g., a parallel port, game port or a universal serial bus (USB)) that are coupled to the system bus.

A monitor 1247 or other type of display device is also connected to the system bus 1223 via an interface, such as a video adapter 1248. In addition to the monitor, computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 73. The logical connections depicted in FIG. 73 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

While the computer architecture depicted in FIG. 73 is similar to typical personal computer architectures, aspects of the invention may be implemented in other computer architectures, such as handheld computing devices like Personal Digital Assistants, etc.

Other Remarks

Having described and illustrated the principles of applicant's inventive work with reference to illustrative features and examples, it will be recognized that the technology is not so limited.

For example, sensing and other processes described as taking place at one location (e.g., a checkout station) may additionally, or alternatively, be conducted elsewhere (e.g., in a shopper's cart, in a store aisle, etc.).

Naturally, data from the sensors can be relayed to a processor by a variety of means—including both wired (e.g., Ethernet) and wireless (e.g., WiFi, Bluetooth, Zigbee, etc.).

Technologies described with reference to fixed systems (e.g., a POS terminal) can instead be implemented through use of portable devices (e.g., smartphones and headworn devices). Technologies described with reference to smartphones can likewise be practiced with headworn devices (e.g., the Google Glass device).

For expository convenience, parts of this specification posit that a retail store (e.g., a supermarket) has two essential portions: the checkout portion, and a shopping portion. The former comprises the checkout station (which can include any or all of a POS terminal, conveyor, cash drawer, bagging station, etc.), and the adjoining areas where the shopper and clerk (if any) stand during checkout. The latter comprises the rest of the store, e.g., the shelves where inventory is stocked, the aisles that shoppers traverse in selecting objects for purchase, etc.

As noted, while many of the detailed arrangements are described with reference to conveyor-based implementations, embodiments of the present technology can also be used to inspect, identify and inventory items presented by hand, or carried on the bottom of a shopping cart, etc. Indeed, item inventory and payment needn't be performed at a conventional checkout counter. Instead, items may be identified in the cart (or while being placed in the cart), and payment can be effected at any location—using the consumer's smartphone.

Although the specification discusses various technologies in connection with decoding watermark data from product packaging in retail settings, it will be recognized that such techniques are useful for the other identification technologies and other applications as well.

Off-the-shelf photogrammetry software can be used to perform many of the operations detailed herein. These include PhotoModeler by Eos Systems, Inc., and Image-Modeler by AutoDesk.

Similarly, certain implementations of the present technology make use of existing libraries of image processing functions (software). These include CMVision (from Carnegie Mellon University), ImageJ (a freely distributable package of Java routines developed by the National Institutes of Health; see, e.g., en<dot>Wikipedia<dot>org/wiki/ImageJ; the <dot>convention is used so that this text is not rendered in hyperlink form by browsers, etc.), and OpenCV (a package developed by Intel; see, e.g., en<dot>Wikipedia<dot>org/wiki/OpenCV, and the book Bradski, Learning OpenCV, O'Reilly, 2008). Well-regarded commercial vision library packages include Vision Pro, by Cognex, and the Matrox Imaging Library. Edge detection, ellipse-finding, and image segmentation are a few of the many operations that such software packages perform.

Some embodiments advantageously employ compressed sensing techniques. As is familiar to artisans, compressed sensing allows representation and processing of imagery with greatly-reduced data sets. See, e.g., Candes et al, An Introduction to Compressive Sampling, IEEE Signal Processing Magazine, March, 2008, 10 pp. Similarly, known computational photography techniques are widely useful in processing imagery for object identification.

Data captured by cameras and other sensors (and information derived from such sensor data), may be referred to the cloud for analysis, or processing may be distributed between local and cloud resources. In some arrangements, cloud processing is performed in lieu of local processing (or after certain local processing has been done). Sometimes, however, such data is passed to the cloud and processed both there and in the local device simultaneously. The cloud resource may be configured to undertake a more detailed analysis of the information than is practical with the time and resource constraints of a checkout system. More particularly, the cloud resource can be configured to learn from the sensor data, e.g., discerning correlations between certain barcodes, watermarks, histograms, image features, product weights, product temperatures, etc. This knowledge is occasionally downloaded to the other devices, and used to optimize their operations. (Additionally, a cloud service provider such as Google or Amazon may glean other benefits from access to the sensor data, e.g., gaining insights into consumer shopping behavior, etc. (subject to appropriate privacy safeguards). For this privilege, they may be willing to pay the retailer—providing a new source of income.)

Figure 7:
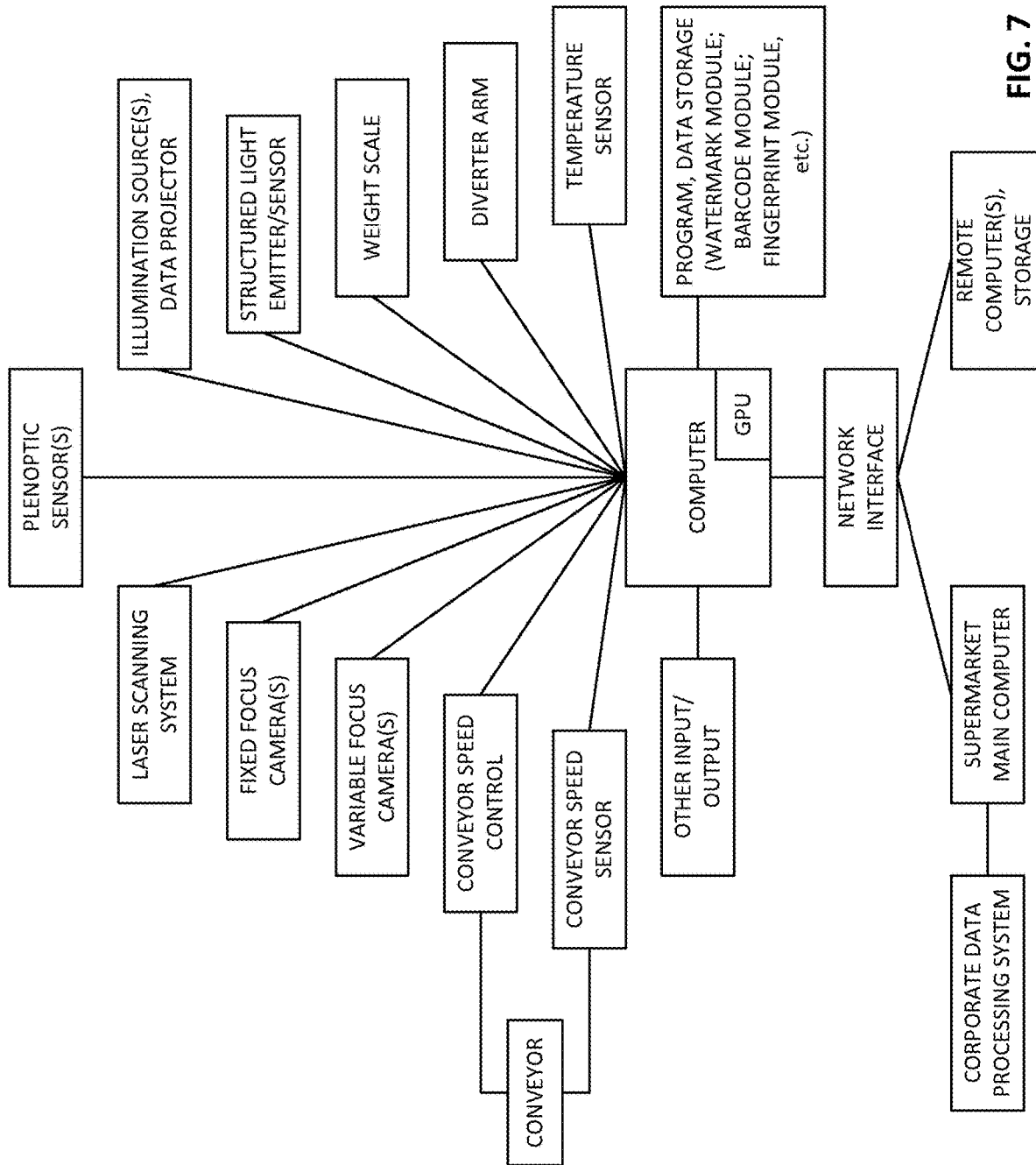
FIG. 7 shows a schematic illustration of a hardware arrangement of a particular embodiment.

Although the specification does not dwell on the point, the artisan will understand that aspects of the detailed technology can form part of a point-of-sale (POS) station, which typically includes a keyboard, a display, a cash drawer, a credit/debit card station, etc. The station, in turn, is networked with a main store computer system, which commonly includes a database system accessible by the POS stations. In turn, the main store computer system is typically networked across the internet, or otherwise, with a corporate data processing system. (A block diagram showing some of the system components is provided in FIG. 7.)

Known supermarket checkout systems, such as those by Datalogic, NCR, Fujitsu, etc., can be adapted to incorporate some or all of the technology detailed herein.

Reference was made to image segmentation. Techniques in addition to those detailed above are familiar to the artisan, including thresholding, clustering methods, histogram-based methods, region-growing methods, edge detection, etc.

Technology for encoding/decoding watermarks is detailed, e.g., in Digimarc's patent publications U.S. Pat. Nos. 6,912,295, 6,721,440, 6,614,914, 6,590,996, 6,122, 403, and 20100150434, as well as in application Ser. No. 13/664,165, filed Oct. 30, 2012 (now U.S. Pat. No. 9,396,509), and 61/749,767, filed Jan. 7, 2013.

Laser scanners used in supermarket checkouts are specialized, expensive devices. In contrast, certain embodiments of the present technology use mass-produced, low-cost cameras—of the sort popular in HD video chat applications. (The Logitech HD Webcam C615 captures 1080p video, and retails for less than $100.)

Such cameras commonly include sensors that respond down into the infrared spectrum, but such response is typically blocked by IR-reflective films. Such sensors can be used without the IR-blocking film to sense IR as well as visible light. As detailed in various of the cited watermarking patents (e.g., U.S. Pat. Nos. 6,912,295 and 6,721,440), use of IR sensing allows watermark and barcode information to be encoded in regions that—to a human—appear uniformly colored.

Although reference was made to GPUs, this term is meant to include any device that includes plural hardware cores operable simultaneously. Intel, for example, uses the term "Many Integrated Core," or Intel MIC, to indicate such class of device. Most contemporary GPUs have instruction sets that are optimized for graphics processing. The Apple iPhone 4 device uses a PowerVR SGX 535 GPU (included in a system-on-a-chip configuration, with other devices).

While detailed in the context of a supermarket implementation, it will be recognized that the present technologies can be used in other applications, including postal and courier package sorting, manufacturing lines, etc.

In some embodiments, a wireless PDA-like device is used in conjunction with one or more fixed cameras to gather imagery from a checkout station. Typically, the wireless device is operated by a store clerk, but alternatively a smartphone owned and operated by a shopper can be used in this role. Some newer smartphones (e.g., the HTC PD29100) include multiple cameras, which can be used advantageously in the detailed arrangements.

In addition to the cited HTC model, particularly contemplated smartphones include the Apple iPhone 5, and smartphones following Google's Android (e.g., the Galaxy S III phone, manufactured by Samsung, the Motorola Droid Razr HD Maxx phone, and the Nokia N900), and Windows 8 mobile phones (e.g., the Nokia Lumia 920).

(Details of the iPhone, including its touch interface, are provided in Apple's published patent application 20080174570.)

The design of smartphone and other computer systems used in implementing the present technology is familiar to the artisan. In general terms, each includes one or more processors, one or more memories (e.g. RAM), storage (e.g., a disk or flash memory), a user interface (which may include, e.g., a keypad or keyboard, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and one or more interfaces for communicating with other devices (which may be wireless, such as GSM, 3G, 4G, CDMA, WiFi, WiMax, or Bluetooth, and/or wired, such as through an Ethernet local area network, a T-1 internet connection, etc.).

The processes and system components detailed in this specification may be implemented as instructions for computing devices, including general purpose processor instructions for a variety of programmable processors, including microprocessors (e.g., the Intel Atom, the ARM A5, the Qualcomm Snapdragon, and A4the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. As noted, "cloud" computing resources can be used as well. References to "processors," "modules" or "components" should be understood to refer to functionality, rather than requiring a particular form of software and/or hardware implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Software and hardware configuration data/instructions are commonly stored as instructions in one or more data structures conveyed by tangible media, such as magnetic or optical discs, memory cards, ROM, etc., which may be accessed across a network. Some aspects of the technology may be implemented as embedded systems—a type of special purpose computer system in which the operating system software and the application software is indistinguishable to the user (e.g., as is commonly the case in basic cell phones). The functionality detailed in this specification can be implemented in operating system software, application software and/or as embedded system software, etc.

As indicated, different of the functionality can be implemented on different devices. For example, certain of the image processing operations can be performed by a computer system at a checkout counter, and other of the image processing operations can be performed by computers in "the cloud."

(In like fashion, data can be stored anywhere: in a local device, in a networked, remote device, in the cloud, distributed between such devices, etc.)

As indicated, the present technology can be used in connection with wearable computing systems, including headworn devices. Such devices typically include display technology by which computer information can be viewed by the user—either overlaid on the scene in front of the user (sometimes termed augmented reality), or blocking that scene (sometimes termed virtual reality), or simply in the user's peripheral vision. Exemplary technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

Use of such identification technologies to obtain object-related metadata is familiar to artisans and is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Linking from watermarks (or other identifiers) to corresponding online payoffs is detailed, e.g., in Digimarc's U.S. Pat. Nos. 6,947,571 and 7,206,820.

Applicant's other work that is relevant to the present technology includes that detailed in pending patent applications 61/838,165, filed Jun. 2, 2013, 61/818,839, filed May 2, 2013, Ser. No. 13/840,451, filed Mar. 15, 2013 (now U.S. Pat. No. 9,060,113), Ser. No. 13/425,339, filed Mar. 20, 2012 (now U.S. Pat. No. 9,402,099), Ser. No. 13/651,182, filed Oct. 12, 2012 (now U.S. Pat. No. 8,868,039), Ser. No. 13/684,093, filed Nov. 21, 2012 (now U.S. Pat. No. 8,620,021), Ser. No. 13/863,897, filed Apr. 16, 2013 (now published as US20130314541), Ser. No. 13/873,117, filed Apr. 29, 2013 (now U.S. Pat. No. 9,830,588), 61/745,501, filed Dec. 21, 2012, and 61/838,165, filed Jun. 21, 2013, and published applications 20100228632, 20110212717, 20110214044, 20110161076, 20120284012, 20120218444, 20120046071, 20120300974, 20120224743 and 20120214515.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicants similarly recognize and intend that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

From the present disclosure—including the noted sources, an artisan can implement embodiments of the present technology without undue experimentation.

While certain aspects of the technology have been described by reference to illustrative methods, it will be recognized that apparatus configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

Plenoptic cameras are available, e.g., from Lytro, Inc., Pelican Imaging Corp., and Raytrix, GmbH. Some of their work is detailed in patent publications 20110122308, 20110080487, 20110069189, 20070252074, 20080266655, 20100026852, 20100265385, 20080131019 and WO/2010/121637. The major consumer camera manufacturers are also understood to have prototyped such products, as has Adobe Systems, Inc. Some of Adobe's work in this field is detailed in U.S. Pat. Nos. 7,620,309, 7,949,252, 7,962,033.

Artisans sometimes draw certain distinctions between plenoptic sensors, light field sensors, radiance cameras, and multi-aperture sensors. The present specification uses these terms interchangeably; each should be construed so as to encompass the others.

Technology for supermarket checkout stations, incorporating imagers, is shown in U.S. patent documents 20040199427, 20040223663, 20090206161, 20090090583, 20100001075, 4,654,872, 7,398,927 and 7,954,719. Additional technologies for supermarket checkout, and object identification, are detailed in the following patent publications owned by Datalogic, a leader in the field: 20070084918, 20060147087, 20060249581, 20070267584, 20070284447, 20090152348, 20100059589, 20100213259, 20100217678, 20100158310, 20100123005, 20100163628, and 20100013934.

A survey of semiconductor chemical sensors is provided in Chang, et al, Electronic Noses Sniff Success, IEEE Spectrum, Vol. 45, No. 3, 2008, pp. 50-56. Illustrative implementations are detailed in Chang et al, Printable Polythiophene Gas Sensor Array for Low-cost Electronic Noses, Journal of Applied Physics 100, 014506 (2006) and in U.S. Pat. Nos. 5,140,393, 7,550,310, and 8,030,100. Semiconductor chemical sensors are available from a variety of vendors, including Owlstone Nanotech, Inc.

Head-mounted display systems, and related technology, are detailed, e.g., in published patent documents U.S. Pat. Nos. 8,235,529, 8,223,088, 8,203,605, 8,183,997, 8,217,856, 8,190,749 and 8,184,070 (Google); 20080088936, 20080088529, 20080088937 and 20100079356 (Apple); and 20120229909, 20120113092, 20050027515 and 20120068913 (Microsoft).

Electronic displays in which optical detectors see-through the display panel to sense optical data are known, e.g., from patent publication 20120169669, and from Hirsch, et al, BiDi Screen: A Thin, Depth-Sensing LCD for 3D Interaction using Light Fields, ACM Transactions on Graphics, Vol. 28, No. 5, December 2009, and from Izadi et al, ThinSight: Integrated Optical Multi-touch Sensing through Thin Form-factor Displays, Proc. of the 2007 ACM Workshop on Emerging Displays Technologies, Paper No. 6.

The present disclosure details a variety of technologies. For purposes of clarity, they are often described separately. However, it will be recognized that they can be used together. While each such combination is not literally detailed, it is applicant's intent that they be so-combined.

Similarly, while this disclosure has detailed particular ordering of acts and particular combinations of elements, it will be recognized that other contemplated methods may re-order acts (possibly omitting some and adding others).

Although disclosed as complete systems, sub-combinations of the detailed arrangements are also separately contemplated.

The artisan will be familiar with other writings useful in various implementations of the present technology, e.g., concerning construction of 3D models using imagery captured from different viewpoints. Examples include the PhD thesis of Snavely, "Scene Reconstruction and Visualization from Internet Photo Collections," University of Washington, 2008, and his published patent application 20070110338. These writings teach, e.g., "structure through motion" methods, and how corresponding image features in different images can be identified and how the geometries of the two images can thereby be spatially related.

The Wikipedia article "Structure from Motion" provides additional information on such technology, and includes links to several such software packages. These include the Structure from Motion toolbox by Vincent Rabaud, Matlab Functions for Multiple View Geometry by Andrew Zissermann, the Structure and Motion Toolkit by Phil Torr, and the Voodoo Camera Tracker (a tool for integrating real and virtual scenes, developed at the University of Hannover).

Such methods are also known from work in simultaneous location and mapping, or SLAM. A treatise on SLAM is provided in Durrant-Whyte, et al, Simultaneous Localisation and Mapping (SLAM): Part I The Essential Algorithms, and Part II State of the Art, IEEE Robotics and Automation, Vol. 13, No. 2 (pp. 99-110) and No. 3 (pp. 108-117), 2006. One implementation of SLAM adapted to operate even on mobile device CPUs/GPSs is available from 13$^{th}$ Lab, AB.

OpenSource implementations of SLAM are widely available; many are collected at OpenSLAM<dot>org. Others include the CAS Robot Navigation Toolbox (at www<dot>cas<dot>kth<dot>se/toolbox/index<dot>html), Matlab simulators for EKF-SLAM, UKF-SLAM, and FastSLAM 1.0 and 2.0 at www<dot>acfr<dot>usyd<dot>edu<dot>au/homepages/academic/tbailey/software/index<dot>html; Scene, at www<dot>doc<dot>ic <dot>ac<dot>uk/~ajd/Scene/index<dot>html; and a C language grid-based version of FastSLAM at www<dot>informatik<dot>uni-freiburg<dot>de/—haehnel/old/download<dot>html.

SLAM is well suited for use with uncalibrated environments, as it defines its own frame of reference. Embodiments of the technology that employ handheld scanning devices (e.g., tethered hand-scanners, or wireless smartphones) are thus particularly suited for use with SLAM methods.

Other arrangements for generating 3D information from plural images are detailed in patent publications 20040258309, 20050238200, 20100182406, 20100319100, 6,137,491, 6,278,460, 6,760,488 and 7,352,386. Related information is detailed in applicant's application Ser. No. 13/088,259, filed Apr. 15, 2011 (now U.S. Pat. No. 9,398,210).

For a review of perspective, the reader is referred to the Wikipedia article "3D Projection." Wikipedia articles concerning "Plenoptic Cameras" and Light Field" provide additional information on those technologies.

(Copies of many of the above-cited non-patent publications are attached as appendices to application Ser. No. 13/231,893, now U.S. Pat. No. 9,033,238.)

CONCLUDING REMARKS

This specification details a variety of embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. However, implementation of all such combinations is straightforward to the artisan from the provided teachings.

Although features and arrangements are described, in some cases, individually, applicant intends that they will also be used together. Conversely, while certain methods and systems are detailed as including multiple features, applicant conceives that—in other embodiments—the individual features thereof are usable independently.

The present specification should be read in the context of the cited references (with which the reader is presumed to be familiar) Those references disclose technologies and teachings that applicant intends be incorporated into the certain embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.)

In view of the wide variety of embodiments to which the principles and features discussed above can be applied, it should be apparent that the detailed embodiments are illustrative only, and should not be taken as limiting the scope of the technology. Rather, applicant claim all such modifications as may come within the scope and spirit of the following claims and equivalents thereof.

The invention claimed is:

1. A system for identifying a barcoded item selected from a shelf of a store by an individual, comprising:
   first and second different sensors, one of said sensors comprising a ceiling-mounted camera, the other of said sensors comprising an inventory sensor;
   one or more processors and one or more memories;
   said one or more memories including instructions that configure the system to employ received data, including information from the first and second sensors, in a data fusion manner to narrow a universe of possible item identifications;
   said instructions including instructions for:
   developing, based on received data that includes information from the first sensor, a set of plural item identification hypotheses about the barcoded item selected by the individual, wherein each of said item identification hypotheses has an associated confidence score that respectively indicates confidence about said hypothesis;
   refining the set of plural identification hypotheses about the selected barcoded item by applying data fusion based on other information, the other information including information from the second sensor, said refining including revising at least certain of said associated confidence scores to yield revised confidence scores;
   determining whether one of said revised confidence scores has a value fulfilling a predetermined criterion;
   if need be, successively repeating said refining and determining operations based on information different than said information from the first and second sensors, until one of said revised confidence scores has a value fulfilling said predetermined criterion; and adding, to a tally for said individual, a particular item identified by the item identification hypothesis associated with said one revised confidence score that has a value fulfilling the predetermined criterion, said particular item being the barcoded item selected by the individual;

wherein the system is configured to identify the barcoded item selected by the individual as said particular item without identifying said item by reading the item barcode.

2. A method involving a first barcoded item, practiced in a store comprising multiple aisles and shelves, the method comprising the acts:

collecting inventory removal data reflecting locations at which items were removed from shelves, including a first barcoded item removed from a first shelf;

storing first time data reflecting times at which said items were removed from said shelves, including first time data reflecting a time when said first barcoded item was removed from the first shelf;

collecting shopper tracking data reflecting locations in the store visited by respective shoppers, including a first shopper;

storing second time data reflecting times at which said shoppers were at said respective locations, including a time the first shopper visited a first location;

evaluating a confidence score against a threshold, said confidence score being based on information including said inventory removal data, said shopper tracking data, said first time data, and said second time data, and indicating confidence that said first barcoded item was selected by said first shopper;

determining that said confidence score exceeds said threshold; and adding said first barcoded item to an item tally maintained for said first shopper;

wherein the act of collecting inventory removal data comprises collecting said inventory removal data using inventory sensors positioned to monitor removal of stock from shelves, and said act of collecting shopper tracking data comprises collecting said shopper tracking data using plural cameras that look down onto aisles.

3. A method practiced in a retail store that stocks barcoded items for sale, comprising the acts:

determining, from an inventory sensor, that a particular item was removed from a stock location, said inventory sensor comprising a weight transducer positioned to monitor removal of stock from a shelf or a camera positioned to monitor removal of stock from a shelf;

storing removal time data indicating a time at which said particular item was removed from said stock location;

tracking shoppers through the store using cameras that look down onto aisles, and storing information indicating presence of different shoppers at different locations at different times, said information comprising first time data indicating a time at which a first shopper was present at said stock location, and comprising second time data indicating a time at which a second shopper was present at said stock location, said stock location being identified as a stock location for said particular item through use of a database containing information about the layout of the store, indicating locations of different items in the store's inventory;

assigning a first confidence value to express a likelihood that said particular item was removed by the first shopper, said first confidence value being a function of said first time data indicating a time at which the first shopper was present at said stock location, and said removal time data; and assigning a second confidence value to express a likelihood that said particular item was removed by the second shopper, said second confidence value being a function of said second time data indicating a time at which the second shopper was present at said stock location, and said removal time data;

wherein the first confidence value is augmented relative to the second confidence value because the time indicated by the first time data is closer to the item removal time than the time indicated by the second time data.

4. The system of claim 1 configured to wirelessly relay information from one or more of said sensors to the one or more processors.

5. The system of claim 1 configured to enable completion of a payment transaction using a mobile device conveyed by the individual.

6. The system of claim 1 in which said other information comprises information provided from a mobile device conveyed by the individual.

7. The system of claim 1 that includes plural spaced-apart cameras serving as the inventory sensor, wherein said cameras capture different views of said barcoded item, thereby providing multiple camera data for input to said data fusion.

8. The system of claim 1 in which said received data or other information includes first data indicating (a) pausing of said individual at positions in the store; (b) times at which said individual pauses at said positions; and (c) times at which items of stock are removed from store shelves where said items are respectively stocked.

9. The system 8 in which:

the first data indicates that, at a first time, the individual paused at a shelf location where a barcoded item having a first identity was stocked, and also at said first time, a barcoded item having the first identity was removed from said shelf location; and the refining includes increasing a confidence score for a hypothesis that the barcoded item selected by the individual is a barcoded item having said first identity, due to coincidence of said two first times.

10. The system of claim 1 in which said refining of the set of plural identification hypotheses comprises evaluating plural alternate Bayesian hypotheses using said other information.

11. The system of claim 1 in which said data fusion employs purchase history information for said individual.

12. The system of claim 1 in which said data fusion employs information indicating that the individual purchases a first brand of product more frequently than a second, competing brand of product.

13. The system of claim 1 in which said data fusion employs information about a recurring interval by which the individual commonly purchases a particular type of item.

14. The system of claim 1 in which said other information includes statistical item correlation data indicating a particular second item that the individual commonly purchases with a particular first item.

15. The system of claim 1 in which said inventory sensor comprises a camera positioned to monitor removal of items from a shelf.

16. The system of claim 1 in which said inventory sensor comprises a weight transducer.

17. The system of claim 1 that further includes an emitter of infrared light to illuminate a viewing area of a camera of said system.

18. The system of claim 1 that further includes a structured light scanner, comprising an infrared light source and an image sensor, which provides information used in said data fusion.

19. The system of claim 1 in which said instructions further include instructions for deriving 3D information, by matching features depicted in multiple images captured by multiple cameras, to determine a point cloud representation of a scene viewed by the multiple cameras, and using said 3D information in developing or refining said plural identification hypotheses.

20. The method of claim 2 that further includes wirelessly transmitting said inventory removal data to a processing system that performs said evaluating of the confidence score.

21. The method of claim 2 that further includes completing a payment transaction for the item tally using a mobile device conveyed by the first shopper.

22. The method of claim 2 in which said information on which the confidence score is based includes information provided from a mobile device conveyed by the individual.

23. The method of claim 3 that further includes wirelessly transmitting data from said inventory sensor to a processing system that performs said assigning of the first and second confidence scores.

24. The method of claim 3 that further includes concluding that the particular item was removed by the first shopper, and completing a payment transaction for the particular item using a mobile device conveyed by the first shopper.

25. The method of claim 3 that includes assigning the first confidence value based on said first time data, said removal time data, and also on further data, wherein the further data includes information provided from a mobile device conveyed by the first shopper.

26. The method of claim 2 that includes collecting the shopper tracking data using plural cameras that look down onto aisles and are coupled to a ceiling.

27. The method of claim 2 that includes collecting said inventory removal data using weight transducers.

28. The method of claim 2 that includes collecting said inventory removal data using cameras positioned to monitor removal of stock from shelves.

29. The method of claim 2 in which the confidence score is derived using a Bayesian technique.

30. The method of claim 2 in which the information on which the confidence score is based also includes purchase history information for said first shopper.

31. The method of claim 2 in which the information on which the confidence score is based includes information indicating that the first shopper purchases a first brand of product more frequently than a second brand of product.

32. The method of claim 2 in which said information on which the confidence score is based includes information about a recurring interval by which the first shopper commonly purchases a particular type of item.

33. The method of claim 2 in which said information on which the confidence score is based includes statistical item correlation data indicating a particular second item that the first shopper commonly purchases with a particular first item.

34. The method of claim 2 in which said information on which the confidence score is based includes information from a structured light scanner, comprising an infrared light source and an image sensor.

35. The method of claim 2 in which said information on which the confidence score is based includes point cloud information, derived by matching features depicted in multiple images captured by multiple cameras, to determine a 3D point cloud representation of a scene viewed by the multiple cameras.

36. The method of claim 3 in which said cameras that look down onto aisles are coupled to a ceiling.

37. The method of claim 3 in which said particular item is one of said barcoded items.

38. The method of claim 3 in which determining the particular item was removed from the stock location uses an inventory sensor comprising a weight transducer positioned to monitor removal of stock from the shelf.

39. The method of claim 3 in which determining the particular item was removed from the stock location uses an inventory sensor comprising a camera positioned to monitor removal of stock from the shelf.

40. The method of claim 3 in which said assigning of the first confidence value employs a Bayesian technique.

41. The method of claim 3 that includes assigning the first confidence value based on said first time data, said removal time data, and also on further data, wherein the further data includes purchase history information for said first shopper.

42. The method of claim 3 that includes assigning the first confidence value based on said first time data, said removal time data, and also on further data, wherein the further data includes information indicating that the first shopper purchases a first brand of product more frequently than a second brand of product.

43. The method of claim 3 that includes assigning the first confidence value based on said first time data, said removal time data, and also on further data, wherein the further data includes information about a recurring interval by which the first shopper commonly purchases a particular type of item.

44. The method of claim 3 that includes assigning the first confidence value based on said first time data, said removal time data, and also on further data, wherein the further data includes statistical item correlation data indicating a particular second item that the first shopper commonly purchases with a particular first item.

45. The method of claim 1 that includes assigning the first confidence value based on data including information from a structured light scanner, comprising an infrared light source and an image sensor.

46. The method of claim 3 that includes assigning the first confidence value based on data including information provided from a mobile device conveyed by the first shopper.

47. The method of claim 3 that includes assigning the first confidence value based on said first time data, said removal time data, and also on further data, wherein the further data includes point cloud information, derived by matching features depicted in multiple images captured by multiple cameras, to determine a 3D point cloud representation of a scene viewed by the multiple cameras.

48. The system of claim 1 including instructions for effecting payment for said tally away from any checkout counter.

49. The method of claim 2 that includes effecting payment for said tally away from any checkout counter.

50. The method of claim 3 that includes effecting payment from the first shopper away from any checkout counter.

51. The system of claim 1 in which said instructions for applying data fusion include instructions for applying data fusion based on other information that includes information from a 3D camera.

52. The system of claim 1 in which said instructions for applying data fusion include instructions for applying data fusion based on other information that includes information from a time of flight camera.

53. One or more tangible computer-readable media storing computer-executable instructions that, when executed, configure one or more processors of a system to identify a barcoded item selected from a store shelf by an individual, said system also including first and second different sensors, one of said sensors comprising a camera that looks down onto a store aisle, the other of said sensors comprising an inventory sensor, said instructions including instructions for:

developing, based on received data that includes information from the first sensor, a set of plural item identification hypotheses about the barcoded item selected by the individual, wherein each of said item identification hypotheses has an associated confidence score that respectively indicates confidence about said hypothesis;

refining the set of plural identification hypotheses about the selected barcoded item by applying data fusion based on other information, the other information including information from the second sensor, said refining including revising at least certain of said associated confidence scores to yield revised confidence scores;

determining whether one of said revised confidence scores has a value fulfilling a predetermined criterion;

if need be, successively repeating said refining and determining operations based on information different than said information from the first and second sensors, until one of said revised confidence scores has a value fulfilling said predetermined criterion; and adding, to a tally for said individual, a particular item identified by the item identification hypothesis associated with said one revised confidence score that has a value fulfilling the predetermined criterion, said particular item being the barcoded item selected by the individual;

wherein the system is configured by said instructions to identify the barcoded item selected by the individual as said particular item without identifying said item by reading the item barcode.

54. One or more tangible computer-readable media storing computer-executable instructions that, when executed, configure one or more processors of a system to identify a first barcoded item in a store comprising multiple aisles and shelves, said instructions including instructions for:

collecting inventory removal data from inventory sensors positioned to monitor removal of stock from shelves, said collected inventory removal data reflecting locations at which items were removed from shelves, including a first barcoded item removed from a first shelf;

storing first time data reflecting times at which said items were removed from said shelves, including first time data reflecting a time when said first barcoded item was removed from the first shelf;

collecting shopper tracking data from plural cameras that look down onto aisles, said shopper tracking data reflecting locations in the store visited by respective shoppers, including a first shopper;

storing second time data reflecting times at which said shoppers were at said respective locations, including a time the first shopper visited a first location;

evaluating a confidence score against a threshold, said confidence score being based on information including said inventory removal data, said shopper tracking data, said first time data, and said second time data, and indicating confidence that said first barcoded item was selected by said first shopper;

determining that said confidence score exceeds said threshold; and adding said barcoded first item to an item tally maintained for said first shopper.

55. A system for use in a retail store that stocks barcoded items for sale, the system including an inventory sensor, plural cameras that look down onto aisles, and one or more processors, wherein said one or more processors are configured to perform acts including:

determining, from the inventory sensor, that a particular item was removed from a stock location;

storing removal time data indicating a time at which said particular item was removed from said stock location;

tracking shoppers through the store using said plural cameras, and storing information indicating presence of different shoppers at different locations at different times, said information comprising first time data indicating a time at which a first shopper was present at said stock location, and comprising second time data indicating a time at which a second shopper was present at said stock location, said stock location being identified as a stock location for said particular item through use of a database containing information about the layout of the store, indicating locations of different items in the store's inventory;

assigning a first confidence value to express a likelihood that said particular item was removed by the first shopper, said first confidence value being based on data including said first time data indicating a time at which the first shopper was present at said stock location, and said removal time data; and assigning a second confidence value to express a likelihood that said particular item was removed by the second shopper, said second confidence value being based on data including said second time data indicating a time at which the second shopper was present at said stock location, and said removal time data;

wherein the first confidence value is augmented relative to the second confidence value because the time indicated by the first time data is closer to the item removal time than the time indicated by the second time data.

56. The system of claim 55 in which the one or more processors are configured to assign said first confidence value based on data further including data from a 3D camera.

57. The system of claim 55 in which the one or more processors are configured to assign said first confidence value based on data further including data from a time of flight camera.

* * * * *